(12) United States Patent
Scandura

(10) Patent No.: US 6,275,976 B1
(45) Date of Patent: Aug. 14, 2001

(54) AUTOMATED METHOD FOR BUILDING AND MAINTAINING SOFTWARE INCLUDING METHODS FOR VERIFYING THAT SYSTEMS ARE INTERNALLY CONSISTENT AND CORRECT RELATIVE TO THEIR SPECIFICATIONS

(76) Inventor: Joseph M. Scandura, 1249 Greentree La., Narberth, PA (US) 19072

( * ) Notice: Subject to any disclaimer, the term of this patent is extended or adjusted under 35 U.S.C. 154(b) by 0 days.

(21) Appl. No.: 08/805,694

(22) Filed: Feb. 25, 1997

Related U.S. Application Data

(60) Provisional application No. 60/013,510, filed on Mar. 15, 1996.

(51) Int. Cl.$^7$ .......................................................... G06F 9/44
(52) U.S. Cl. ...................................................... 717/1; 717/4
(58) Field of Search .................................... 395/701–704, 395/500.43; 714/36, 38; 706/25–30, 919–923; 703/22

(56) References Cited

U.S. PATENT DOCUMENTS

| | | |
|---|---|---|
| 5,262,761 | 11/1993 | Scandura et al. . |
| 5,291,497 * | 3/1994 | Ulrich et al. ............................ 714/38 |
| 5,379,432 | 1/1995 | Orton et al. . |
| 5,390,325 | 2/1995 | Miller . |
| 5,421,006 * | 5/1995 | Jablon et al. .......................... 714/36 |
| 5,423,027 | 6/1995 | Jackson . |
| 5,481,717 | 1/1996 | Gaboury . |
| 5,490,249 * | 2/1996 | Miller .................................... 714/38 |
| 5,652,835 * | 7/1997 | Miller .................................... 714/38 |

OTHER PUBLICATIONS

Ullman et al., "Efficient Tests for Top–down Termination", Journal of the ACM, vol. 35, No. 2, Apr. 1988,pp 345–373.*

Evans et al., "LCLint: A Tool for Using Specifications to Check Code", SIGSOFT, ACM, 1994, pp 87–96.*

Stefanescu et al., "An Equational Framework for the Flow Analysis of Higher Order Functional Programs", LISP 94, ACM, 1994, pp 318–327.*

Bultan et al., "Compositional Verification by Model Checking for Counter–Examples" ISSTA, ACM, 1996, pp 224–238.*

Clarke et al. "Model Checking and Abstraction", ACM 1992, pp 343–354.*

Caughlin, "Verification, Validation, and Accredition (VV&A) of Models and Simulations Thruogh Rduced Order Metamodels", Proc. of the 1995 winter Simulation Conference.*

Kearns et al., "On the Boosting Ability of Top–Down Decision Tree Learning Algorithm", STOC '96, ACM, 1996, pp 459–468.*

Nakagawa et al., "Stepwise Refinement Process with Modularity: An Algebraic Approach" ACM. 1989, pp 166–177.*

(List continued on next page.)

*Primary Examiner*—Kakali Chaki

(57) ABSTRACT

Software development and maintenance involves assembling components, sometimes with explicit support during the design process but more frequently not. In neither case has it been possible to ensure internal consistency and correctness in a manner that scales well to large as well as small system.

Figure 1B:
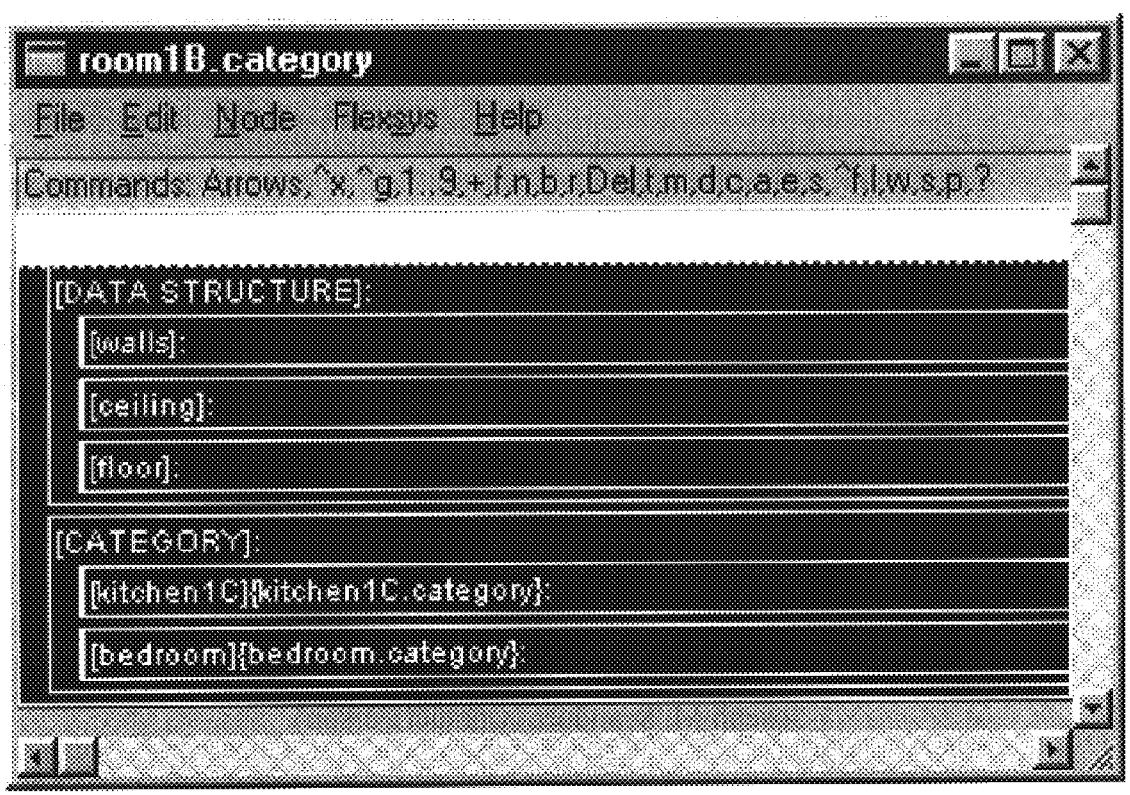

The invention disclosed herein is an intuitive, repeatable, formally verifiable and automated method for developing and maintaining software systems that is practical and easy to use. Specifically, this method provides human designers with automated support for specifying, designing, implementing and maintaining arbitrarily large, complex software systems that are both internally consistent and logically correct (i.e., consistent with external specifications). This method avoids the "combinatorial explosion" problem and minimizes the need for human input, respectively, by constructing specifications and solution designs via successive levels of refinement and by categorizing input and output values into equivalence classes.

27 Claims, 85 Drawing Sheets

OTHER PUBLICATIONS

Mili et al., "Formal models of stepwise refinement of programs", ACM computing Surveys, Sep. 1986, pp 231–276.*

Cherniak, "Undebuggability and cognitive science", Comm. of the ACM, 1988, pp 402–412.*

Batory, D. and O'Malley, Design and implementation of hierarchical software with reusable components. *ACM Transactions in Software Engineering and Methodology*, 1992, 355–398.

Booch, G. *Object–oriented Analysis and Design with Applications Second Edition*. Redwood City, CA: Benjamin Cummings, 1994.

Brunner, J., Goodnow, J. and Austin, G. A Study of Thinking. New York: Wiley, 1956.

Chen, P. The Entity–Relationship model: toward a unified view of data. *ACM Trans. Database System*, 1976, I., pp. 9–36.

Coad, P. and Yourdon, E. *Object–Oriented Analysis*. Englewood Cliffs, NJ: Yourdon Press, 1991.

Flaatten, P.O., McCubbrey, D.J. O'Riordan, P.D. and Burgess, K. *Foundations of Business Systems*. Chicago: Dryden Press. 1989.

Hatley, D. and Pirbhai, I. *Strategie for Real–Time System Specification*. New York: Dorset House, 1987.

Hausler, P. A., Linger, R.C. and Trammell, C.J. Adopting Cleanroom Software Engineering with a Phased Approach. *IBM Systems Journal*, Mar., 1994.

Hoare, C. A. R. and Shepherdson, J. C. Mathematical Logic and Programming Languages. Englewood Cliffs, NJ: Prentice Hall, 1985.

Krut, R. W. et al. *Domain Analysis Workshop Report*, Pittsburgh: SEI, CMI 1996.

Linger, R. C. Cleanroom Process Model. *IEEE Software*, pp. 50–58, Mar. 1994.

Linger, R. C., H. D. Mills, and B. J. Witt. *Structured Programming: Theory and Practice*. Reading, MA: Addison–Wesley Publishing Co., 1979.

Martin, J. *System Design from Provabluy Correct Constructs*. Englewood Cliffs, NJ: Prentice Hall, 1985.

Prywes, N., Shi, Y., Szymanski, B. and Tseng, J. Supersystem programming with the Model equational language. *IEEE Computer*, Feb., 1986, 5–60.

Rumbaugh, J. et al. *Object–Oriented Modeling and Design*. Englewood Cliffs, NJ: Prentice Hall, 1991.

Scandura, J.M. Deterministic theorizing in structural learning: Three levels of empiricism. *Journal of Structural Learning*, 1971, 3, 21–53.

Scandura, J.M. *Structural learning I: Theory and research* London/New York: Gordon & Breach Science Publishers, 1973.

Scandura, J.M. *Problem Solving: A Structural/Process Approach with Instructional Implications*. New York: Erlbaum, 1977.

Scandura, J.M. Structural (cognitive task) analysis: a method for analyzing content. Part I: Background and empirical research. *Journal of Structural Learning*, 1982, 7, 101–114.

Scandura, J.M. Structural (cognitive task) analysis: A method for analyzing content: Part II: Toward precision, objectivitiy and systematization. *Journal of Structural Learning and Intelligent Systems*, 1984a, 8, 1–28. Also in *Proceedings, XIII Congress of Psychology*, Acapulco, Mexico, 9/2–8, 1984a.

Scandura, J.M. Structural (cognitive task) analysis: A method for analyzing content; Part III: Validity and Reliability, *Journal of Structural Learning and Intelligent Systems*, 1984, 8, 173–193.

Scandura, J.M. Cognitive technology and the PRODOC re/NuSys Workbench: a technical overview. *Journal of Structural Learning and Intelligent Systems*, 1992, 11, 89–126.

Scandura, J.M. Converting legacy code into Ada: A cognitive approach. *IEEE Computer*, Apr., 1994, 55–61.

Scandura, J.M. Cognitive analysis, design and programming: Next generation OO paradigm. *Journal of Structural Learning and Intelligent Systems*, 1996, in press. (This paper is partially based on a paper given at Valley Forge: *National Ada Conference*, Mar. 18, 1995.

Scandura, J.M., Durnin, J.H., Ehrenpreis, W., et al. *An algorithmic approach to mathematics: Concrete behavioral foundations*. New York: Harper & Row, 1971.

Scandura, J.M. & Scandura, A.B. *Structural Learning and Concrete Operations: An Approach to Piagetian Conservation*. Praeger Sci. Pub., N.Y., 1980.

Sherer, S. Wayne, Paul G. Arnold, and Ara Kouchakdjian. Experience Using Cleanroom Software Engineering in the U.S. Army. *Proceedings from the Software Technology Conference*, Apr. 1994.

Sigfried, S. Understanding Object–Oriented Software Engineering, NY: IEEE Press, 1996.

Willison et al. *Domain Engineering Handbook* Army STARS Demonstration Project. Ft. Monmouth, NJ AMSEL–RO–SE–PRO, 1995.

Winston, P.H. *Artificial Intelligence*. Reading, MA: Addison–Welsey, 1977.

Yourdon E. *Modern Structural Analysis*. Englewood Cliffs, NJ: Yourdon Press, 1989.

* cited by examiner

Figure 1

Figure 1A

```
room1A.spc

File  Edit  Node  Flexys  Help
Commands: Arrows, %, g, !, 9, +, /, n, b, r, Del, t, n, d, c, a, e, s, T, l, v, s, p, ?

[INPUT]:
  [room]category:
  ABSTRACT VALUES: messy neat
      [kitchen]extraction:
      ABSTRACT VALUES: messy neat
      PARENT-CHILD RELATIONSHIPS:
          or (greasy, dirty); messy
          and (shiny, clean); neat
          [stove]:
          ABSTRACT VALUES: greasy shiny

[dishes]:
          ABSTRACT VALUES: dirty clean

[bedroom]:
      ABSTRACT VALUES: messy neat

[OUTPUT]:
  [room]category:
  ABSTRACT VALUES: neat
  INPUT-OUTPUT PROTOTYPE: room; room
  INPUT-OUTPUT BEHAVIOR: *; neat
      [kitchen]extraction:
      ABSTRACT VALUES: neat
      PARENT-CHILD RELATIONSHIPS:
          and (shiny, clean); neat
      INPUT-OUTPUT PROTOTYPE: kitchen; kitchen
      INPUT-OUTPUT BEHAVIOR: *; neat
          [stove]:
          ABSTRACT VALUES: greasy shiny

[dishes]:
          ABSTRACT VALUES: dirty clean

[bedroom]:
      ABSTRACT VALUES: neat
      INPUT-OUTPUT PROTOTYPE: bedroom; bedroom
      INPUT-OUTPUT BEHAVIOR: *; neat
```

Figure 2

Figure 2A

```
cleanrm2.dsn
File  Edit  Node  Resyn  Help
Commands: Arrows ^x g1 9 - In b/ Del m d e a e s f l x s p ?
clean_room ( room )
[cleanrm2.dsn]:clean_room:[]:library:[system file]:
  [DETAILED SPECIFICATIONS]
    [RULE SPECS]
      [9] [atomic]+++
        [INPUT]
          [current_rug]:ABSTRACT VALUES: messy_dirty dirty clean
        [OUTPUT]
          [current_rug]:ABSTRACT VALUES: clean
          INPUT-OUTPUT PROTOTYPE: current_rug; current_rug
          INPUT-OUTPUT BEHAVIOR: *; clean
      [8] [atomic]+++
      [7] [atomic]+++
      [6] [virtual]+-+
        [INPUT]
          [current_rug]:ABSTRACT VALUES: messy_dirty dirty clean
        [OUTPUT]
          [current_rug]:ABSTRACT VALUES: clean
          INPUT-OUTPUT PROTOTYPE: current_rug; current_rug
          INPUT-OUTPUT BEHAVIOR: *; clean
      [5] [virtual]-+
      [4] [virtual]+-+
      [3] [atomic]+++
      [2] [virtual]+-+
      [1] [atomic]+++
    [PROCEDURE] [virtual]+-+
      [INPUT]
        [room]:ABSTRACT VALUES: unpresentable presentable
      [OUTPUT]
        [room]:component:ABSTRACT VALUES: presentable
        INPUT-OUTPUT PROTOTYPE: room; room
        INPUT-OUTPUT BEHAVIOR: *; presentable
    [DATA SPECS]
    [EXTERNAL SPECS]
  clean_room ( room; )
  [DOMAIN]
```

Figure 10 D

```
Upd_sel.flo                                                    _ ☐ ✕
File  Edit  Node  Flexsys  Help
Commands: Arrows,^x,^g,1..9,+,f,n,b,r,Del,t,m,d,c,a,e,s,^I,w,s,p,?
update_selection_parent ()
[Upd_sel.flo]:update_selection_parent:[]library:[procedure]:
The following conditions allow for missing or incomplete parent solution rules.
Construct a default name for the parent solution rule.
Add the variables in the condition to the parent input.
    For each input variable in the "then" solution rule:
    If it is in the parent's output
      then move it to the parent's input-output
    else if it is not in the parent's input or input-output
      then add it to the parent's input.
    For each input-output variable in the "then" solution rule:
    If it is in the parent's input or output
      then move it to the parent's input-output
    else if it is not in parent's input-output
      then add it to the parent's input-output.
    For each output variable in the "then" solution rule:
    If it is in the parent's input
      then move it to the parent's input-output
    else if it is not in the parent's input-output and not yet in parent's output
      then add it to parent's output.
    Move any remaining parent's outputs to input-outputs.
    IF   else statement exists
    THEN  For each input variable in the "else" solution rule:
          If it is in the parent's output
            then move it to the parent's input-output
          else if it is not in the parent's input or input-output
            then add it to the parent's input.
          For each input-output variable in the "else" solution rule:
          Remove any occurrence in the parent's input or output and add
          it to the parent's input-output.
          For each output variable in the "else" solution rule:
          If it is not in the parent
            then add it to the parent's output
          else if it is in the parent's input
            then move it to the parent's input-output.
```

Structural_analysis27a.dsn

File Edit Node Flexsys Help

Commands: A,n,o,v,?,x,',g,1,9,+,f,n,b,f,Def,f,m,d,c,a,e,s,!,l,w,s,p,?

structural_analysis27a (eliminate_option, set_of_specifications, set_higher_order_specifications, extendable_ill_defined_domain, set_of_designs)

[Structural_analysis27a.dsn]:structural_analysis27a;[]library;[procedure];

dynamic_structural_analysis (eliminate_option, set_of_designs, extendable_ill_defined_domain, set_of_specifications; )

{Dynamic_structural_analysis generates set_of_designs that collectively can accommodate a sufficiently diverse set of problems (satisfactory to the structural analyst) in a dynamically extendable, potentially ill defined extendable_ill_defined_domain. These problems may not be anticipated in any predetermined set_of_specifications (initially nill). This alternative method offers more flexibility than the alternative in Figure 27 but requires more decision making on the part of the structural analyst.}

REPEAT structural_analysis_action (eliminate_option, set_of_designs, extendable_ill_defined_domain, set_of_specifications, set_of_construction_specs; )

CASE next_action ()

NEW_SPECS construct_specs_in_domain (: set_of_designs, extendable_ill_defined_domain, set_of_specifications; )

{Redefine extendable_ill_defined_domain, add new_designs to set_of_designs and construct prototype specifications.}

CREATE_DESIGN create_design (eliminate_option, set_of_construction_specs, set_of_designs, set_of_specifications; )

{Extract next specification and construct corresponding design. Add design to set_of_designs and delete specification from set_of_specifications. Identify inputs and add input-design pair to set_of_construction_specs.}

CONSTRUCT_HO_SPEC convert (: set_of_specifications, set_of_construction_specs;)

{Partition set_of_construction_specs into shared construction specs (equivalence classes of input-design pairs). Convert shared construction specs into higher order specifications. Add higher order specifications to set_of_specifications.}

UNTIL user_decided ()

Figure 27b

```
construct_higher_order_specs27b.dsn
File Edit Node Flexus Help
Commands Answer ?(g1,9+,!nb;Del;m,d,c,a,e,s,1l,w,s,p,?
construct_higher_order_spec()
[construct_higher_order_specs27b.dsn].construct_higher_order_specs;[];library;[procedure];
partition_and_construct_higher_order_specs(set_of_construction_specs, set_of_specifications; )
{Partition set_of_construction_specs and convert into higher order specifications. See Figure 27b for details.}
REPEAT  convert( set_of_specifications, set_of_construction_specs; )

{Partition set_of_construction_specs into shared construction specs (equivalence classes of
        input-design pairs). Convert shared construction specs into higher order specifications. Add
        higher order specifications to set_of_specifications.} identify_and_construct_shared_spec( set_of_construction_specs; template_construction_spec)

{AI techniques or analyst identify an equivalence class of shared or template_construction_spec
        in partitioning set_of_construction_specs.} abstract_generalize( template_construction_spec; )

{Use AI techniques, neural nets or analyst discretion to construct template_construction_spec.
        Constructing shared template structure via abstraction and/or generalization defines an
        equivalence class of construction_specs. Abstraction involves giving abstract names to design
        operations and parameters (including designs with the same IN and OUT structures).
        Abstraction introduces a more abstract representation such as the parent in an extraction
        refinement. Generalization involves replacing parameters in sub-categories with more general
        ones and/or generalizing the numbers of components. The former corresponds to introducing
        class hierarchies and the latter to introducing prototypes.} extract_template_specs(template_construction_spec ; design_template, input_template)

{Extract input_template and design_template.} create_ho_specification(design_template, input_template; ho_specification_IN,
        ho_specification_OUT)

{Insert input_template at top IN level and design_template at top OUT level in a ho
        specification.} build_ho_spec(ho_specification_IN, ho_specification_OUT; higher_order_specification)

Figure 15:
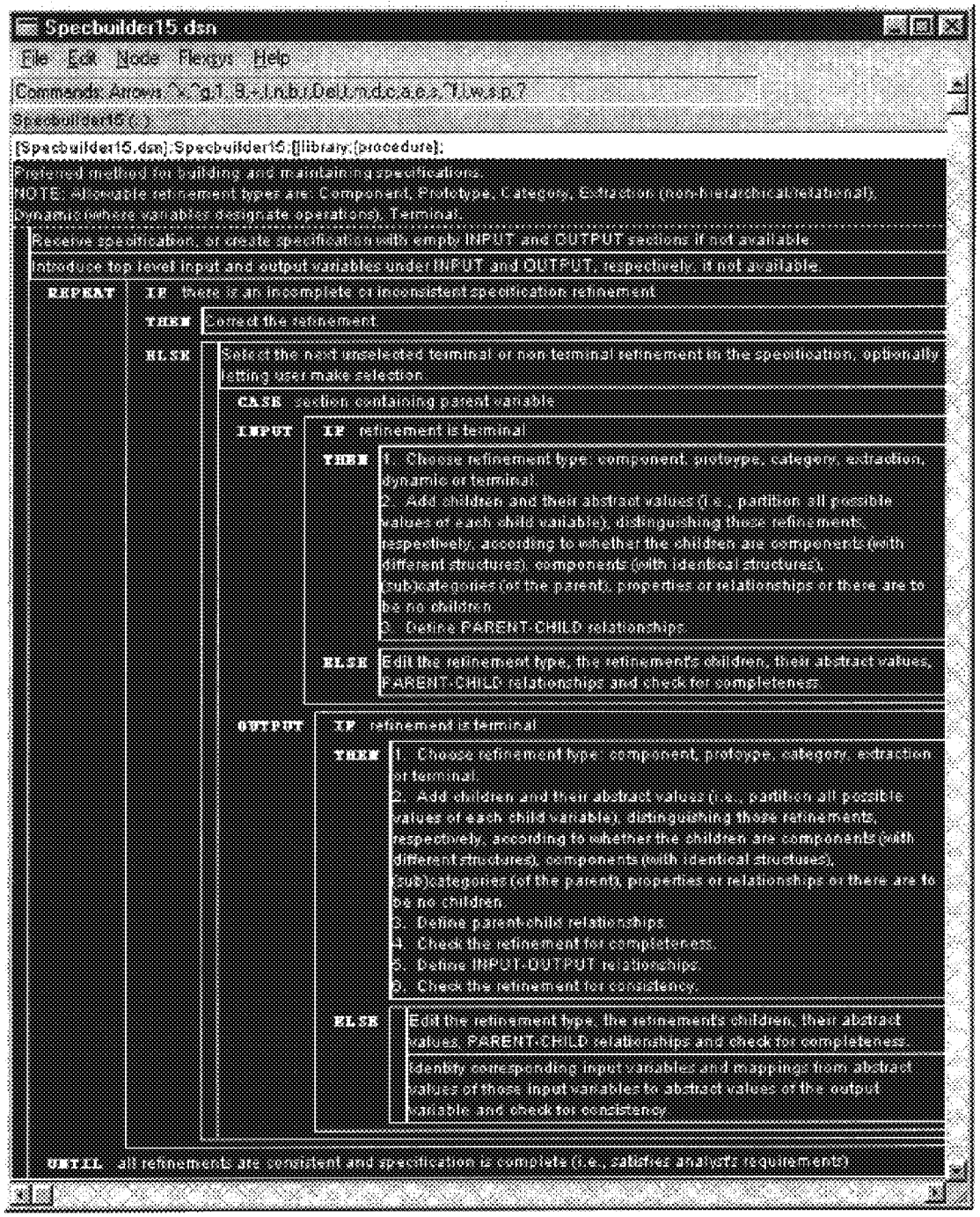

{Start with ho_specification_IN and _OUT, elaborate the higher order specification using
        preferred method for constructing specifications detailed in Figure 15.} add_to_set(higher_order_specification; set_of_specifications; )

{Add higher order specification to the (initially empty) set of specifications.}

UNTIL   no_more_template_specs_can_be_constructed(set_of_specifications)
```

AUTOMATED METHOD FOR BUILDING AND MAINTAINING SOFTWARE INCLUDING METHODS FOR VERIFYING THAT SYSTEMS ARE INTERNALLY CONSISTENT AND CORRECT RELATIVE TO THEIR SPECIFICATIONS

CROSS-REFERENCE TO RELATED APPLICATIONS

Provisional Application: Application Number 60/013,510 Filing Date Mar. 15, 1996

BACKGROUND OF THE INVENTION

Given the growing complexity of modern software systems, there is an increasing demand for easier ways of locating errors and for ensuring or verifying the correctness of software designs. Tools for accomplishing these purposes range from the simple type checking provided by many compilers and source code analysis tools to formal verification proofs.

The former, unfortunately, miss many common errors. The latter involve constructing rigorous mathematical proofs. Such proofs are extremely difficult to construct with automation research limited to small programs. Despite limited successes, these solutions do not scale to non-trivial software. Consequently, formal verification is rarely used in practice. Jackson (see U.S. Pat. No. 5,423,027) has proposed a compromise solution. This approach does not eliminate errors as does formal verification, but it lends itself to automation and does catch more errors than simple type checking (during compilation). This is accomplished via optional programmer input and an automated checking tool that references various aspects (e.g., properties) of objects (types) rather than variables. The invention involves (a) specifying input and output values of these aspects for each procedure in a program, (b) examining and constructing an approximation of actual dependencies in procedural code and (c) comparing the approximate dependencies with the procedural specifications. The comparison of specifications with the approximations in the procedural code is used to identify omissions in the latter.

The above approach, in effect, is concerned with better ways to check given source code. The Jackson invention does not deal with design issues, cannot guarantee correctness and any concrete realization must address language specific issues.

Gaboury (U.S. Pat. No. 5,481,717) takes a different approach to formal verification. In parallel with our own efforts, Gaboury has disclosed a method for verifying a computer program in relation to its specification. This method is an extension of an existing Binary Decision Diagram algorithm to compare Finite State Machines, and involves comparison of a program and its specification after they both have been represented as logic programs (e.g., in Prolog, using variables and production rules). The basic method disclosed by Gaboury involves: (a) converting two logic programs into corresponding finite state machines, each having internal states, input values and output values, (b) determining the data types of the variables of the logic programs, (c) converting all expressions in the logic program into disjunctive form, (d) expanding procedure calls into procedure bodies, (e) translating the programs into transition functions and (f) determining whether equivalencies between internal states, input values and output values of the two finite state machine descriptions produce equivalent output values for all equivalent input values and states.

As with the Jackson method, however, this method requires formal verification of both specifications and solutions as parameterized logic programs. This method offers one way to solve the problem of unspecified parameters (e.g., in specifications); it effectively replaces details with unspecified parameters for comparison purposes. Although this approach is theoretically plausible, it solves the problem by introducing non-intuitive elements into the specification. By way of contrast, the present disclosure has no requirement that either the specification or the program be represented as a logic program. Specifications deal exclusively with input-output behavior and implementations are represented in traditional (sequential/event driven) real world terms.

In a similar vein the Gaboury disclosure eliminates syntactic differences such as variable names. Syntactic differences involving names, for example, although of limited importance in mathematical formulations, play an important role in human understanding. They are essential in building and maintaining complex, real world software. In effect, the Gaboury approach is not likely to be very helpful either during development or during ongoing maintenance. Moreover, the method cannot be used with many kinds of software because comparison of unrestricted logic programs is an undecidable problem.

Rather than verifying correctness after implementation, other approaches attempt to improve software quality by design. One approach derives from contemporary software and system development methodologies (e.g., structured analysis [Hatley & Pirbhai, 1987; Yourdon, 1989]; information engineering [Chen, 1976; Flaatten et al, 1989], object oriented design [Booch, 1994; Rumbaugh et al., 1991]). Most of these methods make a sharp distinction between design, implementation and testing. Implementation, for example, comes after design, and although limited consistency checking is included in many CASE tools, correctness testing is postponed until after implementation. Given exponential growth with complexity in the number of paths to be tested, these methodologies make complete verification testing impossible. For example, after implementation, a simple system having a sequence of 100 binary decisions has $2^{100}$ independent paths to be tested. Clearly, it is impossible to fully verify the correctness of even moderate sized programs empirically. However, only 300 paths are involved if testing is done at successive levels of refinement (see Scandura, 1992, p. 92). In this case the number of paths goes up only additively.

Traditional approaches to proving that software is correct (i.e., does exactly what specifications call for) require proving that the program will produce the desired output for any given set of inputs. This is true whether one attempts to prove correctness after software has been developed (e.g., Hoare & Shepherdson, 1985) or at successive stages of process refinement as in clean room engineering (Linger, 1994) and higher order software (Martin, 1985).

In contrast to the above, clean room engineering is based on mathematically rigorous correctness methods and has been successfully applied in a number of projects. The approach, however, involves manual verification (e.g., Linger, 1994; Linger, Mills & Witt, 1979). It is based on a hardware metaphor (where one knows all inputs and outputs before designing a system) and has not been shown to scale well to larger software systems. In recognition of the complexities of verification during development, "clean room" puts a heavy emphasis on software testing after implementation based on statistical sampling methods. Martin (1985) describes an alternative approach developed by Hamilton and Zeldin that is based on provably correct design constructs. The latter, however, also requires formal, non-intuitive modeling techniques, which again are not easily applied to large systems. A fundamental limitation of these methods is they assume that all input and output variables to a proposed system have been specified prior to system analysis (e.g., Martin, 1985, p. 50). This complicates design, especially in larger systems. Furthermore, no provision is made in the Martin (1985) approach for formulating precise specifications. Even where this is done, proving correctness is impractical using these methods because the numbers of input-output relationships to be verified is simply too large.

In contrast with Jackson, this invention deals with software design as well as code. Like other software engineering methodologies, its goal is to make software easier to understand, construct and modify. Unlike software engineering methodologies, however, including the more complete consistency checking provided by cleanroom engineering and Hamilton's "provably correct designs", the method proposed herein not only ensures consistency but it guarantees that software is correct by design and lends itself to automation.

Rather than catching errors after implementation, like Jackson, the latter more promising approaches attempt to ensure correctness by design. Cleanroom engineering, for example, has been successfully applied in a number of projects, but to date the approach involves manual verification (e.g., Linger, 1994; Linger, Mills & Witt, 1979). The "correctness theorem" (e.g., Linger, Mills & Witt, 1979, p. 222) shows that proving that a sequence refinement is correct involves direct comparison with the parent's behavior; a selection refinement involves checking at least two (branching) conditions; iteration requires checking three conditions, the third involving loop termination. This theorem simply states what must be shown to prove correctness—it refers essentially to syntactic consistency of a refinement. We refer to a refinement, which syntactically distinguishes these conditions, as "internally consistent". Actually demonstrating the correctness of any such condition with respect to its specification requires formal proof.

Martin (1985) describes an alternative approach to internal consistency developed by Hamilton and Zeldin. Although variously referred to as "provably correct" or higher order software, this approach involves showing designs to be consistent in the sense that each type of refinement follows certain specified rules. For example, a sequence refinement is consistent if and only if the input of the first sequence element is the same as the input to the parent, the output of the last sequence element is identical to the output of the parent and the output of each successive sequence element serves as input to the next element in the sequence. This approach requires the designer to adopt an entirely different mind set. Rather than using sequence, selection and iteration refinements, for example, the designer must adopt refinement types that are unfamiliar, and less easily applied to large systems. Even more basic, the approach does not address the issue of correctness with respect to independently defined specifications.

Although proving consistency in clean room engineering and in higher order software appears to be relatively straightforward (e.g., Linger, Mills & Witt, 1979; Martin, 1985), ensuring consistency in practice has been difficult because all input and output variables must be specified prior to system analysis. Except possibly in well organized data base applications, it is impossible even in relatively small systems, to know all possible input and output variables before a system has been implemented. Even here, checking for internal consistency gets increasingly cumbersome as systems get increasingly complex. Indeed, practically speaking, it would be impossible to achieve this goal with the large, complex systems on which government, industry and increasingly the home user depend.

Although processes are refined hierarchically, this is not the case with data. Both clean room and higher order software are based on a hardware metaphor where it is assumed that all inputs and outputs are known from the beginning (of design). In order to design a chip, for example, one must first know all of the input and output pins.

Apart from the hardware metaphor, reliance on a priori specification of all input and output variables derives from the tendency of most software engineers to think about software in terms of code. While the number of inputs and outputs to be considered at each stage of analysis can be reduced via top-down analysis, existing software engineering technologies (e.g., Chen, 1976) deal with data independently of process. There is no relationship between the abstraction levels in data and those in the corresponding design. Although contemporary object-oriented approaches (Booch, 1994; Rumbaugh et al, 1991) allow both data and process abstraction, processes are syntactically grouped according to data. Real world modeling, however, frequently and naturally calls for grouping data (structures) by semantically equivalent processes defined on such data. Furthermore, none of the above methods comes close to ensuring logical consistency of actual software.

In order to ensure such consistency, the numbers of variables to be considered during the design and implementation processes becomes unwieldy. Consequently, neither clean room engineering nor higher order software has been shown to scale well to larger software systems. In a recent talk, Sherer (1994), for example, has admitted a practical limit of 10,000–12,000 lines of code. To summarize, both methods assume that all inputs and outputs to a proposed system have been specified prior to system analysis.

Proving correctness with respect to external specifications is an even more daunting task. One must show that every possible sequence of input values to the system produces the correct output. Indeed, in describing higher order software, Martin (1985, p. 271–2) explicitly disavows the possibility of proving correctness with respect to external specifications. Similarly, in clean room engineering the task is viewed as being of only theoretical interest.

Proving correctness requires showing that a program produces the same behavior as designated in some independent specification. Proving correctness is impractical not only with complete systems but even where individual refinements must be shown to be consistent and correct (children with respect to their parent) during the design process. In standard approaches, the number of inputs and outputs invariably is simply too large. It is difficult in practice to keep track of the variables allowed—much less to prove that each instance of behavior is correct. In recognition of this fact, "clean room" puts a heavy emphasis on software testing after implementation based on statistical sampling methods.

To summarize these two points, internal consistency involves syntactic constraints between the parent in a refinement and its children. Ensuring internal consistency gets increasingly complex as the number of input and output variables gets larger and larger. Proving correctness of any given refinement is even more complex. This requires that refinement components produce the same results as their parent. This is impractical (if not impossible) with realistic software systems.

A third limitation of current approaches to proving correctness derives from the traditional standards used for this purpose. In order to prove that a program is correct with respect to its specification, one must begin by assuming that some basic set of functions operates correctly (e.g., the standard arithmetic functions of addition, subtraction, etc.). Typically, the same basic set is predetermined and assumed irrespective of the program or application. All proofs are effectively judged relative to a single standard. For example, consider some specified functional relationship and a program $$d := \text{prog}(a, b, c)$$

which maps each set of inputs to the function (i.e., a, b and c) into the specified response (i.e., d). In this case we must prove that the program prog produces the same behavior as the specified function.

That is, the function prog is correct if and only if prog's behavior can be produced using the basic set of assumed component functions (e.g., +, /) of which prog is composed. Notice that these component functions are assumed to operate on the same input values and/or values derived therefrom, as does prog itself. This is true at all levels of refinement in a design for prog. In each case there exists a unique output integer $d_i$ for each set of input integers $a_i$, $b_i$, $c_i$, to the specification. In general, the task of proving correctness can be reduced to showing that the behavior associated with any given level in a refinement hierarchy is identical to that of the corresponding refinement, and that, ultimately, with a terminal refinement consisting entirely of the assumed basic functions. Although proving correctness of individual refinements is much simpler than proving that a (complete) design or program is correct, even the latter is a very demanding task. There is no known general-purpose solution that can accommodate arbitrarily complex components.

We have identified three basic limitations of current formal verification techniques as they are presently formulated: (1) the implicit assumption of a hardware metaphor which implies that all input and output variables must be specified prior to process refinement, (2) the assumption that the values of the variables referenced at all abstraction levels in a program design must be identical and (3) the practice of proving correctness with respect to a predetermined set of basic functions. The first limitation leads to unmanageable numbers of input and output variables in developing logically consistent designs. The second leads to the impossibility of devising any universal method for proving correctness. The third leads to impracticability with non-trivial systems. Any one of these limitations makes standard approaches impractical for use in actual practice.

In addition, current approaches have been unfamiliar and nonintuitive requiring highly specialized training. Indeed, existing formal techniques deal primarily, if not exclusively, with internal consistency. The correctness of programs cannot be assured. This requires comparing specifications (what a program is supposed to do) with what the program actually does. The sheer variety of possible inputs and outputs makes this impractical.

Cognitive Research

A completely different approach to the problem of system design derives from earlier research on human cognition and, in particular on structural (cognitive task) analysis by the present inventor. Structural analysis of a problem domain (corresponding to a specification in software engineering) requires specifying one or more "solution rules" (corresponding to language independent designs) which is sufficient for solving all problems in the domain. Each solution rule consists of a triple, domain (inputs), range (outputs) and procedure or operation. Rather than assuming (as standard software engineering approaches) that one knows all inputs and outputs at the beginning of analysis, these inputs and outputs are assumed to be known—that is, objectively specified—only to the same degree as the corresponding operation.

Structural analysis evolved over a long period of time and has been applied in the analysis of a wide variety of problem domains for both basic research on human cognition and the design of instructional materials (e.g., Scandura, 1971, 1973, 1977; Scandura, Durnin, Ehrenpreis et al, 1971; Scandura & Scandura, 1980). Most of the earlier research was directed at the identification of higher order rules—that is to identifying rules which operate on and/or generate other rules. Given a problem domain, typically one so complex that no one solution rules could reasonably be identified, this method involved first identifying subsets of the domain for which solution rules could readily be specified. Then "parallels" (i.e., analogies, similarities, etc.) among the various solution rules were used to specify higher order rules making it possible to automatically generate these and/or new solution rules (for new problem subsets) from more basic rules. Scandura (1982, 1984a) both summarizes much of this research and more fully details a method for specifying individual lower and higher order rules.

As described in Scandura (1984a), this method (which at the time was evolving completely independently of parallel work in software engineering) involved analyzing both data (problems) and solution processes in parallel from the top down. In essence, representative problems where solved step-by-step at successive levels of analysis from the top-down. Essentials of this method are best understood from the description given by Scandura (1984a).

" . . . top-down analysis has the advantage of making clear to the user the "flow of control" of the solution procedure. It also allows for arbitrary levels of procedural refinement. Top-down analysis deals with specific problem characteristics only in an informal heuristic manner . . . there is a close connection between the domain of a problem and the corresponding solution procedure. Informal awareness of either one necessarily influences specification of the other. It would be highly desirable to make such awareness public.

Step-by-step analysis, by way of contrast, deals more directly with particular problems and solution steps. It also provides a potentially mechanical means of translating sequences of solution states into general procedures. But, there are sometimes ambiguities as to overall structure and flow of control. This ambiguity derives from lack of specification of the interrelationships between problem domain and procedural representation.

. . . a method of analyzing procedures which combines the advantages of top-down and step-by-step analyses could go a long way toward providing the kind of objective and systematic method we seek.

One method is to employ problem and step-by-step analyses at progressive levels of top-down analysis. In this method the problem representation and the solution algorithm are refined in parallel. We illustrate the method in the context of subtraction, while emphasizing general principles.

I. First, the analyst would construct a column subtraction problem (on intuitive grounds). For example:

$$\begin{array}{r} 437 \\ -275 \\ \hline \end{array}$$

This problem, then, would be used to specify the corresponding problem domain to a first level of approximation. Toward this end, the analyst would employ the following procedure:

A. Identify the minimum essential characteristics of the problem which make it a problem of the desired type. Specifically, with regard to column subtraction, the "−" sign, the "____", the two numerals (437 and 275), where the one on top designates a number that is larger than the bottom one, constitute the "given" of the problem. The unspecified solution numeral (the one that goes under "____") specifies the problem goal.

B. Identify those input (i.e., "given") characteristics which may vary without changing the essential nature of the problem. By essential nature is meant those qualities of the problem which make it solvable via the, at this point, only intuitively known solution procedure associated with the problem. In the case of a column subtraction problem these characteristics are the two numerals, where the top one is greater than or equal to the bottom one.

C. Replace each such input characteristic with a variable and specify the sets of allowable values of these variables. In the case of subtraction, there are two domain variables: Top number (T), and bottom number (B), such that T>B.

Carrying out Steps A, B and C yields a problem schema which formally represents the domain of the associated rule to a first approximation.

Given the rule domain, the analyst next solves the original problem as specified and uses the resulting states as a basis for specifying the solution procedure. More exactly, the analyst uses the following method.

D. Take the specified values of the input variables of the original problem as inputs and apply step by step the solution procedure, which at this point is known only intuitively. In the case of the above subtraction problem, the analyst just subtracts the two given numbers—i.e., specified the solution. In doing this, he can refer formally speaking only to the variables (numbers) as wholes. Hence, the result is just a pair of states, the subtraction problem before and the subtraction problem after the difference has been written. (The analyst cannot refer to individual digits, for example, since they do not yet exist from the standpoint of the formal analysis. They are known intuitively to the analyst, but have not yet been represented formally. Hence, the digits cannot be referred to explicitly in formally representing the solution procedure at this level.)

E. Go to the first pair of states. (In this case there is only one pair of states: the subtraction problem itself and the problem together with its solution.) Identify the atomic operation corresponding to this pair of states. In this case, let us just call it "subtract." Since these are the only states, we are finished.

F. Identify the "normal" domain of the operation(s) identified, using a variation of step C. Specifically, over what ranges of values can the initial problem state vary without affecting applicability of the atomic operation? Equivalently, what is the corresponding atomic rule? In the present case, the normal domain is just the domain of subtraction problems as specified above.

G. Identify the extra-domain condition, if any, which must be satisfied if this atomic rule (operation—plus domain and implied range) is to be applied. In the context of the intuitively known solution procedure, the "subtract" atomic rule applies to every element in its domain (i.e., to all pairs of numbers where the top one is not smaller than the bottom one). Hence, there are no extra-domain conditions.

Since there is only one atomic rule in the solution procedure, we are finished. The "subtract" atomic rule is THE required solution rule at this level. (Note: This subtract rule consists of the subtraction operation, together with the problem domain and goal.)

II. Reapplication of step-by-step analysis gives a more finely structured rule [i.e., representation] at the next level of top-down analysis. At this point, we may select any problem (including the original one) from the subtraction domain, which we have formally characterized in terms of the "−", "____", and two number variables. (The unspecified solution variable constitutes the range.)

The first phase in refined analysis is to repeat the above steps (A–G) at a next level of detail.

A. What additional characteristics of the problems are referred to in applying the intuitively known solution procedure? In the case of column subtraction problems, columns clearly constitute additional characteristics because solutions proceed column by column.

B/C. Representation of the domain of subtraction problems thereby is enriched by allowing for a variable number of columns (from one up).

D. Next, the given problem is solved taking columns into account. That is, the subtract atomic rule (i.e., component) is refined. It is replaced with a sequence of states of the form $$\begin{array}{r} xN \ldots \left( x_i \right) \ldots x1 \\ -yN \ldots \left( y_i \right) \ldots y1 \\ \hline \boxed{z_i} \left( z_{i-1} \right) \ldots z1 \end{array}$$

each state having one more digit $z_i$ than the preceding state (indicating that one more column has been subtracted).

IMPORTANT: The $(x_i, y_i)$ column and the $(z_{i-1})$ are encircled to distinguish these ACTIVE components of the problem (at state i) from those that are inactive. Active components are those that are attended to (i.e., operated on by the associated atomic rules) at any given step (state) of a problem solution. The square surrounding "$z_i$" denotes the goal to be achieved at state i. (Notice at the initial level of analysis that both of the two given numbers are "active" in this sense.)

E–F. Next, the transition between the first pair of states is specified by the atomic rule "Go to the first column on the right and subtract." In turn, each successive state transition is specified by the atomic rule "Go to the next column to the left and subtract." The domain of this atomic rule is a problem schema. The active components in the schema are the just determined (last) digit in the partial difference (i.e., $z_i$), which determines what the next column to the left is, and that column, which determines the column difference. As before, the result is a sequence of atomic rules.

G. Here, we see that the first atomic rule applies to every subtraction problem. There are no "extra-domain" conditions. Each of the succeeding atomic rules, however, is applied only when there is another column to the left (otherwise the problem is finished). Consequently, we introduce the extra-domain condition "There is a next column."

Suppose now that we have applied Steps D–G to just one problem (it could be the original one). At this point, we have a sequence of atomic rules, together with extra-domain conditions immediately preceding all but the first.

Where such extra-domain conditions exist, further analysis is required.

H. Examine each of the extra-domain conditions to determine whether some succession of the following atomic rules ever generates an output state whose active components satisfy the extra-domain condition (as well as the domain of the first atomic rule following the extra-domain condition). The given problem has three columns, so there is another column after subtracting each of the first two columns.

Indeed, by choosing a suitable problem, this extra-domain condition can be satisfied any number of times. Irrespective of how many columns are chosen, there is always some problem with one more column. What this means, effectively, is that any number of applications of the atomic rule "Go to (i.e., attend to or activate) the next column and subtract the column" is possible (with some problem). Alternatively, reapplication is indicated until an output state is generated (e.g., a fully solved problem) that no longer satisfies the extra-domain condition—namely, "There is no next column." Moreover, when this extra-domain condition is no longer satisfied, the process STOPS so the underlying procedure is completely defined.

Whenever such reapplication (of some succession of atomic rules) is indicated, the extra-domain condition in question defines an iteration. Equivalently, the successive atomic rules may be replaced by a loop, given a more efficient representation of the solution procedure.

More generally, one checks first to see if an extra-domain condition defines an iteration (i.e., loop). If it does not, and only if it does not, then it necessarily defines a selection.

III. Again, one can reapply step-by-step structural analysis to components of the Level II solution rule. As in the previous more informal top-down analysis, the "Subtract the column" atomic rule is one obvious candidate.

A. In this case, close attention is paid to what is done in subtracting individual columns, again building on the analyst's informal awareness of the solution procedure. In subtracting the first column of the given problem

```
  437
- 275
``` we get the partial answer (2) directly. In the next column, however, we must "borrow" in order to subtract (3–7)— where borrowing involves reference to the top digit (4) in the next column.

In effect, at this third level of analysis it is necessary to distinguish individual digits in the subtraction problem. (The digits then constitute the "additional" characteristics.)

B/C. Each of these digits, in turn, may be replaced with a variable ranging from 0 to 9 (subject to the overall constraint that the top numeral represents a larger number than that bottom one).

D. Next, we detail more fully the sequences of states associated with designated components (e.g., the subtract column atomic rule) of the previously determined solution procedure. This is accomplished by solving the above, more finely structured problem, giving explicit attention to the "additional" characteristics specified. Consider a case where the subtract column component rule is applied to a column which requires "borrowing." For example, consider the sequence of states

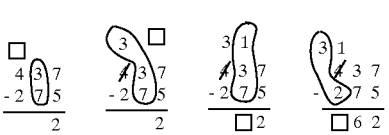

where the encircled entities are active and the square designates the goal at that state.

E/F. In turn, the successive pairs of states correspond to the atomic rules: "Go to the top digit in the next column and borrow," "Add the borrowed 10 to the top number in the original column," "Subtract the original column (using basic facts)." The natural domains, respectively, are: "Problems with next column," "All problems in which a borrow has been initiated," "Columns where the top digit(s) are not smaller than the bottom digit(s)."

G. There is an extra-domain attached to the first of these atomic rules. Specifically, this rule is applied only where the "top digit(s) in a column is less than the bottom digit."

At this point, then, associated with the Level II "subtract the column" rule (as illustrated with the second column of the given problem), we have a sequence of subatomic rules, preceded by an extra-domain condition.

H. The next question is whether some consecutive subsequence of these subatomic rules, including the first one, ever generates a state whose active components satisfy the extra-domain condition (i.e., top digit(s) less than the bottom one). Going to the next column and borrowing (the first of the subatomic rules) certainly does not generate such a state, and neither do the first two subrules—or all three.

Once one has borrowed (after the first two subrules have been applied), the top digits (now there are two digits at the top of the column) always represent a number larger than the bottom one. Consequently, the extra-domain condition does not apply. After subtracting the original column (applying all three subrules in turn), we have done the equivalent of the Level II "subtract the column" rule so control moves to the previously defined iteration "While there is a next column."

For these reasons, the extra-domain condition "Top digit (s) less than bottom one" is NOT an iteration. Therefore, it defines a selection.

Moreover, analysis of subtraction in the first column of the problem tells what happens when the complementary extra-domain condition is satisfied (i.e., when the top number is greater than or equal to the bottom one). In this case, one simply subtracts using the basic facts. Hence, the selection is completely defined. If the top number is greater than or equal to the bottom one, we subtract using the basic facts; otherwise, we borrow and then subtract.

Notice that the entire selection construct, including the alternative atomic rules, is contained within (bounded by) the iteration condition ("There is a next column") defined at the previous level of analysis.

It also is important to observe that the iterations and selections identified in an analysis need not be fully defined. In the present case, for example, we were fortunate (or had the clairvoyance) to select a problem that involved both borrow and non-borrow columns. If this had not been the case, then our analysis would not have been complete. We would have known that a selection was involved, and we would have known one of the two alternatives. But we would not have known the other alternative.

In circumstances such as this, one must repeat the above process with new problems—hopefully ones in which the previously unused conditions are satisfied. The results of each new analysis, then, must be combined level by level and component by component with the initial one. The process must be continued with new problems until the underlying procedure is completely defined. In this regard, notice that there always is a finite number of problems that will suffice for this purpose because the number of conditions in any procedure must be finite."

Nothing new is involved in extending the above process to borrowing across O's. This can be accomplished by introducing a selection (within the borrow selection).

Clearly, the goal of structural analysis was to develop an explicit, repeatable and potentially automatable process for analyzing content. Although the context was completely different, these goals clearly are quite analogous to those common in most software engineering methodologies (e.g., Booch, 1994; Rumbaugh, et al., 1991; Yourdon 1989). Structural analysis, however, differs from traditional software engineering methods in several fundamental ways.

First, unlike software engineering, the original goal of structural analysis (e.g., Scandura et al, 1971; Scandura, 1982, 1984a) was to analyze complex, sometimes called ill-defined domains. Ill-defined domains are problem domains that transcend any given finite set of solution rules. That is, no finite set of rules can be found that is sufficient for solving all problems in the domain. Structural analysis was designed to address this problem. The basic idea was to identify sets of rules and higher order rules that collectively would make it possible to solve qualitatively greater numbers of problems in ill-defined domains than would otherwise be possible.

As described in Scandura (1984a, pp. 23–7), structural analysis of complex domains begins by selecting a representative sample of solvable problems in the domain. Next, a solution rule is derived (e.g., by the above methods) for each type of problem. This results in a set of solution rules that is sufficient for solving problems similar to the sample problems. A key idea in structural analysis is that one can usually find parallels between different solution rules. These parallels typically reflect the fact that the solution rules can be derived via the same higher order rule. Moreover, as indicated by Scandura (1984a, p.23), solution rules correspond to higher order problems, namely problems for which they are solutions.

Structural analysis takes higher order problems as new starting place and the process (of identifying solution rules) is repeated. This time the results are higher order rules which operate on and/or generate other rules. The process of moving to higher and higher levels can continue indefinitely.

Each iteration leads to rules which are simpler individually, but which collectively are more powerful in the sense that they account for qualitatively broader varieties of problems. That is, when used in combination, higher order rules may generate new rules which in turn make it possible to make it possible to generate new solution rules and/or problems. Structural analysis also takes into account that solution rules derived in this way may include previously identified rules. Hence, a final step in structural analysis is to eliminate redundant rules. A number of applications of structural analysis are summarized in Scandura (1982).

A second major difference between software engineering and structural analysis is that data and process in structural analysis are refined in parallel (from the top down). In structured analysis, for example, all of the required inputs and outputs are assumed from the beginning. In structural analysis, data abstractions are defined only as needed in process refinement.

A major limitation of structural analysis as regards software engineering is its informality. Ambiguities, omissions, and lack of scalability to complex systems, make it unsuitable as a foundation for automation and even less for ensuring the correctness of complex software systems. Indeed, the possibility of ensuring correctness of an analysis, whether internal or external, was not seriously considered.

What is needed is a repeatable, formally verifiable and intuitive process that is easy to use. Specifically, this process must provide human designers with automated support making it easy to implement arbitrarily large, complex software systems that are both internally consistent and logically correct (that are consistent with specifications).

Domain Analysis

Domain analysis (e.g., Krut et al, 1996) has become a new and active area of research in recent years. Like structural analysis, domain analysis is concerned with ill-defined domains (e.g., word processing, software engineering [tools]). Most software engineers, however, are not familiar with prior work in structural analysis (understandably using such terms as analysis, design and application). Consequently, whereas structural analysis would seek parallels between different (lower order) applications (attempting to represent these parallels in terms of higher order designs), domain analysis has taken a different tact. Thus, instead of seeking ways to identify higher and lower order components for constructing applications from more basic components, domain analysis looks for similarities and differences between alternative applications. Although such information can be useful in designing specific applications in a given domain, domain analysis does not provide the information necessary to help automate the construction of such applications.

Control Mechanisms

A final line of prior research is relevant to the present disclosure. This pertains to the way in which given sets of rules are used in solving problems (e.g., see Winston, 1977, pp. 129–156). Given a problem together with a set of rules (and higher order rules), the question is how those rules are to be used in attempting to solve the problem. A variety of mechanisms have been proposed for searching and controlling interactions among available rules (or what are commonly called productions). Various combinations of forward and backward chaining have been most common. Forward chaining involves selecting rules in order beginning with the problem given. Backward chaining begins by selecting a rule that would solve the problem given that rule's input.

Two basic approaches have been widely used. An approach called means-ends analysis bases the selection and use of rules on computed differences between given and goal states. The success of this approach depends on finding a useful and universally applicable way to compute differences.

Another approach is based on sets of independent productions, each consisting of an operation and a set of conditions defining its domain of applicability. Rather than relying on differences between goals and what is given, production systems allow more flexible control. Individual productions are triggered by currently available inputs. Productions are selected by matching what is available with production domains. The order in which productions are listed can be important. When more than one production matches a given situation, conflicts can be resolved in any number of ways: first production found, most complete match, most recently used, etc. Productions and problem categories can also be partitioned into classes.

Productions systems are fully modular. New productions may be added as desired. Given productions can even control interactions among other productions. Within the artificial intelligence community, productions are typically identified by a process called "knowledge engineering". This is a largely informal process whereby a domain expert identifies and represents individual items of knowledge as productions.

Structural (cognitive task) analysis (e.g., Scandura et al, 1971, Scandura, 1982) represents a more systematic approach to the same problem. Two major characteristics distinguish structural analysis: (a) operations identified via structural analysis may be refined into their constituents and (b) higher order rules which operate on and/or generate other rules are identified in a systematic manner. The former supports the inclusion of productions with non-elementary operations, which we call solution rules. The explicit introduction of higher as well as lower order rules in the latter provides an explicit basis for predicting coverage of the initial problem domain. Lower order rules can only be combined and/or otherwise modified via explicitly identified higher order rules. The order in which rules are listed plays no essential role.

The Structural Learning Theory (e.g., Scandura, 1971, 1973, 1977) builds on these two characteristics of structural analysis. This theory includes corresponding mechanisms for: (a) assessing the knowledge state of individual human beings relative to a set of rules and (b) controlling interactions between rules. Specifically, in the latter case, a generalized "goal switching" mechanism was proposed to control interactions between higher and lower order rules: If an available rules applies, use it. Otherwise, control automatically switches to a higher order goal of deriving one. Higher order rules are applied in this case, thereby generating new rules that apply to the original situation. This mechanism was later modified (Scandura, 1993) so a rule is applied only where exactly one rule applies (no more and no fewer). Otherwise, higher order goals are invoked. This modification provides an explicit base for rule selection in which more than one rule can be used.

The goal switching mechanism appears to be straightforward and potentially applicable to all problem domains. Moreover, strong empirical support suggesting its universal availability to human beings has been found in a variety of research studies (e.g., Scandura, 1977; Scandura & Scandura, 1980). Nonetheless, this mechanism has never been detailed with the precision necessary for implementation in a devise with memory in a completely general manner. Goal switching control and higher order rules, for example, are intrinsically intertwined in the computer simulation reported by Wulfeck and Scandura (in Chapter 14 of Scandura, 1977). In the original goal switching control mechanism, higher order goals are defined as sets of rules for solving lower order problems (see Scandura, 1973, p.293). Because higher order goals and higher order rules are defined in the same way, it is impossible to construct an independent test to determine whether a given higher order rule satisfies the higher order goal.

SUMMARY OF THE INVENTION

Software development and maintenance involves assembling components, sometimes support during the design process but more frequently not. In neither case has it been possible to ensure that systems will operate correctly. At best, verifying program correctness (component assembly) requires formal techniques, which in practice have been difficult to apply. Existing design methodologies have suffered from incompleteness. When wisely used, these methods help avoid certain problems but leave the most difficult—ensuring internal consistency and correctness (with respect to specifications) in a manner that scales well to large as well as small systems.

The invention disclosed herein are intuitive, repeatable, formally verifiable, and automated methods, that are practical and easy to use, for developing and maintaining software systems. Specifically, these methods provide human designers with automated support for specifying, designing, implementing and maintaining arbitrarily large, complex software systems that are both internally consistent and logically correct (i.e., consistent with external specifications). These methods avoid the "combinatorial explosion" problem and minimize the need for human input. This is accomplished, respectively, by constructing specifications and solution designs via simultaneous and successive levels of data and process refinement, by capitalizing on semantically meaningful relationships between different kinds of specification and design refinement, and by partitioning input and output values and types into equivalence classes.

Disclosed herein are methods lending themselves to automation for: (1) building unambiguous specifications in a manner which dramatically reduces the number of distinct input and output variables that the human analyst needs to specify and even more so the numbers of distinct values of said variables which need to be specified and hence checked for correctness, (2) constructing solution designs by successive refinement of solution rules and/or conditions in a manner which minimizes the need for human input, ensures internal consistency, minimizes side effects and guarantees that the design produces abstract behavior consistent with specifications, (3) implementing designs in a manner that both automates key aspects of the process and guarantees correct execution, (4) constructing and/or updating virtual solution rules in an existing or implied design hierarchy from terminal solution rules in a solution design (in that hierarchy) by successive abstraction in a manner which minimizes the need for human input, ensures internal consistency and minimizes side effects, (5) converting programs written in a structured language to a canonical form to which the above method 4 applies. Also included are methods for: (6) making designs more efficient, (7) allowing designers to assemble virtual and/or real components in combination with the above methods at any desired level of abstraction, (8) incorporating the above methods in procedural, event-driven and client-server architectures, (9) accommodating systems of any size, (10) creating library and object resources, (11) creating test cases, (12) constructing an interpreter that supports a behavioral approach to debugging OO designs, (13) implementing design elements even when no matching component exists and (14) identifying components and higher order components which collectively make it possible to solve problems in arbitrarily complex domains.

BRIEF DESCRIPTION OF THE SEVERAL VIEWS OF THE DISCLOSURE

FIG. 1. Flexform representing specifications for cleaning a room.

FIG. 1A. The room1A.spc Flexform representing an INPUT variable "room" and two catagories: "kitchen" and "bedroom".

FIG. 1B. The room1B.cat Flexform representing a room category structure and its sub-categories kitchen and bedroom, where room and its sub-categories are non-atomic.

Figure 1C:
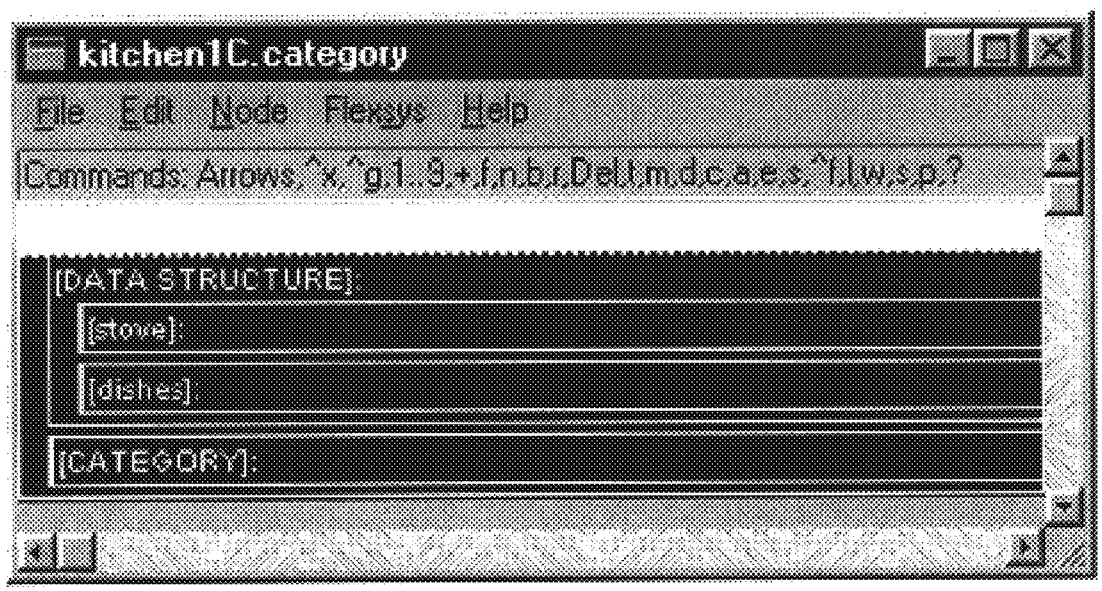

FIG. 1C. The kitchen1C.category Flexform representing the specialized portion of the room data structure of FIG. 1B needed to characterize kitchens.

FIG. 1D. Category hierarchies represented in integrated tree-views.

Figure 2:
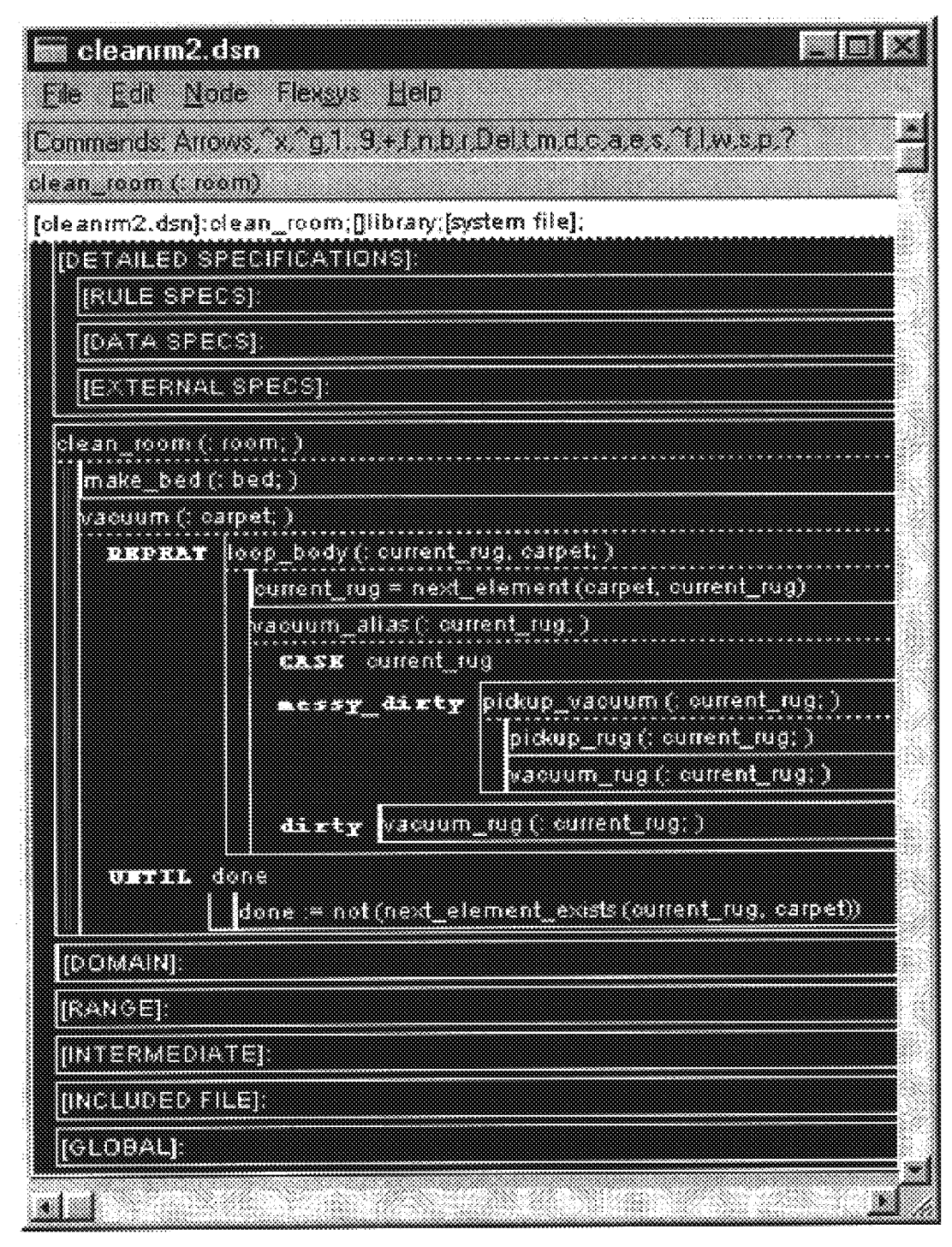

FIG. 2. Flexform representing a design for cleaning a room, along with top-level sections containing supporting information.

FIG. 2A. Flexform representing the RULE SPECS subsection of the DETAILED SPECIFICATIONS section in the clean room design.

Figure 2B:
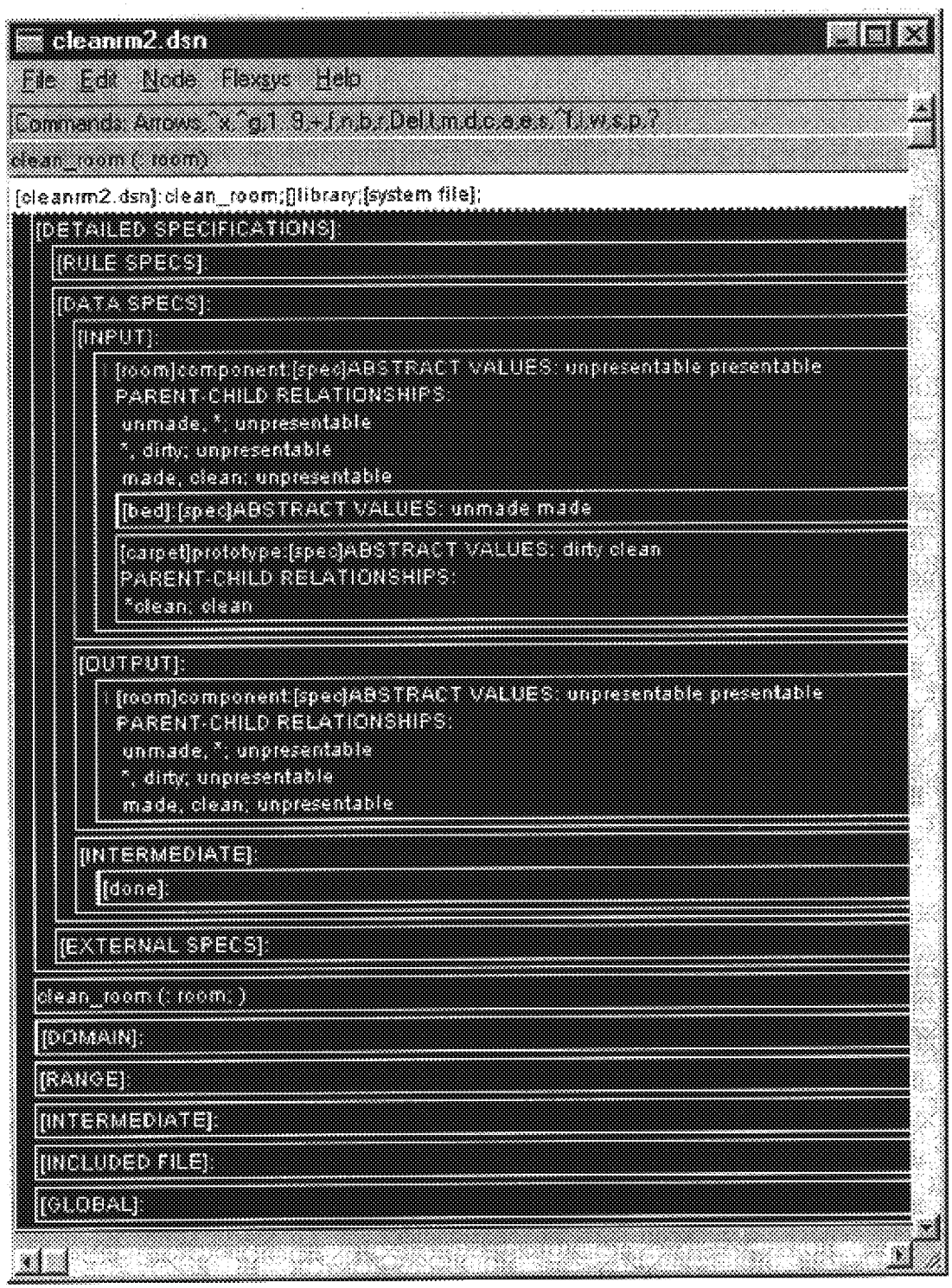

FIG. 2B. Flexform representing the DATA SPECS subsection of the DETAILED SPECIFICATIONS section in the clean room design.

Figure 2C:
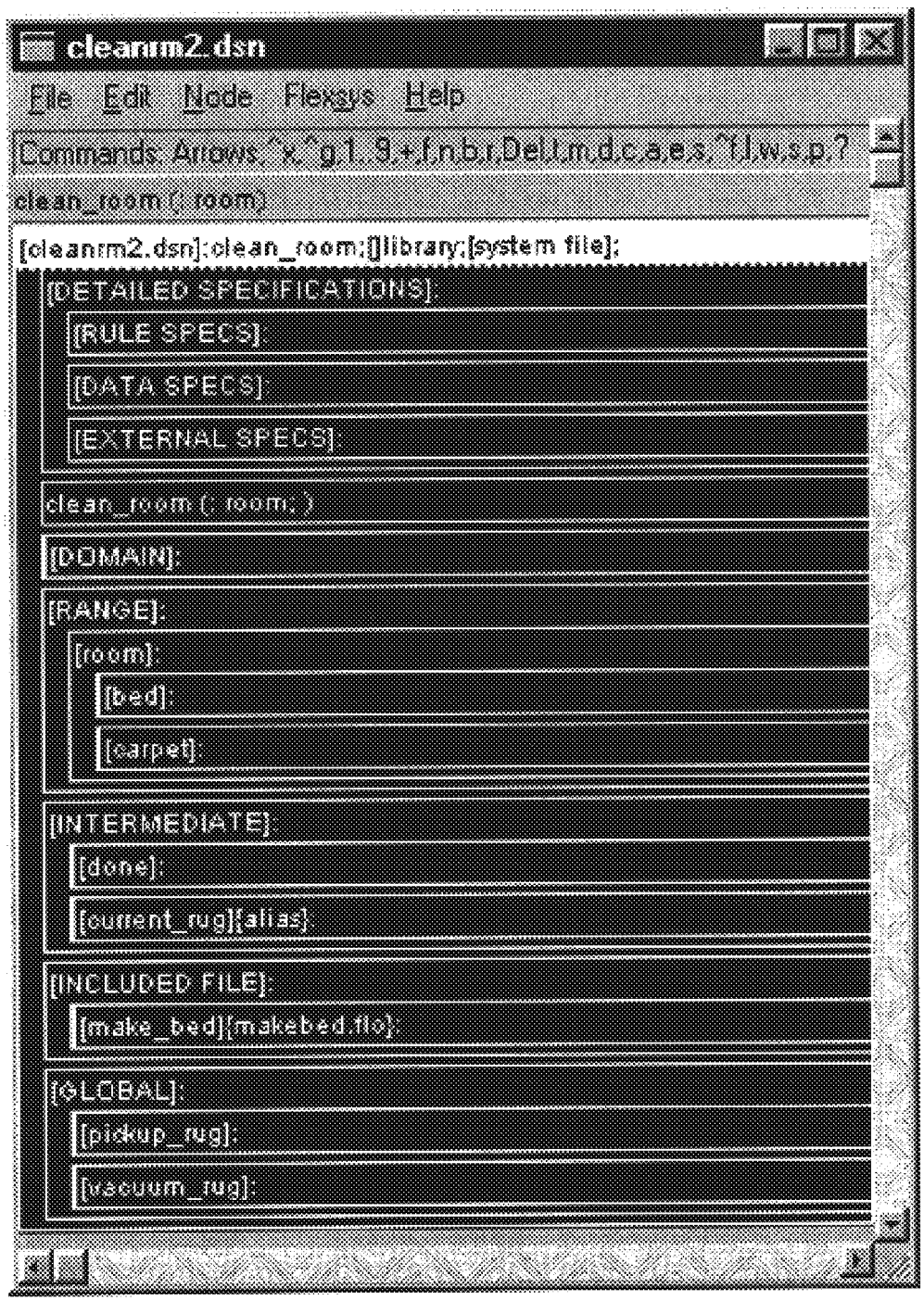
Figure 2B:
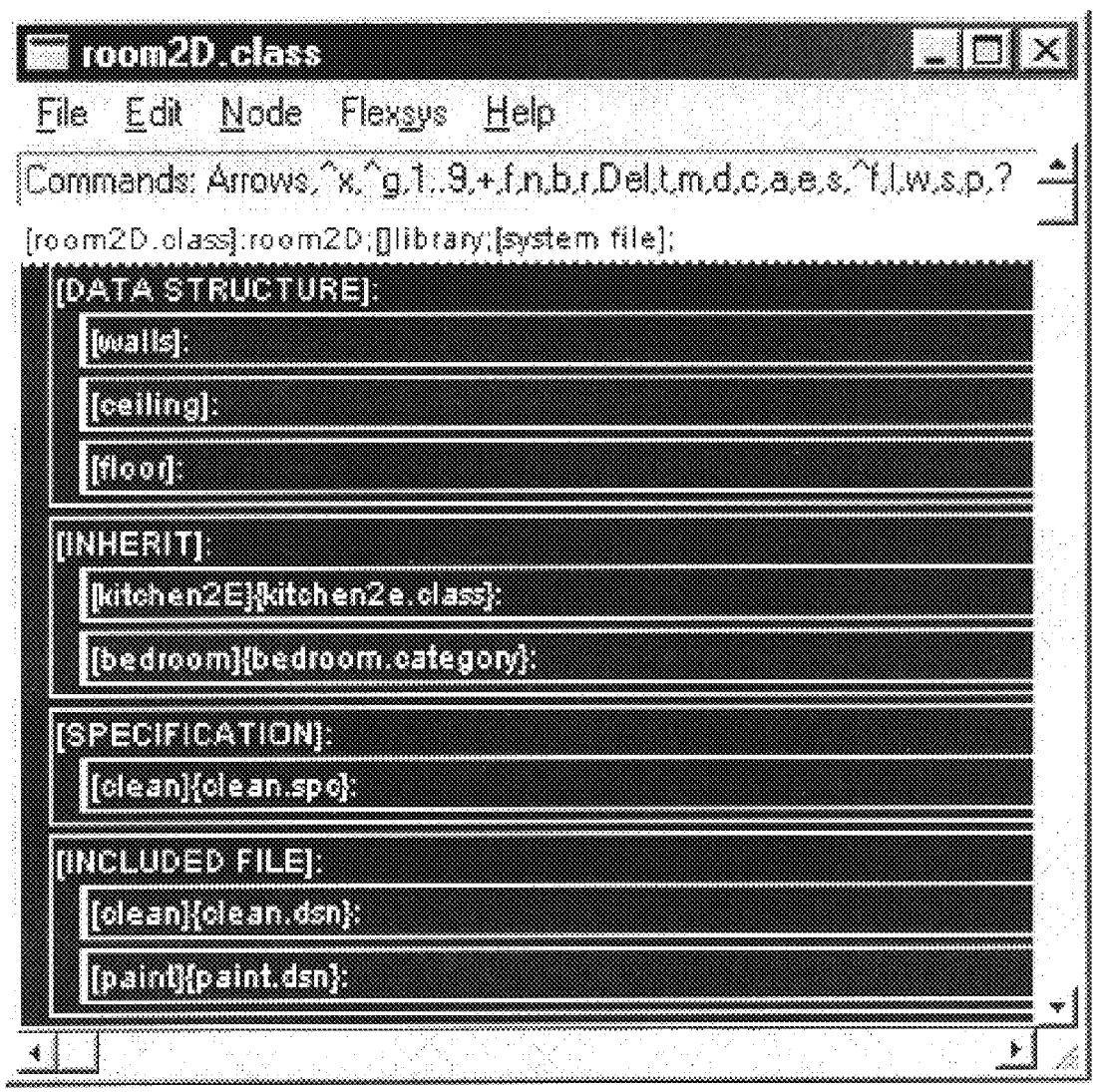

FIG. 2C. Flexform representing top levels of an executable version of the clean room design with DOMAIN, RANGE and INTERMEDIATE, and INCLUDED FILE and GLOBAL sections expanded.

FIG. 2D. Flexform representing the top-level class in a class hierarchy.

Figure 2E:
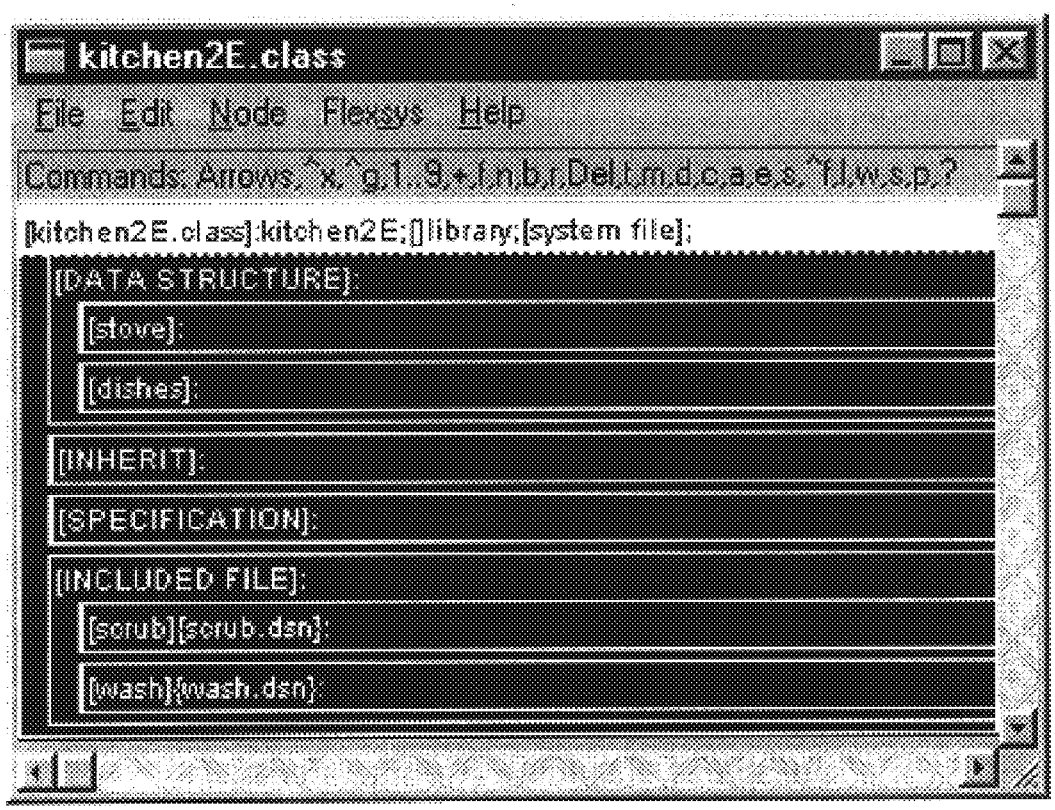

FIG. 2E. Flexform representing the kitchen class that inherits from the room class of FIG. 2D.

Figure 3:
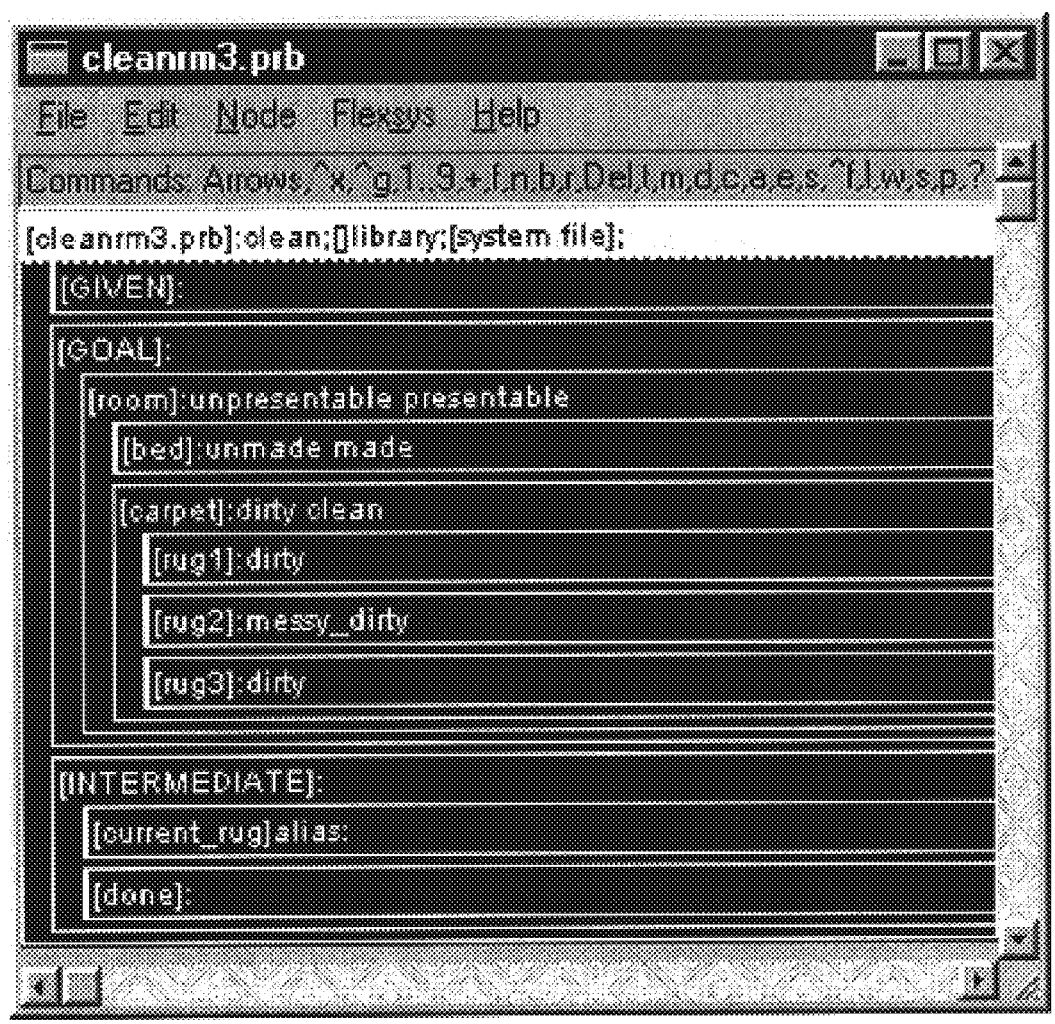

FIG. 3. Flexform representing a sample problem (data) on which the clean room design of FIG. 2 operates.

Figure 4:
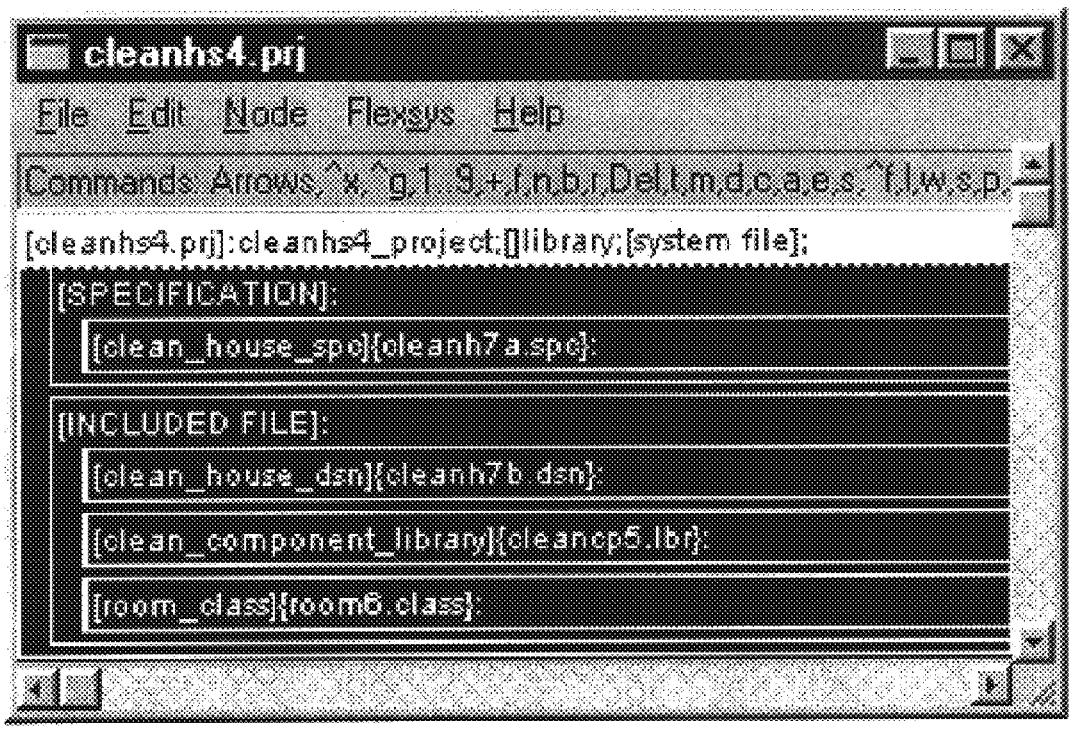

FIG. 4. Flexform representing a sample project for cleaning houses.

Figure 4A:
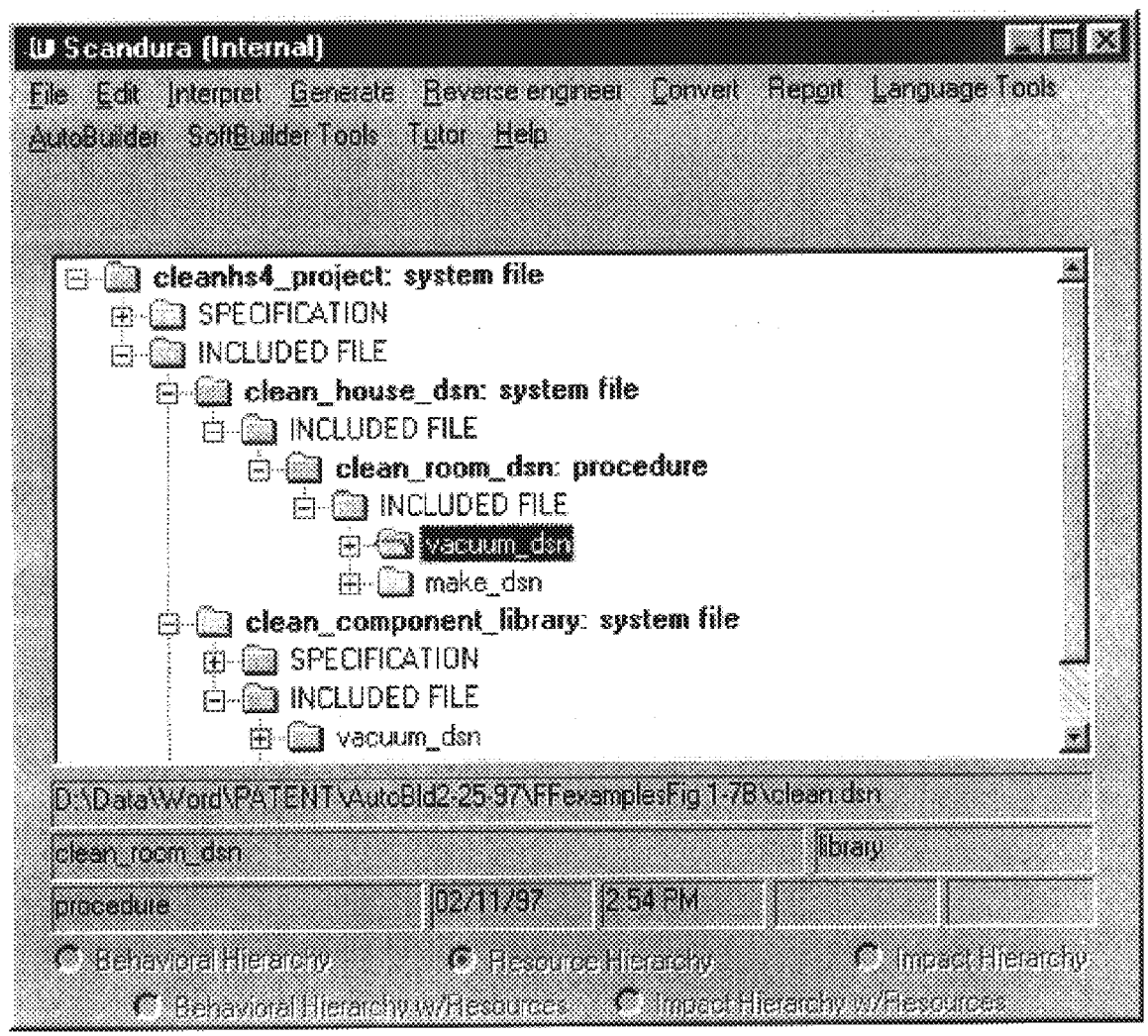

FIG. 4A. Tree view showing the clean_house project Flexform of FIG. 4 with relationships to referenced Flexforms.

Figure 5:
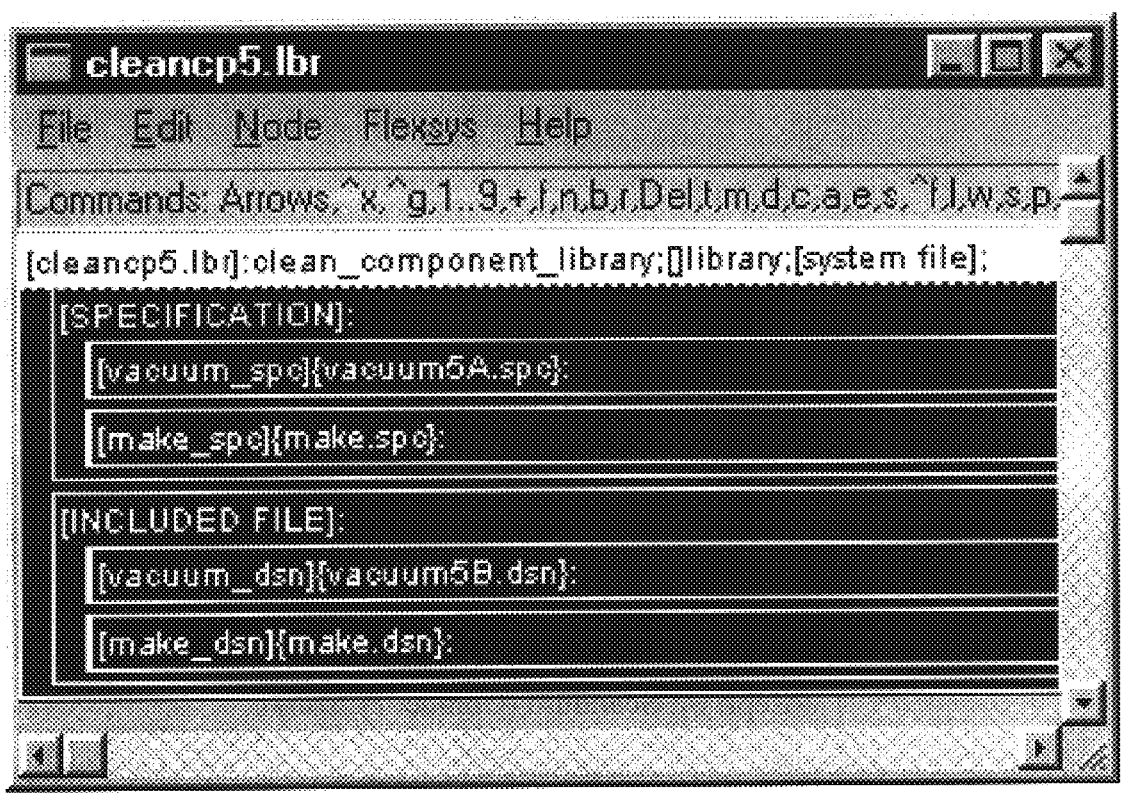

FIG. 5. Flexform representing a clean_component_library containing "vacuum" and "make" designs and their specifications.

Figure 5A:
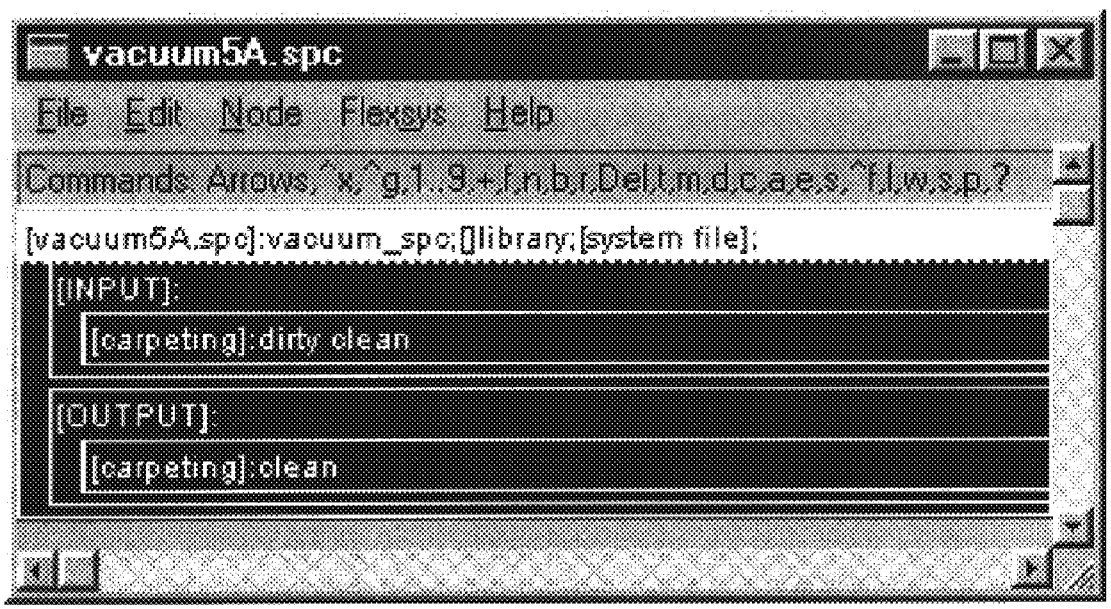

FIG. 5A. Flexform representing specifications for vacuum carpeting in clean_component_library.

Figure 5B:
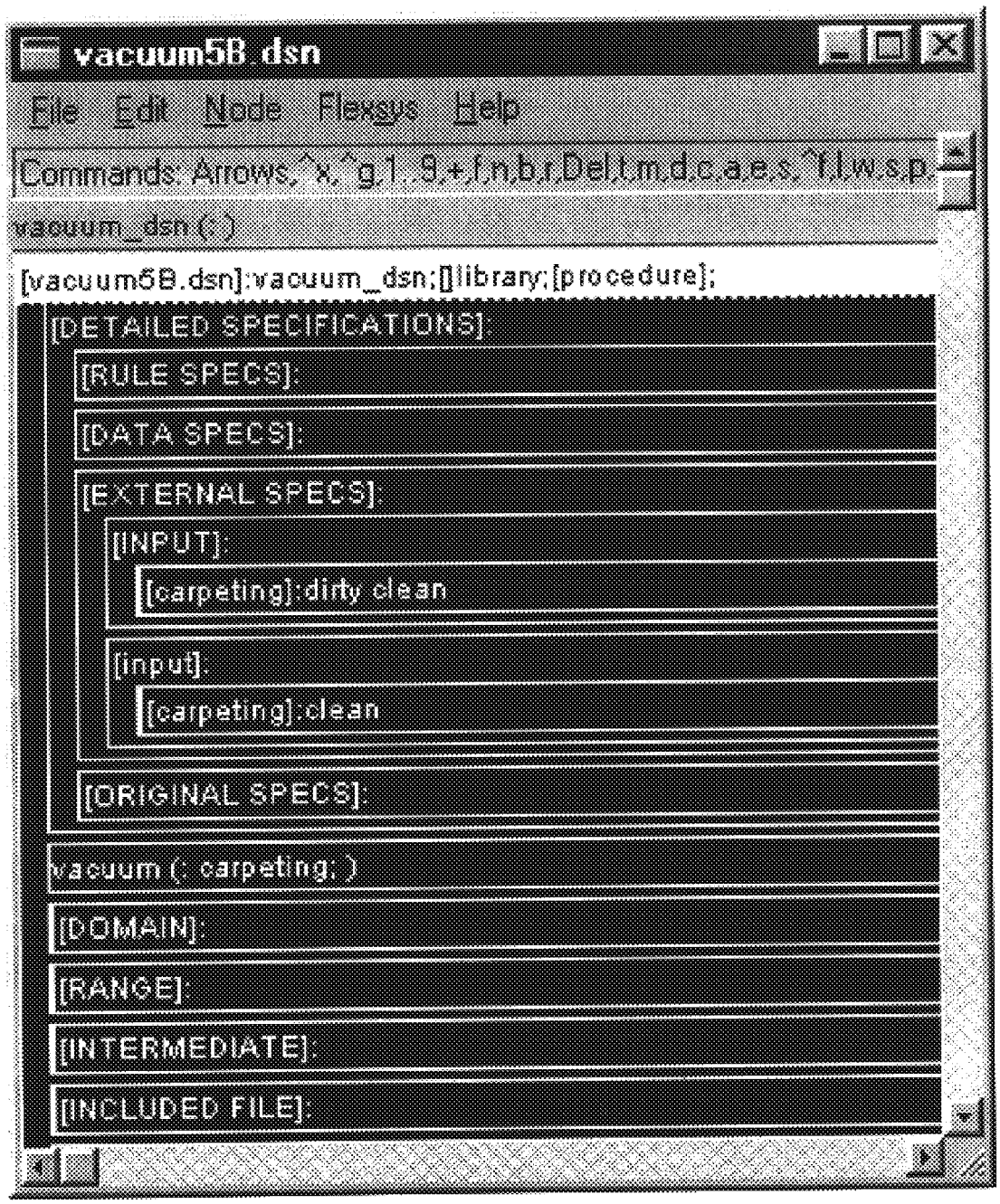

FIG. 5B. Flexform representing the top level of a design and external specifications for vacuum carpeting in clean_component_library.

Figure 6:
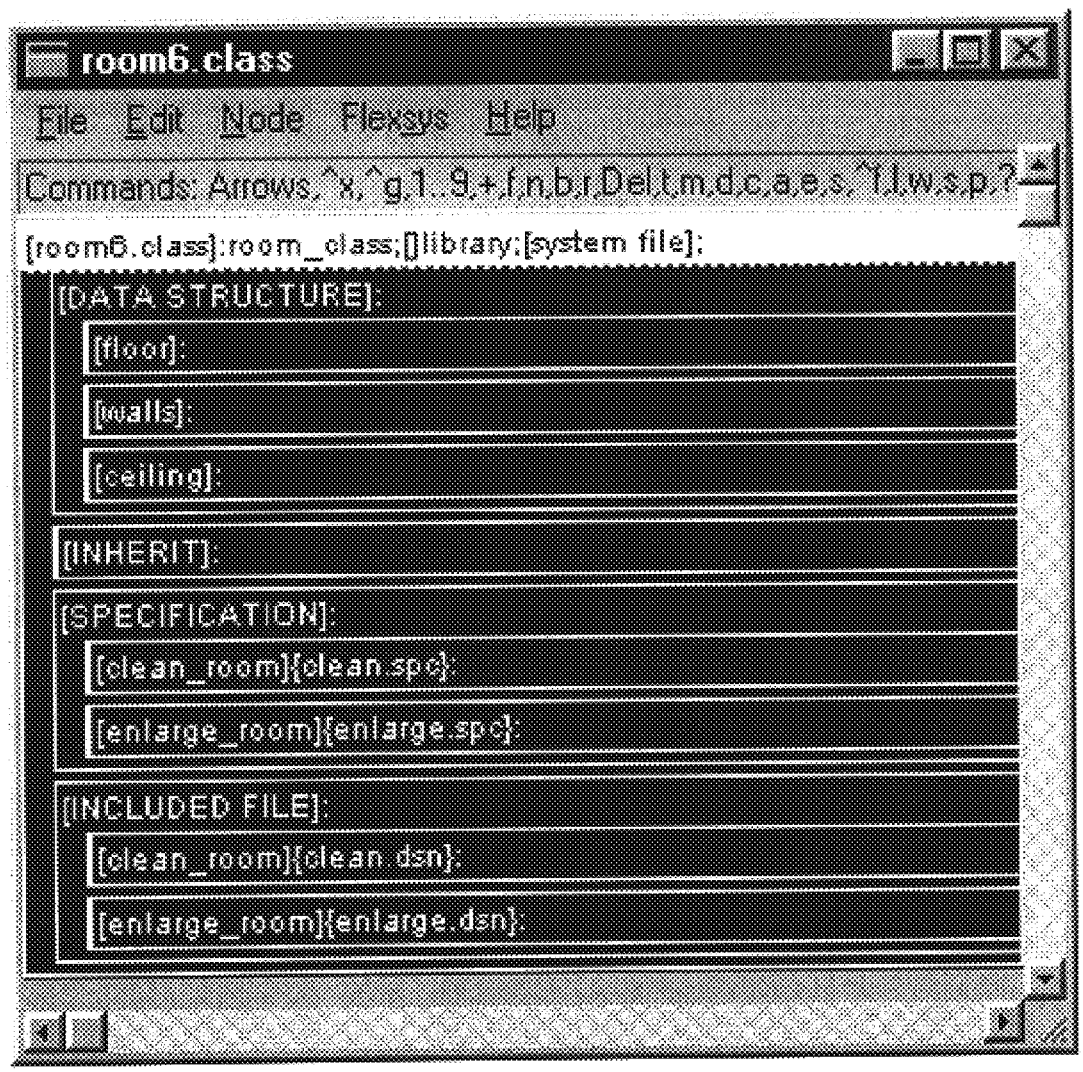

FIG. 6. Flexform representing a room class containing a data structure (set of components) which represents a room, two designs that operate on this data structure and their specifications.

Figure 7A:
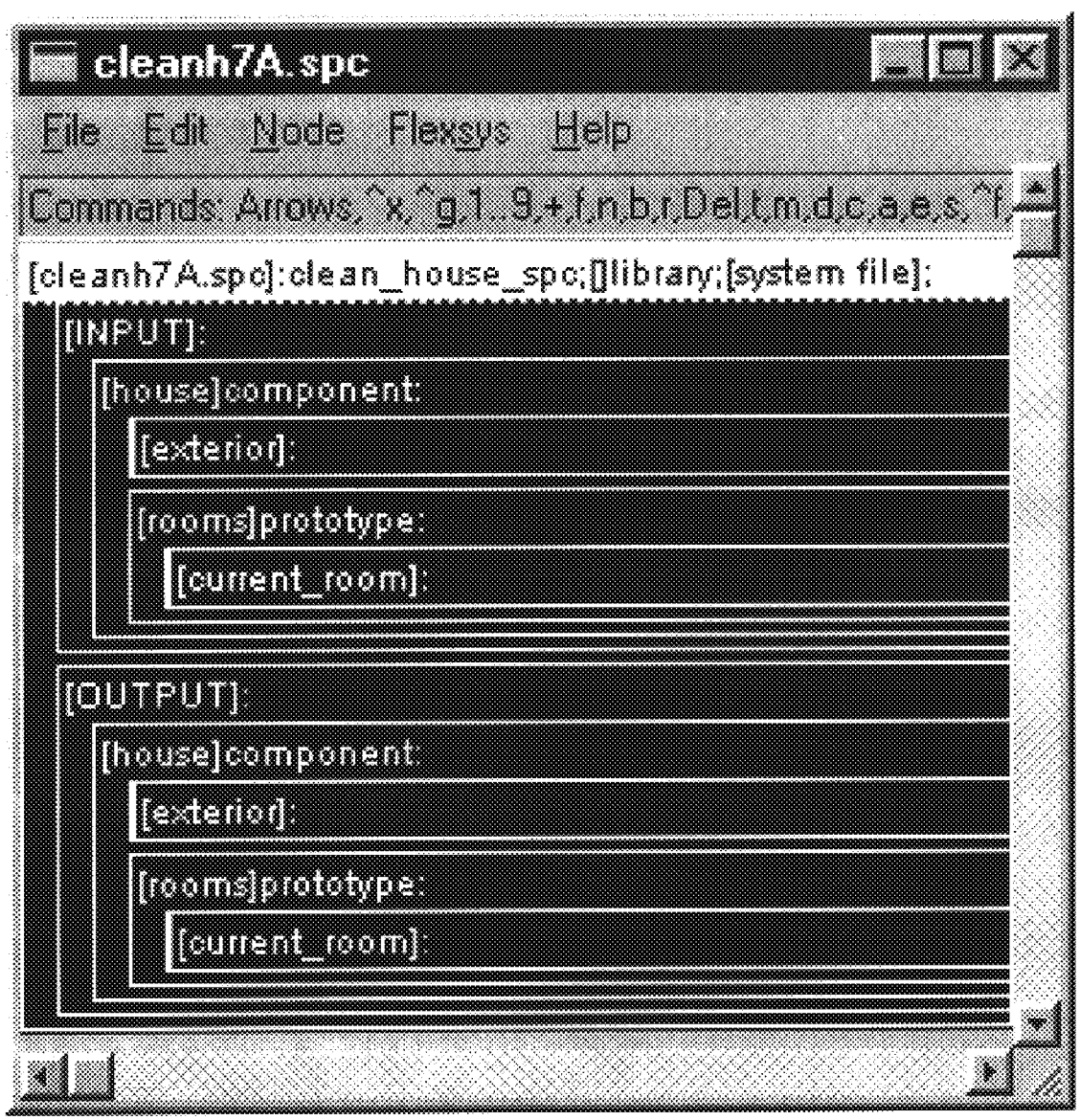

FIG. 7A. Flexform representing the clean_house_spc specifications in the clean house project shown in FIG. 4.

Figure 7B:
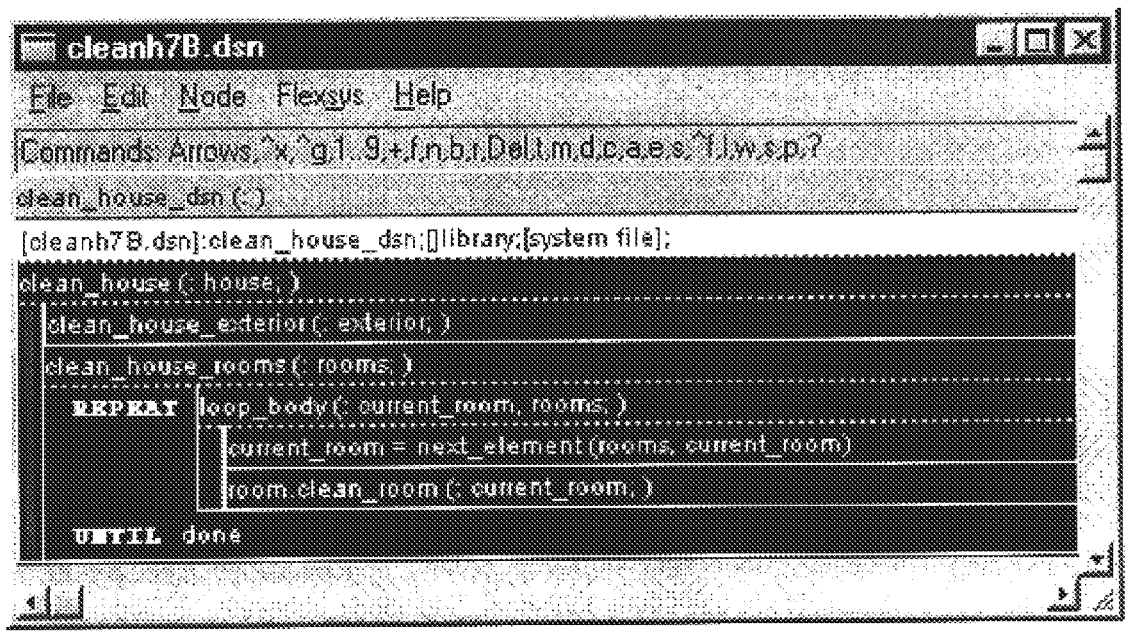

FIG. 7B. Flexform representing the clean_house design corresponding to the specification in FIG. 7A.

Figure 8A:
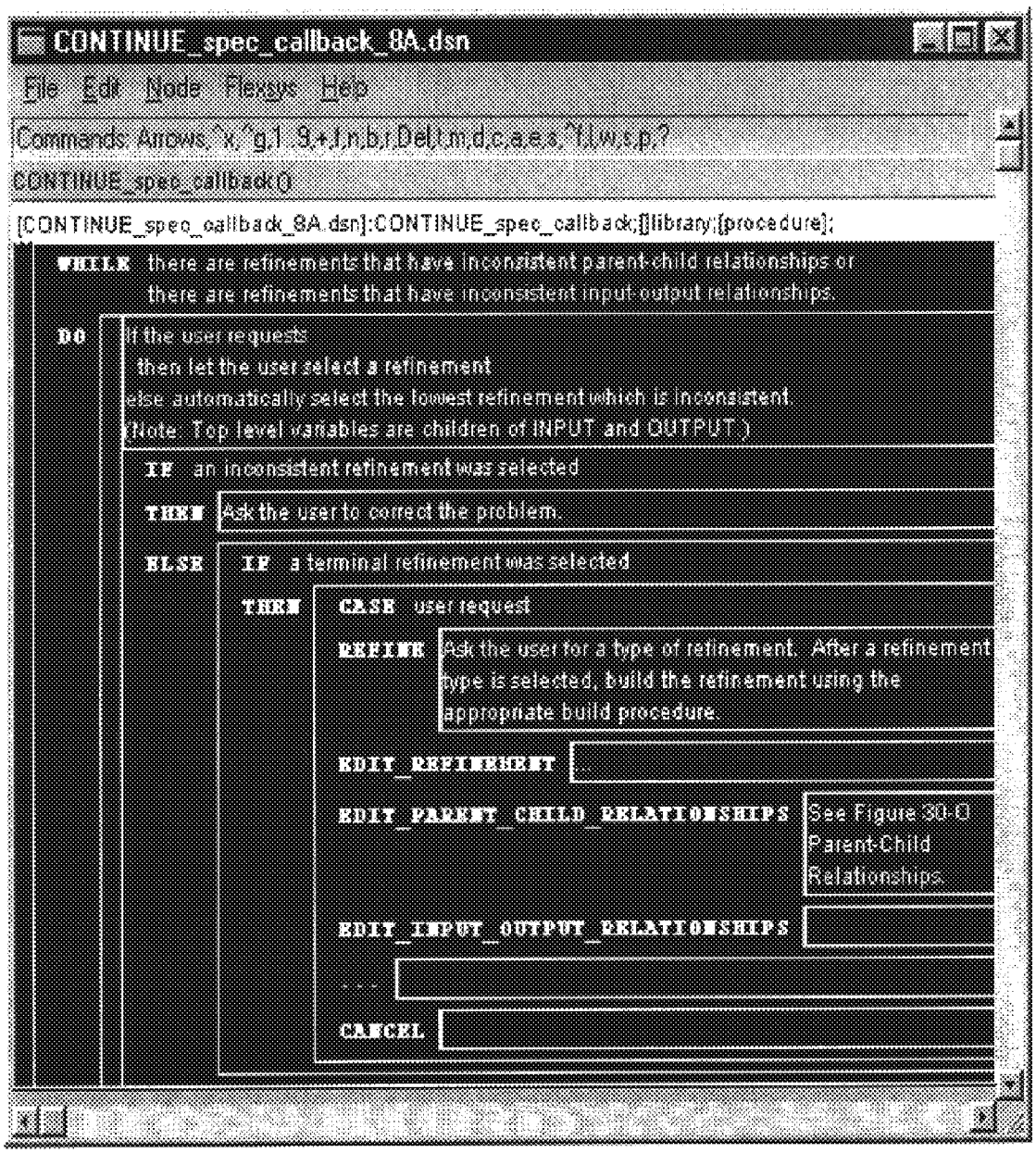

FIG. 8A. Flexform representing a high level of the specifications callback, with emphasis on automatic (called continue—suggest next) mode.

Figure 8B:
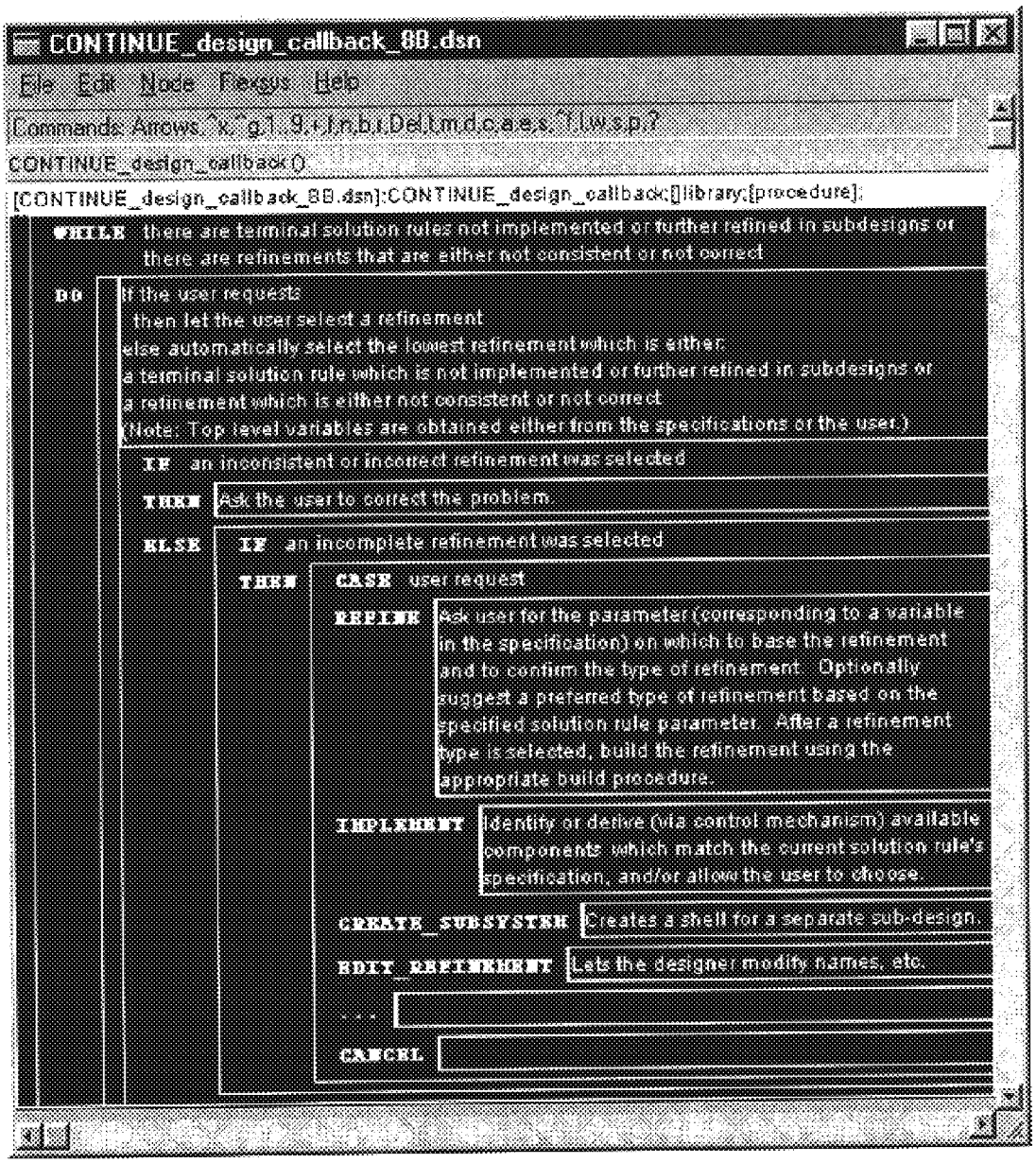

FIG. 8B. Flexform representing a high level of the design callback, with emphasis on automatic (called continue—suggest next) mode.

Figure 9:
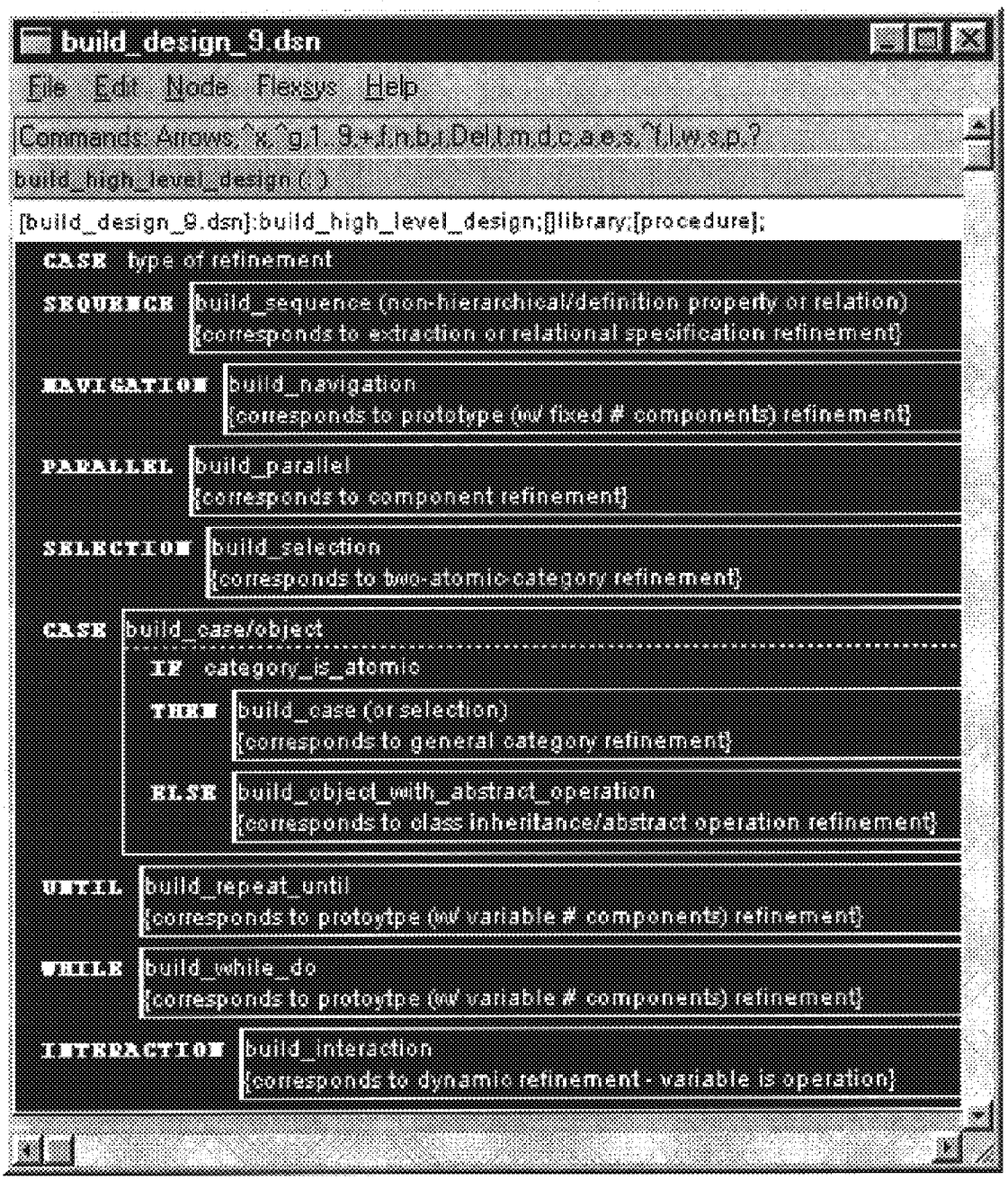

FIG. 9. Flexform representing the high level case selection used in building various types of procedural refinement.

Figure 9A:
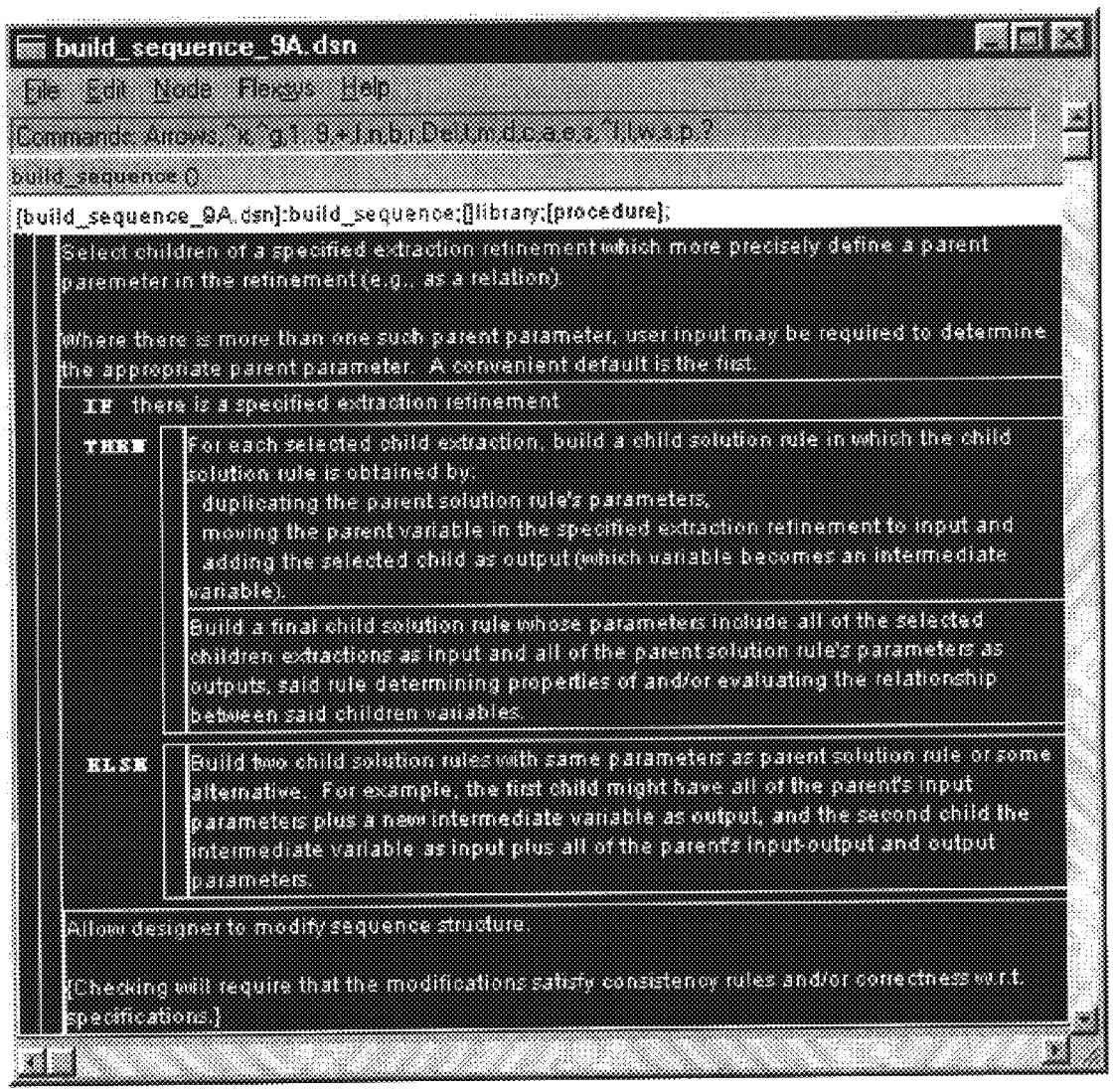
Figure 98:
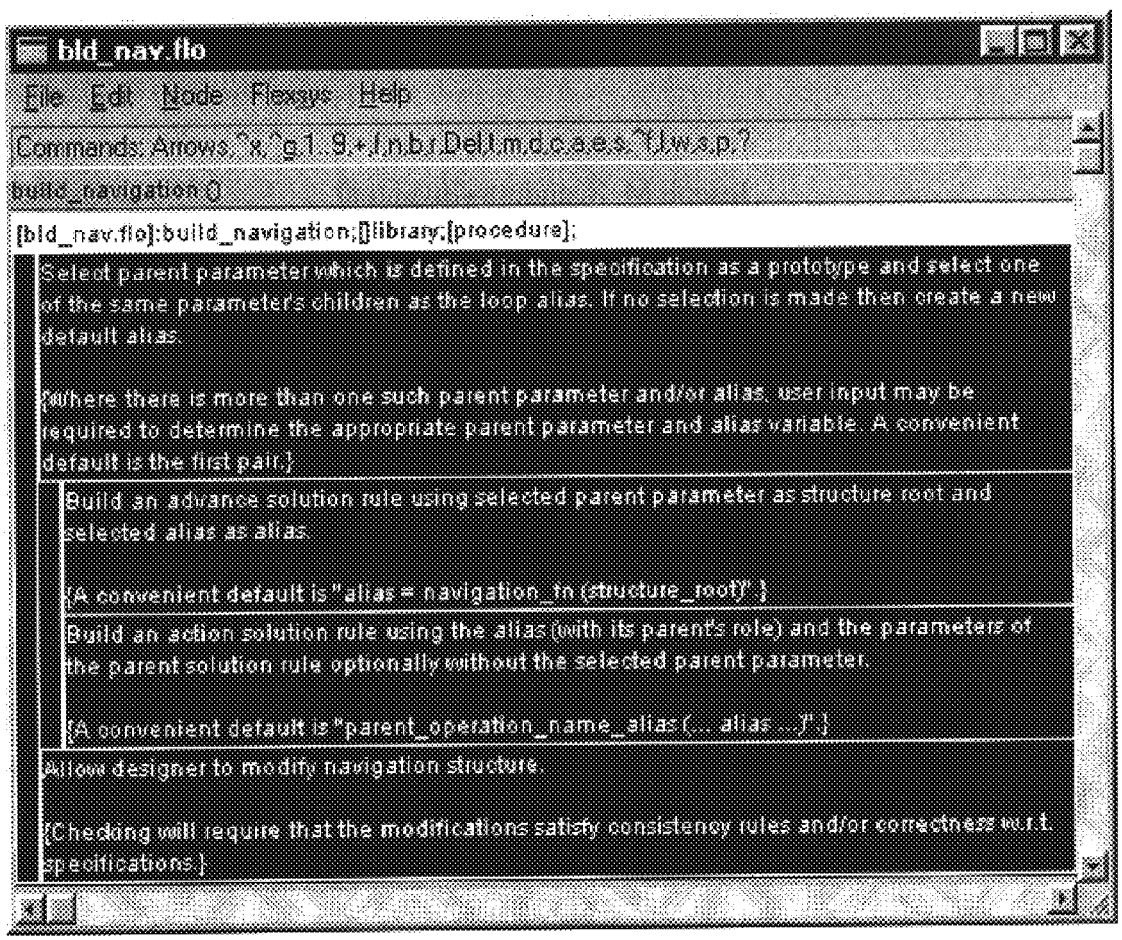

FIG. 9A. Flexform representing a high level design for building sequence refinements.

FIG. 9B. Flexform representing a high level design for building navigation sequence refinements.

Figure 9C:
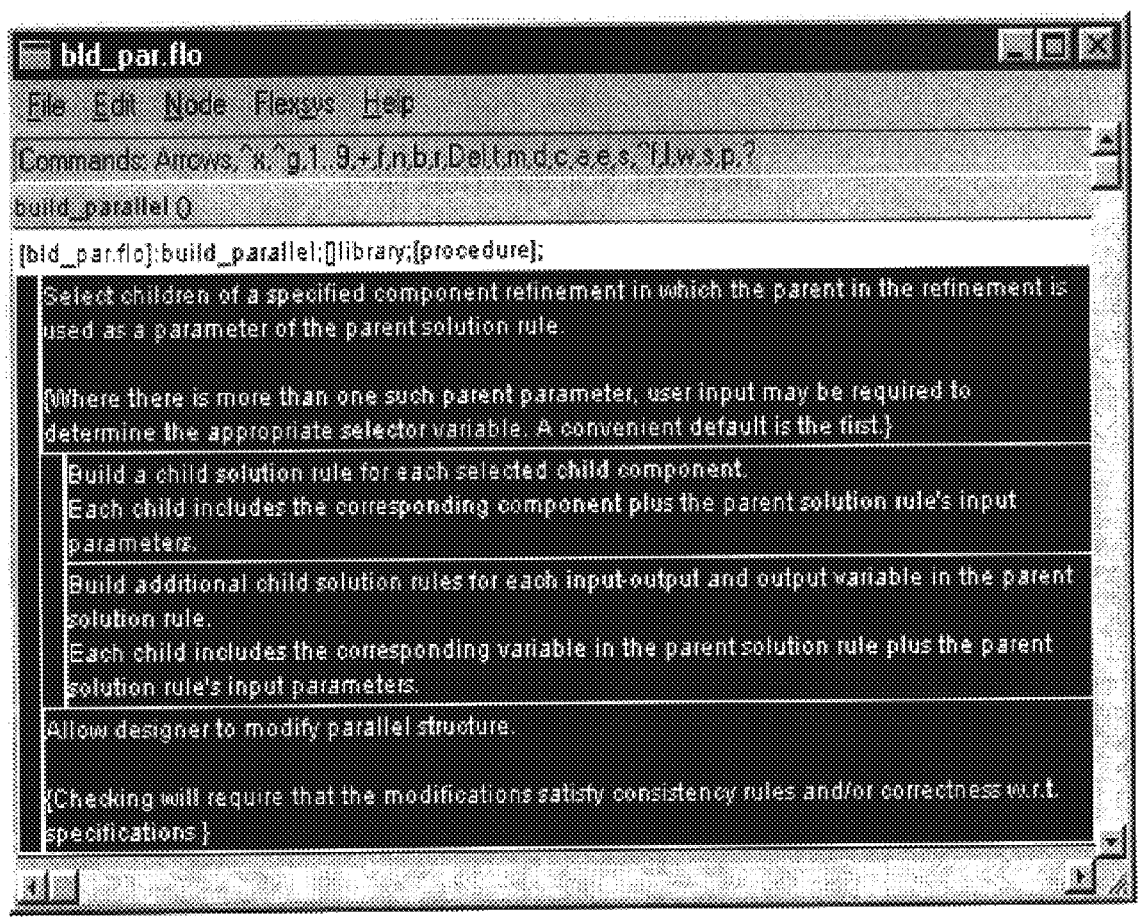

FIG. 9C. Flexform representing a high level design for building parallel refinements.

Figure 9D:
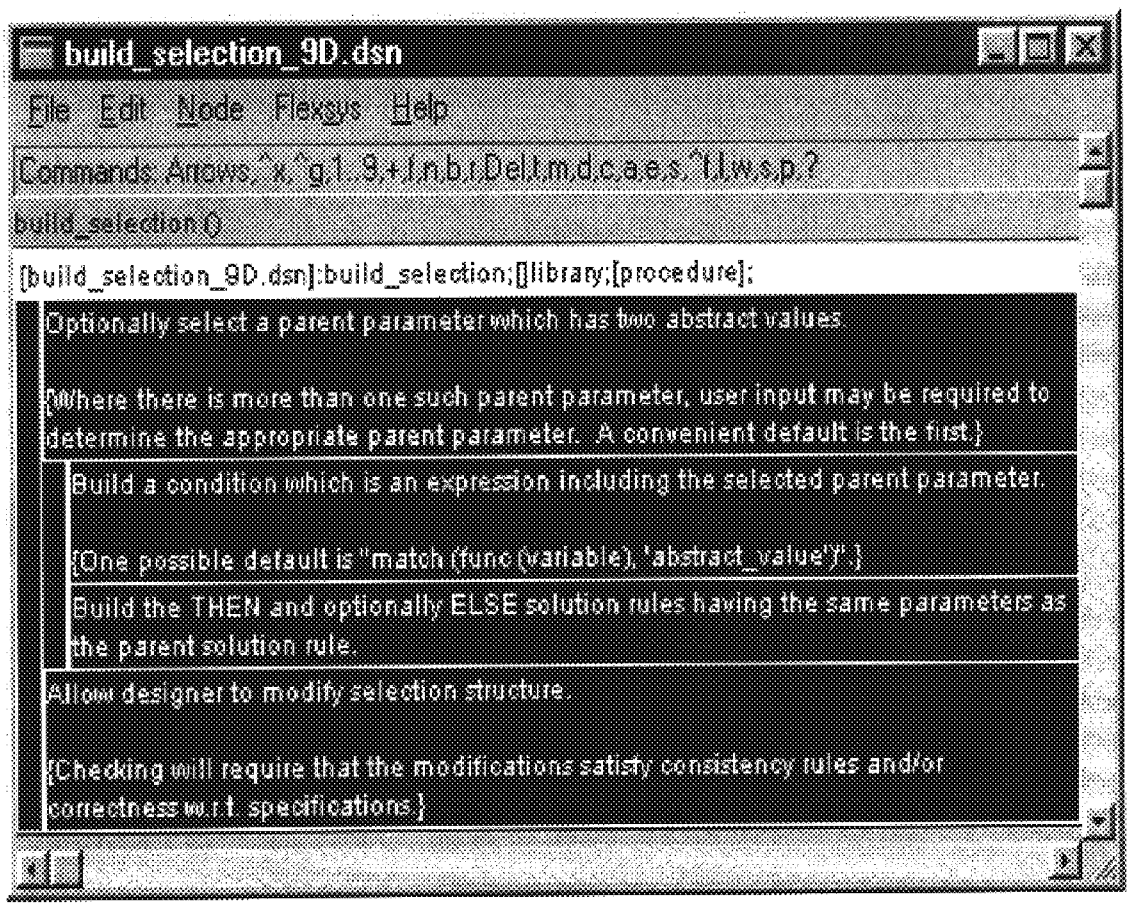
Figure 4E:
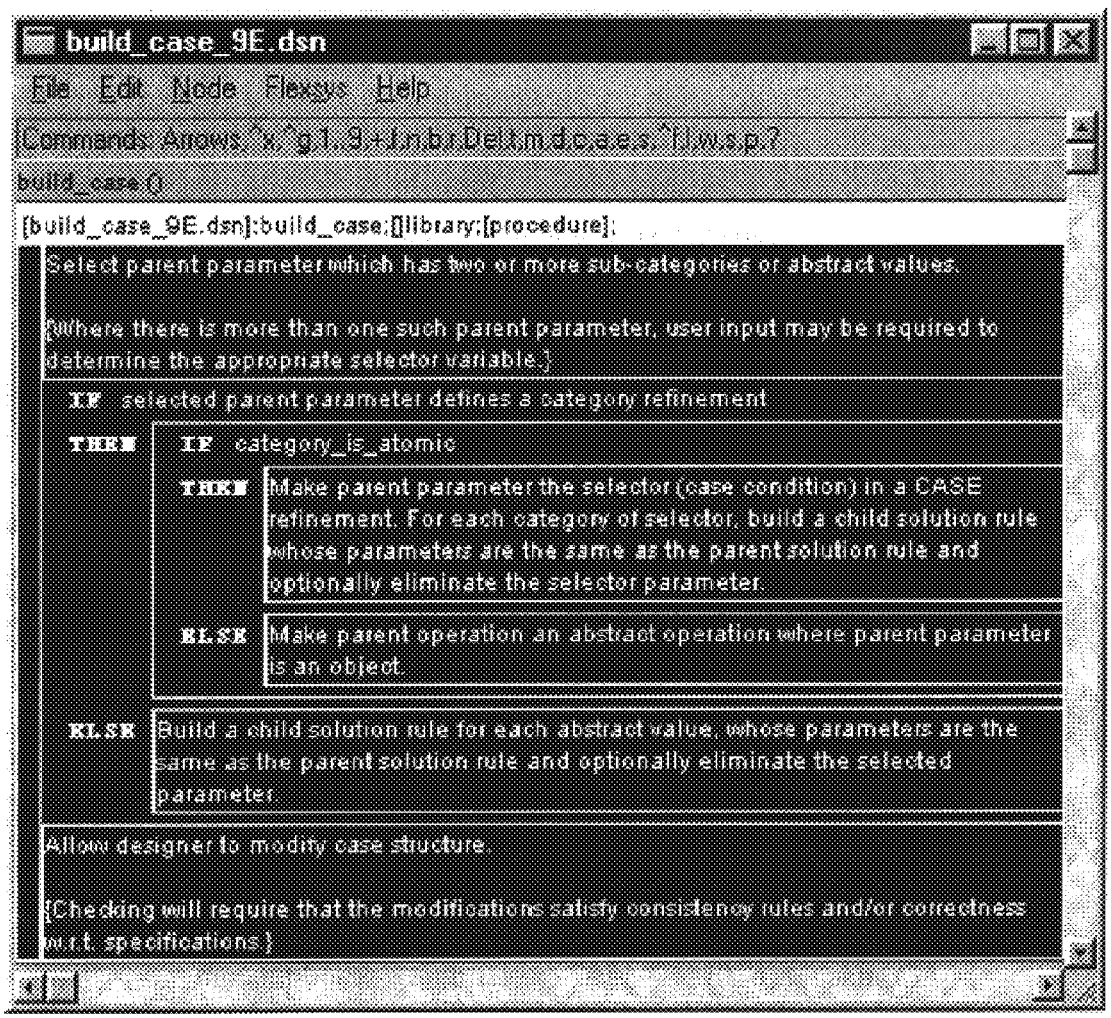

FIG. 9D. Flexform representing a high level design for building selection refinements.

FIG. 9E. Flexform representing a high level design for building case refinements.

Figure 9F:
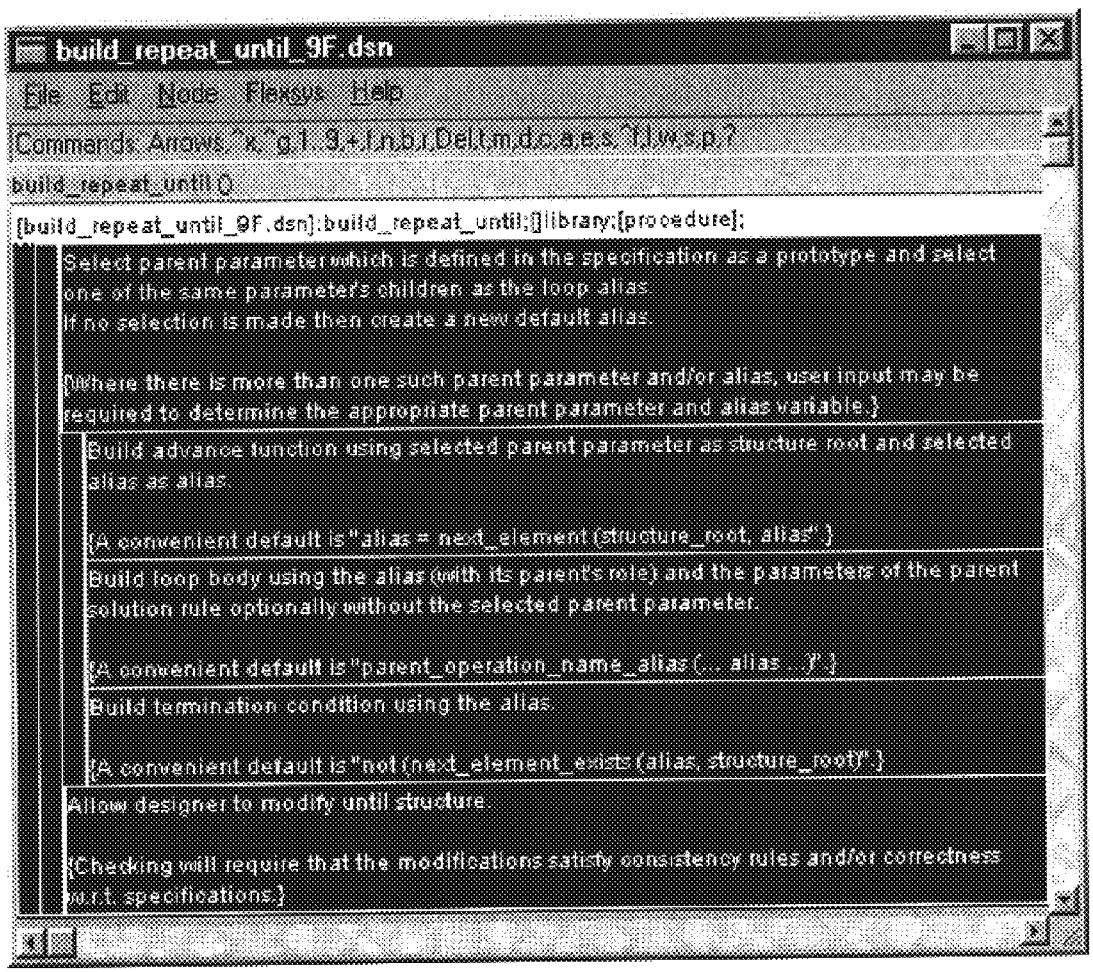

FIG. 9F. Flexform representing a high level design for building repeat . . . until refinements.

Figure 9G:
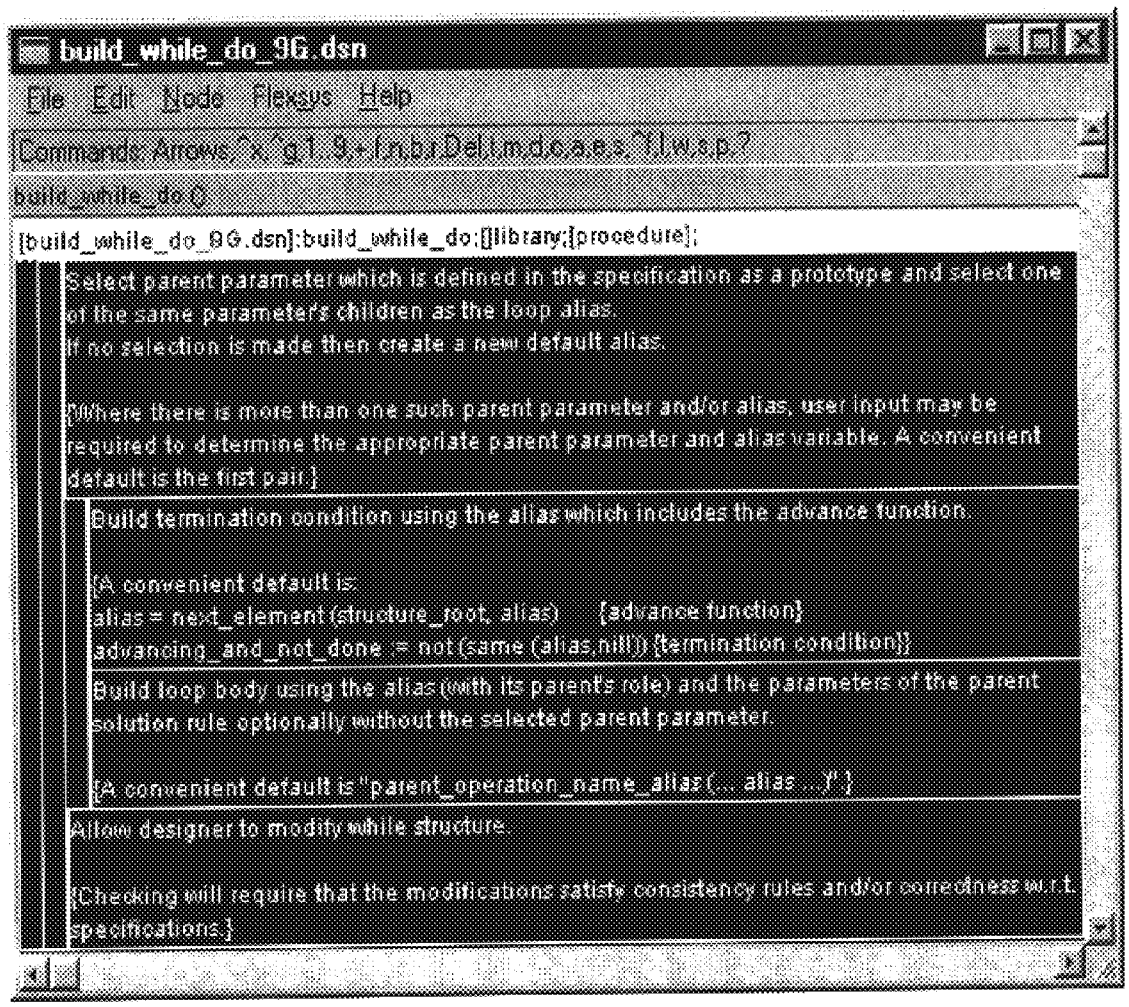

FIG. 9G. Flexform representing a high level design for building while . . . do refinements.

Figure 10:
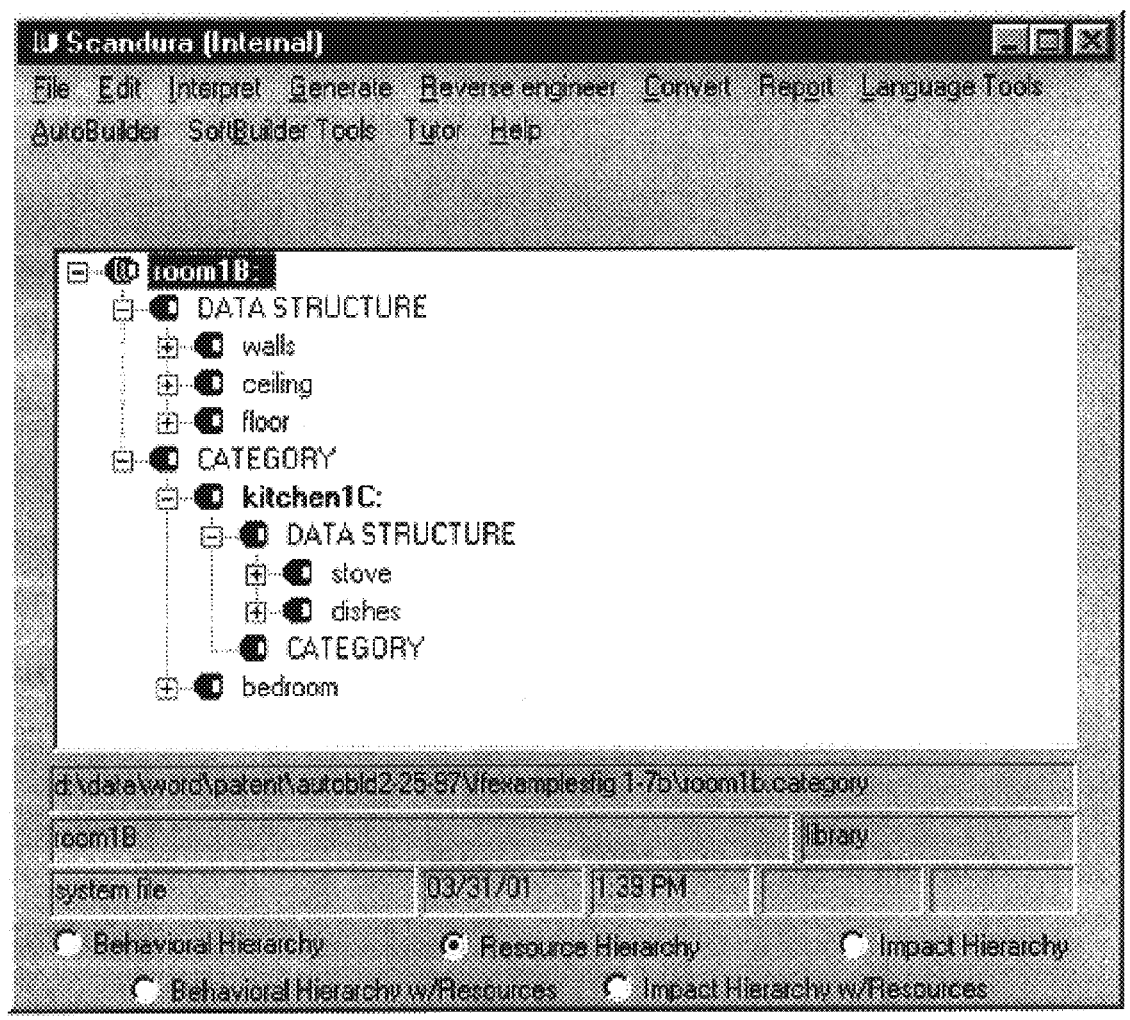

FIG. 10. Flexform representing a high level design for updating the parent solution rule in a given design refinement.

Figure 10:
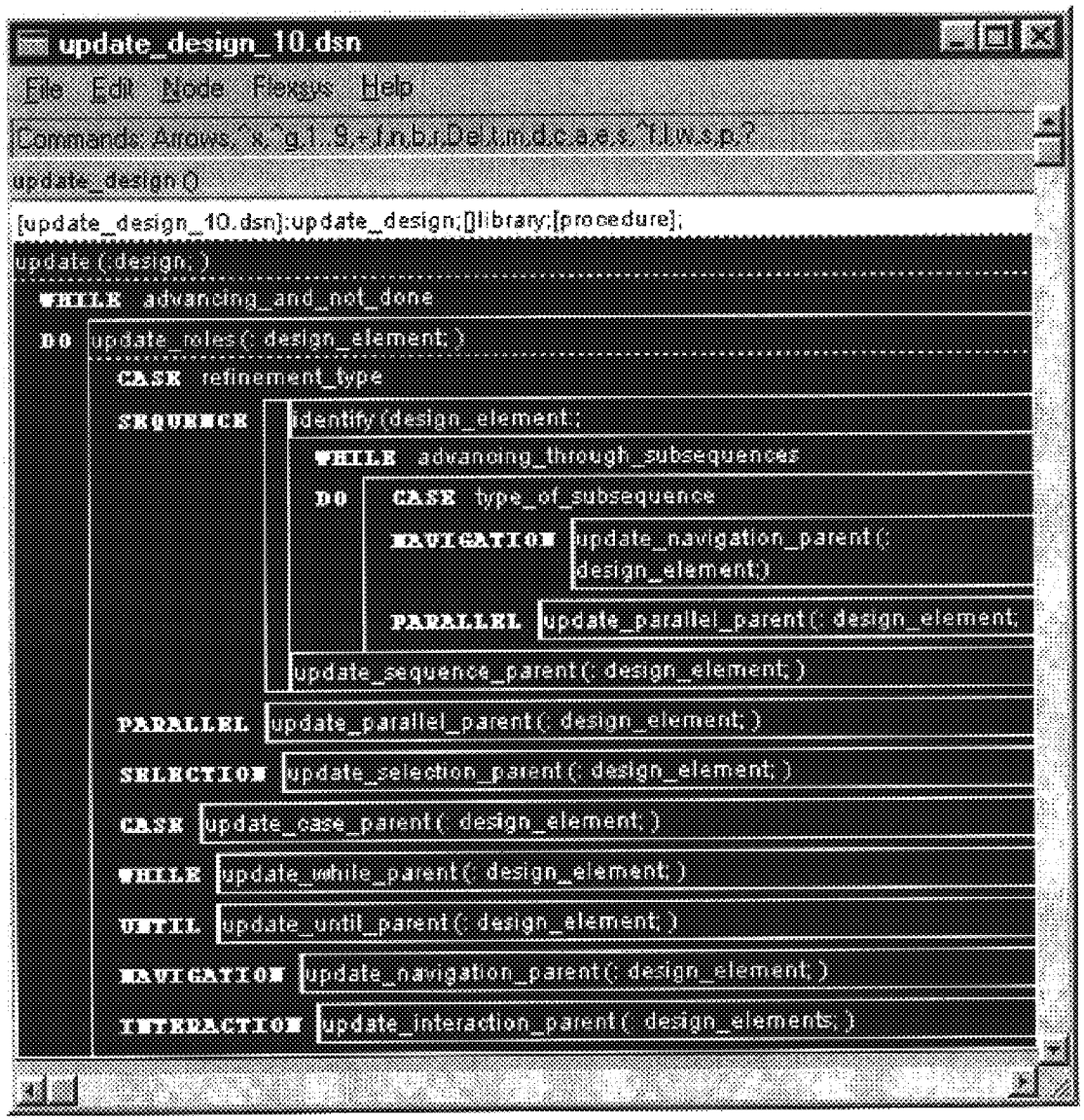
Figure 10A:
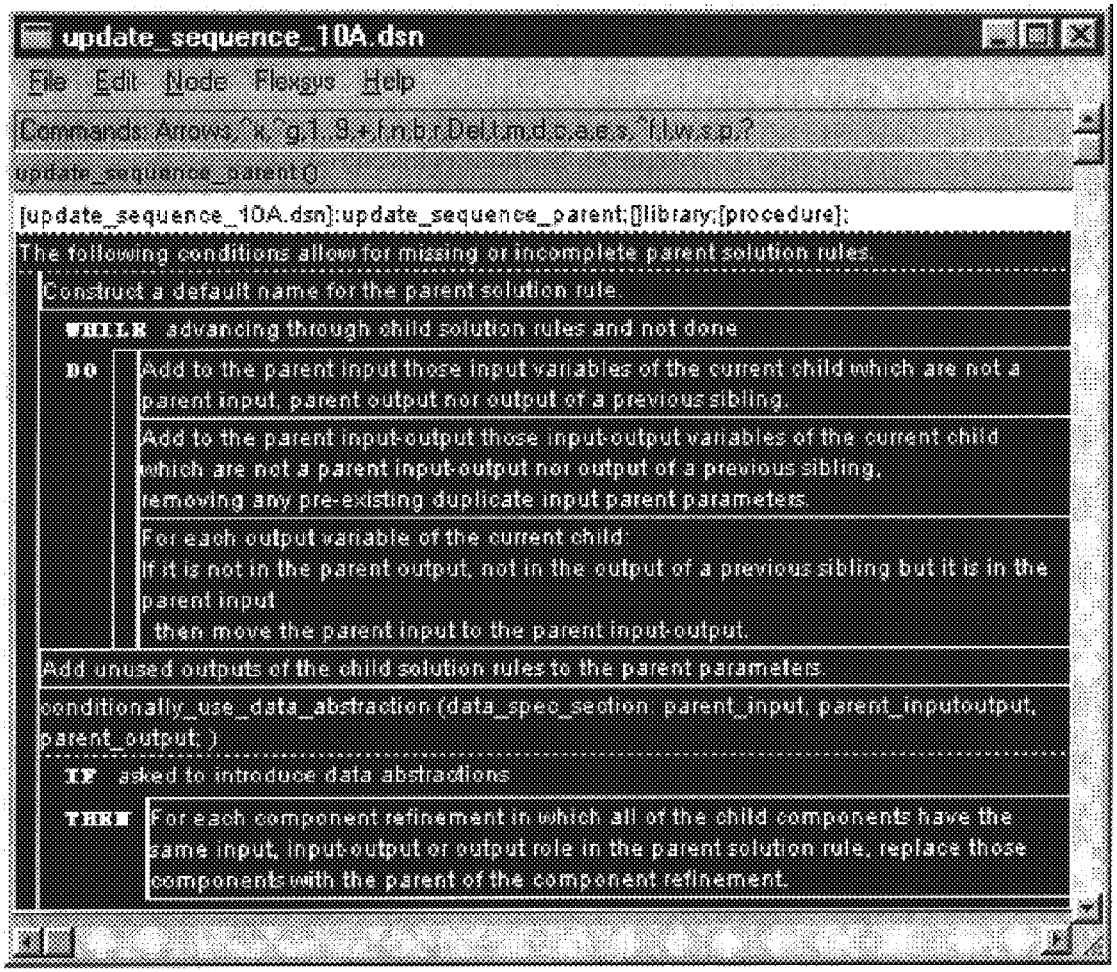

FIG. 10A. Flexform representing a high level design for updating sequence refinements.

Figure 10B:
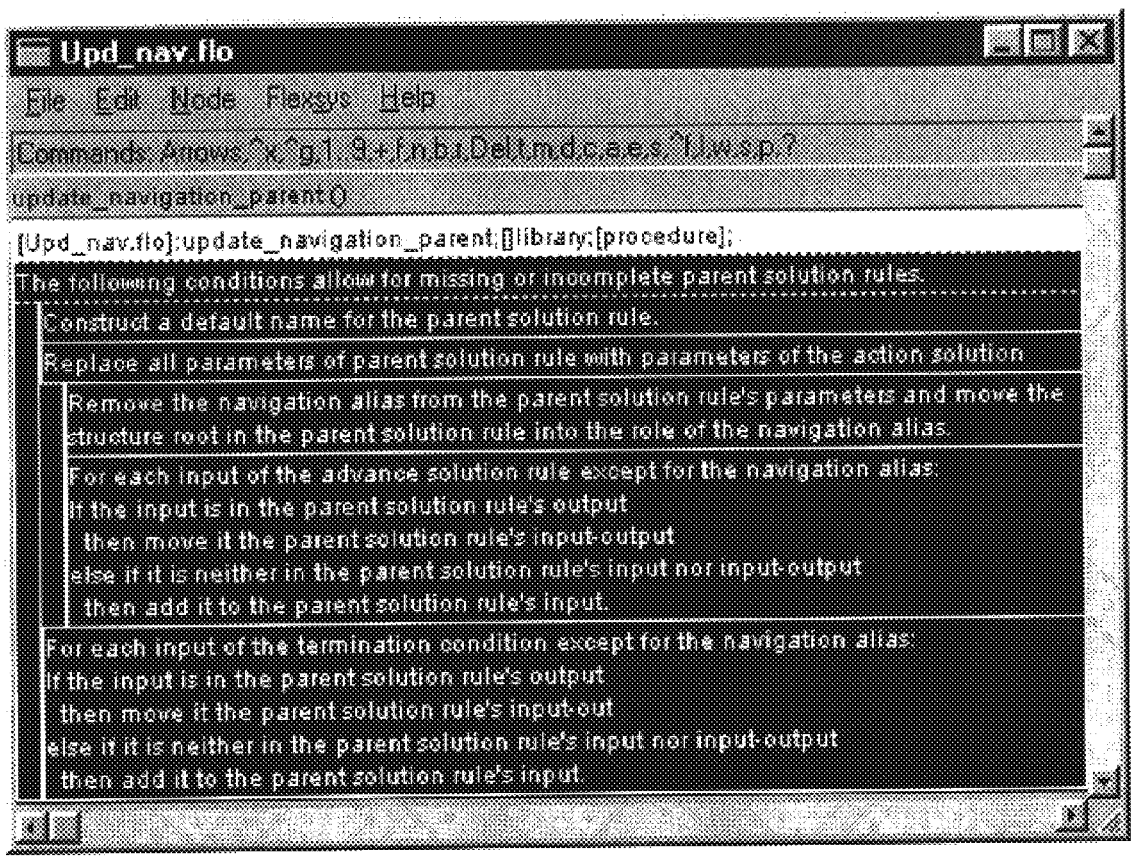

FIG. 10B. Flexform representing a high level design for updating navigation sequence refinements.

Figure 10C:
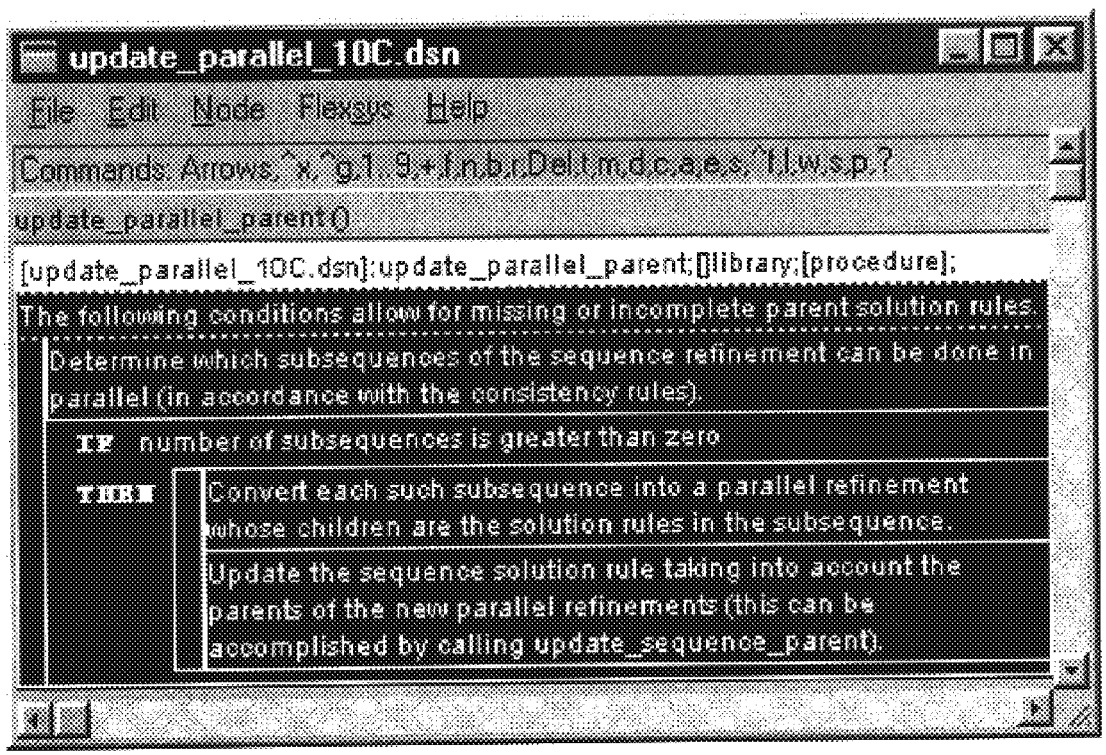
Figure 10:
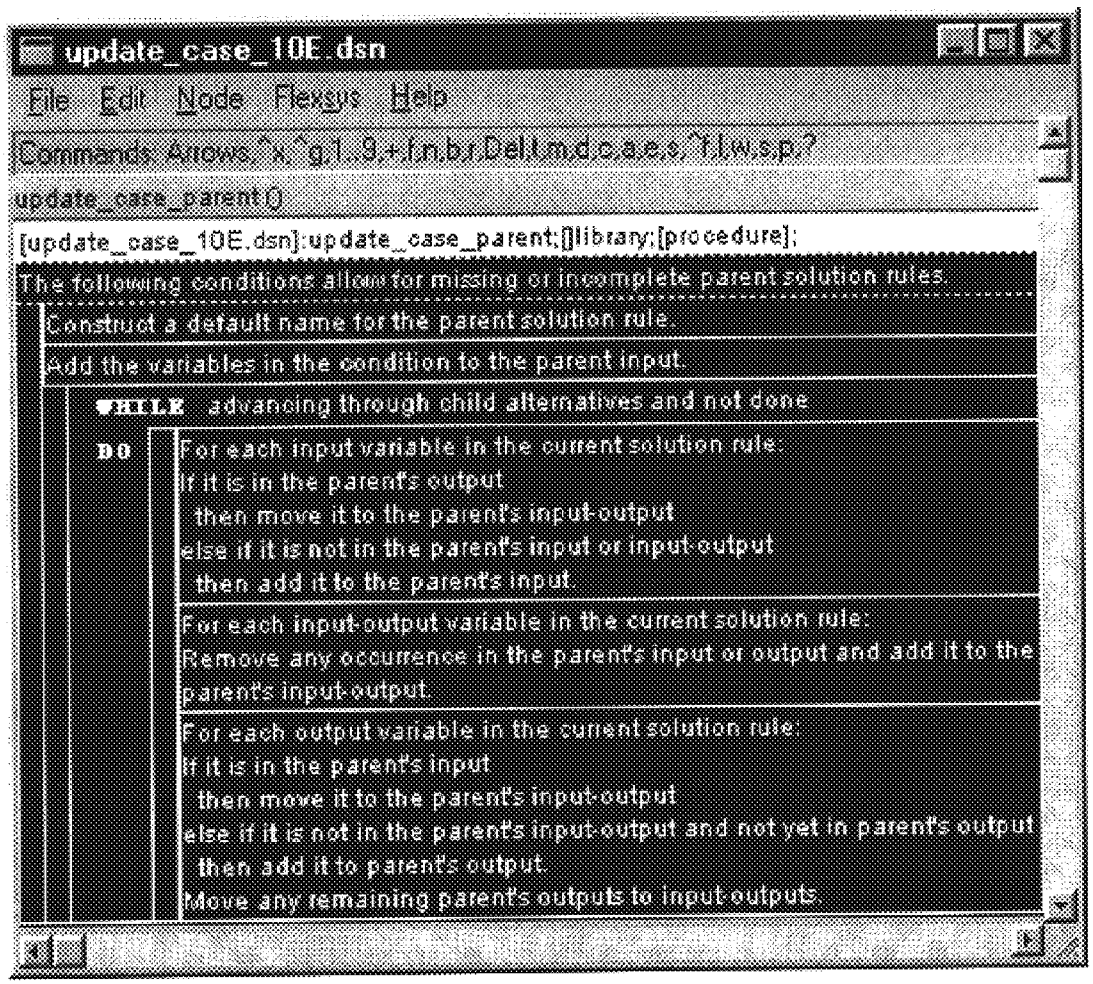

FIG. 10C. Flexform representing a high level design for updating parallel refinements.

FIG. 10D. Flexform representing a high level design for updating selection refinements.

FIG. 10E. Flexform representing a high level design for updating case refinements.

Figure 10F:
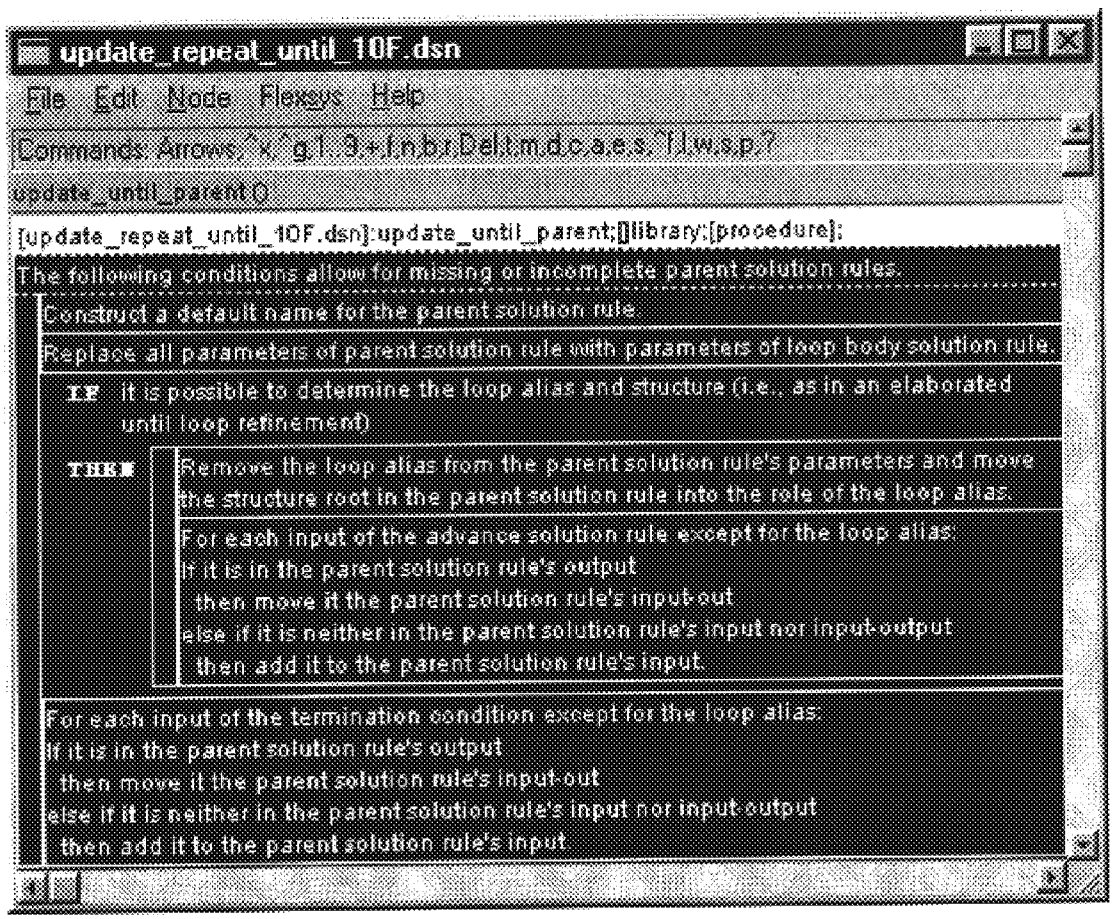

FIG. 10F. Flexform representing a high level design for updating repeat . . . until refinements.

Figure 10G:
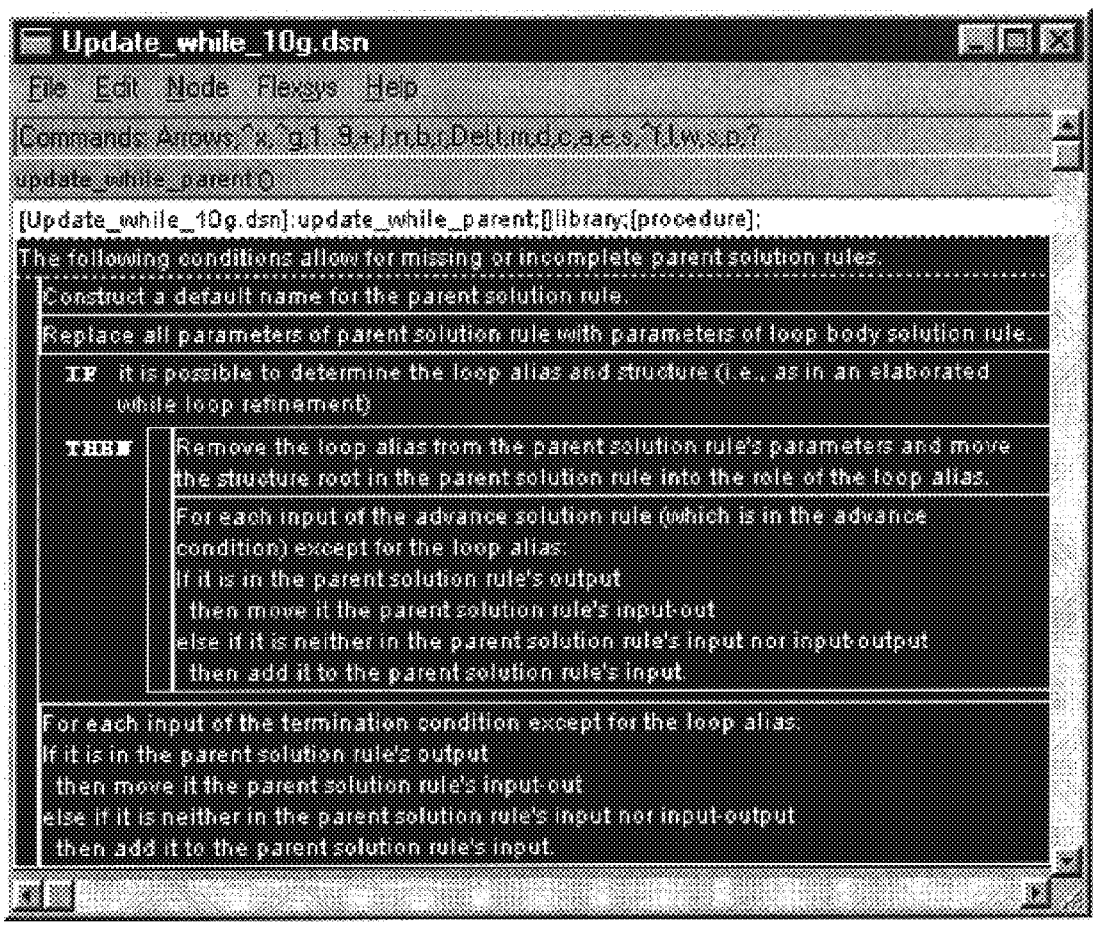

FIG. 10G. Flexform representing a high level design for updating while . . . do refinements.

Figure 11:
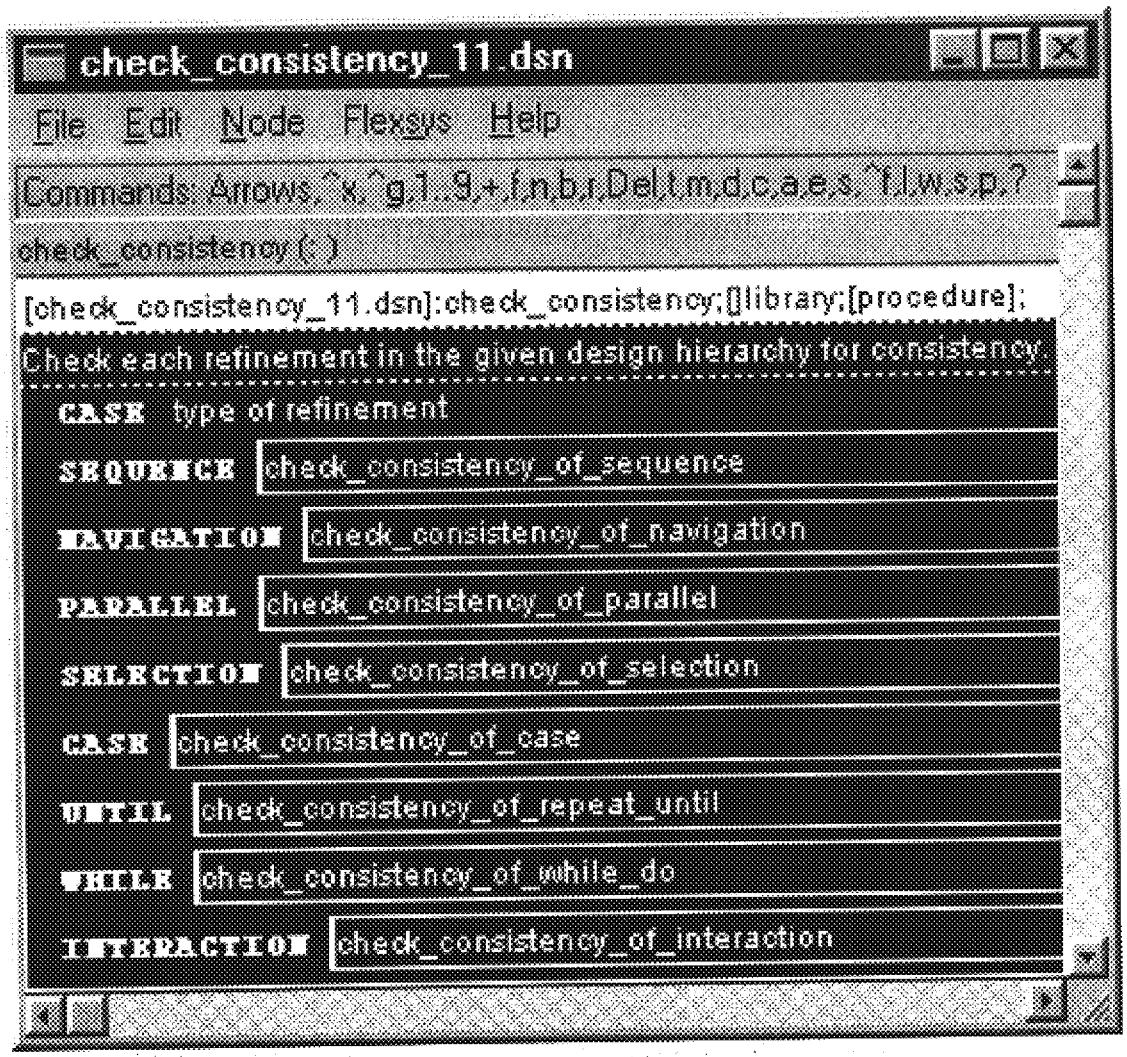

FIG. 11. Flexform representing the top-level design for checking the consistency of a given design refinement.

Figure 12:
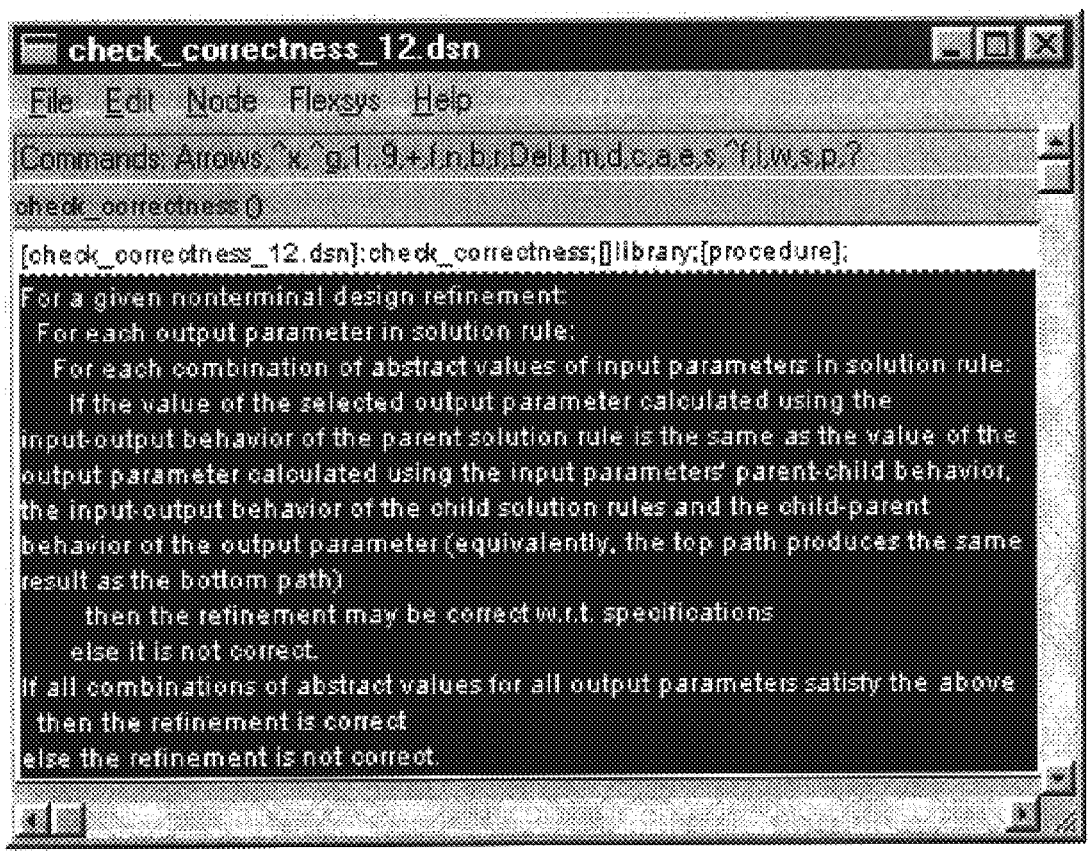

FIG. 12. Flexform summarizing the design for checking the abstract or relative correctness of given design refinements.

Figure 13A:
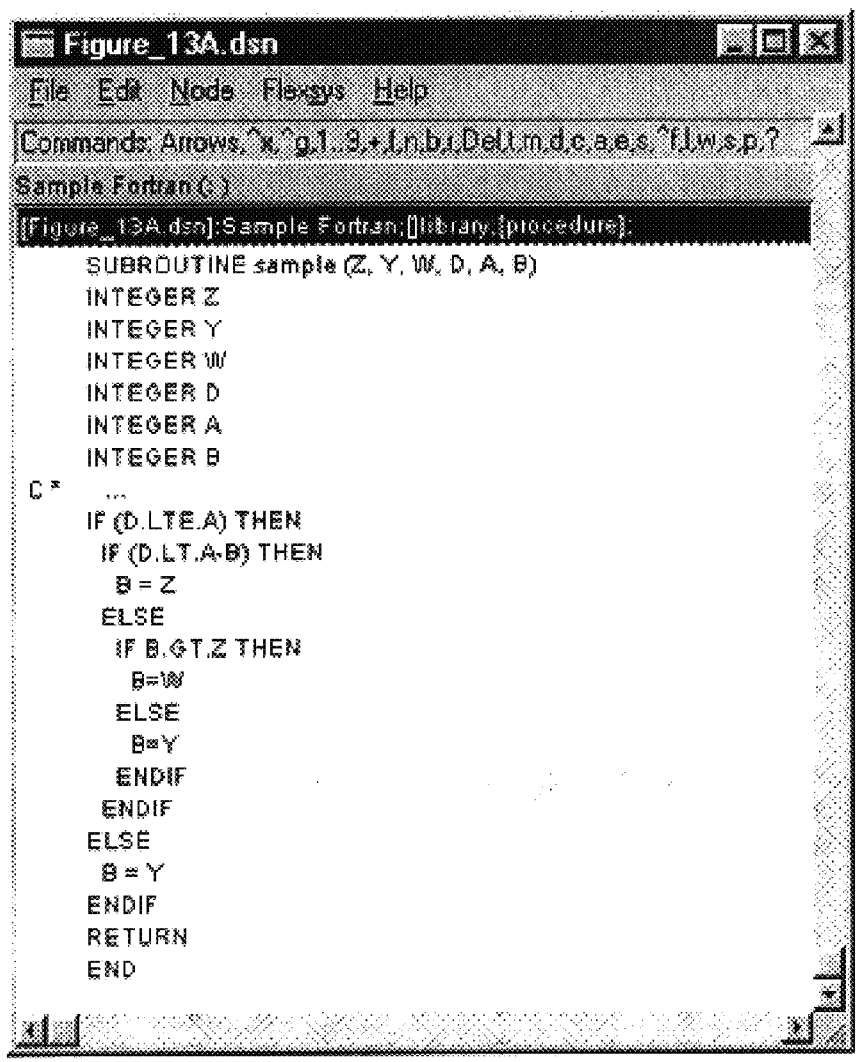

FIG. 13A. Sample FORTRAN subroutine illustrating both data and process source code.

Figure 13B:
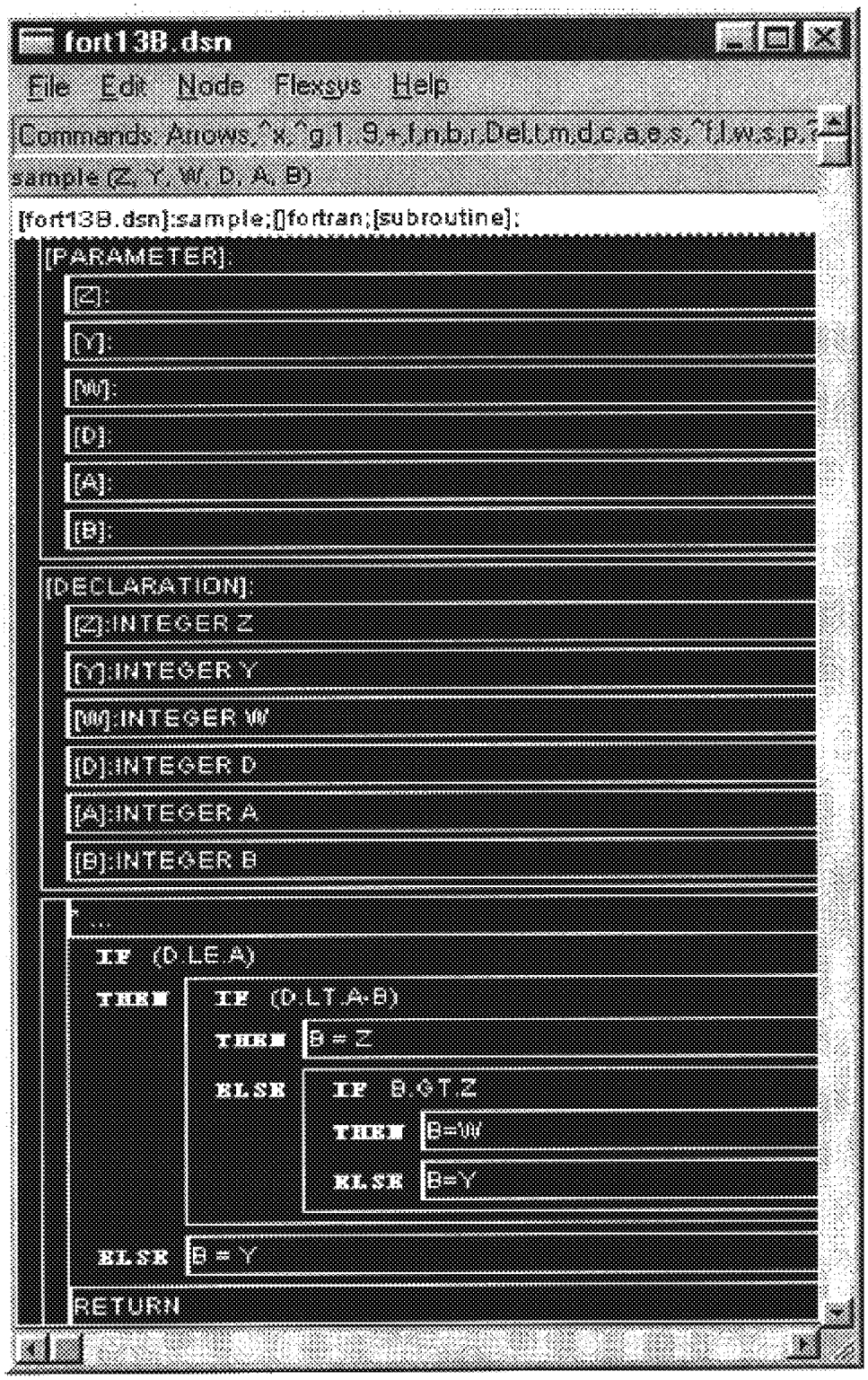

FIG. 13B. FORTRAN Flexform representing all essential information in the sample FORTRAN subroutine of FIG. 13A.

Figure 13C:
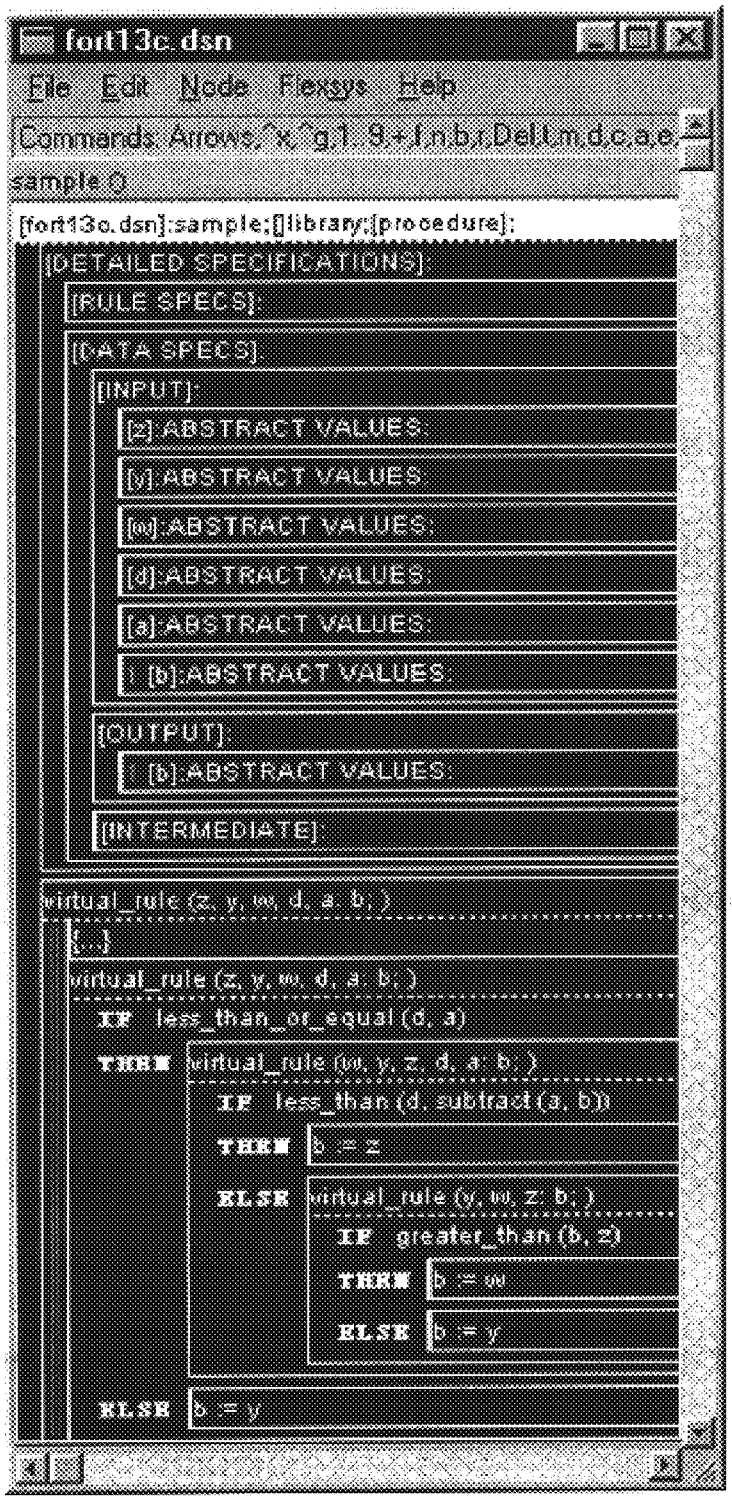

FIG. 13C. Terminal-level design in this HLD design hierarchy Flexform represents the HLD equivalent of the FORTRAN Flexform shown in FIG. 13B.

Figure 14:
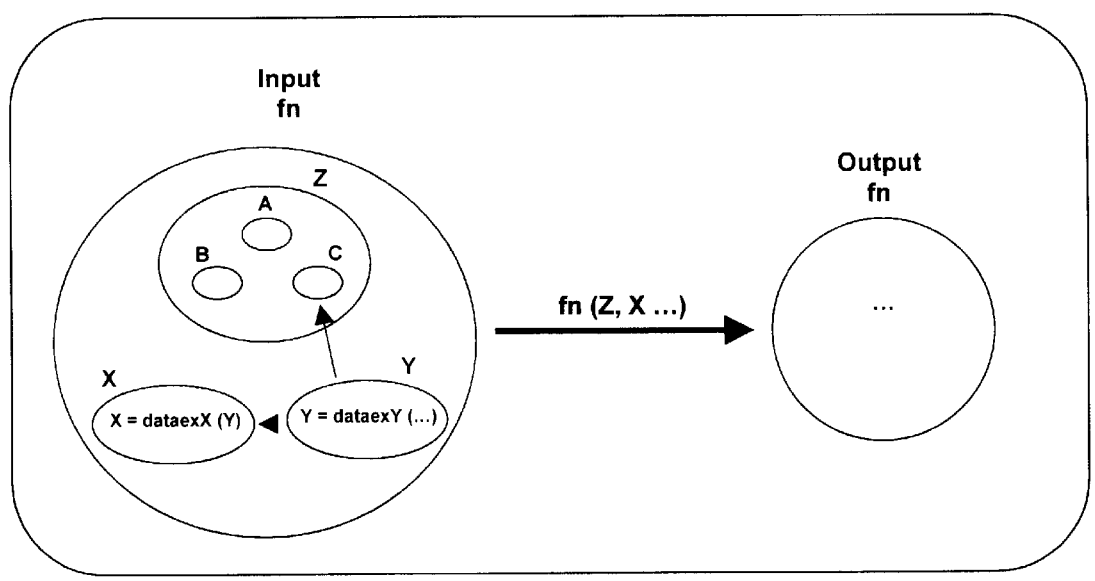

FIG. 14. Abstract solution rule fn (Z, X . . . ) representing the combined effects of affiliated operations embedded in the class inheritance hierarchy associated with object Z.

FIG. 15. Preferred method for constructing and maintaining specifications.

Figure 16:
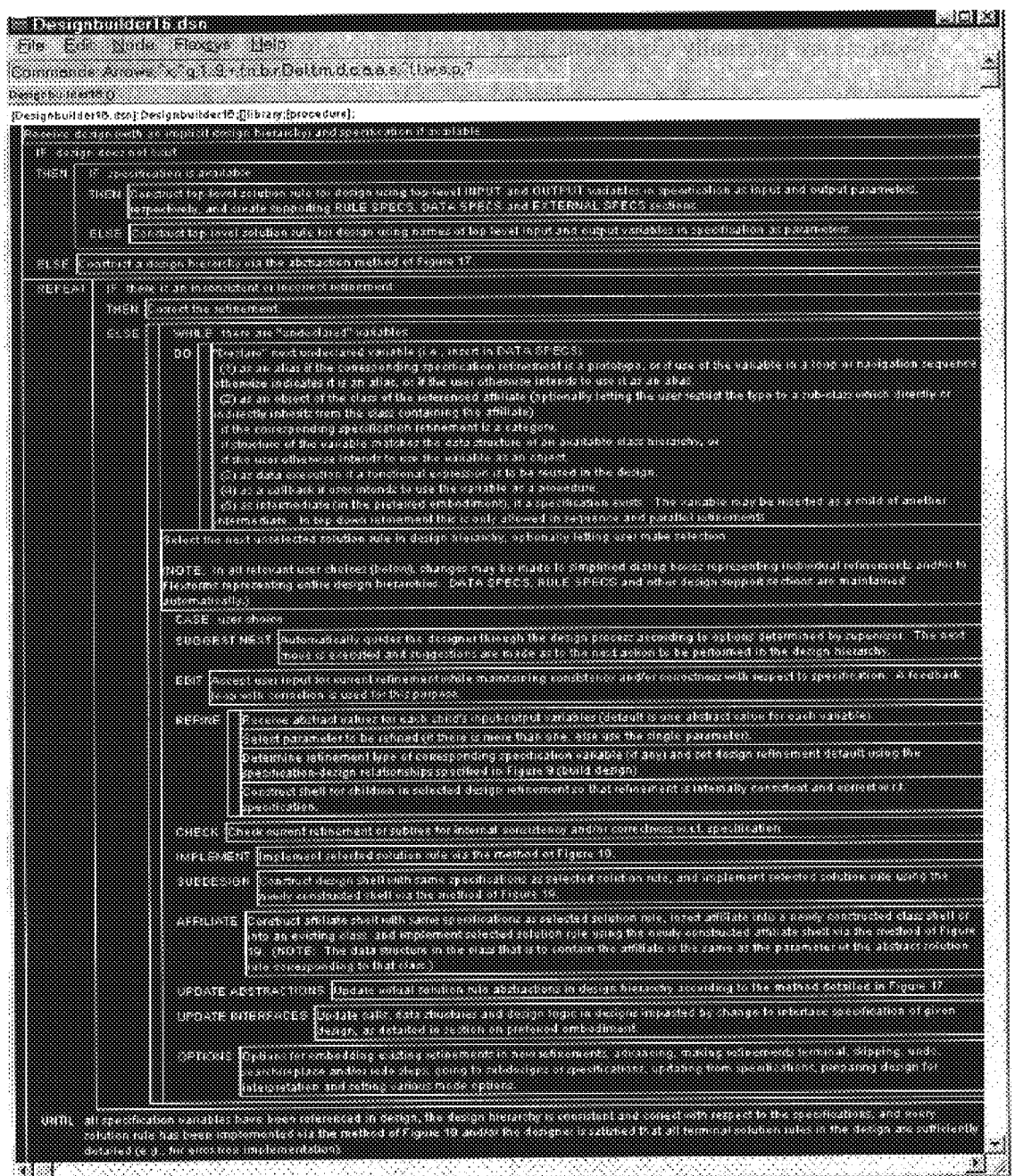

FIG. 16. Preferred method for constructing and maintaining designs.

Figure 17:
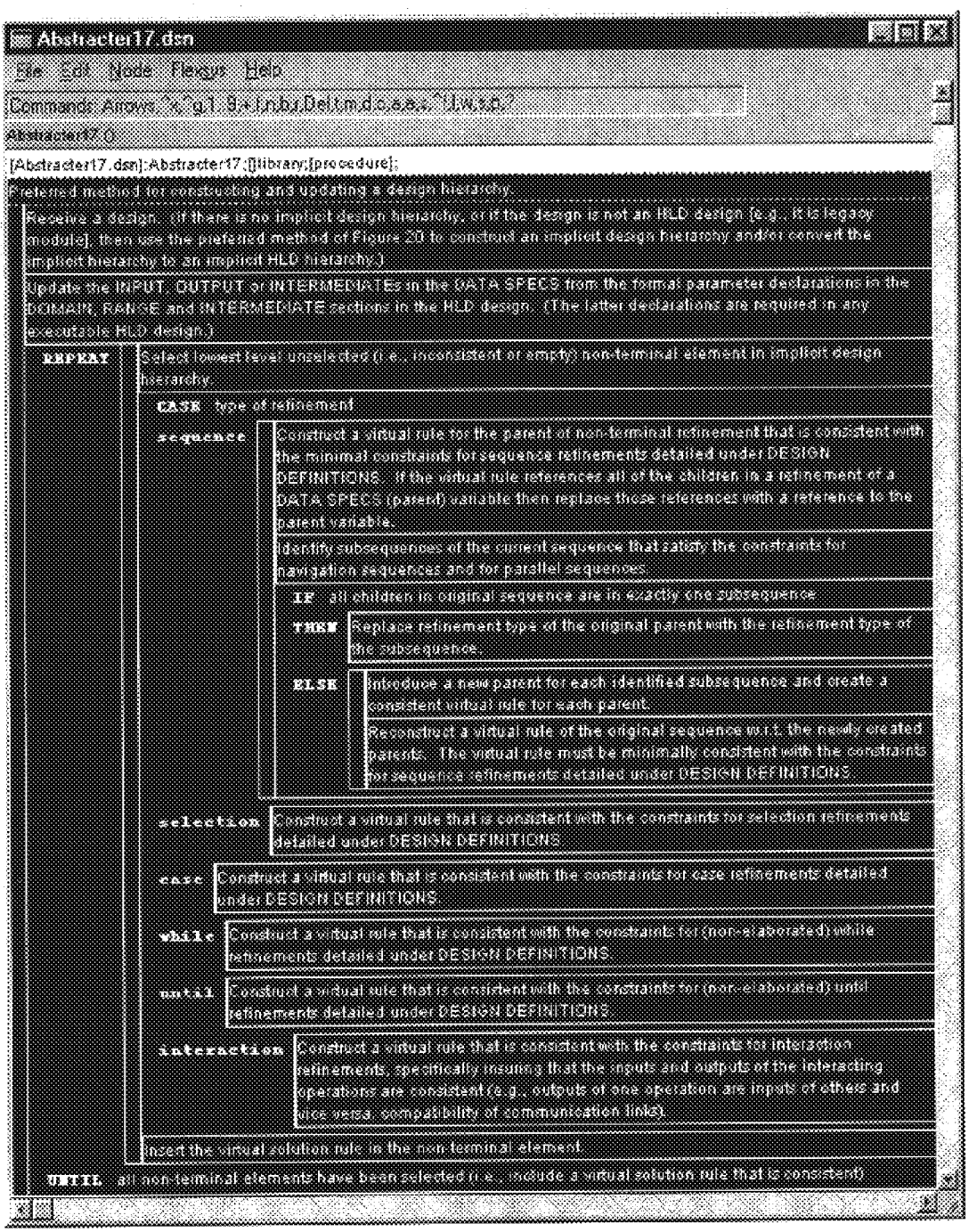

FIG. 17. Preferred method for constructing and updating a design hierarchy from a design or design hierarchy.

Figure 18:
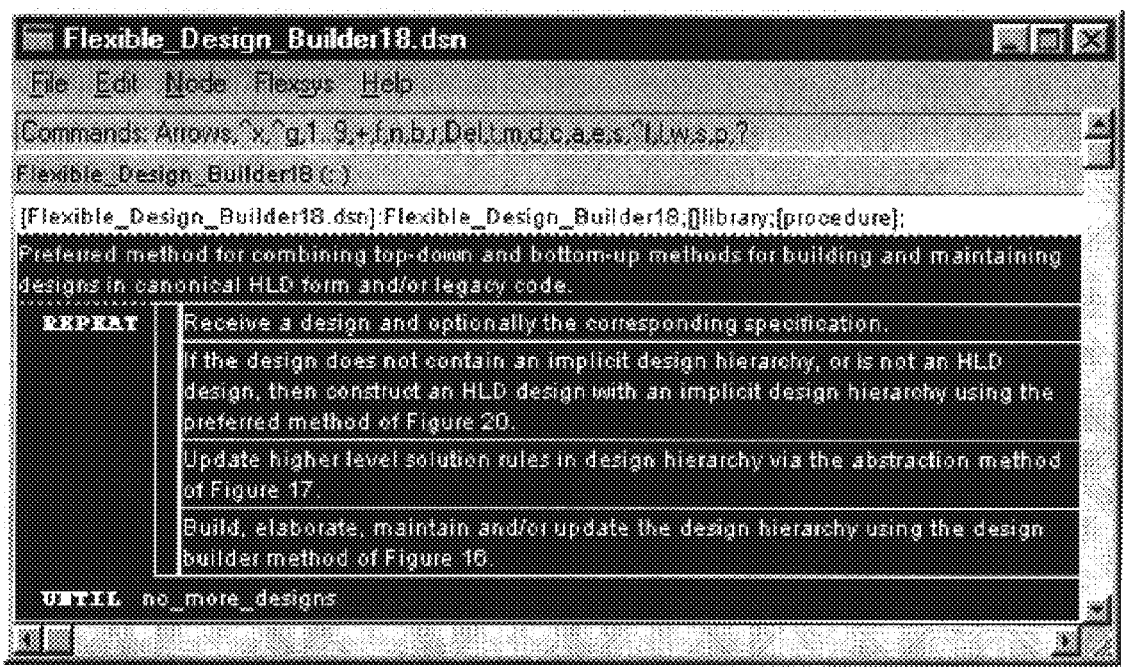

FIG. 18. Preferred method for combining top-down and bottom-up methods for building and maintaining designs.

Figure 19:
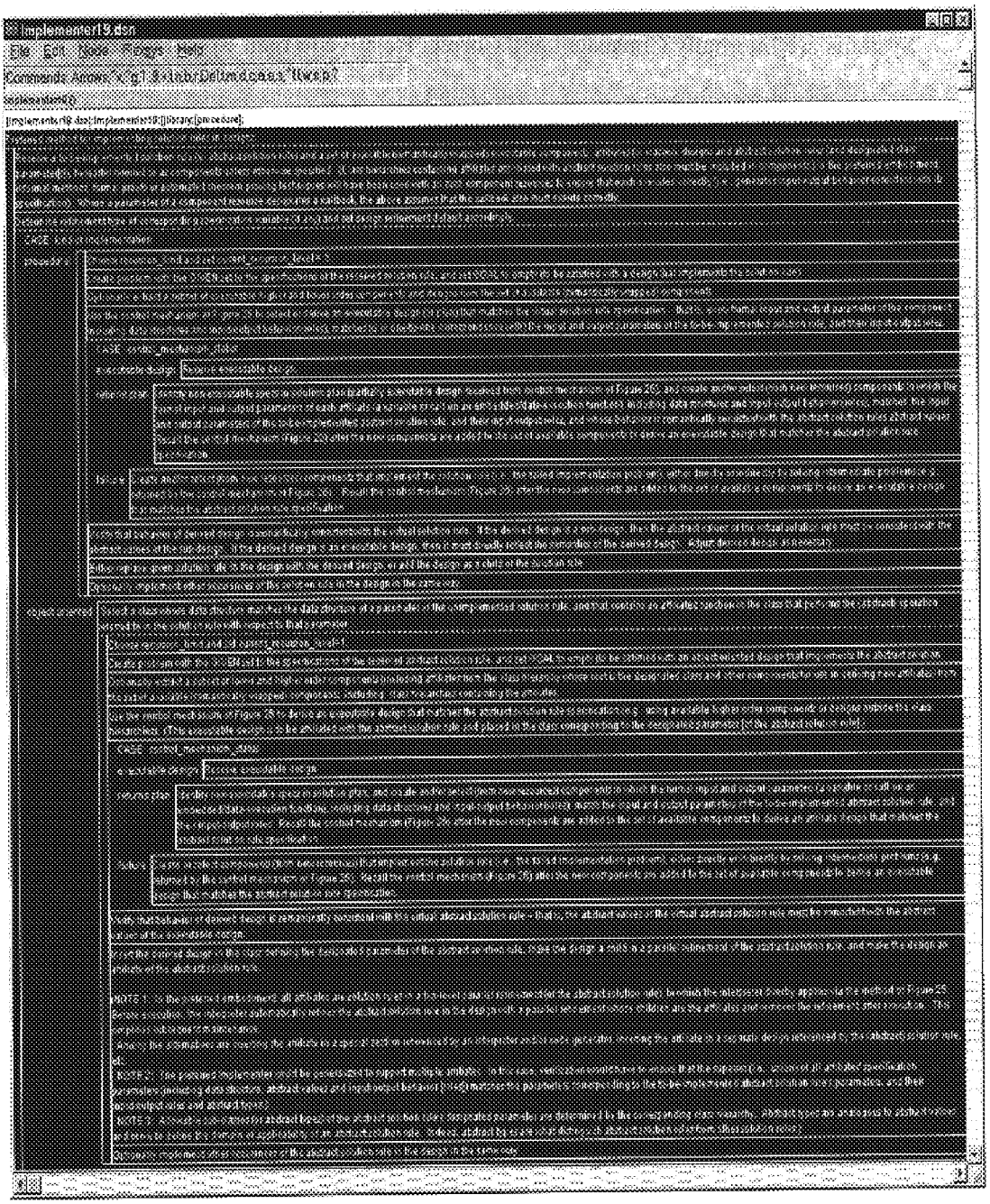

FIG. 19. Preferred method for implementing solution rules in designs constructed via the method of FIG. 16 (for constructing and maintaining designs).

Figure 20:
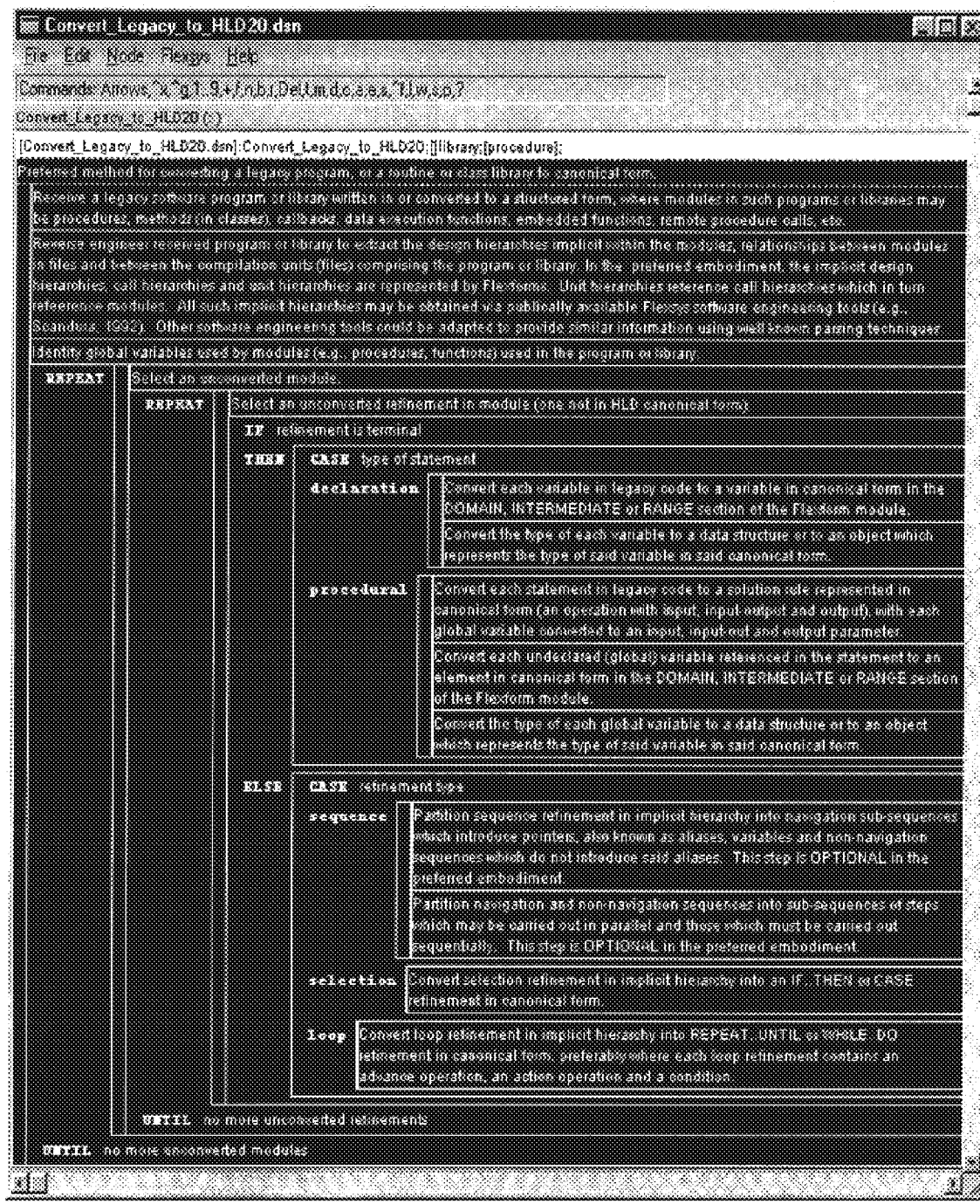

FIG. 20. Preferred method for converting a procedural module (program, subroutine or method) written in another programming language to canonical form.

Figure 21:
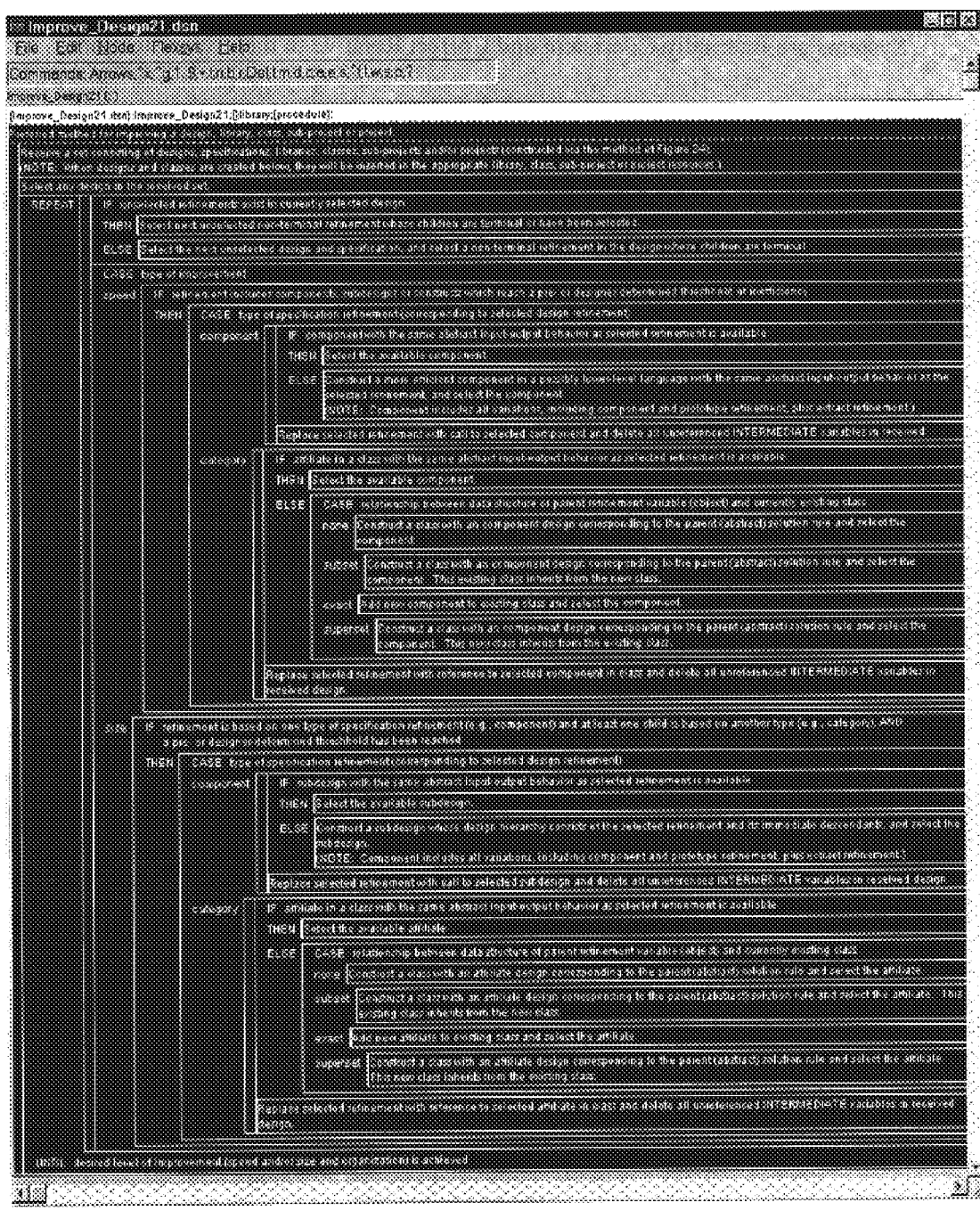

FIG. 21. Preferred method for making a design more compact, more efficient or both.

Figure 22:
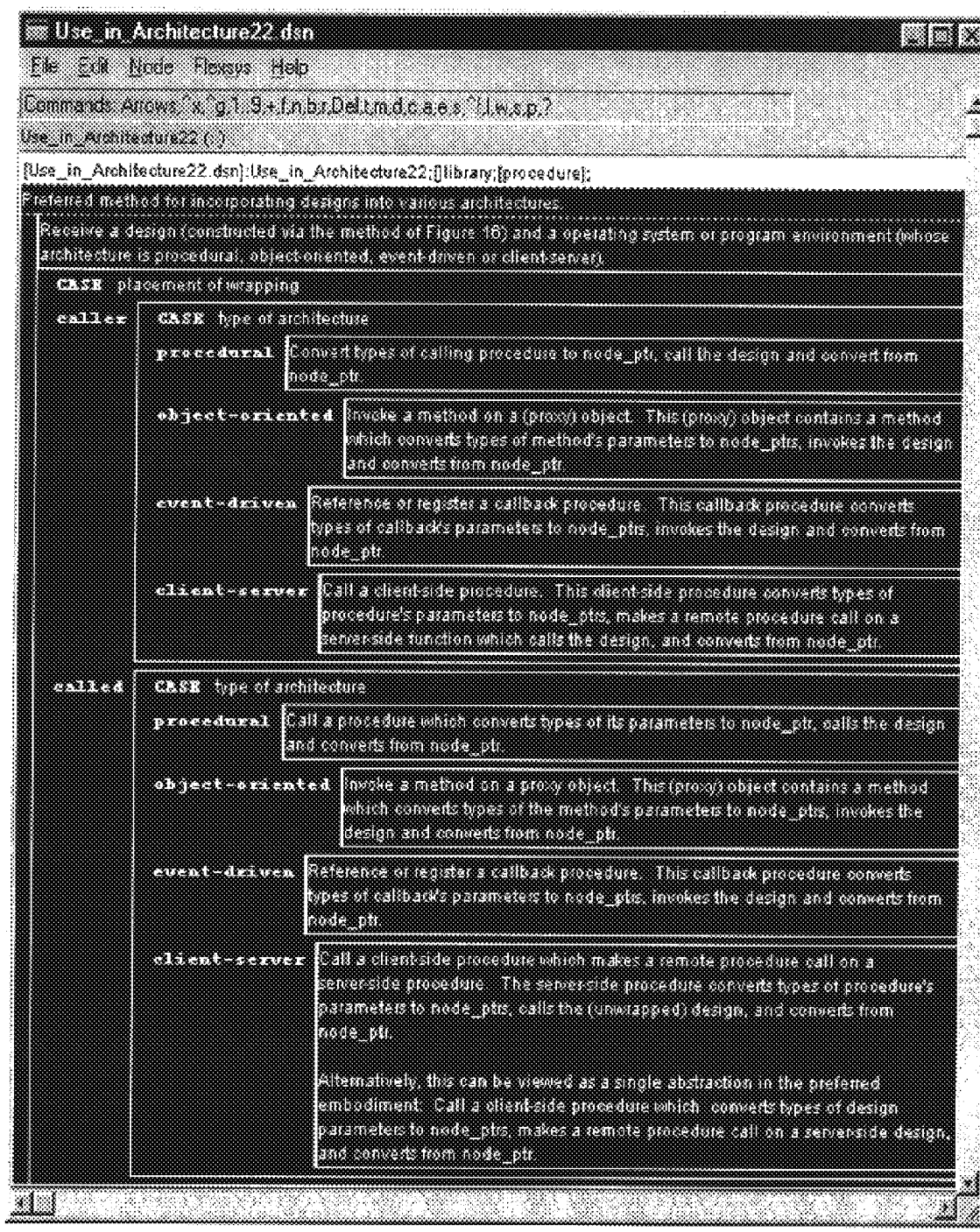

FIG. 22. Preferred method for incorporating designs into various architectures.

Figure 23:
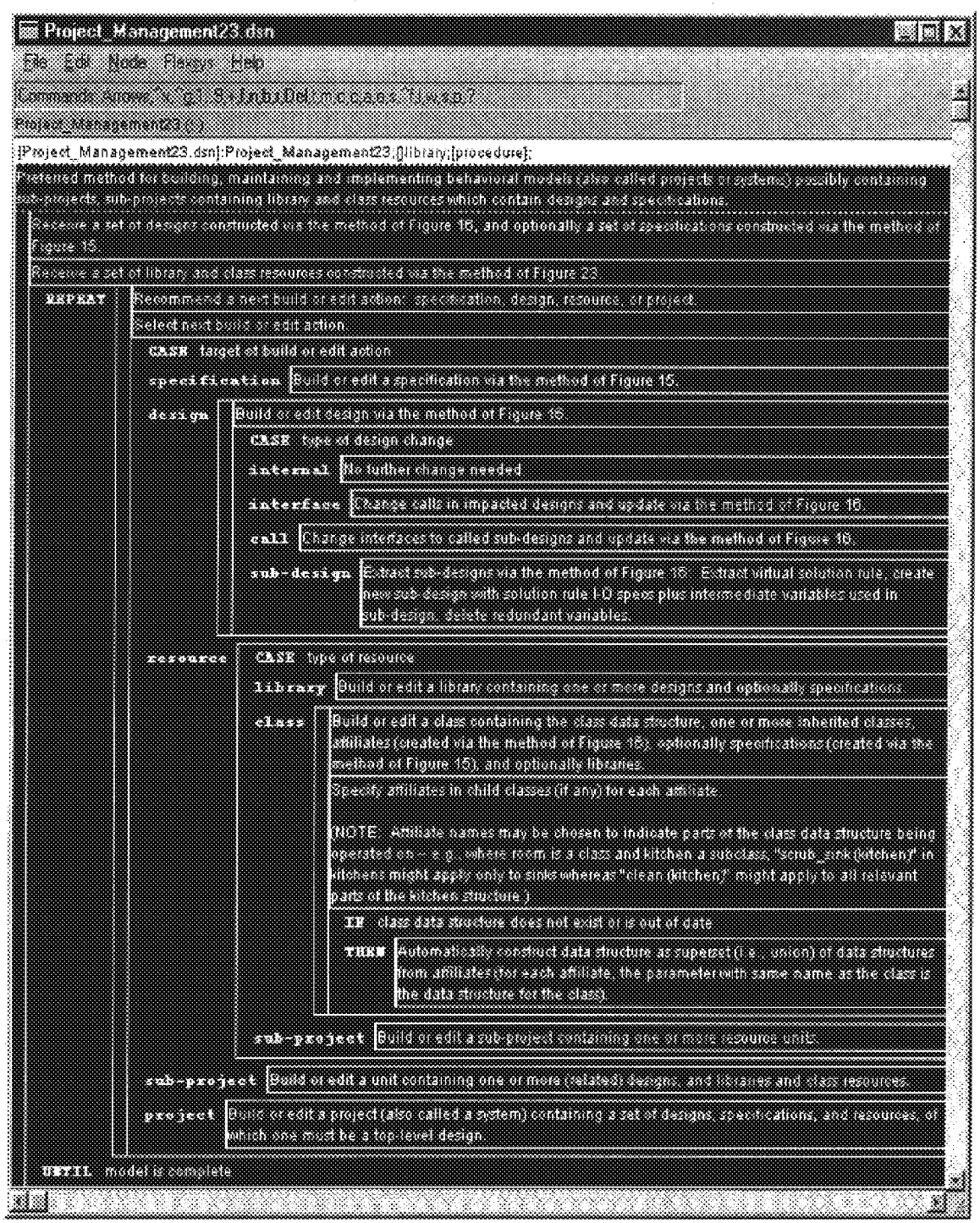

FIG. 23. Preferred method for building, maintaining and implementing behavioral models.

Figure 24:
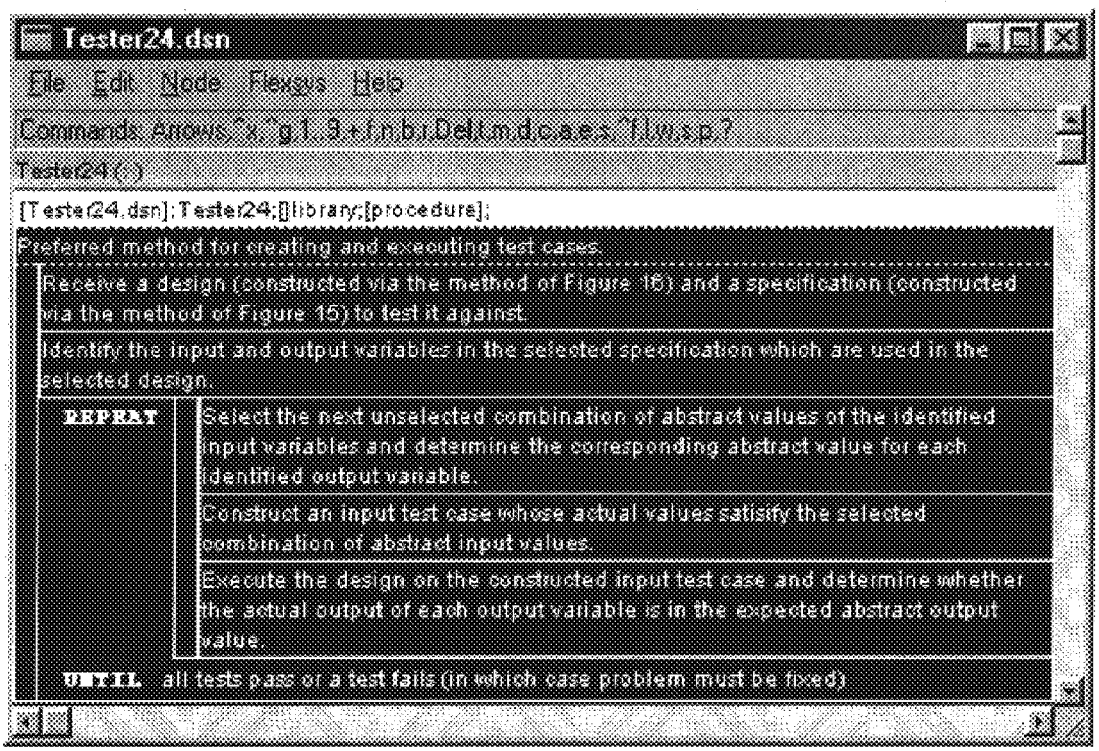

FIG. 24. Preferred method for creating and executing test cases.

Figure 25:
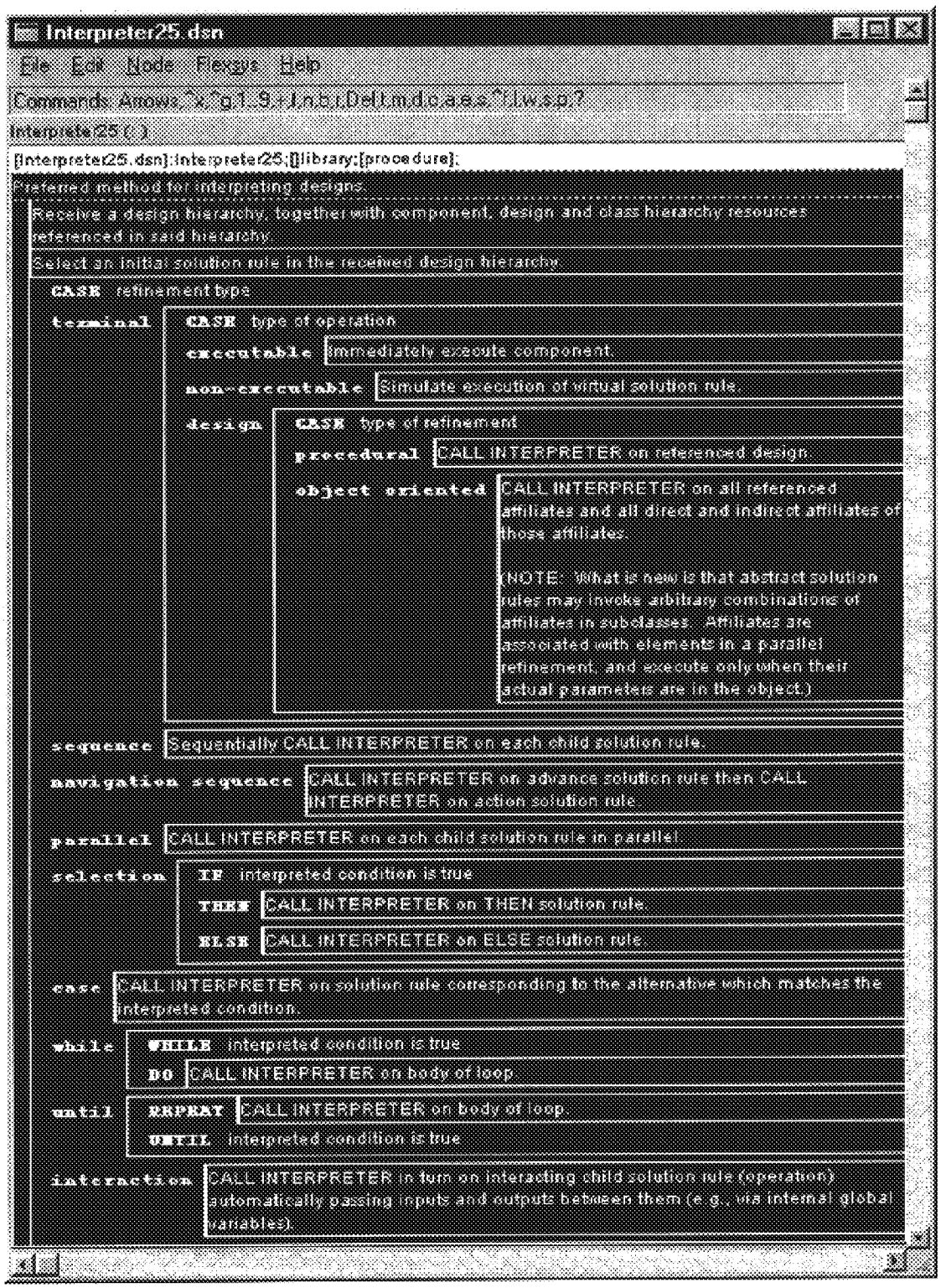

FIG. 25. Preferred method for interpreting designs.

Figure 26:
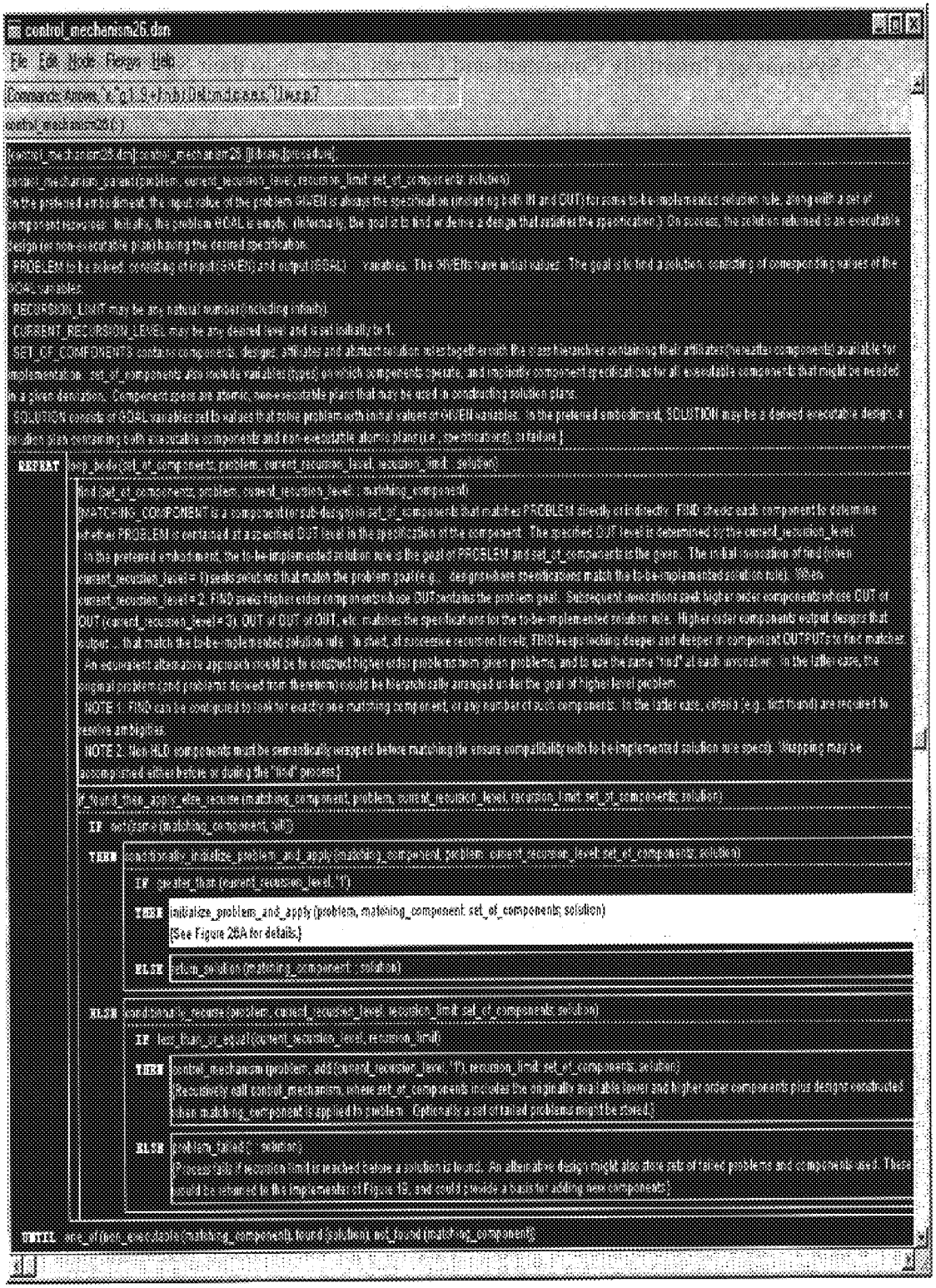

FIG. 26. Preferred method based on a universal (component independent) control mechanism for deriving executable designs for implementing virtual solution rules.

Figure 26A:
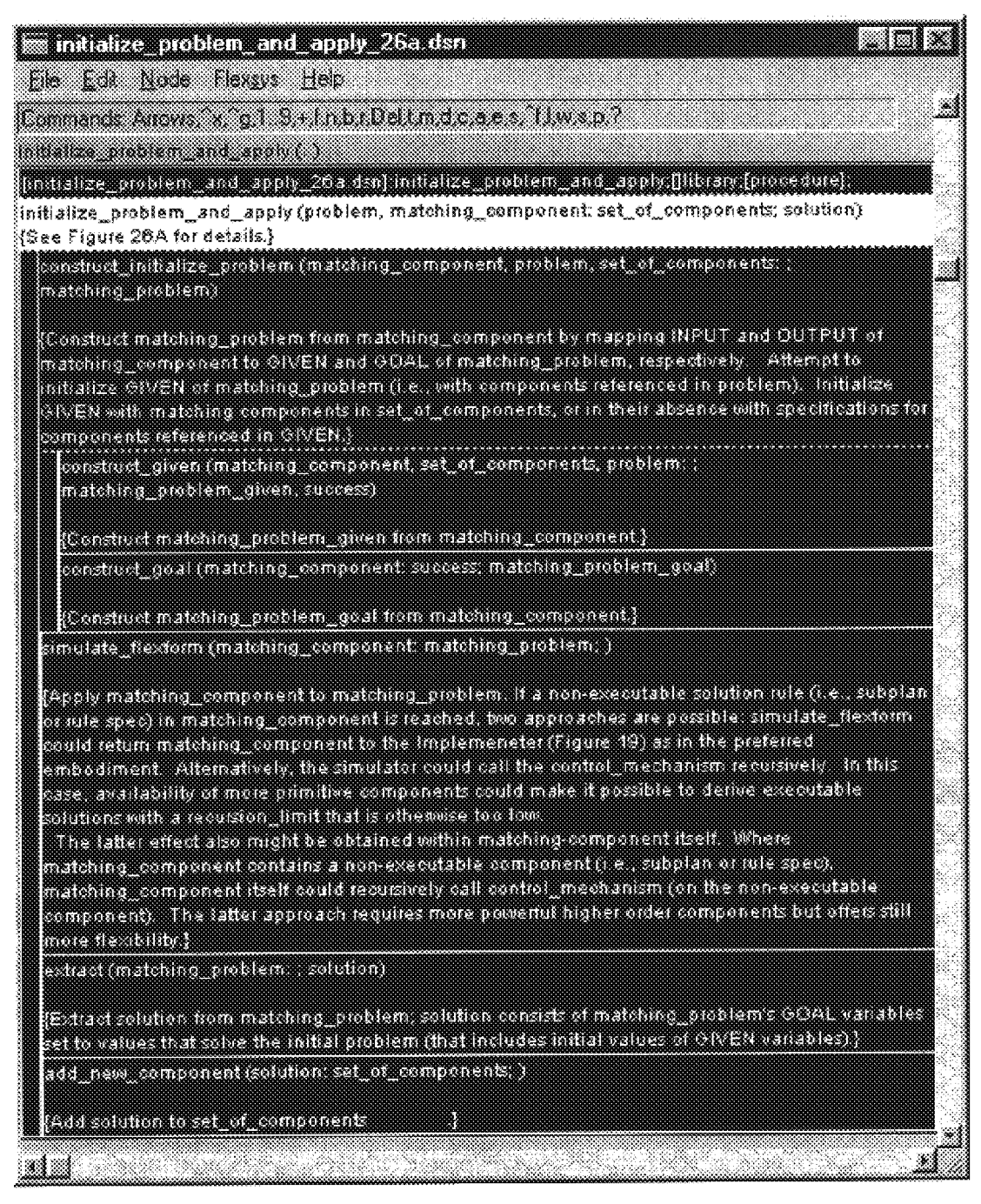

FIG. 26A. Elaboration of the initialize_problem_and_apply step in FIG. 26.

Figure 27:
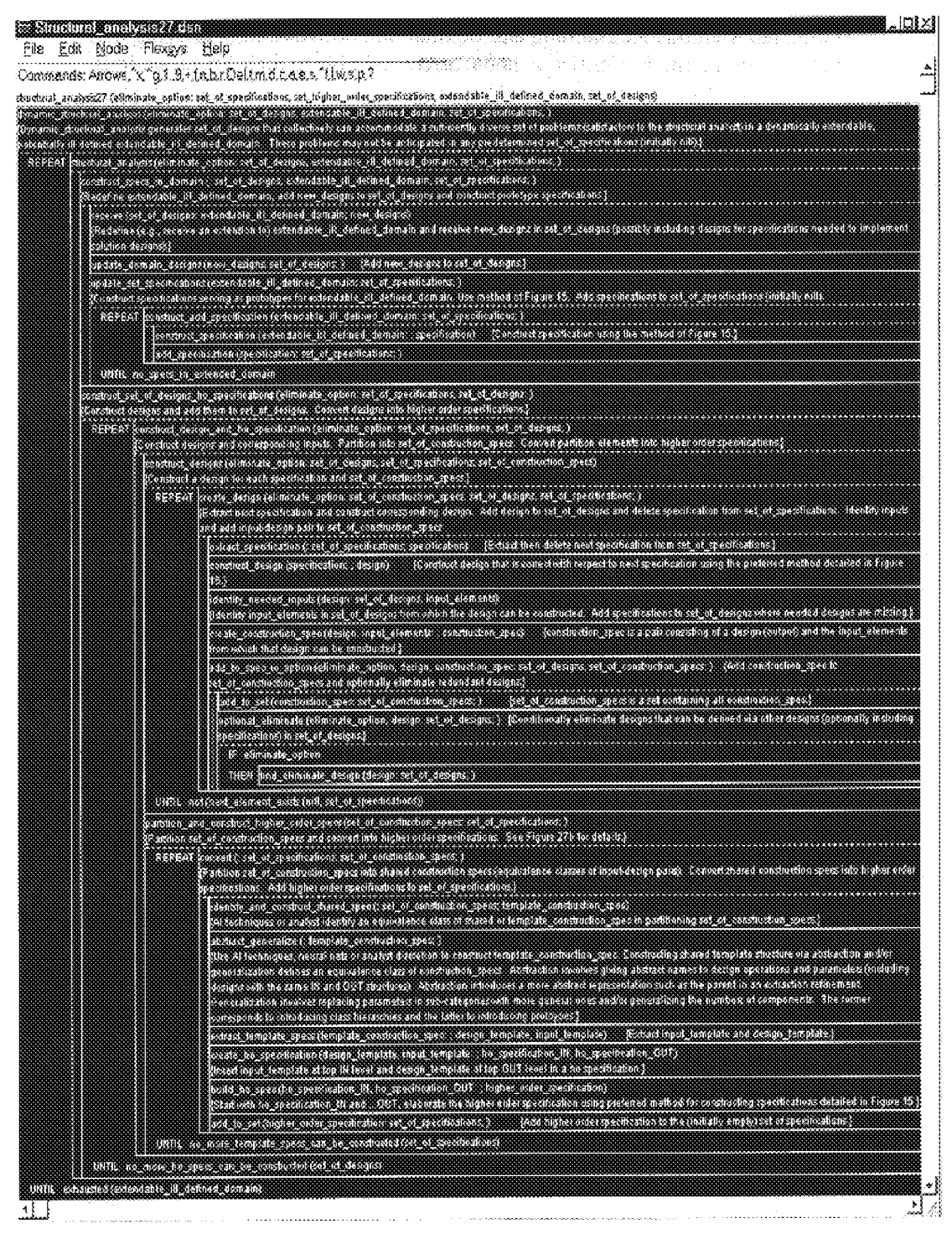

FIG. 27. Preferred method of structural analysis for constructing a set of designs.

FIG. 27A. Alternative method of structural analysis offering the designer less specific guidance but allowing more flexibility.

FIG. 27B. Elaboration of the partition_and_construct_higher_order_specs step in FIG. 27.

Figure 28A:
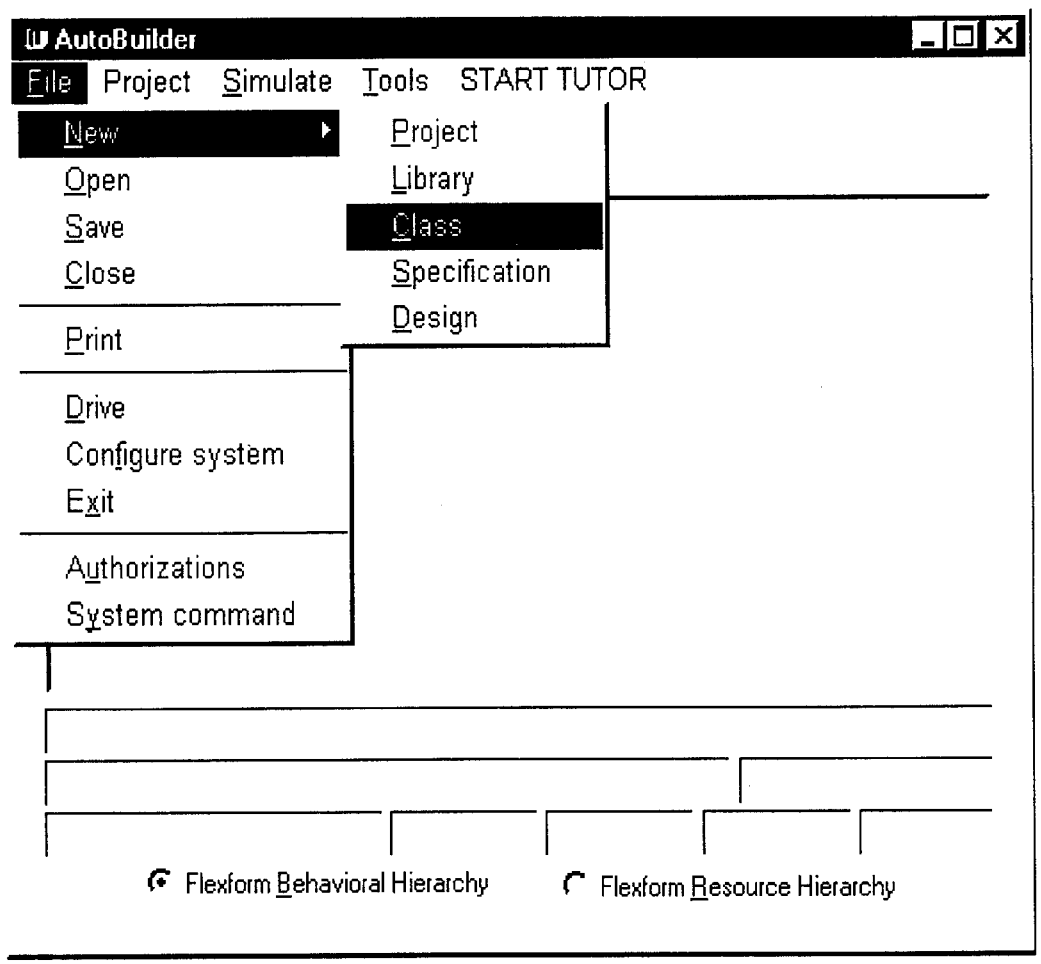

FIG. 28A. File pull-down menu used in the current AutoBuilder implementation, including the kinds of files supported.

Figure 28B:
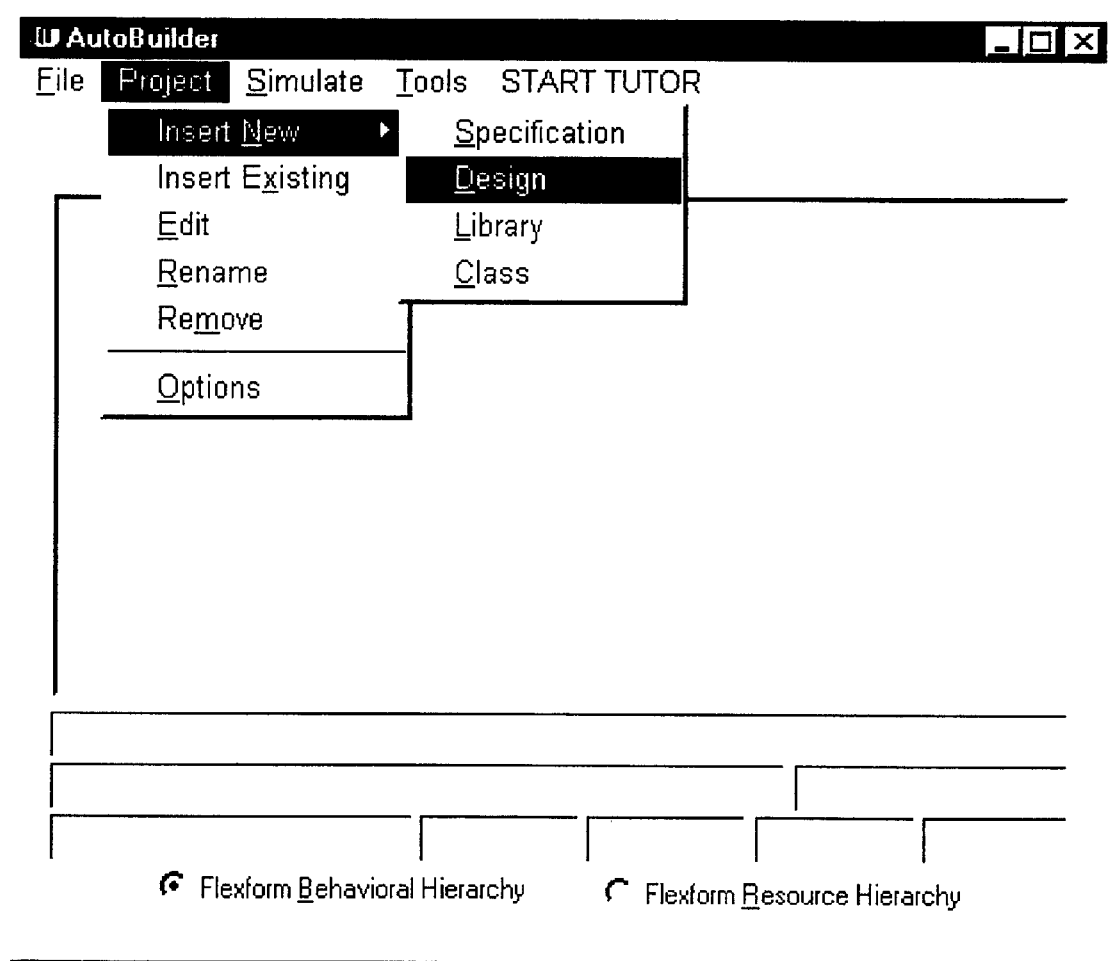

FIG. 28B. Project pull-down.

Figure 28C:
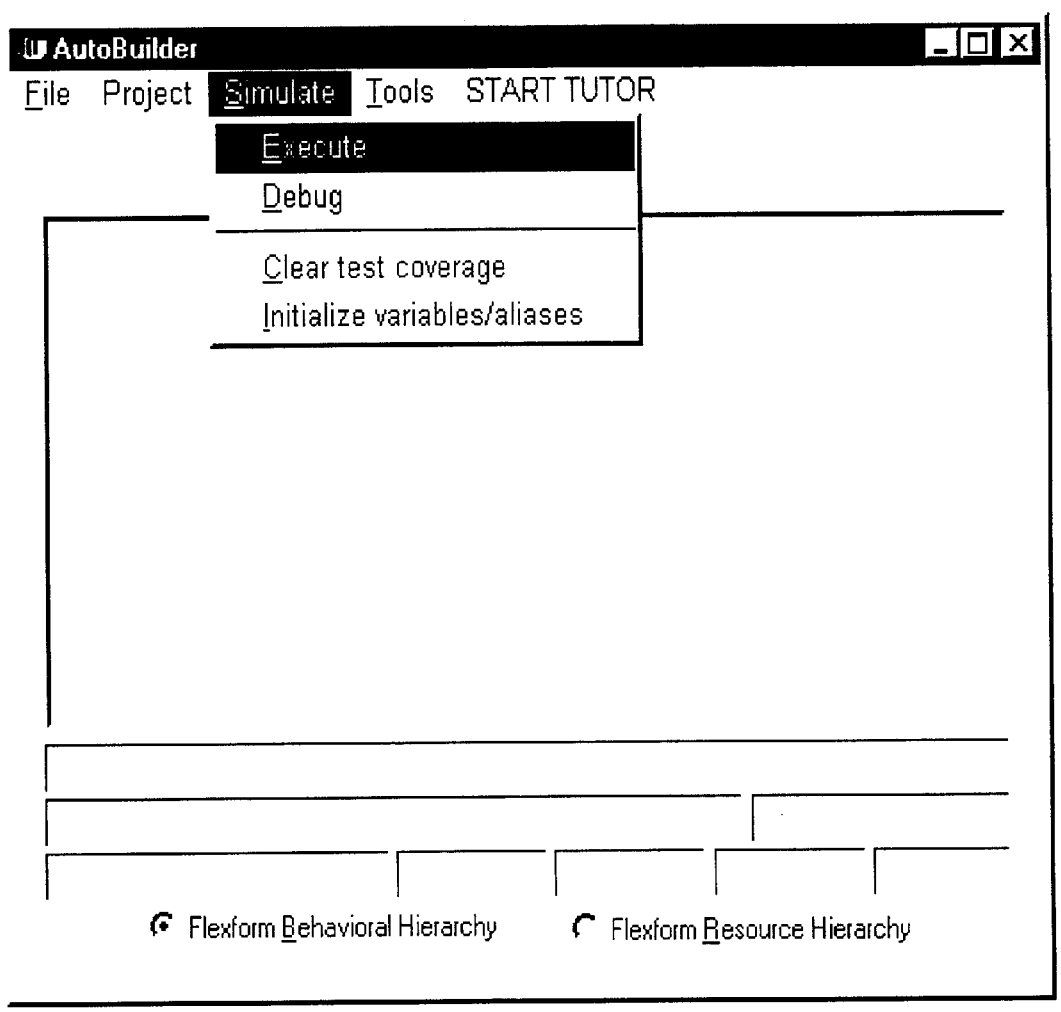

FIG. 28C. Simulate pull-down, including debugging and support options.

Figure 28D:
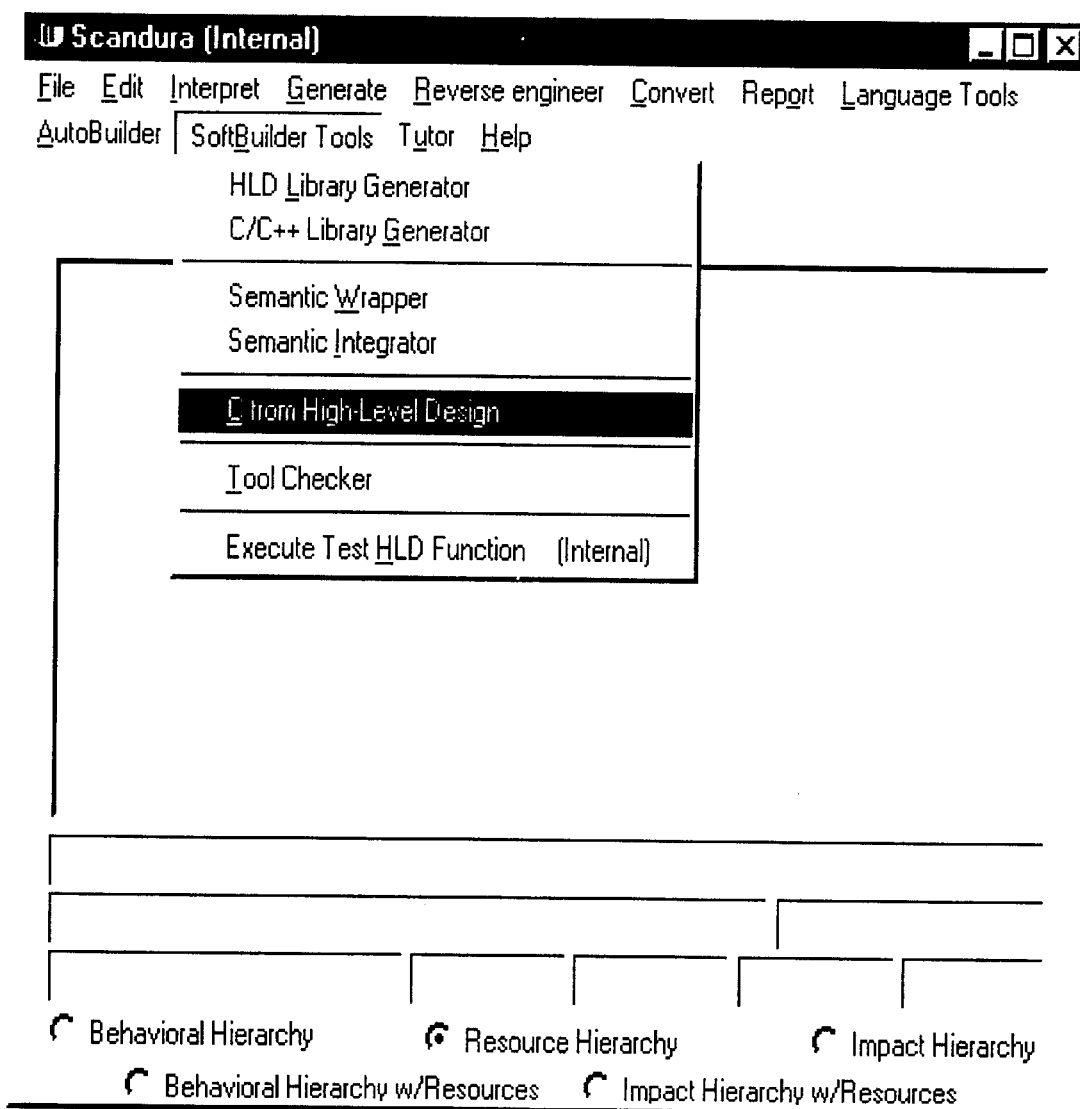

FIG. 28D. Tools pull-down, including Semantic Wrapper, Semantic Integrator options and C code from HDL designs options.

Figure 29A:
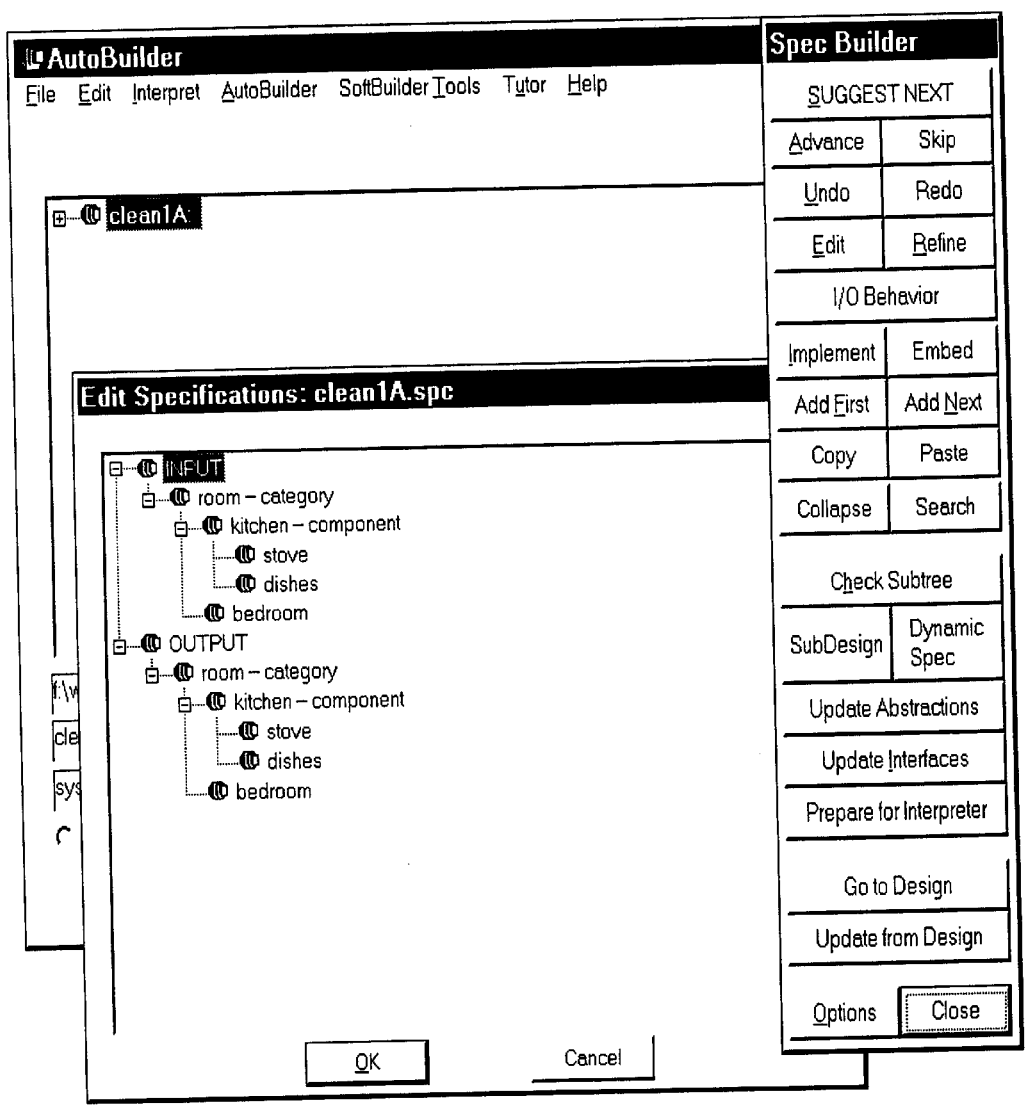

FIG. 29a. Spec Builder Modeless Dialog Box Used in the Current Implementation.

Figure 29B:
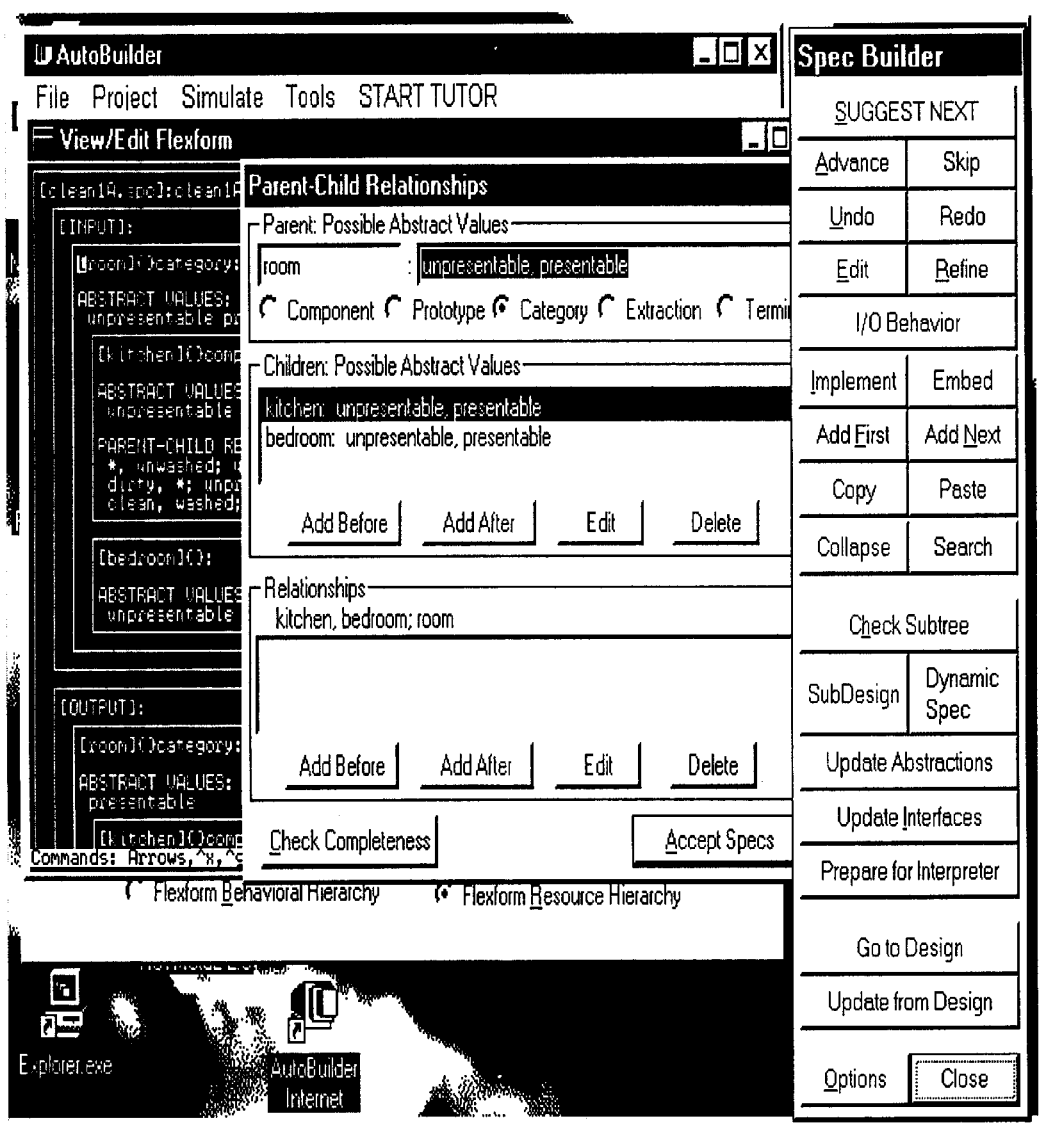

FIG. 29B. Edit design option dialog box.

Figure 29C:
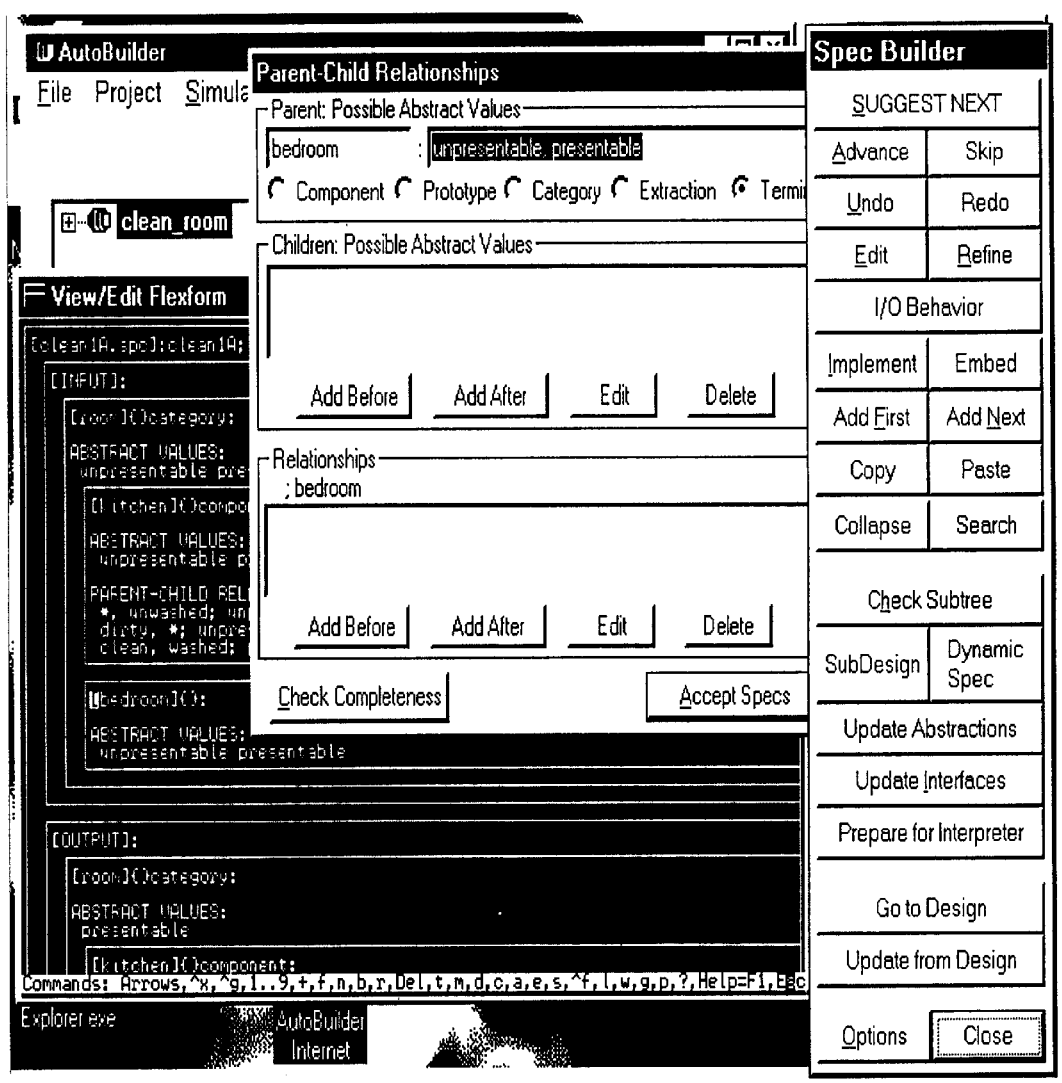

FIG. 29c. Refine Option Dialog Box.

Figure 29D:
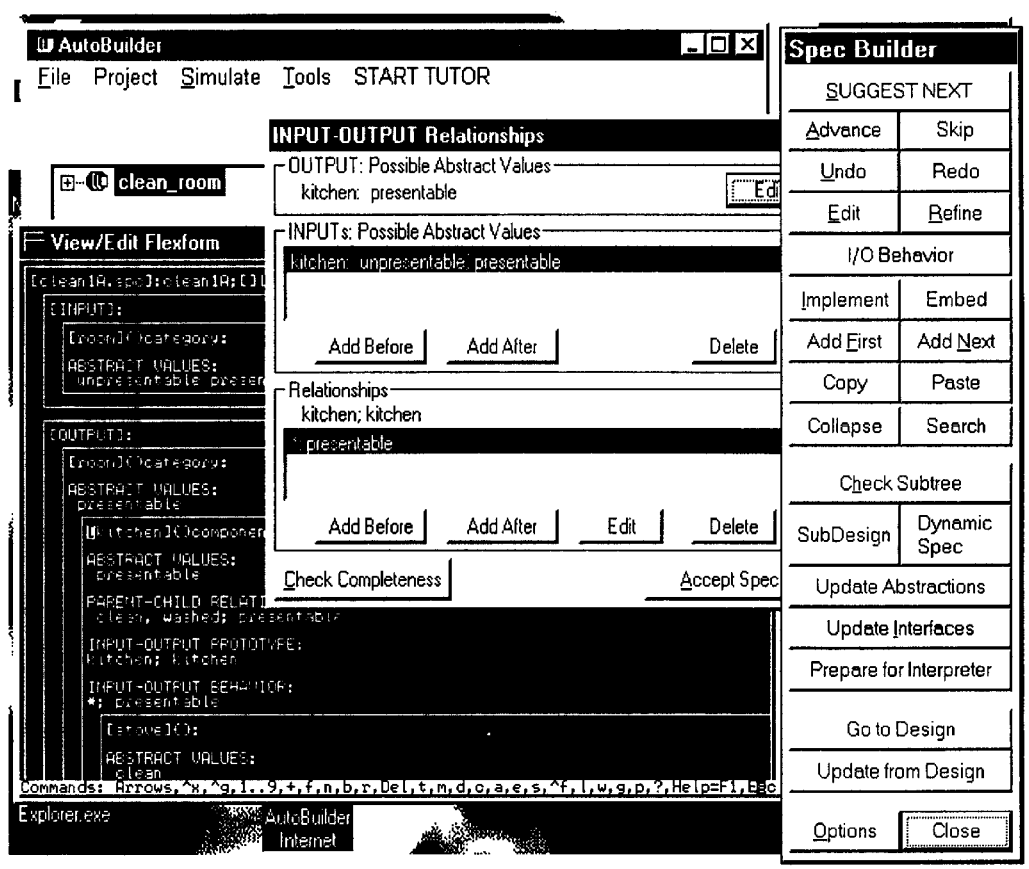

FIG. 29D. I/O Behavior option dialog box.

Figure 29E:
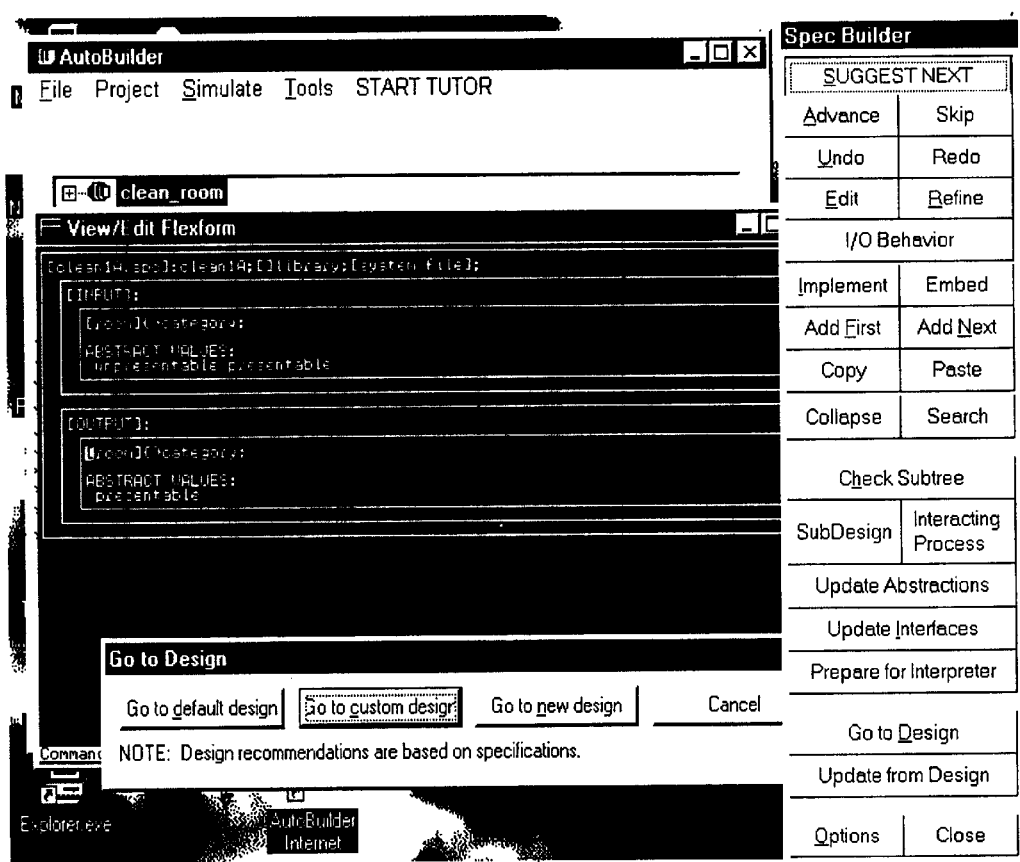

FIG. 29E. Go to Design option dialog box.

Figure 29F:
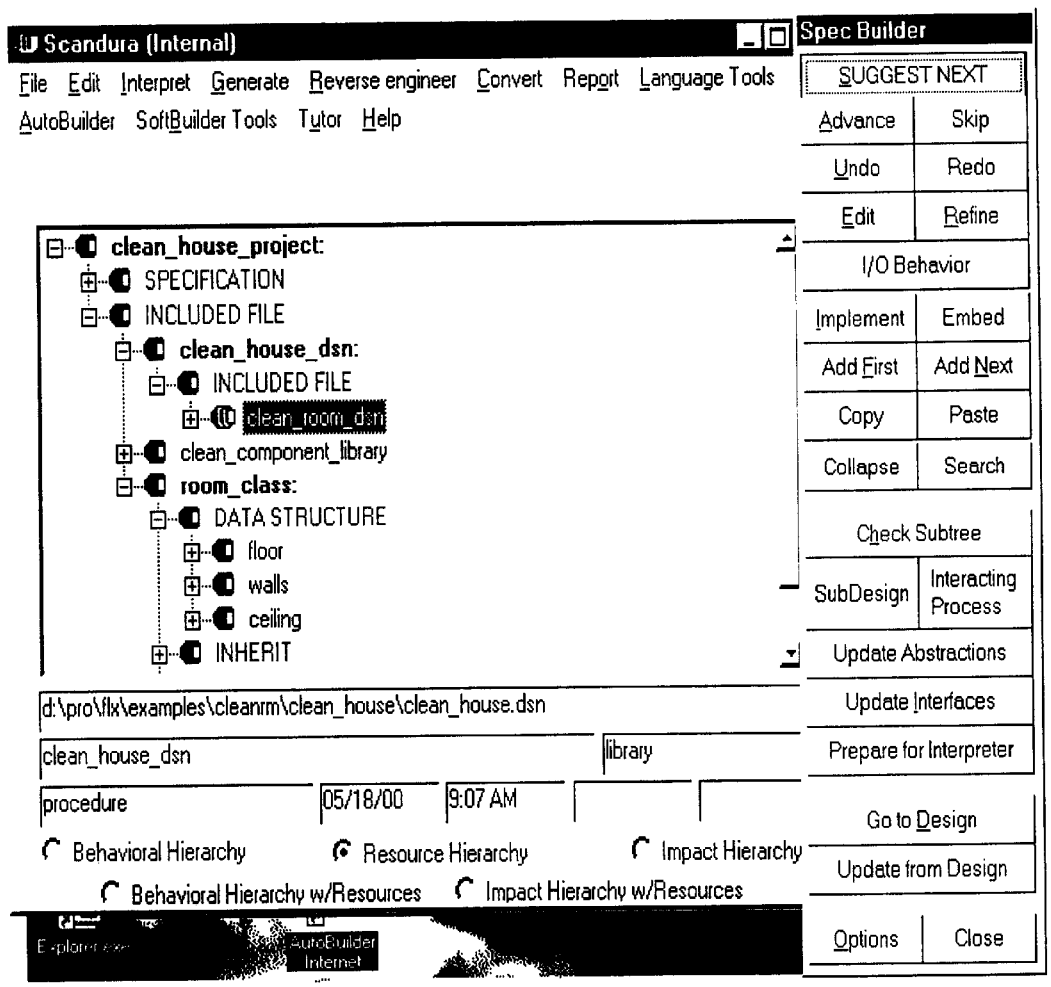

FIG. 29F. Tree-view representation of a sample project.

Figure 30A:
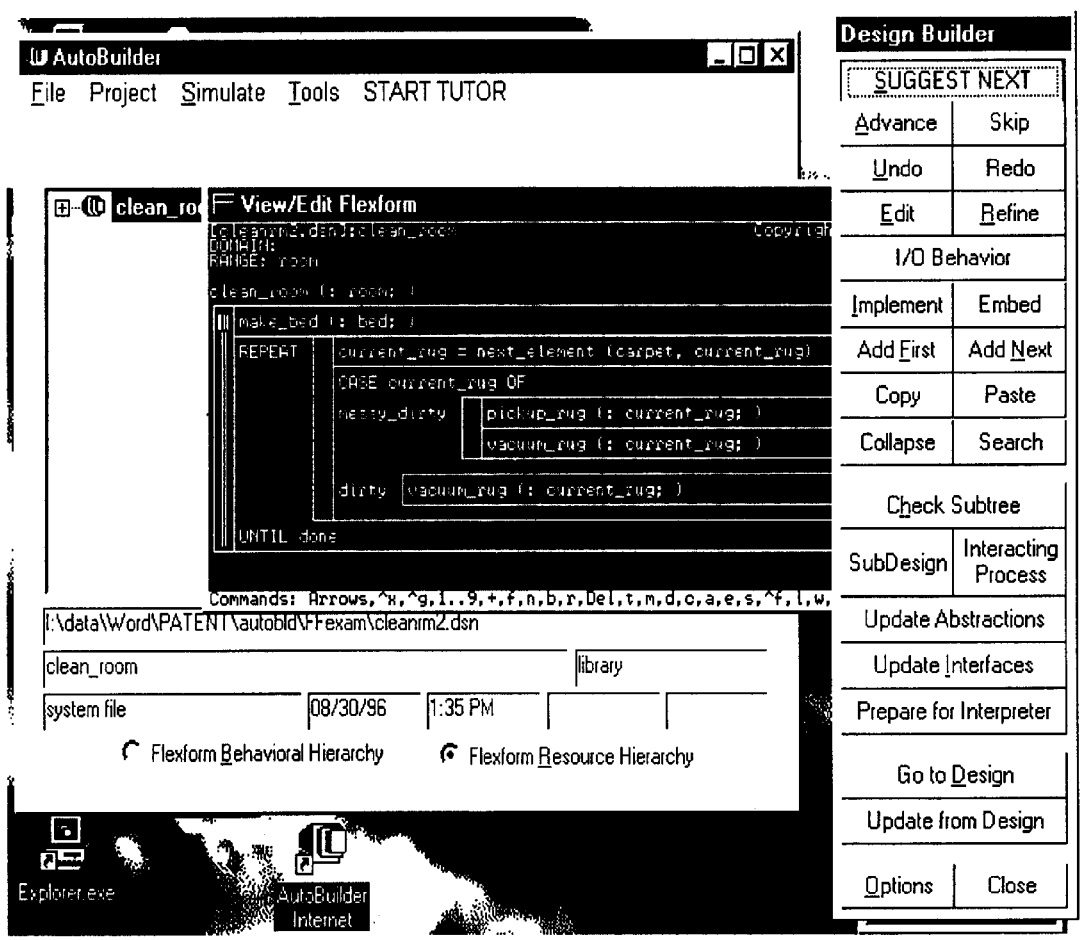

FIG. 30A. Design Builder modeless dialog box used in the current implementation.

Figure 30B:
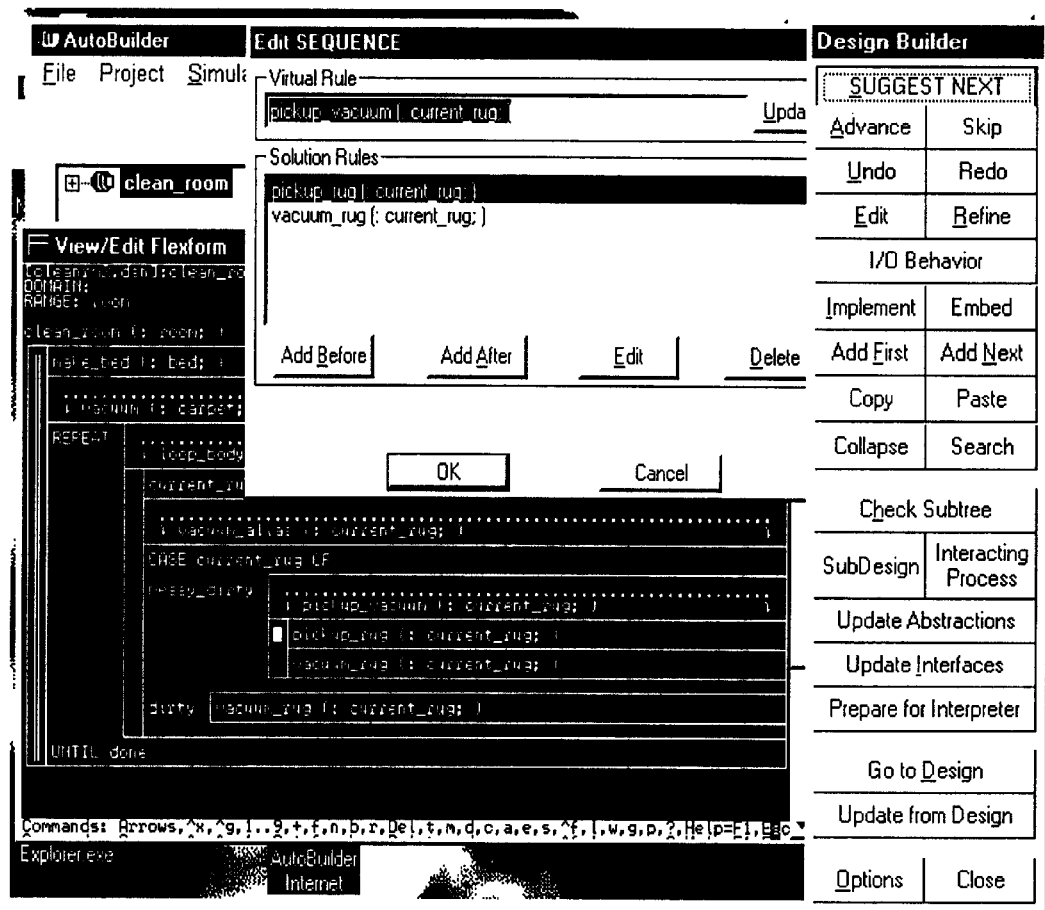

FIG. 30B. Edit design refinement dialog box.

Figure 30C:
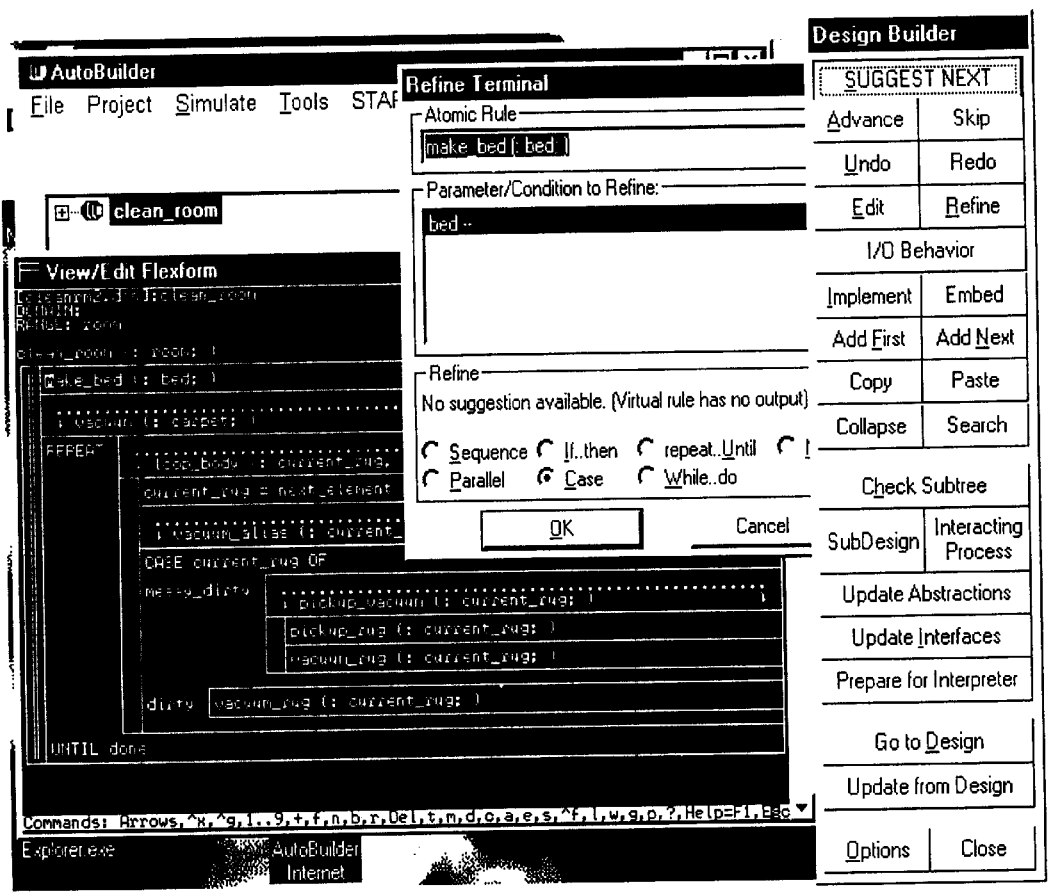

FIG. 30C. Refine design dialog box.

Figure 30D:
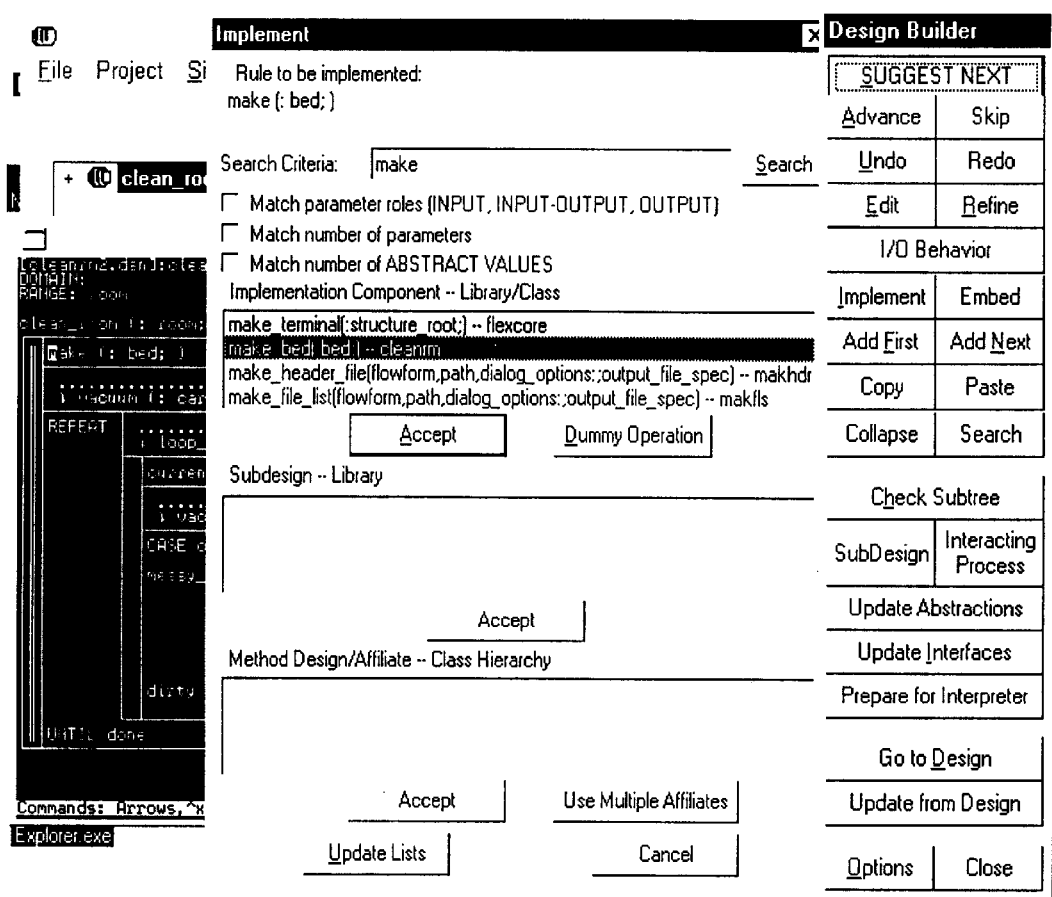

FIG. 30D. Implement solution rule dialog box.

Figure 30E:
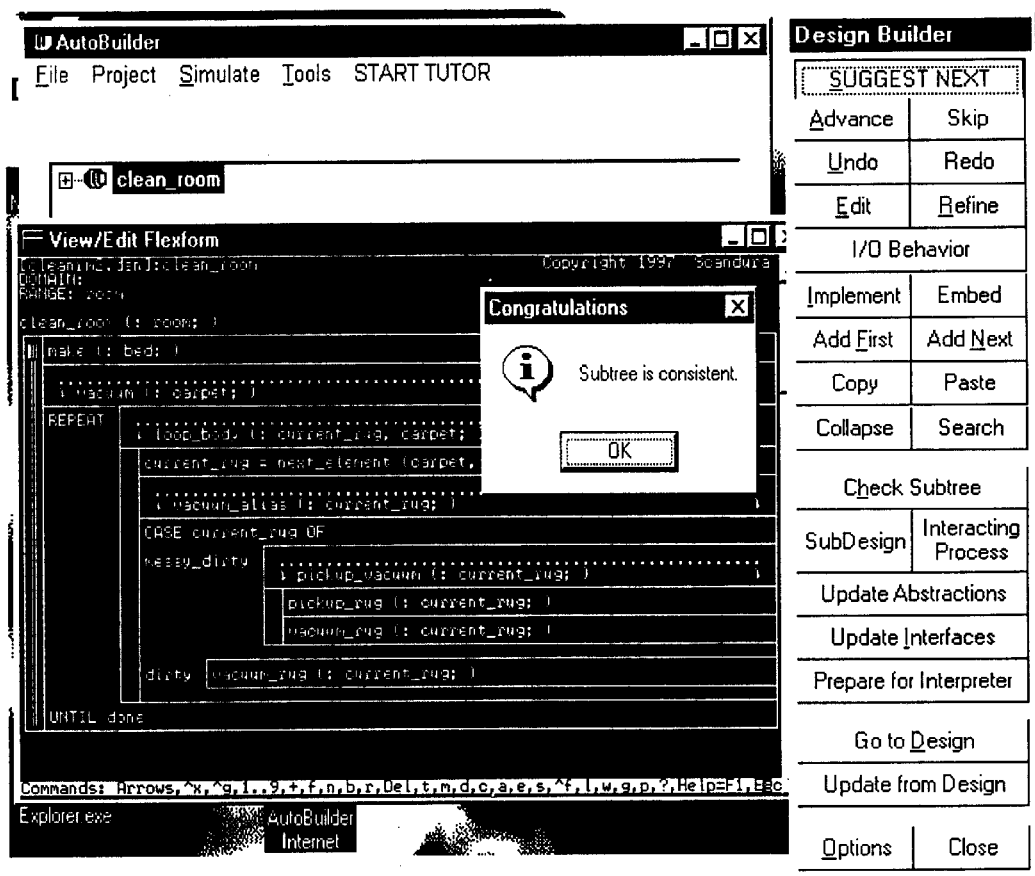

FIG. 30E. Check Sub-design dialog box.

Figure 30F:
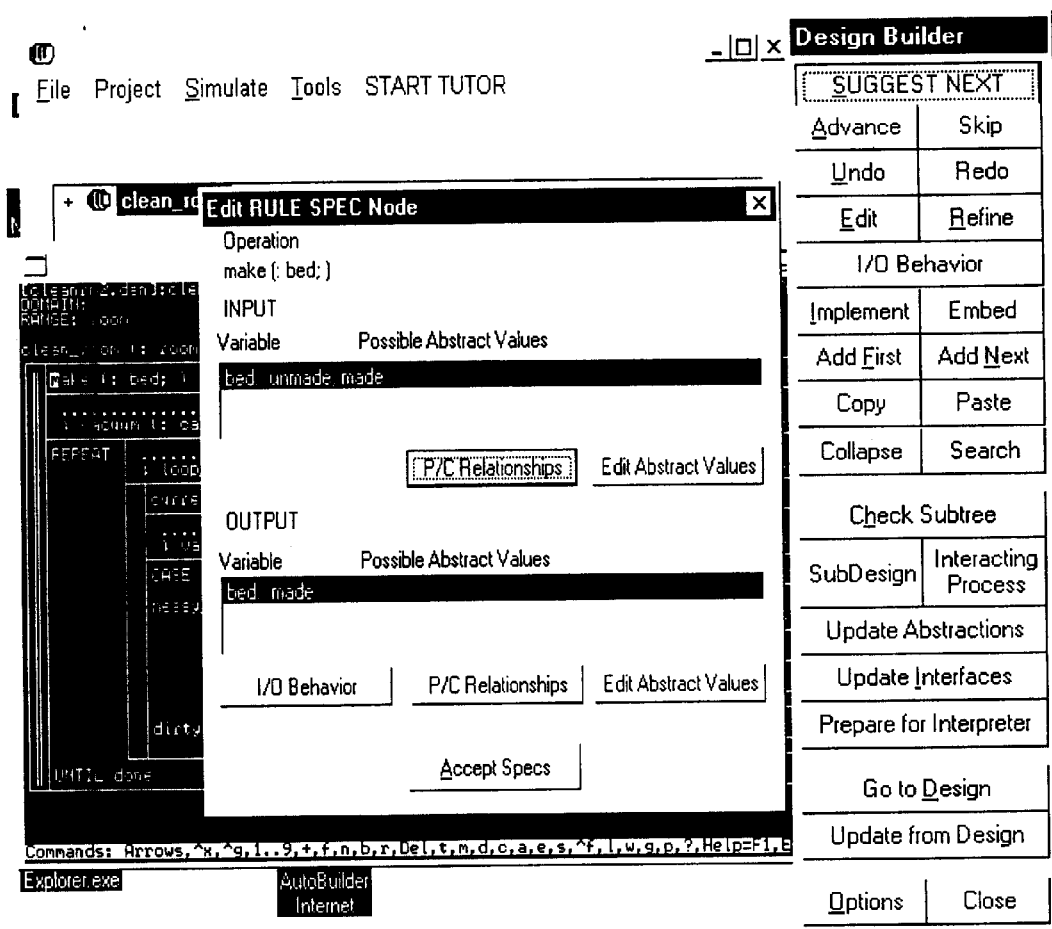

FIG. 30F. Edit Rule Spec dialog box.

Figure 30G:
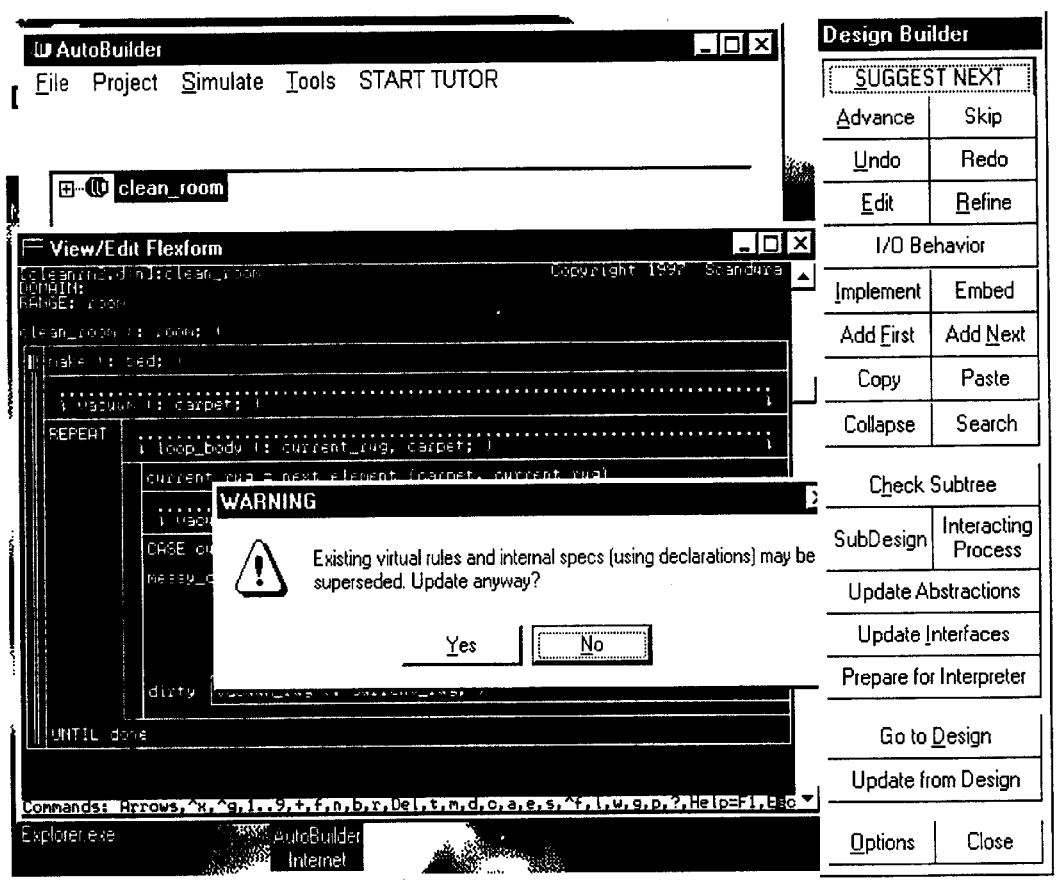

FIG. 30G. Sample warning message pertaining to Update Abstractions.

Figure 30H:
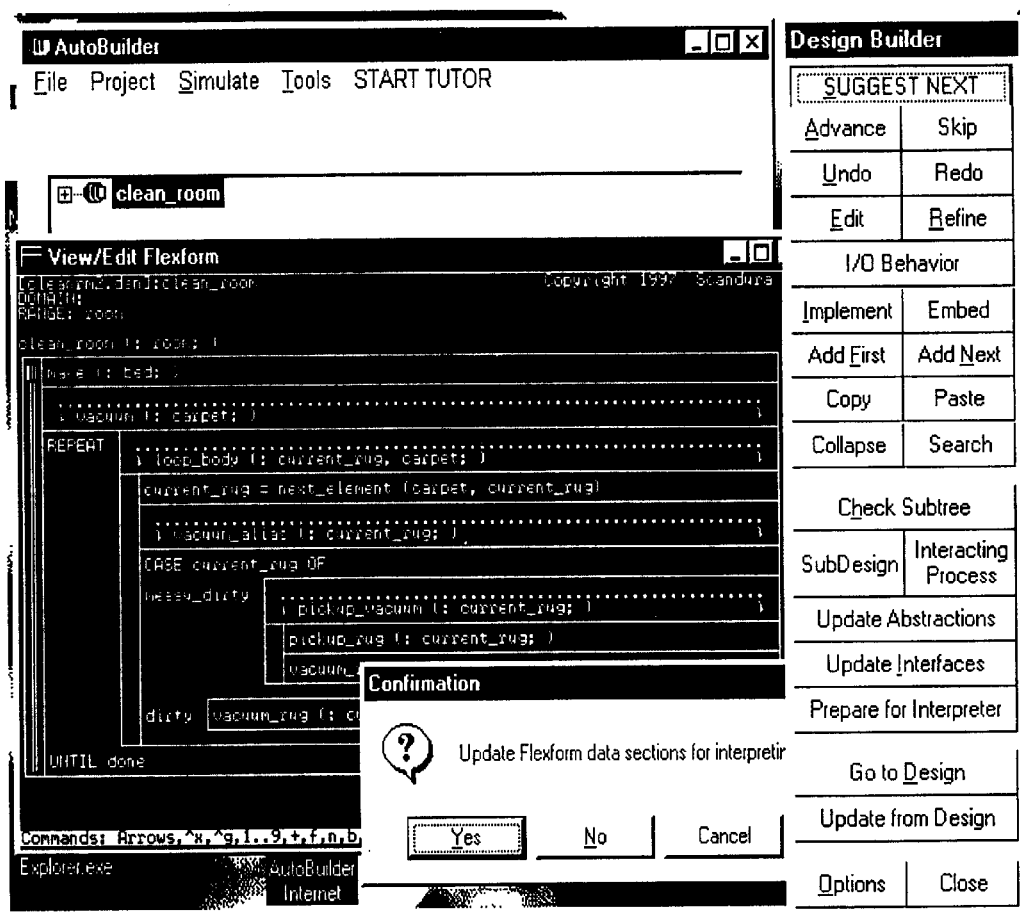

FIG. 30H. Confirmation message pertaining to Prepare for Interpreter option.

Figure 30I:
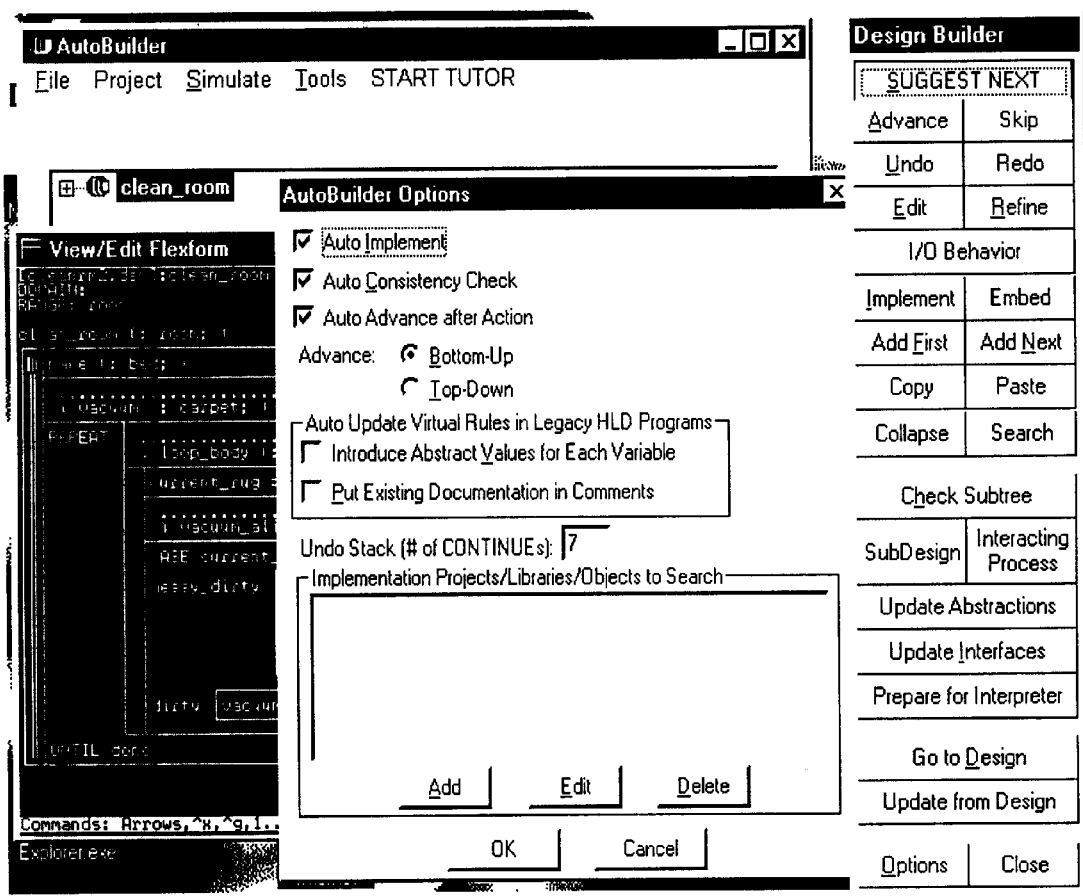

FIG. 30I. AutoBuilder Options dialog box.

Figure 30J:
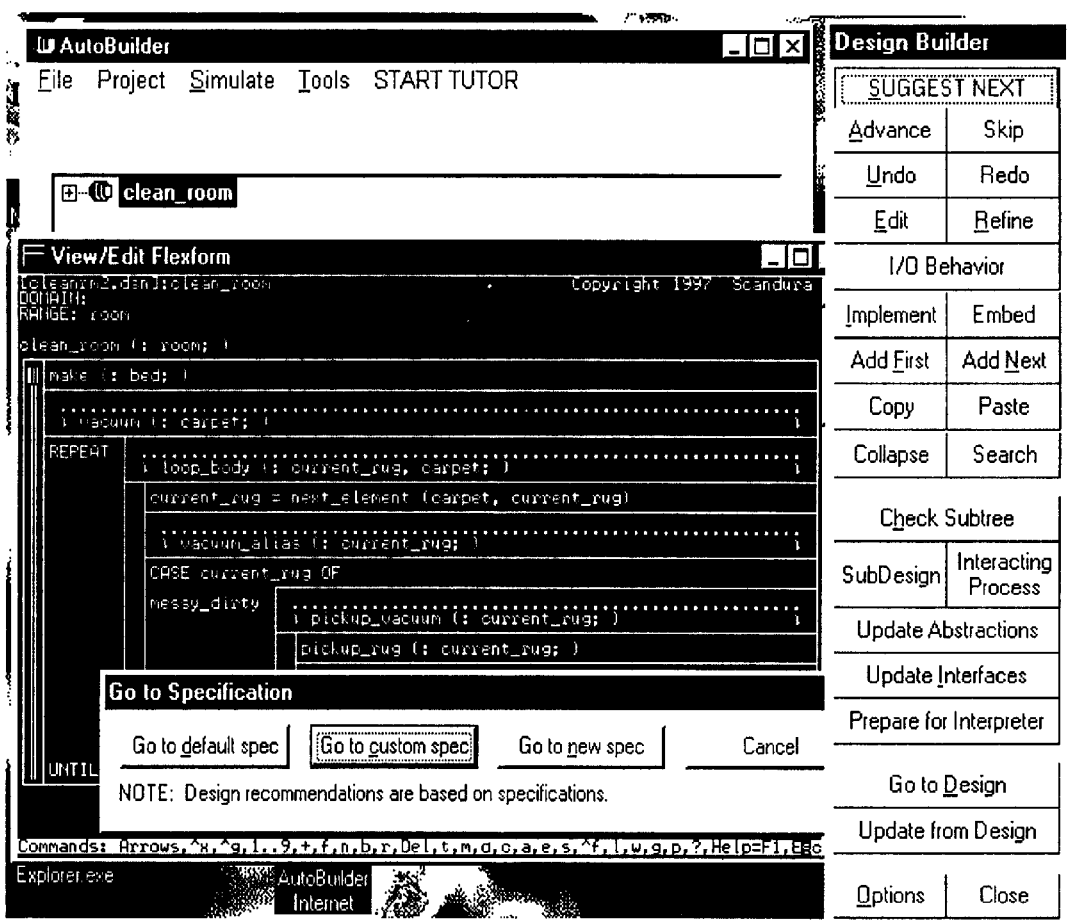

FIG. 30J. Go to Specification dialog box.

Figure 30K:
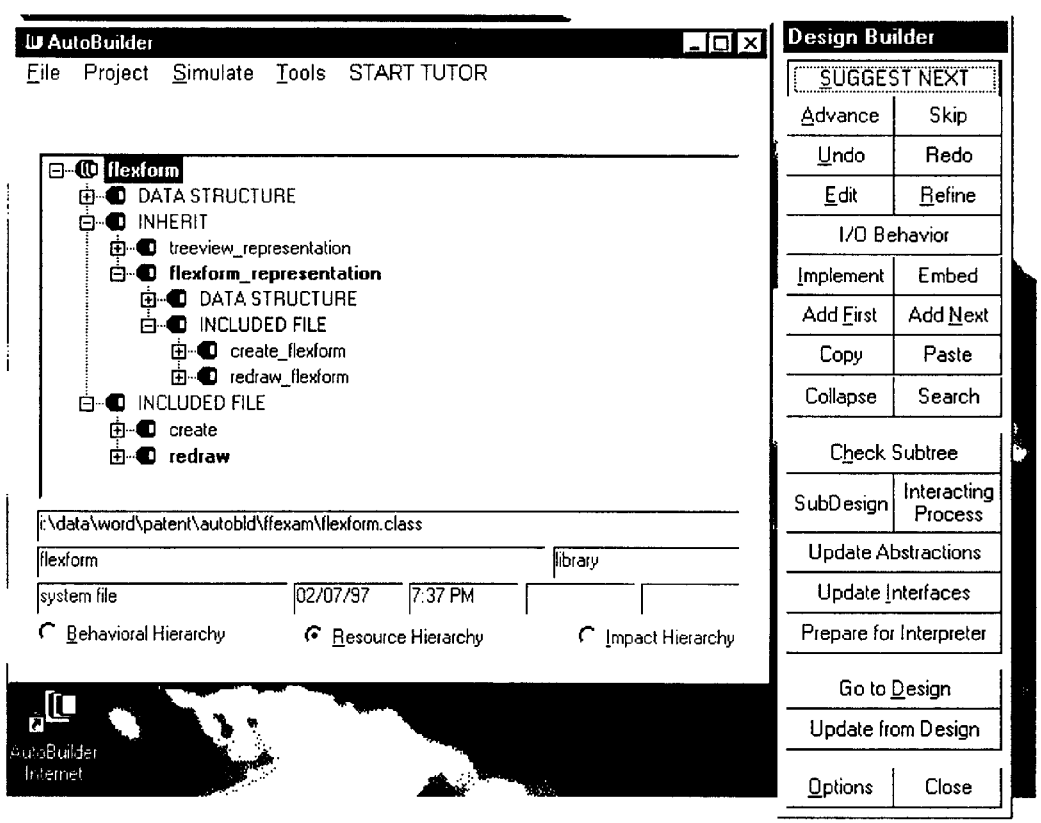

FIG. 30K. flexform class hierarchy containing two subclasses, treeview_representation and flexform_representation.

Figure 30L:
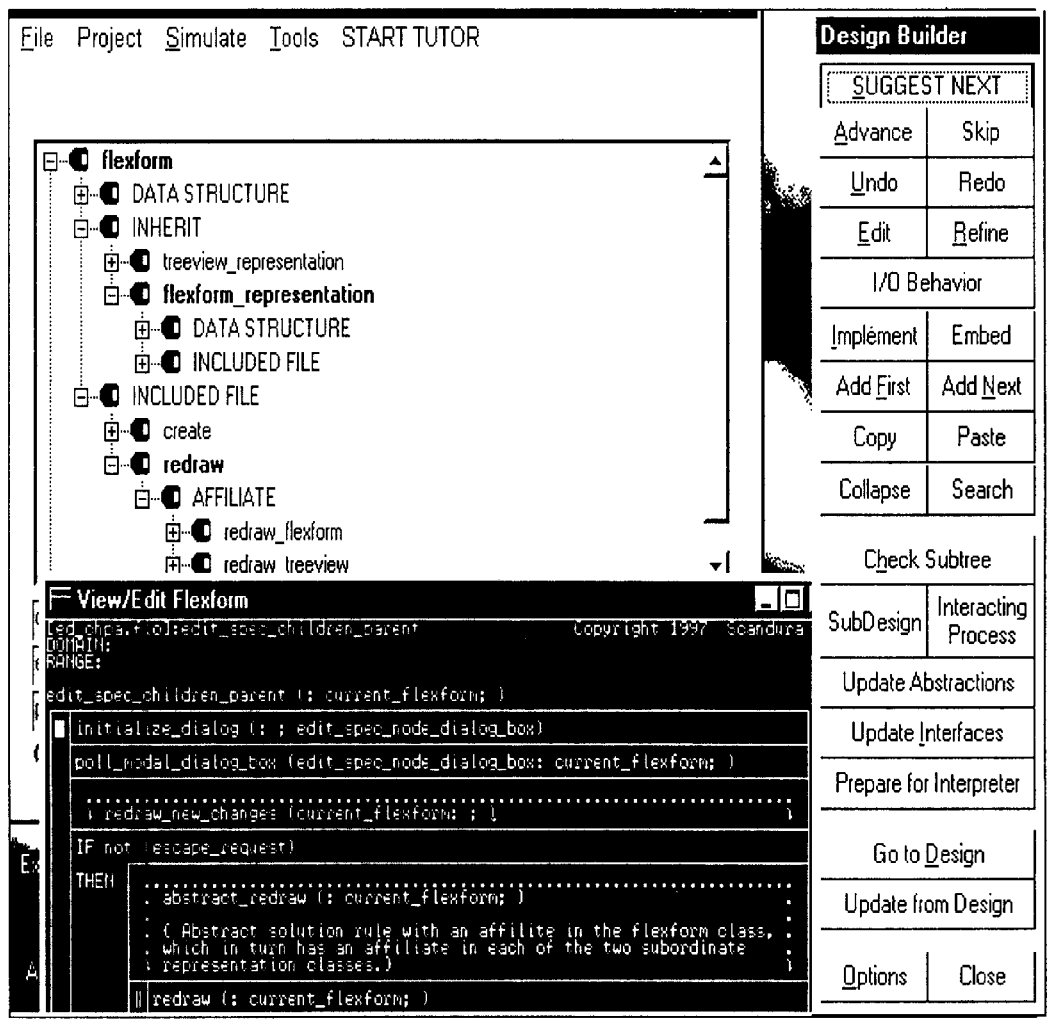

FIG. 30L. Design containing the abstract solution rule abstract_redraw (: current_flexform;).

Figure 30M:
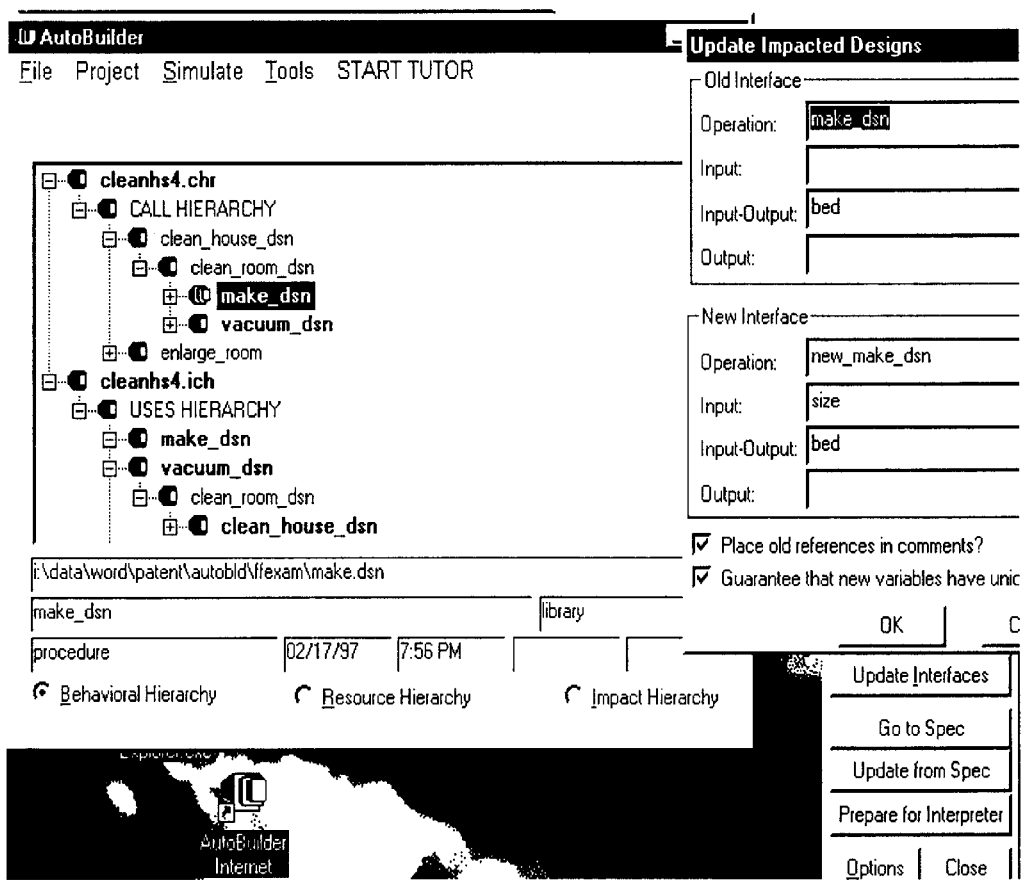

FIG. 30M. Update Impacted Designs dialog box for the Update Interfaces option in the Design Builder.

Figure 30N:
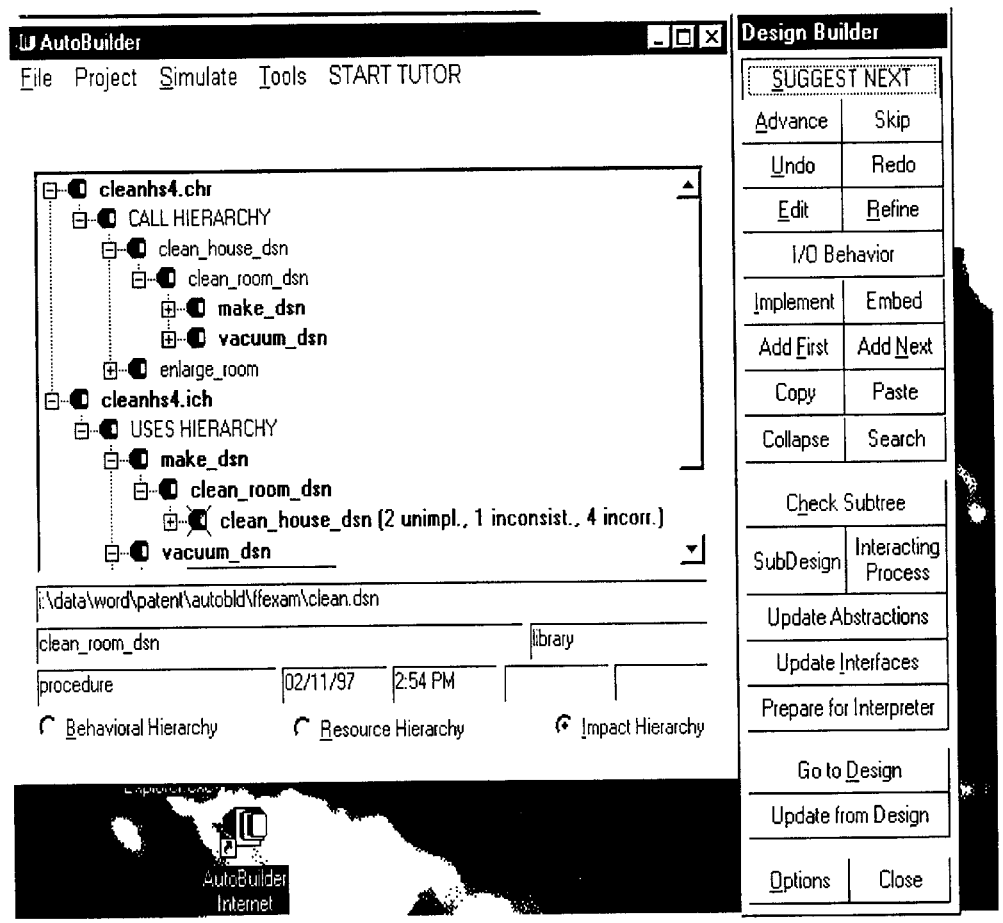

FIG. 30N. Treeview after Update Impacted Designs has been run and the design logic in clean_room_dsn in the USES HIERARCHY has been adjusted to reflect changes to its calls and data.

Figure 30O:
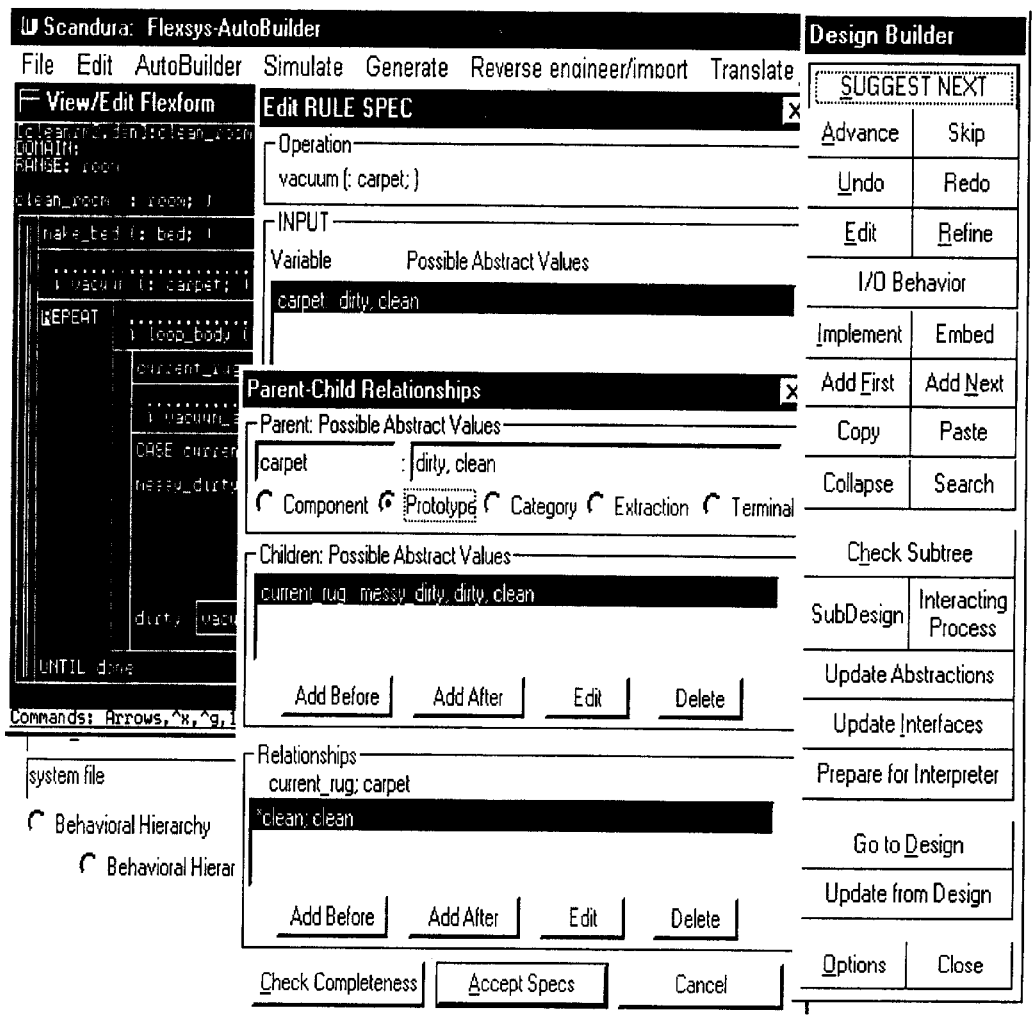

FIG. 30O. Parent-Child Relationships dialog box for the prototype refinement associated with vacuum (: carpet;).

DETAILED DESCRIPTION OF THE INVENTION

FIG. 1. This Flexform represents specifications for cleaning a room and was automatically generated by the current AutoBuilder implementation. Each element in a specification Flexform contains one variable. Terminal elements contain the name of the variable in the name field [within square brackets] of the element and the variable's ABSTRACT VALUES in the value field (after the :) of the element. Non-terminal elements under INPUT also contain PARENT-CHILD RELATIONSHIPS. Non-terminal OUTPUT elements contain INPUT-OUTPUT BEHAVIOR as well as PARENT-CHILD RELATIONSHIPS. In this example, the variable room and its component descendants serve as both inputs and outputs. (NOTE: All Flexforms in the following figures have been generated by the AutoBuilder implementation.)

FIG. 1A. The room1A.spc Flexform represents an INPUT variable "room" and two categories: "kitchen" and "bedroom". Notice that abstract values "messy" and "neat" of room also partition both categories. Consequently, parent-child relationships are redundant in category refinements and may be omitted. In this example, room and its sub-categories, kitchen and bedroom, are atomic in the sense that they do not contain any components. This type of self-contained category representation is used where the analyst wishes to specify a procedural design. The extraction refinement of "kitchen" provides further guidance for the design, indicating a sequence refinement in which the abstract values of "stove" and "dishes" are first extracted from kitchen, followed by a function defined on these values which is used to compute the abstract value of kitchen.

FIG. 1B. The room1B.cat Flexform also represents a room category structure and its sub-categories kitchen and bedroom. This time, however, the room and its sub-categories are non-atomic. Specifically, the Flexform shows how data structures (categories) representing non-atomic variables in category refinements are represented in the preferred embodiment. The room1B.category Flexform represents a room category containing walls, a ceiling and a floor. This category Flexform also references kitchen (kitchen1C.category) and bedroom (bedroom.category) sub-categories. The latter represent specialized portions of the data structure needed to characterize kitchens and bedrooms, respectively. Non-atomic category refinements used in specifications correspond to class hierarchies in designs. Indeed, classes and sub-classes can easily be derived from category refinements by adding SPECIFICATION and DESIGN sections (see next section). The latter sections contain designs and corresponding specifications associated with the class data structures.

FIG. 1C. The kitchen1C.category Flexform represents the specialized portion of the room data structure of FIG. 1B needed to characterize kitchens. The kitchen category includes the data structure in the room category supplemented with that associated with the kitchen category.

FIG. 1D. Category hierarchies also can be represented in integrated tree-views. This figure shows a tree-view combining the room1B and kitchen1C categories. Notice that the room1B and kitchen1C categories are displayed in bold type indicating that they are in separate Flexforms.

FIG. 2. This Flexform represents a design for cleaning room, along with top-level sections containing supporting information. Definition of the condition "done" depends indirectly on the nature of the advance solution rule. Consequently, in the preferred AutoBuilder implementation, condition definitions can often be constructed automatically. The definition done:=not (next_element_exists (current_rug, carpet))

is not shown in the figure. It is hidden below the "done" element where it can be accessed as needed. Nonetheless, the definition can be displayed in the Flexform as the child element of "done". (In general, condition definitions may be single elements or hierarchies of elements.)

FIG. 2A. This Flexform represents the RULE SPECS subsection of the DETAILED SPECIFICATIONS section in the clean room design. In the preferred embodiment, the RULE SPECS subsection lists specifications for each solution rule in the design sequentially in order as an alternative to retaining hierarchical relationships implicit in the design. The former representation is strictly optional and is done solely to speed access during processing. Solution rules are referenced by number rather than by name to reduce the need for checking (names) after editing. Notice also that the triples of +'s and −'s in the value field of the root spec for each rule refer to whether the rule has been checked, and if so, its consistency and correctness status.

FIG. 2B. This Flexform represent the DATA SPECS subsection of the DETAILED SPECIFICATIONS section in the clean room design. The DATA SPECS subsection lists all of the INPUT, OUTPUT and INTERMEDIATE variables used in the design. Notice that "room" is marked with a @ indicating that it is a "clone" shared by both INPUT and OUTPUT. This clone is displayed below as a separate section of the Flexform (with a "." between the initial and clone sections). In the preferred embodiment, clones can be referenced either separately (as in FIG. 2B) or in context. In the latter case only the first expansion is normally shown. The intermediate variable "done" is defined by data execution in the design (see FIG. 2).

FIG. 2C. This Flexform represents top levels of an executable version of the clean room design with DOMAIN, RANGE and INTERMEDIATE, and INCLUDED FILE and GLOBAL sections expanded. The former sections are automatically constructed from the DATA SPECS and the latter during implementation of the design. All of these sections are referenced during execution of a design. Notice that input-output variables are put in the RANGE section. Prototype variables, like "current_rug", become aliases used during processing and are listed under intermediate variables. Alias variables "point to" specific variables (e.g., specific "rugs") during execution. As noted above, the intermediate variable "done" is defined by data execution (refined in the design). The INCLUDED FILE and GLOBAL sections, respectively, contain sub-designs (e.g., "make_bed") and compiled components (e.g., "pickup_rug" and "vacuum_rug") introduced in implementing the design. These "executables" replace the virtual solution rules "make", "pickup" and "vacuum" in FIG. 2, respectively. "Next_element" and "=" are core components built into the current embodiment, and are not (but could be) listed.

FIG. 2D. This Flexform represents the top-level class in a class hierarchy. This Flexform represents a room class derived from the room category of FIG. 1B. This class is supplemented with designs (and one of the two optional specifications) defined on the room data structure. These designs are listed in the INCLUDED FILE (the name used for included designs in the current embodiment) section. Two classes inherit from this class: kitchen2E and bedroom. The major differences between class hierarchies and category hierarchies are their respective roles (designs vs. specifications) and the introduction of designs and specifications. Notice that sub-categories in category hierarchies correspond to subclasses in class hierarchies. These distinctions are reflected in the Flexform root suffix (*.category vs. *.class) and the section names (e.g., CATEGORY versus INHERITS). As with category refinements, various sections in class hierarchies can either be expanded in place or as file references. File references are used for sub-classes, designs and specifications in FIG. 2D but not for the data structure.

FIG. 2E. This Flexform represents the kitchen class that inherits from the room class of FIG. 2D. It contains two designs, one of which operates on stoves and the other on dishes. Other designs, of course, could operate on both. In the preferred embodiment, however, operations in a sub-class may not operate on data in super-ordinate classes.

FIG. 3. This Flexform represents a sample problem (data) on which the clean room design of FIG. 2 operates. In this example all of the input variables also are outputs. In the current embodiment, such variables are put in the GOAL section. Also notice that the particular carpet in this problem contains three rugs. (In general, a problem may have any number of rugs.) During execution, the design introduces two intermediate variables, current_rug and done. Consequently, the figure includes the INTERMEDIATE section in addition to the GIVEN and GOAL sections which comprise the problem. During execution, individual rugs are referenced by the alias current_rug: current_rug corresponds to the prototype element current_rug in the specification of FIG. 1. The value of the intermediate variable done is determined from its definition (see FIG. 2) during execution.

FIG. 4. This Flexform represents a sample project for cleaning houses. This Flexform references the specification clean_house_spc for the top-level design clean_house_dsn. In the current implementation, the INCLUDED FILE section contains references to Flexforms representing clean_component library and room_class resources. The referenced Flexforms are shown in FIGS. 5 through 7.

FIG. 4A. The tree view in this figure shows the clean_house project Flexform of FIG. 4 with relationships to referenced Flexforms. In this example, clean_house_dsn is the top-level design. It calls clean_room_dsn, which in turn calls vacuum_dsn and make_dsn. The latter designs are contained in clean_component_library.

FIG. 5. This Flexform represents a clean_component_library containing "vacuum" and "make" designs and their specifications.

FIG. 5A. This Flexform represents specifications for vacuum carpeting in clean_component_library.

FIG. 5B. This Flexform represents the top level of a design and external specifications for vacuum carpeting in clean_component_library.

FIG. 6. This Flexform represents a room class containing a data structure (set of components) which represents a room, two designs that operate on this data structure and their specifications. No sub-class inherits this room data structure.

FIG. 7A. This Flexform represents the clean_house_spc specifications in the clean house project shown in FIG. 4.

FIG. 7B. This Flexform represents the clean_house design corresponding to the specification in FIG. 7A. Notice that the "clean_room.room" solution rule refers to the "clean_room" design in the "room" class of FIG. 6. Reference to both an operation and the class containing it is common in OO design. An alternative OO implementation would be to introduce an abstract solution rule with affiliates in the room class. These object-oriented implementations can be further contrasted with the calling relationships depicted in FIG. 4A. In the latter case, clean_house_dsn calls clean_room_dsn, which in turn calls make_dsn and vacuum_dsn in the clean component library.

FIG. 8A. This Flexform represents a high level of the specifications callback, with emphasis on automatic (called continue—suggest next) mode. When the suggest-next button (see FIG. 29A) is selected, the AutoBuilder implementation automatically checks and advances through the specification hierarchy, ensuring that each refinement is complete and consistent. Suggest-next may also suggest which action (s) to perform next. Each of the case alternatives corresponds to a manual option that can be performed at each node in the specifications hierarchy. The REFINE option, for example, gives the analyst a choice of refinement types (e.g., component, prototype, category, and extraction). The refine callback also assists in construction of the refinement, including parent-child relationships and, in the case of output variables, input-output behavior. These manual options can be activated and/or turned off globally as desired (e.g., by a chief analyst).

FIG. 8B. This Flexform represents a high level of the design callback, with emphasis on automatic (called continue—suggest next) mode. When the suggest-next button (see FIG. 29A) is selected, the AutoBuilder implementation automatically checks and advances through the design hierarchy ensuring that each refinement is complete and consistent. Suggest-next may also suggest which action(s) to perform next. Each of the case alternatives corresponds to a manual option that can be performed at each node in the design hierarchy. The REFINE option, for example, automatically constructs a design refinement for the current node (see FIG. 9). In the process, it requests information on abstract behavior associated with the child solution rules while ensuring consistency (FIG. 11). Where specifications are available, the design callback suggests an appropriate refinement and abstract values based on the corresponding specifications variable. Otherwise, the callback asks for the key variable on which to base the design refinement. See FIG. 30A for other options. Where appropriate, global options can be preset to assure given degrees of automation. The check sub-tree option, for example, can be configured to check for consistency, correctness with respect to specifications or both (FIG. 12).

FIG. 9. This Flexform represents the high level case selection used in building various types of procedural refinement. Details on each case alternative are given in FIGS. 9A–G. Similar case logic is used in checking for consistency and correctness. Actual checking in the current embodiment is in accordance with the consistency rules detailed above as implemented in the FIGS. 11 and 12.

FIG. 9A. This Flexform represents a high level design for building sequence refinements.

FIG. 9B. This Flexform represents a high level design for building navigation sequence refinements.

FIG. 9C. This Flexform represents a high level design for building parallel refinements.

FIG. 9D. This Flexform represents a high level design for building selection refinements.

FIG. 9E. This Flexform represents a high level design for building case refinements.

FIG. 9F. This Flexform represents a high level design for building repeat . . . until refinements.

FIG. 9G. This Flexform represents a high level design for building while . . . do refinements.

FIG. 10. This Flexform represents a high level design for updating the parent solution rule in a given design refinement. The Update-Abstractions operation also involves a case with alternatives for each type of refinement. Notice in the preferred embodiment that the sequence alternative distinguishes those sub-sequences that may be converted to navigation sequences and those that may be carried out in parallel.

FIG. 10A. This Flexform represents a high level design for updating sequence refinements. In the preferred embodiment, a second pass is made through the design hierarchy to construct data abstractions where possible.

FIG. 10B. This Flexform represents a high level design for updating navigation sequence refinements.

FIG. 10C. This Flexform represents a high level design for updating parallel refinements.

FIG. 10D. This Flexform represents a high level design for updating selection refinements.

FIG. 10E. This Flexform represents a high level design for updating case refinements.

FIG. 10F. This Flexform represents a high level design for updating repeat . . . until refinements.

FIG. 10G. This Flexform represents a high level design for updating while . . . do refinements.

FIG. 11. This Flexform represents the top-level design for checking the consistency of a given design refinement. These consistency rules are detailed in the section on DESIGN DEFINITIONS.

FIG. 12. This Flexform summarizes the design for checking the abstract or relative correctness of given design refinements.

FIG. 13A. This sample FORTRAN subroutine illustrates both data and process source code.

FIG. 13B. This FORTRAN Flexform represents all essential information in the sample FORTRAN subroutine of FIG. 13A. It also represents the implicit design hierarchy extracted from the code during reverse engineering. Higher levels in the Flexform design hierarchy are blank (see the rectangular regions surrounded by dots). These regions may be filled in with documentation or, as in the current disclosure, with abstract solution rules representing the functionality of the refinements below.

FIG. 13C. The terminal-level design in this HLD design hierarchy Flexform represents the HLD equivalent of the FORTRAN Flexform shown in FIG. 13B. Notice that the higher levels in this HLD design hierarchy have been abstracted level by level from the terminal-level. All variables have been "passed" upward from children solution rules in this case because there are no hierarchical relationships between any of the variables. This is indicated by the flat list in the DATA SPECS section. Data abstractions are introduced by the method summarized in FIG. 10A.

Although the terminal-level HLD solution rules representing FORTRAN procedural statements in this example correspond one-to-one, this will not always be the case. FORTRAN FORMAT and PRINT statements provide a case in point. The sample data conversions are more complex. In particular, FORTRAN includes parameters and initializations in separate sections of the code. In an HLD design hierarchy parameters are associated with the top-level solution rule. Initial values of parameters belong to data files (problems) on which the HLD design operates. Moreover, because individual HLD elements are type-less, base types like INTEGER are ignored (although they need not be). Defined types, such as three-dimensional arrays, are represented hierarchically. These kinds of abstraction are characteristic of those required in converting from standard programming languages to HLD. Constructs which designate compiler options, or which serve primarily to improve efficiency (e.g., inherits in VAX Pascal) are simply ignored. Pointers (e.g., in C) may require manual adjustment. For example, pointers must correspond in HLD abstractions to aliases in navigation sequences or loops. Assuring that this is so may require reordering statements in a sequence, and/or other changes to satisfy predetermined refinement constraints.

FIG. 14. Abstract solution rules defined on objects raise polymorphism to a higher level. The abstract solution rule fn (Z, X . . . ) represents the combined effects of affiliated operations embedded in the class inheritance hierarchy associated with object Z. Rather than resolving reference to overloaded operations in different classes (e.g., A, B, C), abstract solution rules use the notion of affiliate operations to integrate semantically equivalent functionality across objects. Abstract solution rules also support dynamic definition (data execution) of objects (e.g., X) in terms of other objects (i.e., Y).

FIG. 15. This is the preferred method for constructing and maintaining specifications. This method corresponds to claim 1 and subordinate claim 12.

FIG. 16. This is the preferred method for constructing and maintaining designs. This method corresponds to claim 2 and subordinate claims 13 and 14.

FIG. 17. This is the preferred method for constructing and updating a design hierarchy from a design or design hierarchy. This method corresponds to claim 4 and subordinate claim 15.

FIG. 18. This is the preferred method for combining top-down and bottom-up methods for building and maintaining designs. This method corresponds to claim 7.

FIG. 19. This is the preferred method for implementing solution rules in designs constructed via the method of FIG. 16 (for constructing and maintaining designs). This method corresponds to claim 3.

FIG. 20. This is the preferred method for converting a procedural module (program, subroutine or method) written in another programming language to canonical form. This method corresponds to claim 5.

FIG. 21. This is the preferred method for making a design more compact, more efficient or both. This method corresponds to claim 6.

FIG. 22. This is the preferred method for incorporating designs into various architectures. This method corresponds to claim 8.

FIG. 23. This is the preferred method for building, maintaining and implementing behavioral models (also called projects or systems) possibly containing sub-projects as well as units (libraries and/or classes) that in turn contain designs and/or specifications. This method corresponds to claim 9.

FIG. 24. This is the preferred method for creating and executing test cases. This method corresponds to claim 11.

FIG. 25. This is the preferred method for interpreting designs.

FIG. 26. This is the preferred method based on a universal (component independent) control mechanism for deriving executable designs for implementing virtual solution rules. The input of the problem to be solved is the to-be-implemented solution rule. The solution is a plan or executable design whose specification matches the solution rule specification.

FIG. 27. This is the preferred method of structural analysis for constructing a set of designs that solves a "sufficiently large" (as determined by the structural analyst) subset of problems in an ill-defined domain.

FIG. 27A. This is an alternative method of structural analysis offering the designer less specific guidance but allowing more flexibility.

FIG. 28A. This figure shows the File pull-down menu used in the current AutoBuilder implementation, including the kinds of files supported. These include specifications and designs, and the projects, libraries and classes that reference them. Large categories also may be maintained as separate files.

FIG. 28B. This figure shows the Project pull-down. The Edit Full option shows the full Flexform file, including all support information, and can be used for debugging purposes. Edit Corresponding switches between corresponding specifications and designs.

FIG. 28C. This figure shows the Simulate pull-down, including debugging and support options for determining (and removing) test coverage information and automatic initialization of variables.

FIG. 28D. This figure shows the Tools pull-down. The Semantic Wrapper and Semantic Integrator options are used to make independently developed components interoperable with and available for use in HLD designs. Such components can then be used in implementing designs as disclosed herein. The highlighted option is used to generate compilable C code from HLD designs.

FIG. 29A. This figure shows the Spec Builder modeless dialog box used in the current implementation. This dialog box contains various options that control the specification callback, together with the corresponding specification Flexform and/or tree-view displays on which this callback operates. In this example, the clean1a.spc specification has been loaded (as shown in the background window). Its contents, including the type of refinement used (e.g., category), are displayed in the treeview in the foreground.

FIG. 29B. This figure shows the Edit design option dialog box. In this example, the clean1a.spc specification has been displayed as a Flexform showing more of the detail. The Parent-Child Relationships dialog box indicates that the room category refinement is being edited.

FIG. 28C. This figure shows the Refine option dialog box. In this example, the terminal variable bedroom is being refined. The designer must choose a type of refinement and identify the children and abstract values associated with bedroom. One abstract value is assumed when none is given for a variable. Completeness of the refinement is checked when either Accept Specs or Check Completeness (used for intermediate checking) is pressed.

FIG. 29D. This figure shows the I/O Behavior option dialog box. In this example, the abstract output value of the variable kitchen is presentable, irrespective of its input value.

FIG. 29E. This figure shows the Go to Design option dialog box. The default design is the design with the same prefix as the specification, in this case clean1a. Here, clean1a.spc is the specification so the corresponding design would be clean1a.dsn.

FIG. 29F. This figure shows a tree-view representation of a sample project containing: a) hidden specifications, b) a clean_house_dsn design, which in turn calls a clean_room_dsn, c) a clean_component_library, and d) a room_class.

FIG. 30A. This figure shows the Design Builder modeless dialog box used in the current implementation, along with a sample cleanrm2.dsn design. The dialog box includes various options controlling the design callback. The latter operates on the cleanrm2.dsn design Flexform (or other representation).

FIG. 30B. This figure shows the Edit design refinement dialog box. This example shows the Edit Sequence dialog box in conjunction with compound solution rule pickup_vacuum.

FIG. 30C. This figure shows the Refine design dialog box. This example shows the Refine Terminal dialog box in conjunction with the terminal solution rule make_bed.

FIG. 30D. This figure shows the Implement solution rule dialog box. This example shows the Implement dialog box in conjunction with the terminal virtual solution rule, make. After implementation, make will be converted to the executable component make_bed.

FIG. 30E. This figure shows the Check Sub-design dialog box. Because the cursor is at the top of the clean_room design hierarchy, the subtree in question is the entire design hierarchy. It was checked and, as reported, found to be consistent.

FIG. 30F. This figure shows the Edit Rule Spec dialog box. This example shows the input-output behavior associated with make (: bed;).

FIG. 30G. This figure shows a warning message pertaining to Update Abstractions. This option automatically reconstructs virtual solution rules (also called design abstractions) from their children in accordance with specified consistency constraints. Update Abstractions can be used, as in this example, where higher-level virtual solution rules already exist. This option also can be used in conjunction with legacy designs, which have been embedded via reverse engineering in an implicit design hierarchy. Higher level abstractions in the implicit design hierarchy may be missing or consist perhaps of English or other documentation.

FIG. 30H. This figure shows a confirmation message pertaining to the Prepare for Interpreter option. This option is used to update Flexform DOMAIN, RANGE and INTERMEDIATE data sections so the design can be interpreted.

FIG. 30I. This figure shows the AutoBuilder Options dialog box. This option provides control over the type of checking used. In the current embodiment, one can check for consistency, correctness and/or implementation status. Auto Implement automates the implementation of virtual solution rules used more than once in a design. The three advance options designate the order in which the Design Builder options, SUGGEST NEXT and Advance, operate. Other options control the way Update Abstractions, Undo and Implementation in the Design Builder are to work.

FIG. 30J. This figure shows the Go to Specification dialog box. It operates analogously to that in FIG. 29E.

FIG. 30K. This figure shows the flexform class hierarchy, which contains two subclasses, treeview_representation and flexform_representation. The flexform, treeview_representation (not expanded) and flexform_representation classes each contain two designs, one for creating objects and the other for redrawing representations.

FIG. 30L. This figure shows a design containing the abstract solution rule, abstract_redraw (: current_flexform;)

This abstract solution rule has as an affiliate redraw in the flexform class. In turn, redraw has two affiliates, redraw_treeview in the treeview_representation sub-class and redraw_flexform in the flexform_representation sub-class (neither expanded). Although the Flexform design is expanded to show redraw, this expansion is simply part of the current implementation of the AutoBuilder Interpreter and C Code Generator. This expansion is accomplished automatically, and transparently. The designer only needs to introduce abstract_redraw. The use of affiliates handles calls on class-specific redraws automatically. (Although the affiliates in this example all have different names, overloading and polymorphism are supported similarly.)

FIG. 30M. This figure shows the Update Impacted Designs dialog box for the Update Interfaces option in the Design Builder. The treeview shows both a USES (Impact) HIERARCHY and the corresponding CALL (Behavioral) HIERARCHY in which make_dsn is highlighted. The dialog box shows that make_dsn's old interface is to be changed to the new interface. When OK is pressed the calls and data structures (corresponding to changes in parameters) in the impacted designs are automatically changed to reflect the new interface. In the current embodiment, the designer then adjusts the design logic of the impacted designs as necessary.

FIG. 30N. This figure shows the treeview after Update Impacted Designs has been run and the design logic in clean_room_dsn in the USES HIERARCHY has been adjusted to reflect changes to its calls and data. clean_house_dsn is marked with an "X" indicating that it still needs to be adjusted. In the preferred embodiment, the methods for building and maintaining designs summarized in FIGS. 16, 17 and 18 are used for this purpose. In particular, notice that various automation technologies may be used to automate the process.

FIG. 30O. This figure shows the Parent-Child Relationships dialog box for the prototype refinement associated with vacuum (: carpet; ). This example shows that the parent variable carpet is clean when all of the children variables associated with prototype variable current_rug are clean (*clean).

Specifications may be created externally, independently of designs. They consist of INPUT and OUTPUT hierarchies of variables. A variable in such a hierarchy may have two or more parents. The analyst must specify the top-level system variables. Optionally, the analyst also may specify a finite partition on the values of each variable. The partition effectively categorizes those values which the analyst believes should be distinguished, placing them in separate equivalence classes. These equivalence classes are herein referred to as "abstract values." In addition, the analyst may specify the functional relationship between abstract values of each parent variable and its children, as well as the nature of this relationship (e.g., component, prototype, category). Indeed, there is a close relationship between kinds of parent-child relationship and corresponding design refinements.

For each output variable, the analyst must also specify the associated abstract behavior. Abstract behavior is specified in terms of a functional mapping from abstract values of input variables to abstract values of the corresponding output variables. The parent-child and input-output mappings must be consistent. That is, input-output mappings between children must produce the same abstract behavior, as does the corresponding mapping between the parents.

The default number of abstract values is one. That is, unless otherwise specified, all values associated with a given variable are assumed to be in just one equivalence class or abstract value—namely, the variable itself. Two or more abstract values are introduced to ensure (to whatever degree the analyst desires) that the specifications will be adequate for their purpose. Refinements in which explicit relationships are specified between abstract values of parent and children variables are referred to as complete. Refinements need not be complete, but they must be consistent. They may be created prior to, in parallel with and/or after solution designs are formulated. In the preferred embodiment, information pertaining to the specification is stored both in the specification hierarchy and, for easier reference during design, also under DETAILED SPECIFICATIONS. (The latter includes a copy of the original external specifications [EXTERNAL SPECS], detailed specifications for each solution rule and data specifications.) The above ideas are represented in the Flexform shown in FIG. 1.

Solution designs are characterized by hierarchies of refinements of semantically meaningful components (herein called solution rules) at successive levels of abstraction. Designs are supplemented with (a) a DETAILED SPECIFICATIONS section which in addition to EXTERNAL SPECS contains hierarchies of parent-child relationships [DATA SPECS] and input-output specifications for all solution rules introduced in the design hierarchy [RULE SPECS], including non-terminal virtual rules, terminal subdesigns in which specifications and designs are elaborated separately and terminal atomic rules (which may be executable), (b) a DOMAIN hierarchy corresponding to the specification INPUT which specifies the structure of the formal input parameters of the design—optionally including their initial (abstract) values (i.e., each DOMAIN variable has exactly one of the abstract values listed in the INPUT specifications), (c) a RANGE hierarchy similarly corresponds to the specification OUTPUT and specifies the formal output parameters of the design, (d) an INTERMEDIATE section representing variables which are "local" to the design—in the preferred embodiment this section contains a list of variables, some of which may be hierarchically related to others, (e) an INCLUDED FILE section containing the names and file names of those sub-systems which elaborate terminal solution rules separately and (f) a GLOBAL section containing a list of executable rules and previously referenced sub-systems. A sample a design Flexform is shown in FIG. 2 with top levels of the supporting sections. The latter are expanded in FIGS. 2A, 2B and 2C.

Specific constraints guarantee that successive levels of refinement are syntactically consistent with respect to previous levels. These constraints, which are automatable by means of a device with memory, also make it possible to partially construct and/or correct solution refinements automatically. Similar constraints make it possible to construct abstractions (i.e., virtual solution rules) from given ones and/or to detect (to-be-remedied) inconsistencies. Other largely automatable processes ensure that specifications are consistent and that design semantics are abstractly correct with respect to the specifications.

Abstract correctness differs in this context from true mathematical correctness. The former does not in itself guarantee that a program will operate as expected. What it does do is make it possible to reduce, to whatever degree may be desired, the complexity of the formal proofs required to prove correctness. In a loop refinement, for example, one must prove only such things as that the loop advances systematically through all values of the loop alias and, where termination is desired, that the loop condition ensures that at least one such value exits the loop. The preferred embodiment also accommodates exceptions and non-terminating loops. In addition, meaningful guidance is provided in the preferred implementation for building those portions of a specification and/or design, which cannot be automated. A design implemented in this manner can be guaranteed to be correct (i.e., to work as specified) as long as the components used in implementing the design are themselves correct.

In practice, the human analyst must convert informal and/or imprecise specifications into a semantically meaningful specification hierarchy. The analyst also should have in mind some sense of how the solution is to proceed. Variables at successive levels in the INPUT and OUTPUT hierarchies become input and/or output parameters for corresponding solution rules in the design hierarchy. For each such variable, the analyst may partition its values into equivalence classes (herein called abstract values). What constitute abstract values depends on the variable and its level of abstraction. Intuitively, abstract values correspond to distinctions (e.g., input-output behavior, decisions in the desired solution design) that the analyst/designer believes must be preserved in to-be-developed software.

As noted above in constructing specifications, the analyst must specify for each output variable the desired abstract behavior in terms of tuples of abstract values. These abstract values correspond to variables at various levels in the INPUT and OUTPUT hierarchies. In a complete specification, the analyst must also specify abstract functional relationships between each parent variable and its children as well as between input and output variables. In particular, for each set of abstract input values, the analyst must specify the corresponding abstract value of the parent and similarly for output variables and their children. Specification of these functional relationships can be accomplished either by enumerating n-tuples of abstract values or by some automatable rule. In the preferred embodiment, these relationships are all represented as n-tuples.

Because analysts may lack the rigorous training necessary to build consistent specifications, abstract behavior also may be specified during the design process. In order to prove that a design is correct, each solution rule introduced during design must have a full specification for each of its parameters, including abstract values and behavior. This information is stored under RULE SPECS.

Collectively, the specified variables, their abstract values, and the input-output and parent-child relationships involving those variables comprise (abstract) specifications for the system to be developed. Restricting reference to a relatively very small number of abstract values at successive levels of abstraction dramatically reduces the numbers of instances which must be considered, both to ensure consistency of a specification and correctness of a solution design with respect to that specification. Where no abstract value has been specified for a variable, the variable is assumed to have just one (default) abstract value. Specifying input-output behavior in this default case only requires specifying the input variables that map into each output variable. Similarly, specifying parent-child relationships only requires distinguishing between component, category and prototype refinements. Even the latter requirement is optional, and is desirable only because it makes it possible to determine corresponding design refinements automatically.

In the preferred embodiment, restricting the number of values to be considered (by introducing abstract values) makes it possible to automatically verify that a specification is complete and internally consistent, irrespective of how complex a system might be.

More important, the relatively small numbers of abstract values involved also makes it quite feasible to prove that a system is correct, irrespective of how complex that system might be. Instead of increasing exponentially with complexity, the number of abstract values to be tested at each level of refinement is very small indeed. Moreover, given the hierarchical nature of the design process, this number goes up only additively with complexity.

Nonetheless, as emphasized above, specifications themselves need not be complete in the preferred embodiment. In the absence of explicitly specified abstract values, a variable is assumed to have exactly one abstract value. Two things are sufficient for the purpose of proving correctness. The relationship between each parent variable and its children must be specified (under DATA SPECS in DETAILED SPECIFICATIONS) as must the abstract behavior associated with each output parameter of each solution rule introduced during the design process (under RULE SPECS in DETAILED SPECIFICATIONS). This information may partially be derived automatically from the original specifications. DETAILED SPECIFICATIONS, however, also contains more complete information (including information about INTERMEDIATE variables) making it possible to check correctness statically. Conversely, detailed specifications can be constructed (i.e., reversed engineered) automatically from designs which are complete, internally consistent and correct.

Solution designs may be constructed hierarchically from the top-down, and as we shall see, also from the bottom-up. In the former case, design begins with the automatic construction of a shell for the top-level solution rule. The rule's input and output parameters come, respectively, from the top level of the INPUT and OUTPUT hierarchies in the EXTERNAL SPECS. That is, the top-level specification variables constitute the input and output parameters of the top-level solution rule. This (virtual) solution rule is postulated to map each set of abstract values of the input parameters into specified abstract values of the output parameters. Refinement types (i.e., component, category and prototype) introduced at successive levels in the specification hierarchy correspond to design refinement types which may be used to automatically construct frameworks (or shells) for solution rules as that design is being elaborated. For each refinement, the designer may adjust names in the resulting rule frameworks (e.g., automatically constructed operation names and/or names for needed local variables may be changed to semantically meaningful names). The designer may also specify abstract values for each new intermediate variable introduced as well as the abstract behavior associated with each solution rule introduced during the design process. This information completes the specifications (i.e., DETAILED SPECIFICATIONS) needed to ensure internal consistency and (abstract) correctness—all without testing.

For each solution rule in the preferred embodiment, the designer may choose to modify it, to refine it, to implement it or to create and refine a separate sub-system with its own specifications and design. For each allowed type of refinement (i.e., sequence, selection, iteration, parallel) of a solution rule, there is a well-defined set of constraints which guarantee that the refinement is syntactically consistent with its predecessor. These constraints also may be designed to reduce (or eliminate) unwanted "side effects" in the resulting software, to provide information needed to automatically construct frameworks for each refinement, to modify parent solution rules (in refinements) and/or to guide the designer in supplying missing information. Correctness constraints further ensure that behavior of the children in a refinement are equivalent to the parent's behavior.

Consistency and correctness constraints imposed on refinements assist both during development and during maintenance. During development, each parent solution rule and its refinement type, supplemented with specifications, provides sufficient information for automatically producing a framework for the refinement. During maintenance, child solution rules and the refinement type are sufficient for suggesting and/or automatically updating parent solution rules. In effect, while constraints imposed by a solution rule propagate down to child solution rules during development, these constraints propagate up (introducing abstractions) during maintenance.

Implementation of a design requires two additional steps. For each terminal element in the solution design, the designer/programmer must select, modify or build a component that satisfies the constraints (abstract value behavior) specified by that terminal element. Abstract specifications for given solution rules (which are terminal in a design) are used to identify executable components (in an available library) which match the signature (syntax) and/or semantics (abstract behavior) of that solution rule. Second, architectural constraints impose specific design requirements. For example, in a sequential architecture, one might need to embed an event driven solution design in a loop. Conversely, an event driven architecture might require disassembling a design to react to individual events.

As noted above, the introduction of abstract values dramatically reduces the number of values that need to be considered in (automatically) proving (or disproving) correctness. In particular, the preferred embodiment ensures that the solution rules and conditions in each refinement collectively produce the same behavior as the parent. A design constructed exclusively via correct refinements is guaranteed to be correct both internally and with respect to the specifications. Such a design also will execute correctly as long as each virtual rule is consistent with the defining architectural environment and each terminal solution rule in the design is implemented in terms of a component which executes correctly and whose abstract specification satisfies the rule's abstract specification. In effect, proving that a program will execute correctly is reduced to ensuring that each component used to implement (one or more) solution rules in the corresponding (abstractly correct) design does what it is supposed to do. The latter is a much simpler task.

To summarize, the method disclosed herein makes it possible both to ensure correctness (via static checking) and to provide automated support for building and maintaining precise specifications and designs. In addition, the current embodiment includes an automated simulation tool, called the Flexsys Simulator. Use of the Simulator is optional but makes it possible to dynamically execute and, hence, to test designs empirically. The Simulator operates on what herein are called PROBLEMs. Each PROBLEM consists of a GIVENS and a GOALS hierarchy. Values of GIVENS variables are given at the beginning of any given execution. The value of each GOALS variable (which may simultaneously be a GIVENS variable) is uniquely determined by the GIVENS. During execution, values of GOALS variables may change and new GOALS and INTERMEDIATE variable structures may be introduced, modified or deleted. In the current implementation, the DOMAIN and RANGE hierarchies may serve as default PROBLEMS (where the latter do not exist).

External specifications are typically formulated independently before design modeling begins. In this case, the design process disclosed herein yields a solution design, which is guaranteed to satisfy the given specifications. In the preferred embodiment, DETAILED SPECIFICATIONS also may be formulated during the design process itself. This approach yields specifications that are more complete than is typically the case. Furthermore, highly detailed system specifications may be reverse engineered (i.e., derived) from the DETAILED SPECIFICATIONS.

The preferred embodiment incorporates a high degree of automation but also allows a manager to specify how much rigor is to be imposed on an analyst or designer. The human analyst/designer's responsibility is limited to: (a) formulating specifications in a semantically meaningful manner prior to or in parallel with specifying the solution design—including specification of each variable and its abstract values, relationships between input and output variables and relationships between parent variables and their children, (b) having in mind an appropriate solution process (design) which will satisfy the specifications as well as available components with which the design may be implemented, (c) assigning semantically meaningful names to required input and output parameters and operations at successive levels of design refinement and (d) deciding at each level whether to continue refinement, to implement the (now terminal) solution rule or to create a separate sub-design. In many cases, the appropriate refinement type can be determined automatically from the specifications.

The analyst/designer may also modify and/or maintain a system in the usual way by modifying terminal (possibly implemented) solution rules in a design. The preferred embodiment assists in the process and ensures that any such change maintains consistency and correctness.

Cognitive Foundations

The present invention has been motivated by the cognitive metaphor (Scandura, 1984a) introduced earlier. It retains the intuitive, cognitive flavor of structural analysis while ensuring the rigor necessary to ensure correctness. More specifically, the methods disclosed herein lend themselves to automation and make it possible: (a) to create unambiguous specifications that are semantically meaningful and internally consistent, (b) to create unambiguous designs that are internally consistent and abstractly correct with respect to their specifications, (c) to implement abstractly correct designs in a way which ensures that the software will execute correctly on the assumption that the components used in implementation actually do what is expected (i.e., are consistent with their specified abstract behavior), (d) to create and/or update virtual abstractions (rules) in design hierarchies to ensure or maintain consistency with terminal solution rules in a design, (e) to convert given programs into a canonical form to which the above apply, (f) making designs more efficient, (g) allowing designers to assemble virtual and/or real components in combination with the above methods at any desired level of abstraction, (g) incorporating the above methods in procedural, event-driven and client-server architectures, (h) accommodating systems of any size, (i) creating library and object resources, (j) creating test cases, (k) deriving designs that implement given solution rules and (l) constructing sets of higher and lower order rules, which collectively account for behavior associated with arbitrarily large problem domains.

In the preferred embodiment, these methods provide automated support for human designers in creating, checking, implementing and modifying specifications and/ or designs that are internally consistent and correct (with respect to each other). Furthermore, while software is the main target of this invention, it should be noted that the methods apply equally to other types of specifications, designs and implementations. For example, the components used to implement a design may involve hardware and/or human operations as well as software.

The methods revealed herein are modeled on cognitive processes and conform to the way people naturally describe "real world" objects and actions on those objects. Cognitive foundations and relationships to the object-oriented paradigm are detailed in Scandura (1996 in press). In this paper, Scandura introduces a cognitive object oriented (OO) approach to software analysis, design and programming based directly on "real world" semantics. Specifically, Scandura shows how this cognitive approach together with existing Flexsys simulation technology: (a) makes it possible to model the "real world" more simply and more fully than the standard OO paradigm, and to dynamically test and debug these models as they are being designed, (b) is a natural successor to OO in the evolution of programming paradigms, (c) can be implemented in $C^{++}$ (and by implication Ada 95) and (d) supports code reuse, including the reuse of legacy code. Scandura refers to this cognitive approach as the Cognitive Object Oriented (COO) paradigm. The invention disclosed herein shows how extension of the COO approach also makes it possible to automate software development and maintenance processes while guaranteeing that software is correct by design.

Several unique characteristics make these intuitive methods suitable for use with large, complex applications. First, the present invention is based on a direct connection between data abstraction and process abstraction. Data and process are hierarchically refined in parallel in constructing both specifications and designs. Data and process are similarly related in working from the bottom-up during maintenance. This close relationship between data and process abstraction dramatically reduces the number of data elements (variables) that must be considered in checking internal consistency at successive levels of process refinement. At a minimum, refinement constraints must ensure syntactic consistency between parent and children elements. Minimal checking also is common in many CASE tools in defining data and/or process. The major difference here is that contemporary CASE tools deal with data and process refinement separately. A close connection is essential in the proposed methods, not only with regard to design but with regard to specifications as well. Introducing refinement constraints further reduces the number of variables. Among other things, these constraints: (a) ensure that refinements are semantically consistent, (b) impose desirable discipline on the designer/programmer, (c) simplify consistency checking, (d) reduce or eliminate possible "side effects" and (e) improve maintainability.

Second, the methods disclosed herein dramatically simplify the task of proving correctness (i.e., proving that a system design and/or program satisfies external specifications). The traditional approach to proving correctness requires that a program produce the specified output value for every set of specified input values.

Key to the disclosed method is the recognition that one does not need to consider individual values of input and output variables in the specifications. It is sufficient to ensure that each refinement in a design hierarchy is logically consistent and abstractly correct with respect to its specification. Moreover, in the design process one need only consider equivalence classes of values. These equivalence classes (herein referred to as abstract values) result from partitioning sets of actual values associated with input and output variables. They are distinguished by the analyst (at successive levels of abstraction in the specification) precisely because they are considered essential in assessing the adequacy of desired behavior.

Rather than proving correctness with respect to individual values of variables, the disclosed methods are based on abstract values. Capitalizing on this concept dramatically reduces the number of input and output values (i.e., abstract values) to be considered in proving correctness. In particular, each specification includes a partition on the values of each input and output variable in that specification. Relationships between specified variables and their children, as well as relationships between input and output variables, are specified in terms of these abstract values. In this case, proving correctness of a program reduces to showing that each refinement in a design hierarchy is correct with respect to the specifications, that each terminal solution rule has been implemented and that each component used to implement a terminal solution rule in the design operates as it should with respect to specifications for that rule. It is only in proving correctness of the implementation components that one must make contact with actual input and output values.

The number of abstract values the analyst introduces is arbitrary, making it possible to distinguish whatever the analyst deems important. In practice, however, we have found that the number of abstract values, which need to be distinguished, is quite small—often only two or three abstract input values and only one abstract output value. This dramatically reduces the complexity of proving correctness of any given refinement. In the preferred embodiment, this is accomplished via simple enumeration. Moreover, because refinement of a design can continue indefinitely, overall proof complexity may be reduced to whatever degree may be desired.

To summarize, hierarchically arranged variables and abstract values of those variables play a central role both in constructing and maintaining specifications and software designs and in proving correctness of those designs with respect to the specifications. Abstract values as well as syntax and types (signatures) also play an important role in implementing designs. In the preferred embodiment, it is possible to construct specifications first (as is the norm), in parallel with constructing a corresponding design hierarchy or even after the design. The last alternative has the effect of formalizing (i.e., detailing or deriving) the behavior that a given design will actually produce.

Third, the methods disclosed herein also make different assumptions as to assumed components. Whereas traditional correctness proofs call for reduction of a software program to a common predetermined set of assumed components (e.g., +, −, *, /), the disclosed methods assumes that virtual components are available as needed in modeling any given application domain.

As noted above, a correct design must satisfy specified relationships between abstract input and output values. Similarly, a refinement is correct just to the extent that its child components satisfy the abstract value relationships associated with the parent. To actually function correctly, of course, one must eventually prove correctness with respect to actual values. Put differently, a component used to implement a terminal rule in a design satisfies that rule if the component generates a (real) value in the specified abstract output value (associated with the terminal rule) for each set of (real) values in the corresponding abstract input values.

In effect, abstract values of terminal rules in a design impose all essential constraints on the actual (real) input-output values of components used to implement that design. It is a much simpler task to prove correctness of small components used in an implementation than it is to prove correctness of the original program. In effect, the methods disclosed herein can be used to reduce the difficulty of formal correctness proofs to whatever degree is desired. Eventually, of course, one must either prove or assume without proof that each component used in the implementation is correct—that the component performs in accordance with its specified abstract behavior.

This relativistic (i.e., domain-specific) concept of correctness is quite different from the standard approach. The former does not require one to "prove", using some predetermined set of "safe" components, that for any given set of inputs a given design or program produces a required result. Because components in a design are virtual (i.e., abstract), one can always assume whatever is needed. At some point, of course, one must necessarily prove (or assume) that the implementation components "work as advertised".

To better understand what is involved, suppose that a, b and c are arbitrary rational numbers and that prog (a, b, c) is a function defined on these variables. More specifically, assume in attempting to prove correctness that we refine prog into a sequence whose components are "+" and "/". We represent this as "(a+b)/c". In this case, we see that "/" is not well defined for c=0. Hence, prog itself is not well defined. From this perspective, the component "/" is not sufficient to ensure that the program does what is intended. To ensure correctness using standard criteria, we would have to build a program (from the given set of allowable components) which explicitly accounts for the possibility that c might be zero.

Alternatively, we can assume that prog must work, that it is well defined for all inputs to the system (e.g., a, b, c) and that it produces whatever behavior is desired. The problem here is not trying to implement the program in terms of a given set of predefined functions (e.g., +, /). Because the program is assumed to work uniformly on all a, b and c in the specifications, correct refinement of the program requires that we find or construct child components that do what the program requires. Minor modification of "/" to handle c=0 would serve this purpose. We might call the component "enhanced divide".

The key to implementation in this case is not finding some way to combine preexisting components to produce the original specifications. Rather, the goal is to identify components that do what the abstract specification requires. Implementing these components, of course, may involve wrapping, combining or modifying whatever components are actually available. Effectively, the method disclosed herein reduces the problem of proving correctness of complex systems to proving correctness of terminal components in the design individually—a much simpler task.

Basic definitions and related commentary on specifications, solution designs and relationships between the two are presented in the following sections. These concepts are essential in understanding the disclosed methods. Given this background, the preferred embodiment is then detailed. This embodiment includes support for: (a) building and modifying specifications and designs with automated support, (b) automatically checking those specifications and designs for consistency and completeness, (c) automatically checking to ensure that designs are correct with respect to their specifications, (d) ensuring that any implementation of a logically consistent and correct design will operate correctly as long as all components used in the implementation satisfy specifications for terminal elements (solution rules) in the design, (e) automatically constructing and/or updating higher level abstractions from internally consistent designs and working programs and (f) converting existing programs into a canonical form to which other embodied methods apply. In addition, the preferred embodiment includes: (g) efficient and systematic guidance throughout the specification, design, implementation, testing and maintenance processes, (h) a simulation environment for executing given designs at arbitrary levels of abstraction, (i) automatic generation of compilable code from designs which have been implemented in terms of executable components, (j) applicability to various software architectures, including procedural, event-driven and client-server and (k) support for creating library and object resources and for aggregating designs in larger systems, (l) a mechanism for deriving designs that implement given solution rules and (m) a process for constructing sets of higher and lower order rules, which collectively account for behavior associated with arbitrarily large problem domains.

It should be emphasized that the disclosed methods can be embodied in any number of forms. Rather than basing all methods on a single canonical form, for example, one alternately could embody these ideas in a (programming) language-specific context.

Although there are any number of equivalent representations, we describe our methods using Flexforms (Scandura & Stone, U.S. Pat. No. 5,262,761). Unlike other methods for representing tree-like designs in windows, this representation has advantages pertaining to refinement in context and the simultaneous display of multiple levels of abstraction.

Each box-like region in a Flexform is called a node or element. In the current embodiment, a Flexform element may have a name field, a type field, a structure field, a role field and a value field. The syntax used is:

[name]{type}structure:[role]value

Design information is put in the value field with the other fields hidden. All fields are commonly used in creating specifications and in other data sections containing support information.

Flexforms are used to both: (a) represent specifications and designs as they are being constructed and (b) represent the methods used to construct, modify and/or prove correctness of specifications and designs. Flexform sections used to implement specifications and designs in the preferred embodiment are illustrated below. FIG. 1 shows specifications for cleaning a room. This specification Flexform includes both INPUT and OUTPUT hierarchies. FIG. 2 shows the top level of a simple design for cleaning the specified rooms. Later, we shall see how such designs can be constructed and modified with automated support while ensuring correctness with respect to their specifications.

The design Flexform includes a design hierarchy section, the top-level node of which contains "clean (: room;)". The ":" and ";" in this node are optional in so far as execution (via the Flexsys Simulator) is concerned. These delimiters do serve a purpose, however, in checking for correctness. Parameters before the ":" serve strictly as input parameters, those after the ":" serve as both input and output parameters, and those after the ";" serve exclusively as output parameters. In this case, "room" serves as both input and output. The above defines the core syntax for what we herein call the High Level Design (HLD) language.

The design Flexform also includes several other sections. These sections contain supplemental information needed to ensure correctness. Most important is the DETAILED SPECIFICATIONS section. This section includes three hierarchies: RULE SPECS, DATA SPECS and EXTERNAL SPECS. EXTERNAL SPECS is simply a local copy of the specifications Flexform, including both its INPUT and OUTPUT hierarchies. DATA SPECS includes all of the specification variables arranged hierarchically, along with complete functional relationships between each parent variable and its children. These variables are arranged according to role in three sub-hierarchies: INPUT, OUTPUT and INTERMEDIATE. The RULE SPECS section provides more detailed information about rules used in the design hierarchy. In the preferred embodiment, this section includes a list of all solution rules in the design (whether virtual, separately elaborated sub-rule or executable implementation component) together with their abstract INPUT-OUTPUT behavior. The DATA SPECS and RULE SPECS sections provide information necessary for proving that each refinement is abstractly correct.

In the current implementation, separate DOMAIN, RANGE and INTERMEDIATE sections also are included for efficiency purposes during simulation. Explicit support in this embodiment is provided for intermediate variables which are pointers (i.e., aliases needed in loops and navigation sequences), and intermediate variables which refer to executables (e.g., callbacks). The latter are referred to as dynamic-parameters. The INCLUDED FILE section lists all referenced Flexforms and is essential in any non-trivial design—that is, whenever the full system includes more than one Flexform (i.e., sub-rule). A separate list of the implementation components is maintained in a GLOBAL section.

Specification Definitions
Definition

A data element or entity is a variable along with a partition on the set of values of that variable. Equivalence classes (i.e., non-overlapping and exhaustive subsets) defined by such a partition are called abstract values.

Data elements may be represented as nodes (elements) in a data Flexform. The name of a variable is put in the name field of the node and its abstract values are listed in the value field.

Definition

A data hierarchy is a hierarchy of data elements in which there may be any finite number of variables at the top and where any other data element may have one or more parents.

Definition

A specification hierarchy is a pair of data hierarchies, one consisting of input variables (INPUT) and the other, of output variables (OUTPUT). Each variable $a_i$ (where i=1, 2, ..., n) in INPUT has a finite set of $n_i$ abstract input values (possibly null, which is equivalent to one abstract value). Each output variable $c_i$ (where I i=1, 2, ..., m) in OUTPUT also has a finite set of abstract output values. In addition, each output variable has a finite set of n-tuples, each of which consists of an abstract output value and the corresponding input values, which map into that output value.

Informally, the abstract values of a variable are elements (i.e., equivalence classes) of a partition defined on values of the variable. Abstract values are equivalence classes of actual inputs and outputs to a system, those that must be distinguished (at corresponding levels of abstraction in a solution design) if the specification is to be unambiguous. In particular, abstract values correspond to solution rule semantics (i.e., what the rules are to do) and to conditions associated with decision points in the design. The purpose of abstract values will become clearer in the examples which follow.

In the preferred embodiment, specification hierarchies are represented in data Flexforms containing INPUT and OUTPUT sections. Each section is the top level of a data or variable hierarchy. Each data element in a data Flexform defines a subtree (of which it is the root). Notice also that a data hierarchy is a data structure, or equivalently an object without any associated operations. Specifications properly refer only to input and output data structures. Data hierarchies may be viewed as resources that can be used (or reused) in building specifications.

Abstract values of INPUT and OUTPUT variables are put in the value field of the respective Flexform elements. In the Flexform embodiment, the n-tuples (alternatively a functional rule) representing the relationship between abstract values of a parent variable and its children variables (parent-children relationship) also are put in the value field of the parent node (see FIG. 1). In addition, each OUTPUT variable contains n-tuples (or rules) representing the input-output behavior associated with that variable. Preferably, a specification hierarchy characterizes desired input-output variables and their abstract values at the highest possible, semantically meaningful levels of abstraction. As noted above, this can dramatically reduce the number of cases of input-output behavior, which must be tested to prove correctness. This functional specification may be extensional (in terms of the n-tuples of abstract values involved) or intentional (in terms of a functional rule partitioned into a finite number of operations, each of which can be verified automatically). FIG. 1 illustrates these ideas using the preferred extensional form.

Definition

A specification hierarchy is complete if an unambiguous functional relationship is specified between each non-terminal variable and its children, every input variable referenced in the input-output specification of each output variable is present in the specification hierarchy, and each input variable is referenced in the input-output specification of some output variable.

For a refinement to be complete there must be a well-defined relationship between abstract values of children variables and abstract values of the parents. In the preferred embodiment, when no abstract values are specified, exactly one abstract value is assumed—namely, the variable itself. This is equivalent to a one-element partition.

Given a complete specification hierarchy, any "slice" in the specification hierarchy (i.e., set of variables in the specification hierarchy used by a design) has the property that the abstract values of all variables higher in the hierarchy can be determined from abstract values of variables in the "slice". Consequently, relationships between parent and children variables in a complete specification make it possible to use related variables interchangeably in designing solutions. The preferred embodiment encourages development of specification hierarchies which are hierarchical and as complete as possible. It also places restrictions on which variables may be used in a design and where (they may be used).

Refining a specification hierarchy introduces one or more children of a terminal element in the INPUT or OUTPUT hierarchy, including abstract values of the children variables. Each child variable in OUTPUT also includes a specification for the input-output mapping from abstract input values (of the corresponding INPUT variables) to abstract output values. In effect, specification includes explicit functional relationships both between previously terminal elements and their children and between their input and output variables. These mappings normally (but need not) include variables having more than one abstract value as also illustrated in FIG. 1.

Although one can refine INPUT and OUTPUT nodes independently, full specification requires that relationships be established between abstract input and output values. In the clean room example (FIG. 1), unpresentable and presentable are the possible abstract values of the variable, room, in INPUT. Presentable is the only acceptable abstract value of room as an output variable. In this case, (unpresentable; presentable) and (presentable; presentable)—where the first element in each pair refers to room as an input and the second to room as the corresponding output—are the corresponding input-output tuples. This input-output behavior is represented in shorthand in FIG. 1 as (*; presentable).

In the refinement we also assume (unmade; made) and (made; made) for the variable "bed" and (dirty; clean), (clean; clean) for "carpet". In this case, the functional relationship between "room" and its children "bed" and "carpet" might be represented extensionally by the set (unmade, dirty; unpresentable), (unmade, clean; unpresentable),
(made, dirty; unpresentable), (made, clean; presentable)

FIG. 1 uses the following shorthand representation:

(unmade, *; unpresentable), (*, dirty; unpresentable), (made, clean; presentable)

Definition

A refinement is consistent if and only if the refinement is complete and, for each parent OUTPUT variable, the abstract input-output relationships are equivalent to those specified by its children. Put differently, starting from abstract values of the children input variables, one generates the same parent outputs via both the top path (via the parent inputs) and the bottom path (via children outputs). Notice that consistency of a specification refinement is meaningful only when the refinement is complete. Parent-child relationships (based on refinement types) and single abstract values are assumed in the preferred embodiment where abstract values are otherwise unspecified. Consequently, specification consistency can always be checked.

All specification refinements in FIG. 1 are consistent in this sense.

Definition

A specification hierarchy is consistent if and only if every refinement in the specification hierarchy is consistent.

Making consistency (and design correctness) checking feasible requires keeping the numbers of input and output variables in the specification and their abstract values to a minimum at each level of refinement. The introduction of abstract values dramatically reduces the numbers of abstract values to be considered, thereby reducing proof complexity to simple enumeration (of possibilities). The use of abstraction hierarchies simplifies the situation even further. The behavior associated with room, for example, is easier to check for correctness than collectively to check correctness of the behavior associated with its children variables, bed and carpet. Irrespective of whether real or abstract values are considered, it makes a big difference whether correctness is checked at each level of refinement or after a design has been fully elaborated. If one were to wait until a design has been completed, then the number of instances of input-output behavior would increase exponentially with complexity. Where checking is done refinement by refinement, the number goes up only additively (cf. Scandura, 1992, p. 91).

There is more to specification refinement than just refining variables into a given number of components. It is clear in the clean room example how the variable room is refined. It may not be so immediately obvious, however, how this is accomplished with the variable carpet. Different carpets may be divided into different numbers of segments. More complete specification can be accomplished in this case by introducing a prototype child variable of carpet, which refers to a class of seg variables—all of which share a common structure. current_rug serves this role in FIG. 1. The preferred embodiment distinguishes prototype refinements in which the prototype refers to a fixed number of elements in a set of components (one in the preferred embodiment), rather than to an arbitrary number of elements (in a set). As we shall see in the following sections on design, this special case corresponds to what we call a navigation sequence.

More generally, specification variables may be classified as to type. In the preferred embodiment, there are two basic kinds of hierarchical refinement: aggregation, or what we shall call component refinement, and specialization or category refinement. The kind of refinement is put in the structure field of the parent element in a specification Flexform. Component refinements define what are sometimes called "is part of" relationships. (Category refinements are sometimes called "is a" relationships. We discuss category refinements below.)

Component refinements are analogous to record types where the children correspond to fields of the record. As we shall see, component refinements correspond to parallel refinements in designs. Prototype refinements constitute an important subtype. Prototype refinements correspond to linked lists or arrays where one child element represents an arbitrary but finite set of child elements, each having an identical structure or defined type. (Structures and defined types are represented in the preferred embodiment as subtrees). As we shall see, prototype refinements correspond to loops. Prototype children correspond to aliases (intermediate variables) needed in loop refinements.

In the above, we have ignored the internal structure of variables. They have been defined as equivalence classes of (actual) values but nothing more. To more fully reflect specific intent it is frequently necessary to say more about the internal structure of the specified variables.

Extract refinements, for example, correspond to what are commonly called attributes and relationships or equivalent dynamic operations. They are used to represent abstract values of a parent more precisely, specifically where the parent's abstract values are represented in terms of relationships or equivalent dynamic operations between variables. The variables are attributes of the parent and are represented in the preferred embodiment as children (in the refinement). Above, recall that (bed) room was refined into bed and carpet components. In that case, a room being presentable involved beds being made and carpets, cleaned. The abstract values of bed and carpet could vary independently of one another. Moreover, the abstract values of (bed) room were defined in terms of the abstract values of bed and carpet.

The situation in extract refinements is quite different. Here, the abstract values associated with the children serve to elaborate (make more explicit) abstract values of the parent by expressing those abstract values in terms of relationships between the child variables. In particular, (bed) room being presentable or unpresentable also could be expressed via an extract refinement in which the abstract values presentable and unpresentable are represented as a relation between two attributes, which also could be called "bed" and "carpet". This relation distinguishes those bed, carpet pairs in which bed is made and carpet, cleaned from all other combinations of values. This example shows that similar ideas can be specified in more than one way but may appear somewhat strained because the abstract values of beds and carpets in the real world can vary independently.

Abstract values are not always independent. Suppose, for example, we wish to distinguish between rooms that are rectangular (in shape) and rooms that are non-rectangular. Being rectangular assumes a particular relationship between the child variables walls, floor and ceiling. As before, rectangular and non-rectangular can be represented more precisely in terms of equivalence classes, this time in terms of triples of values of the child variables walls, floor and ceiling. However, one cannot assign abstract values to the child variables (e.g., walls, floor) individually. Rather, the abstract values of walls, for example, necessarily reference floor and ceiling.

For a room to be rectangular, the walls, ceiling and floor must be perpendicular to one another. One cannot partition these children variables independently of one another (as is the case with bed and carpet) and expect to express rectangular and non-rectangular in terms of the children's abstract values. It is the relationship that counts, not combinations of the abstract values themselves.

The children variables in extract refinements are not input or output variables of the system specification. Instead, they represent a "down payment" on the design. These variables (e.g., walls, floor and ceiling) are outputs associated with child solution rules introduced in a sequence refinement in the design. Initial child solution rules generate abstract values of children variables (in the extract specification) from abstract values of the parent (e.g., room). Others map these child abstract values into abstract values of the output variables, which correspond to those in the parent outputs. In effect, child solution rules in the refinement elaborate (make more concrete) the parent's behavior: Extract refinements more fully reflect the analyst's intent for the design. (As we shall see, extract refinements also simplify associated correctness proofs.) Because the number of relationships associated with the children variables is identical to the number of abstract values of the parent, this is the only condition required for completeness.

Relationships in extract refinement may be represented as equivalence classes of n-tuples of values of the child variables, as functional relationships or as any number of other kinds of mathematical expressions. In the preferred embodiment the functional relationships are inserted under the parent-child relationships in parent. This is strictly arbitrary. They could just as easily be added to the first child, put in a special "relation" child or in any number of other equivalent ways.

Input-output relationships also can represented more precisely in terms of functional relationships. See the extraction refinement of kitchen in FIG. 1A for an example. Notice that the output *; neat in the designated input-output relationship associated with kitchen can be represented more precisely as *; and (shiny, clean). Similarly, the two inputs represented by * also can be represented in terms of functional relationships (i.e., those under PARENT-CHILD RELATIONSHIPS).

The children in extract refinements are not hierarchically related to parent elements. Rather than defining abstract values of the parents in terms of the children's abstract values, we do the reverse. Nonetheless, extract refinements, as with all specification refinements reduce the complexity of the components (i.e., solution rules) used in the corresponding design.

Extract refinements are introduced where the analyst wishes to more precisely specify design logic. Given an extract refinement, the designer must introduce one or more operations to extract information from otherwise abstract variables (e.g., information about walls, ceilings and floors from "room"). More specifically, the children in extract refinements correspond in designs to intermediate variables produced by solution rules operating on the parent variables. Thus, the design must include computation of intermediate variables (corresponding to the specified children). In this sense, the children in extract refinements supplement specifications but, strictly speaking, are not input or output variables as such.

Consider another example of an extract refinement, this one derived from the design of the preferred embodiment itself (also referred to as the AutoBuilder). The variable in question is "refinement." A key distinction in this case is between input-output refinements, which are consistent, and those, which are inconsistent. That is, "consistent" and "inconsistent" are the abstract values. The question is how to determine consistency? Other than assigning the decision to some omniscient oracle, accomplishing this requires specifying "refinement" in more detail. Talking about consistency of a refinement requires specifying such things as top-paths, bottom-paths, parents, children, parent-child relationships and input-output relationships.

A refinement is consistent, for example, if the output of the top_path is equal to the output of the bottom_path. This helps but it raises questions about top_path and bottom_path. More precise specification requires further (extract) refinement, refining top and bottom paths into parent and children inputs and outputs. In the former case, consistency of a refinement depends on the top and bottom paths producing the same result. In the latter more precise case, consistency depends on starting from the children input and getting the same parent output, irrespective of whether the parent input (top_path) or the children output (bottom_path) is determined first.

This example illustrates how extract refinements may be repeated, resulting in successively more precise specifications. Ultimately, a given refinement will be consistent if and only if the value of the parent output determined by top path is the same as that determined by bottom path. Irrespective of the output value associated with top-path, the output value associated with bottom-path must be the same. Top-path and bottom-path must produce the same result. "Same" in this case represents the "consistent" equivalence class; "not same" represents "inconsistent."

As we shall see in the following sections, extract refinements reduce the complexity of corresponding design operations. In general, it is easier to prove correctness of child operations in a design than it is for their parents (child operations are less comprehensive in scope). (This is an essential characteristic of all design refinements, which as we shall see reduces the difficulty of proving correctness to whatever degree may be desired.) In the above examples, for instance, it would be harder to define and verify an operation for making a room rectangular than it would to define and verify operations that work directly on walls, ceilings and floors (and their relationships). Similarly, it is far easier to determine whether values of the parent output variable determined by top path and bottom path, respectively, are the same than it is to determine whether an abstract refinement is consistent.

In category refinements the child elements are subtypes of the parent type. In this case a value of any sub-category is a value of the category itself, and vice versa. Similarly, although different names may be used, abstract values of parents and children in category refinements must be in one-to-one correspondence. Given the abstract values of a parent is sufficient for determining abstract values of each child sub-category.

Category relationships can be represented in two basic ways, one to specify procedural logic in the corresponding design and the other to specify object oriented logic. In particular, we shall see in the section on Specification-Design Relationships that the way a category refinement is represented determines whether a selection is to be used (procedural design logic) or inheritance (object-oriented design logic). Procedural designs are indicated when the parent and children elements in a category refinement consist of atomic (i.e., elementary indivisible) variables. The selection alternatives correspond to the different sub-categories specified for that variable. Object-oriented designs are indicated when one or more variables in the category refinement are themselves elaborated as component structures. As we shall see in the section on design, operations on these data structures eliminate the need for procedural refinement in the designs (the needed structure is absorbed in objects).

In specifying a system's behavior the hierarchies of category refinements (that include component structures) correspond to inheritance hierarchies (of types/data structures) in object-oriented designs. In particular, child data structures in inheritance hierarchies are specializations or categories of their parents. Category variables similarly include superordinate data structures supplemented with additional structure of their own. Category variables (also called objects) have types, which correspond to what are called objects in OO design. In the preferred typeless embodiment, the type of a variable is represented directly by the subtree (of variables) of which that variable is the root. (In OO designs, objects correspond to class hierarchies containing operations.) A room, for example, may consist of a floor, a ceiling and walls. Bedrooms have these components plus beds and possibly other components. Similarly, kitchens include stoves, dishes, refrigerators, etc. By analogy to inheritance, it is clear that subordinate data structures (categories) simply elaborate the data structures they inherit. (Multiple inheritance from two or more data structures may be allowed but can always be avoided by introducing a superordinate data structure, which includes the former ones. Moreover, as we shall see in the section on OO design, the preferred embodiment introduces the notion of affiliate operations. Affiliate operations introduce true type independence. Objects, for example, are not restricted to pre-specified categories. Objects may contain arbitrary combinations of components in sub-categories.)

In the preferred embodiment, objects (hierarchies of components) that specialize given data objects are called category, or specialization refinements. Category refinements are needed where the analyst wants to distinguish specializations (e.g., kitchen, bedroom) of a given data structure (i.e., room). The children variables in category refinements contain the data structures that specialize the parents. These specializations ma y be elaborated separately or represented in a number of other ways.

FIG. 1A shows a specification containing category refinements. The elementary (atomic) room variable serves as both input and output and has two categories, kitchen and bedroom. Bedroom also is atomic but kitchen further specifies an extraction refinement (indicating that the design must extract the status of stove and dishes from kitchen before determining the abstract value of kitchen). In FIG. 1A, for example, the two abstract values of kitchen are determined by two functional relations defined on abstract values of the children stove and dishes (e.g., or (greasy, dirty)). Clearly, determining the status (abstract values) of stove and dishes is a more concrete, and hence more easily formalized notion, than is determining the status of kitchen.

FIG. 1B shows how data structures (categories) representing non-atomic variables in category refinements are represented in the preferred embodiment. The room 1B.category Flexform represents a room category containing walls, a ceiling and a floor. This category Flexform also references kitchen (kitchen1C.category) and bedroom (bedroom.category) subcategories. The kitchen1C.category Flexform, for example, represents the specialized portion of the data structure needed to characterize kitchens. Clearly, kitchen data structures contain all components of room structures as well as their own.

In the preferred embodiment category hierarchies also can be represented in an integrated tree-view. Notice in FIG. 1D that the room 1b and kitchen 1C categories are displayed in bold type indicating that they are in separate Flexforms. Such relationships clearly can be represented in any number of other ways as well.

It also is obvious to anyone skilled in the art that data structures (types) representing categories may be defined once and reused as resources in specifying behavior. Abstract values, parent-child and input output relationships must be specified, of course, when data structures are reused in specifying behavior. Until then, only the data structures themselves and specializations thereof can be specified.

Specifying hierarchies of categories (including their subcategories) corresponds to constructing class hierarchies in designs. Indeed, classes and subclasses can easily be derived from category specifications by adding a DESIGN (or historically an INCLUDED FILE) section (see next section) that contains designs (and optionally a SPECIFICATION section containing corresponding specifications) associated with class data structures.

Category hierarchies are analogous to OO in other ways. A kitchen data structure, based on the category hierarchy represented in FIGS. 1B and 1C, for example, would include the data structure in the room category (walls, ceiling and floor) supplemented with the structure associated with the kitchen category (stove, dishes). Clearly, the kitchen data structure is an instance of the room category hierarchy, and so would be a bedroom structure. But what about hybrid rooms containing some (but not all) characteristics of both kitchens and bedrooms? Restricting specifications to a priori data structures, or simply lumping them together with generic rooms (ignoring their unique characteristics), runs counter to real world semantics. "Room" means any kind of room, including all distinguished specialized components that it may contain.

Accordingly, the preferred embodiment is not restricted to any pre-declared set of subtypes. Just as variables of a given type can have arbitrary values, category hierarchies correspond to variables whose values are arbitrary types composed of components in the hierarchy. In particular, instances of a category hierarchy in a truly type-less environment need not be restricted to predefined sub-types. Any combination of specialized characteristics (e.g., stove alone, or stove and bed where bedrooms contain beds) would be allowed. In the design section (below), this idea of unrestricted subtypes is extended to inheritance hierarchies (and to objects associated with the latter). This is accomplished by introducing what are called affiliate operations in category hierarchies.

To summarize, category data structures and their subcategories can be represented directly by refining variables in context, or by creating separate files. In the preferred implementation, the user is given the choice of either refining a Flexform, or of creating a new one (with links to the original).

Whereas abstract values partition (actual) values of given variables, category refinements partition category hierarchies according to data type. In standard OO methods, each subcategory in the partition represents a distinct type (equivalence class), a composite of hierarchically arranged component data structures in the category hierarchy. Every composite includes the data structures associated with every category to which the specified subcategory belongs (including the top-level data structure). The defined substructure-superstructure specification corresponds to inheritance in object-oriented design. This idea is extended in the preferred embodiment to include all combinations of components in a category hierarchy. Thus, in addition to kitchen and bedroom sub-categories (of room), one can speak of "hybrid" rooms as well. One such hybrid, for example, might contain a bed and a sink. Allowance for hybrid objects of this sort is made possible by the introduction of affiliate operations in the section on OO designs.

Hierarchically arranged categories are resources used in specifying behavior. In specifying behavior, it is important to distinguish between component data structures and category data structures. Abstract values associated with parent variables in component refinements are determined by abstract values of the children. Abstract values associated with children variables in category refinements are defined in terms of the abstract values of the parents. Put differently, abstract values associated with categories in a category refinement are not independent of those used in specifying behavior associated with the parents.

Returning to our room example, we might want to distinguish kitchens and bedrooms (two categories of room). Any specific instance of a room can either be generic (i.e., an undifferentiated room, perhaps characterized by walls, ceiling and floor), or take the form of exactly one of the specified (child) categories (i.e., kitchens or bedrooms). Irrespective of room type, a room can be unpresentable or presentable. What makes a particular room presentable or unpresentable, of course, depends in part on the structure of the room. For example, we may only be interested in behavior common to all rooms (e.g., clean walls). More detail is needed, however, to clean components unique to kitchens and bedrooms.

In order to talk about kitchen, for example, our characterization of a room must be elaborated to include information about stoves, refrigerators, etc. Cleaning a bedroom requires information about beds. In effect, kitchens and bedrooms include all of the structure common to rooms plus some additional characteristics of their own. It is clear from this perspective that behavior associated with category refinements in specifications can be satisfied by OO designs based on inheritance. These ideas are extended in the preferred embodiment to include hybrid sub-categories.

We shall see below that the type of specification refinement has direct implications for determining the corresponding design refinement. Among other things, category refinements in specifications can be implemented in either procedural or object oriented designs. The former requires selection or case refinements. The latter require object inheritance.

It also is important to note that specifications have a direct relationship to, and indeed formalize, what in structural (cognitive task) analysis (e.g., Scandura, 1982, 1984a) are called problems. As we shall see below, problems play an important role in the disclosed methods for implementing designs.

Definition

A problem is a specification in which the input variables have been initialized and are called GIVENs. The problem is to find the correct value of the output or GOAL variables. The goal of a problem is to find or generate values of the GOAL variables, which correspond to the initial values of the GIVEN variables.

Definition

A higher order specification is a specification in which the values of one or more output variables are themselves specifications.

Definition

A higher order problem is a higher order specification in which the input (GIVEN) variables have been initialized (and the outputs renamed to GOAL).

In the preferred embodiment, the goal of a prototypic higher order problem is to derive an executable design that implements a given solution rule. The solution rule is a value of the GIVEN and to-be-derived executable designs are values of the GOAL variables. In particular, the solution of such a problem would consist of an executable design whose specification matches the given to-be-implemented solution rule. As in other specifications, solution rule inputs and acceptable solution designs may be partitioned into equivalence classes (abstract specifications). As we shall see below, higher order problems play an essential role both in structural analysis and in implementing designs.

Design Definitions

Designs are behavioral models or solution processes that normally are assumed to satisfy given specifications. In this section we consider logical or internal consistency of designs independently of specifications. Such designs may be viewed as if they are based on informal specifications available only to the designer. In the next section we explicitly consider relationships between specifications and corresponding designs.

In the preferred implementation, designs are represented in what we call the High Level Design (HLD) language. Statements in the HLD language are called solution rules and have a very simple but expressive syntax.

Definition

A solution rule is a statement of the form f (a: b; c) where a ($=a_1, a_2, \ldots, a_n$), b ($=b_1, b_2, \ldots, b_m$) and c ($=c_1, c_2, \ldots, c_p$) are mutually exclusive ordered sets of variables. Variables in set a are INPUT to the rule, in b INPUT and OUTPUT to the rule and in c only OUTPUT to the rule. The variables in a and b collectively correspond to INPUT variables in the solution rule's specifications and the variables in b and c to the OUTPUT variables. We shall say more about the relationships between specifications and designs in the next section.

The top level of all sections included in the clean room design Flexform, together with the design hierarchy itself, is shown in FIG. 2. In the preferred embodiment, the designer need only attend to the main design section, the one whose root contains "clean (: room;)". The collapsed sections provide support information used to ensure that the design hierarchy is internally consistent and correct with respect to the specifications. The DETAILED SPECIFICATIONS section is derived from both the original or external specifications and from the design process itself. The EXTERNAL SPECS section is a direct copy of the original specifications. In the preferred embodiment, the RULE SPECS section is a list of the virtual, subdesign and atomic solution rules contained in the design hierarchy. (This list could be arranged hierarchically as well. Each type of representation has both advantages and disadvantages as regards efficiency.) It contains input-output specifications for each solution rule used in the design. Each such rule specification has its own INPUT and OUTPUT sections. The RULE SPECS section for the clean room example is elaborated in FIG. 2A. The rules in this section may be arranged hierarchically. In the preferred embodiment, however, a simple list is used for easier maintenance. The DATA SPECS section contains a hierarchy of variables used in RULE SPECS, together with their abstract values and parent-child relationships. These DATA SPECS variables are categorized according to whether they are INPUT, OUTPUT, both INPUT and OUTPUT or INTERMEDIATE. The DATA SPECS section for clean room is elaborated in FIG. 2B.

The INCLUDED FILE section contains a list of the names and file names of separate Flexform files in which sub-specifications and sub-designs are elaborated (see FIG. 2C). GLOBAL contains a list of precompiled atomic solution rules and any previously referenced sub-designs (see FIG. 2C). What is atomic, of course, will vary according to the application. Sample atomic (and executable) rules are given in Table 1. The list of atomic rules in any practical embodiment must be extensible.

In the preferred embodiment, DOMAIN and RANGE sections are derived automatically from the DATA SPECS. DOMAIN and RANGE sections, respectively, contain formal parameters (for the design) corresponding to INPUT and OUTPUT variables in DATA SPECS. Notice that variables, which are both INPUT and OUTPUT (in FIG. 2B), are included only in the RANGE. DOMAIN and RANGE variables (FIG. 2C) may contain default initial values. The INTERMEDIATE section contains a hierarchy of local variables, which are introduced in the design process.

Table 1

Sample Atomic Semantic "Glue" Components

Sample Navigation Components:
   match_structure (structure_root, structure$_{13}$pattern)
   find_next_element (structure_root, , traversal_type: start_element, start_parent;)
Sample Modification Component:
   replace_field (field, replacement: element;)
Sample Manipulation Components:
   duplicate_structure (structure_root: target_element;)
   embed_structure (structure_type: structure_root, structure_parent;)

In FIG. 2 the top levels of the clean design are a virtual rules.

Definition

A solution rule is virtual until it has either been elaborated as a separate subdesign (exposing more of its inherent semantics), or implemented in terms of an atomic (separately compiled) semantic component.

In addition to automating key aspects of the design process and guaranteeing correctness, the preferred embodiment includes support for dynamic execution of virtual designs as well as designs which have been implemented (e.g., run interpretively via the Flexsys Simulator). In this context, solution rules (and designs) operate on data called PROBLEMs. A sample PROBLEM (input data) corresponding to the clean-room example, including GIVENS and GOALS, is shown in FIG. 3. Notice that carpet in this case has exactly three segments (rug1, rug2, and rug3). This represents an instantiation of the prototype variable current_rug under the SPECIFICATIONS INPUT. In effect, the initialization involves both a concrete number of variables corresponding to the prototype and their initial values. In the current embodiment, DOMAIN and RANGE variables and their initial values often serve to define a default problem.

In the expanded DATA SPECS section of FIG. 2B, notice that the OUTPUT variable room is cloned with (identical to) room in the INPUT (which is fully expanded). This is indicated by the "@" symbol on the left side of the room element. Also notice in FIG. 2C that all formal parameters are under RANGE because room belongs to both the INPUT and OUTPUT sections of DATA SPECS. The relevance of these sections will become more apparent in the following sections. Here, we emphasize design issues. The two basic ingredients of all designs are solution rules and conditions.

Definition

A condition is a variable v with a finite set of abstract values.

Initially, any design can be specified in terms of a single solution rule at the highest possible level of abstraction (e.g., the solution rule clean (: room;) at the top level of the design section in FIG. 2). This sample solution rule has only one parameter, the INPUT and OUTPUT parameter room. After elaboration, a design may include any number of solution rules and conditions. The following definitions pertain to refinements of solution rules and the design hierarchies of which they are a part.

Definition

A refinement of a solution rule is said to be consistent if and only if the refinement consists of a finite set of conditions and solution rules (children of the solution rule) which satisfy certain syntactic constraints relative to the parent.

Specific constraints are specified below for commonly used structured refinements and useful variations on such refinements.

Assuming each solution rule does what is expected (i.e., correctly map input values to corresponding outputs), these constraints at a minimum must ensure that the behavior of the children will be the same, or equivalent, to that of the parent. This is made explicit in the following.

Definition

A refinement of a solution rule is internally consistent and correct if and only if the refinement performs the same function (i.e., produces the same results) as the original solution rule.

This means that for every set of input values to the parent, the refinement must produce the same output as does the parent. In general, the numbers of inputs and outputs in even the simplest of cases is indefinitely large making it totally impractical to check correctness in an automatic fashion.

Definition

A refinement of a condition variable is a function c(w) defined on variables w any of which, in turn, may be defined in terms of functions. In the present context, a condition is a finite valued (abstract) variable or a finite valued function defined on such variables. In the latter case, the condition variable is defined in terms of data execution. The function returns the value of the variable. Although the preferred embodiment uses functions, it is apparent that operations also could be used, as is common practice in many programming languages.

Data execution involves dynamically defining a variable by attaching to it a function defined on other variables. The function defines the variable by returning either a value or a pointer to another variable.

Variable refinements are referred to as "data execution" because the values and/or the variables themselves are determined dynamically during run time in the current implementation, which includes a design interpreter (Flexsys Simulator). In the preferred embodiment, data execution is implemented by attaching functions to INTERMEDIATE variables in a design. The variable "done" in FIG. 2 illustrates data execution.

Definition

A design is the set of solution rules and conditions resulting from some finite number of successive refinements of solution rules (and conditions), including zero refinements.

The RULE SPECS section for the clean room example is shown in FIG. 2A.

Definition

A refinement of a design is a design in which one of its constituent solution rules or conditions has been refined.

Definition

A design hierarchy is a hierarchy of design refinements. A design may be thought of as a "slice" through a design hierarchy. Any given design covers its design hierarchy in the sense that all of the terminal elements in each subtree defined by a solution rule of a design hierarchy are either in the design or in a subtree defined by a solution rule in the design.

It is possible to construct a design hierarchy without requiring that virtual solution rules have a particular form or syntax. The contents of higher level elements in the hierarchy can range from simple descriptions in a natural language or in an alternative syntax to no description at all.

It is desirable to impose restrictions on refinements to facilitate design construction, to improve understandability, to ensure maintainability and to guarantee design correctness relative to its specifications. The question is what kinds of restrictions have the desired effects? In general, syntactic constraints can help ensure internal consistency of a refinement—that each type of refinement satisfies reasonable constraints, and that names are used consistently.

In this section, we consider internal consistency. Enforcing name consistency with respect to specifications clearly serves a useful purpose as well. As we shall in the next section, semantic constraints go further and are used to ensure that designs are correct (i.e., that a design produces the expected outputs for each possible set of inputs in the specifications). The complexity of proving correctness is dramatically reduced by partitioning actual input and output values into abstract values (i.e., equivalence classes identified as essential). Correctness in this context is referred to as abstract correctness. As we shall see below, ensuring internal consistency is equivalent to ensuring abstract correctness of a design because abstract parameter values are determined implicitly by the outputs of decision conditions used in the design. When a variable does not enter into such a condition, the default number of abstract values is one. Enforcing name consistency with respect to specifications further ensures abstract correctness of the design with respect to its specification. The refinement constraints described below are those implemented in the current implementation. They are designed to ensure parameter (signature) matching, or what we call syntactic consistency. These constraints also are designed to facilitate maintainability by eliminating "side effects" due to sequencing and indirect referencing (pointers). Clearly, these constraints may easily be modified to accommodate different preferences. The key is to enforce desirable standards and disallow inconsistencies without unduly restricting common programming practices.

Properly designed constraints have another benefit as well. When reasonable design (or coding) standards are maintained, an HLD design (consisting of solution rules) implicitly defines both the structure of the design hierarchy of which it is a part and the virtual solution rules in that hierarchy.

Definition

An implicit design hierarchy associated with a given design refers to the structure of (the levels and kinds of refinements in) the design hierarchy—apart from the contents of the non-terminal levels in that hierarchy.

Established reverse engineering procedures (e.g., Scandura, 1992, 1994) can be used to automatically construct the refinement hierarchy implicit in legacy code written in essentially any structured programming language (e.g., Pascal, C, C++, Ada, FORTRAN, COBOL, etc.). FIG. 13A shows a simple FORTRAN subroutine and FIG. 13B shows the corresponding implicit hierarchy represented in a Flexform. The empty regions with a distinctive border (i.e., dotted lines) represent higher levels in the hierarchy and may optionally contain documentation or other information.

It is more difficult to infer what we have called higher level virtual rules from such code due to the wide variety of supplemental constructs and complex features in most such languages. Inferring virtual abstractions is greatly simplified when a design or program is written in or converted to an easily analyzed (e.g., HLD) language. FIG. 13C shows an HLD hierarchy corresponding to the FORTRAN Flexform in FIG. 13B. The HLD has the flexibility needed to express essential ideas (at any level of abstraction) without peripheral detail (like how things are implemented in computer memory). In this context, one can more readily formulate refinement constraints which enable the automatic construction of both: (a) child elements from parents in a refinement and (b) abstract, virtual parent elements (e.g., virtual solution rules) from the children. In either case, of course, it may be desirable to modify names and/or to make optional changes to parameters which better reflect the designer's semantic intent.

The preferred embodiment is based on the constraints defined below. These constraints have been designed to achieve the above ends. It will be clear to anyone skilled in the art that many variations on these constraints are possible.

Definition

A refinement of a solution rule is either a sequence, selection, case, until, while or terminal refinement. In addition, the preferred embodiment distinguishes two special variants of sequence refinements: navigation sequence and parallel.

Many of these refinements are illustrated in FIG. 2. PARALLEL refinement of clean (: room,) yields make (: bed;) and vacuum (: carpeting,). In the preferred embodiment, every loop refinement is represented in terms of a condition and a loop body. The elaborated UNTIL refinement of vacuum combine two refinements. The loop body is a NAVIGATION SEQUENCE consisting of two solution rules—one advancing to the next element and the next performing the desired action on that next element. Next, the action rule vacuum (: current_rug;)

is refined into a CASE SELECTION followed by refinement of the first alternative into a SEQUENCE. The loop condition done is an intermediate variable, which is, defined by the function same (next_element (carpeting, current_rug)). The case selection variable current_rug has three abstract values two of which serve as case selectors, in particular "messy_dirty", "dirty" and "clean" (see FIG. 2B). The third value "clean" is not changed and that case alternative is eliminated. Also notice that all of the virtual (non-terminal) solution rules (e.g., clean, vacuum) are listed under RULE SPECS (FIG. 2A). The terminal rules are divided between INCLUDED FILE and GLOBAL. The former includes those rules which may be elaborated as sub-designs (and sub-specifications) (e.g., make, pickup). The latter includes those rules corresponding to available semantic components (e.g., =, next_element, match). Any solution rule, of course, can be implemented and thereby made executable—in which case it is atomic.

Definition

A terminal operation f (a: b; c) in which a contains an embedded function g (d) is consistent if and only if every variable in d is either in a or in b. (Notice that a variable in d, which acts as both input and output functionally, belongs to b. To improve maintainability, the preferred embodiment disallows embedded functions in b and c.)

Definition

A sequence refinement of f (a: b; c) containing n operations $f_1$ ($a_1$: $b_1$; $c_1$), $f_2$ ($a_2$: $b_2$; $c_2$), . . . , $f_n$ ($a_n$: $b_n$; $c_n$) is minimally consistent if and only if (1) Every input variable of a child must be: a) an input or input-output variable of the parent, b) a child of an input or input-output variable of a parent variable, or c) the output variable of a previous child.
Formally: $\forall i=1, \ldots ,n$: $a_i \subset ((a \cup b) \cup \cup_{j<i} c_j)$ (2) Every input-output variable of a child must be: a) an input-output variable of the parent, b) a child of an input-output variable of a parent variable, or c) an output variable of a previous child.
Formally: $\forall i=1, \ldots ,n$: $b_i \subset (b \cup \cup_{j<i} c_j)$ (3) Every output variable of a child must be: a) an input-output or output variable of the parent, b) a child of an input-output or output variable of a parent variable, or c) an input or input-output to a following child but not an output for any later child.
Formally: $\forall i=1, \ldots ,n$: $c_i \subset (b \cup c) \cup \cup_{j>i}(a_j - \cup_{j<k>n}(b_k \cup c_k))$ (4) No input variable or child of an input variable of the parent is a child's output variable.
Formally: $\forall i=1, \ldots ,n$: $a \cap c_i = \emptyset$ (5) If a variable is: a) in a child's output and an input-output to the parent, b) a child of an input-output variable of a parent, or c) in the output of a previous child, then it must be input to a previous child but not an input-output or output of any child in between. Alternatively, for each child of a sequence refinement, no input variable or child of an input variable of the parent and no output variable of a previous child can be output to the child, unless d) it has been input to a (another) previous child and e) not input-output or output since then. For every child output variable which is input to the parent or output to a previous child, this rule ensures that the initial value of that output variable is actually used.
Formally: $\forall i=1, \ldots ,n$: $c_i \cap (b \cup (\cup_{j<i} c_j)) \subset \cup_{j<i}(a_j - \cup_{j<k<i}(b_k \cup c_k))$ (6) Every variable of parent's input or at least one child of a parent's input variable is used as input in at least one child.
Formally: $a \subset \cup_{i=1, \ldots ,n} a_i$ (7) Every input-output variable or at least one child of the input-output variable is changed at least once.
Formally: $b \subset \cup_{i=1, \ldots ,n}(b_i \cup c_i)$ (8) Each parent output variable, or all of its child variables, is changed at least once.
Formally: $c \subset \cup_{i=1, \ldots ,n} c_i$

EXAMPLES

To better understand the definition for consistency of a sequence refinement, consider the following examples. The following sequence refinement is consistent.

clean (soap[1]: water[2], room; trashcan[3])
   pickup (:room; garbage[4])
   dump (garbage[5]:; trashcan[6])
   mix (soap[7]: water[8])
   mop (:water[9], room)

The following examples invalidate one or more of the above consistency requirements.

The following numbers correspond to the above consistency rules.

(1a) Adding oil as an input parameter to mix (soap[7]: water[8]) makes the refinement inconsistent because oil is neither in the input of the parent, nor an output of a previous child.
(oil ∉ {soap, water, room} ∪ {garbage} ∪ {trashcan})

(1b) If garbage[1] is omitted as an output of pickup (first child), then garbage[5] (input to dump—second child) is neither in the input of the parent, nor in the output of a previous child (where it used to be).
(garbage ∉ {soap, water, room})

(2) If oil is added as input-output to mix (soap[7]: water[8]), then oil is neither in the input-output of the parent nor in the output of a previous child.
(oil ∉ {water, room} ∪ {garbage} ∪ {trashcan})

(3a) If foam is added as output of mix (soap[7]: water[8]), then foam is neither in the output of the parent nor in the input of a subsequent child (and not output thereafter).
(foam ∉ {water, room, trashcan} ∪ {})

(3b) If garbage[5] is omitted as input to dump (garbage[5]: ; trashcan[6]), then garbage[4] (output to pickup) is neither in the output of the parent nor in the input of a subsequent child (where it used to be).
(garbage ∉ {soap, water, room} ∪ {trashcan} ∪ {soap})

(4) If soap is added as output of pickup (:room; garbage$^4$), then soap is just input to clean (parent), but output of (and therefore changed by) pickup.
  ({soap}∩{garbage, soap}≠∅)
(5) If water$^8$ is moved from the input-output of mix (soap$^7$: water$^8$) to the output, then the initial value of water is ignored (it is input to the parent but not to any of the previous children).
  ({water}∩({water, room}∪{garbage}∪{trashcan}) ⊄ ({room}-{trashcan})∪{garbage})
(6) No new input (e.g., xxx) to the parent clean would be input to any of the existing children.
  (xxx∉{garbage}∪{soap})
(7) No new input-output (e.g., xxx) to the parent clean would be input-output to any of the existing children.
  (xxx∉{room}∪{garbage}∪{trashcan}∪{water}∪{water, room})
(8) No new output to the parent clean would be output by any of the existing children.
  (cat∉{garbage}∪{trashcan})

Definition

A sequence refinement $f_1$ ($a_1$: $b_1$; $c_1$), $f_2$ ($a_2$: $b_2$; $c_2$), ..., $f_n$ ($a_n$: $b_n$; $c_n$) of f (a: b; c) is maximally consistent if and only if (1) All input variables of the parent must be input variables of the first child and input to the first child must be an input or input-output variable of the parent.
  Formally: $a \subset a_1 \subset a \cup b$
(2) All input-output variables of the first child are input-output variables of the parent and all input-output variables of the parent are input or input-output to the first child.
  Formally: $b_1 \subset b \subset a_1 \cup b_1$
(3) The output of the last child is the output of the parent.
  Formally: $b_n \cup c_n = b \cup c$
(4) The output of every child is the input to the following child.
  Formally: $\forall i=1, \ldots, n$: $b_i \cup c_i = a_{i+1} \cup b_{i+1}$ At a minimum, consistency requirements must ensure correctness of any given refinement in the sense that the parent solution rule will produce the same or equivalent behavior as the children solution rules. As noted above, sequence consistency can be accomplished in more than one way. Minimal sequence consistency allows more variety. Maximal consistency facilitates understandability. Indeed, any number of other consistency requirements can ensure the internal correctness of any given type of design requirement.

In the preferred embodiment maximal consistency is used in automating the refinement process—that is, in constructing child solution rules from the parent. Minimal consistency is used in updating parent solution rules from children. Minimal checking allows the designer or programmer greater flexibility in assembling solution rules or components.

In the preferred embodiment only one set of consistency rules is used for all except sequence and loop refinement types. Nonetheless, it is clear that any number of alternatives could serve the above ends.

It frequently is helpful for understanding, development and maintenance purposes to distinguish two specializations of sequence refinement. Navigation sequences are used where pointer or aliases are introduced (and used). The first step of a navigation sequence involves introducing an alias (often finding and assigning a variable to that alias). The second step involves an action on that alias. As we shall see below, navigation sequences correspond to prototype refinements in which the prototype refers to a fixed number of elements in a set (one in the preferred embodiment). Parallel refinements are used where child operations may be executed in parallel. The use of parallel refinements has obvious implications for assigning tasks during parallel execution. Parallel refinements correspond to component refinements in specifications. Close relationships also are noted between types of specification refinements and other design refinements in the section on specification-design relationships.

Definition

A navigation sequence refinement f1 (structure_root, $a_1$: $b_1$; $c_1$) and $f_2$ ($a_2$: $b_2$; $c_2$) of f (a: b; c) ($f_1$ is called navigation rule, $f_2$ is called action rule) is consistent if and only if (1) The navigation alias is the only output of the navigation rule.
  Formally: $b_1 \cup c_1 = \{\text{navigation\_alias}\}$)
(2) The navigation alias is a variable (by convention the first) in the action rule's input, input-output, or output depending on whether structure_root (of the structure being searched for the alias) is an element of the parent's input, output or input-output.
  Formally: navigation_alias∈$a_2$⇔structure_root∈a^
  navigation_alias∈$b_2$⇔structure_root∈b^
  navigation_alias∈$c_2$⇔structure_root∈c
(3) Only input and input-output variables of the parent can be used as input for the navigation rule.
  Formally: $a_1 \subset a \cup b$
(4) Only input variables of the parent can be used as input for the action rule and each input variable of the parent must be used as input either for the navigation rule or the action rule (the structure root can be replaced by the navigation alias).
  Formally: $a_2 \subset a \cup \{\text{navigation\_alias/structure\_root in I-O}\}$^$a \subset a_1 \cup a_2 \cup \{\text{structure\_root}\}$
(5) The input-output of the parent and the action rule are the same (the structure root can be replaced by the navigation alias).
  Formally: $b_2 \subset b \cup \{\text{navigation\_alias/structure\_root if alias in I-O}\}$^$b \subset b_2 \cup \{\text{structure\_root}\}$
(6) The output of the parent and the action rule are the same (the structure root can be replaced by the navigation alias).
  Formally: $c_2 \subset c \cup \{\text{navigation\_alias}\}$^$c \subset c_2 \cup \{\text{structure\_root}\}$.

EXAMPLES

The following example illustrates a consistent navigation refinement:
  pickup_first_segment (: carpet; garbage)
    first_segment=next_element (carpet$^1$)
    pickup (: first_segment$^2$; garbage$^3$)
Sample violations of the above rules are as follows:
(2) If first_segment$^2$ is omitted as input-output of pickup (action rule), carpet (the structure root) is input-output of the parent but first_segment (the navigation alias) is not used as input-output to the action rule.
(3) If carpet$^1$ is replaced by garbage, then garbage (a range of the parent) is an input to the navigation rule.
  {garbage} ⊄ {carpet}
(4) If shovel is added as input to the action rule pickup, the input of the parent and the joint inputs of the navigation and the action rule differ.
  {shovel} ⊄ ∅∪{first_segment}

(5) If rug is added as input-output to the action rule pickup, the input-output of the parent pickup_first_segment (: carpet; garbage) and the input-output of the action rule differ.

{carpet, rug} ⊄ {first_segment}∪{carpet}

(6) If garbage$^3$ is omitted from the range of the action rule pickup, the output of the parent and the output of the action rule differ.

{garbage} ⊄ ∅∪{carpet}

Note: Rule (6) and those parts of the other rules which reference $c_2$, $c_2$ and/or c are irrelevant unless the parent rule of a navigation sequence is a child of a sequence refinement but not the first. The only way output variables are significant in navigation sequences is where rule 5 for sequence refinements is satisfied. Rule 5 ensures that the initial value of the output variable is actually used.

Definition

A parallel refinement $f_1$ ($a_1$: $b_1$; $c_1$), $f_2$ ($a_2$: $b_2$; $c_2$), ..., $f_n$ ($a_n$: $b_n$; $c_n$) off f (a: b; c) is consistent if and only if (1) Every input variable of a child is an input variable or a child of an input variable of the parent.
Formally: $\forall i=1,...,n$: $\forall v_c \in a_i$: $(v_c \in a) \lor (\exists v \in a$: $v_c$ is child variable of v)

(2) Every input-output variable of a child is an input-output variable or a child of an input-output variable of the parent.
Formally: $\forall i=1,...,n$: $\forall v_c \in b_i$: $(v_c \in b) \lor (\exists v \in b$: $v_c$ is child variable of v)

(3) Every input-output or output variable of a child is an output variable or a child of an input-output or output of the parent.
Formally: $\forall i=1,...,n$: $\forall v_c \in c_i$: $(v_c \in c) \lor (\exists v \in c$: $v_c$ is child variable of v) (4) There is no overlap between the input-output variables of the children.
Formally: $\forall i,j=1,...,n$: $\forall v \in b_i$: $\forall w \in b_j$: $i \neq j \rightarrow v$ is not descendent of w (5) There is no overlap between the output variables of the children.
Formally: $\forall i,j=1,...,n$: $\forall v \in c_i$: $\forall w \in c_j$: $i \neq j \rightarrow v$ is not descendent of w (6) Every input-output variable of the parent is itself or has a child which is the input-output variable of at least one child, or is itself or has a child which is an input variable of at least one child and is itself or has a child which is an output variable of at least one other child.
Formally: $[\forall v \in b \exists i (v \in b_i \lor \exists v_c$ ($V_c$ is child variable of $v \land v_c \in b_i$)] $\lor [\exists i, j$ ($v \in a_i \lor \exists V_c$ ($V_c$ is child variable of $v \land V_c \in a_i$))$\land$($v \in c_j \lor \exists V_c$ ($v_c$ is child variable of $v \land V_c \in c_j$))]

EXAMPLES

To understand the following examples for consistent and inconsistent parallel refinements consider the data refinement:

[room]:
[bed]:
[carpet]:

EXAMPLES

The following example illustrates a consistent parallel refinement:

clean (: room)
  make (: bed)
  vacuum (:carpet$^1$)

The following numbered examples are inconsistent with respect to the corresponding rules above.

(2) If carpet$^1$ is replaced by rug, then this input-output variable to vacuum (i.e., the second child) is neither an input-output nor a child of an input-output of the parent.

rug ∉ {room}ˆ rug is not a child of room (4) If the refinement has an additional child pickup (: carpet) as in clean (: room)
  make (: bed)
  pickup (:carpet)
  vacuum (:carpet)

then there is an overlap of the input-output variables of the second and the third child. (carpet ∉ $b_2$ˆ carpet∈$b_3$ˆcarpet=carpet)

Definition

A selection refinement cond, $f_1$ ($a_1$: $b_1$; $c_1$) and $f_2$ ($a_2$: $b_2$; $c_2$) of f (a: b; c) is consistent if and only if (1) cond is a variable defined as a Boolean function b (v).

(2) The condition uses only input or input-output variables to the parent.
Formally: $v \subset a \cup b$ (3) Every input variable of a child is either: a) in the input of the parent or b) in the input-output of the parent and the input-output or output of another child.
Formally: $\forall i=1,2$: $a_i \subset a \cup (b \cap \bigcup_{j \neq i}(b_j \cup c_j))$ (4) Every input-output variable of a child is an input-output variable of the parent.
Formally: $\forall i=1,2$: $b_i \subset b$.

(5) Every output variable of a child is either: a) in the output of the parent or b) the input-output of the parent and the input or input-output of another child.
Formally: $\forall i=1,2$: $c_i \subset c \cup (b \cap \bigcup_{j \neq i}(a_j \cup b_j))$ (6) Every input variable of the parent is contained in the condition variables or in the input of at least one child.
Formally: $a \subset v \cup \bigcup_{j=1,2} a_j$ (7) Every input-output variable of the parent is: a) input-output of a child, b) input to one child and output to the other child, or c) output to one child and not output to at least one other child.
Formally: $b \subset \bigcup_{j=1,2} b_j \cup \bigcup_{j=1,2}(c_j \cap v) \cup \bigcup_{i \neq j}(c_j \cap a_j)$ (8) Every output variable of the parent is contained in the output of all children.
Formally: $c \subset \bigcap_{j=1,2} c_j$

EXAMPLES

The following examples similarly illustrate the consistency rules for selection refinements. The first refinement is consistent:

clean (:current_segment)
  IF is_messy (current_segment$^2$)
  THEN pickup_and_vacuum (:current_segment$^3$)
  ELSE vacuum (: current_segment)

These changes make the refinement inconsistent:

(2) If current_segment$^2$ is replaced by garbage, then the condition uses a variable that is not input or input-output to the parent.
(garbage ∉ {current_segment})

(4) If current_segment$^3$ is replaced by carpet, then pickup_and_vacuum (the THEN-child) uses an input-output variable that is not input-output of the parent.
(carpet ∉ {current_segment})

(5) If garbage is added to the THEN alternative, then pickup_and_vacuum (the THEN-child) would use an output variable which is not output of the parent.

(carpet$\notin \emptyset$)
(8) If garbage is added as an output to the parent, then an output variable of the parent is not in the output of some child.
(garbage$\notin \emptyset$)

Definition

A case refinement cond, $f_1$ ($a_1$: $b_1$; $c_1$), ..., $f_n$ ($a_n$: $b_n$; $c_n$) of f (a: b; c) is consistent if and only if (1) cond is a variable defined as a finite valued function c (v). This finite valued function can return either an abstract value or a subcategory of one of the variables in v.

(2) The condition uses only input or input-output variables to the parent.
Formally: $v \subset a \cup b$ (3) Every input variable of a child, other than subcategories used as case selectors, is either: a) in the input of the parent or b) in the input-output of the parent and the output of another child.
Formally: $\forall i=1, \ldots n$: $a_i \subset a \cup (b \cap \cup_{j \neq i}(b_{j \cup cj}))$ (4) Every input-output variable of a child, other than subcategories used as case selectors, is contained in the input-output of the parent.
Formally: $\forall i=1, \ldots, n$: $b_i \subset b$.

(5) Every output variable of a child, other than subcategories used as case selectors, is contained either: a) in the output of the parent or b) the input-output of the parent and the input or input-output of another child.
Formally: $\forall i=1, \ldots, n$: $c_i \subset c \cup_{j \neq i}(a_j \cup b_j)$
(NOTE: If a subcategory is used, then $a_i$, $b_i$ and $c_i$ [in constraints 3, 4 and 5] should be interpreted not to contain that subcategory.)

(6) Every input variable of the parent, other than the parent variable of the categories used as CASE selectors, is contained in the condition variables or in the input of at least one child.
Formally: $a \subset v \cup \cup_{j=1, \ldots, n} a_j$ (7) Every input-output variable of the parent, other than variables which are parents of categories used as CASE selectors, is: a) in the input-output of a child or b) input to at least one child and output to at least one different child (for which it is not also input).
Formally: $b \subset \cup_{j=1, \ldots, n} b_j \cup \cup_{j=1, \ldots, n}(c_j \cap v) \cup \cup_{i \neq j}(c_j \cap a_j)$ (8) Every output variable of the parent is contained in the output of all children.
Formally: $c \subset \cap_{j=1, \ldots, n} c$
(NOTE: If a subcategory is used, then a, b and c [in constraints 6, 7, and 8] should be interpreted not to contain the parent of the subcategories.)

(9) There must be a CASE alternative for each category of the category parent.

(10) Every category variable used in the corresponding CASE alternative operation must have a role compatible with the input, input-output or output role of the corresponding variable in the parent.

Condition variables in selection and case refinements may be defined as functions defined on and/or returning abstract values of variables in v, or equivalently as functions defined on and/or returning child variables in category refinements of the parent variable in v. In particular, conditions in a selection refinement may operate on abstract values and return booleans, whereas conditions in case refinements return abstract values or categories.

For example, FIG. 2 is based on a specification involving abstract values of the variable "current_rug", in particular the abstract values "messy_dirty" and "dirty". Alternatively, we could have introduced two categories of current_rug in the specifications, namely really_bad_current_rug and not_so_bad_current_rug. Clearer motivation for category refinement in this case can be seen by noticing that we might need to perform different operations on different kinds of rugs for exactly the same reasons that different kinds of rooms (e.g., bedrooms, kitchens) may require different kinds of operations. The preferred embodiment encourages the introduction of categories only where these categories have different structures and require different though analogous operations.

Definition

A repeat refinement cond, loop_body ($a_1$: $b_1$; $c_1$) of f (a: b; c) is consistent if and only if (1) cond is a variable defined as a boolean function b (v)

(2) Every variable used in the condition is either input or input-output to the parent.
Formally: $\forall v \in v$: ($v \in a \cup b$)

(3) The parent variables are a subset of variables to the loop body and condition.
Formally: $a \cup b \cup c \subset a_1 \cup b_1 \cup c_1 \cup v$ Definition An elaborated repeat refinement cond, advance_fn (structure_root, $a_1$: loop_alias), f' ($a_2$: $b_2$;($c_2$)) of f (a: b; c) is consistent if and only if (1) cond is a variable defined as a boolean function b (v, loop_alias)

(2) The loop alias is the only input-output of the advance function, and there is no output.
Formally: $b_1 = \{loop\_alias\}^{\wedge} c_1 = \emptyset$ (3) The loop alias is an (by convention the first) element of the loop action's input, input-output, or output depending on whether structure_root is an element of the parents input, output or input-output.
Formally: loop_alias$\in a_2 \Leftrightarrow$structure_root$\in a \cup b^{\wedge}$
loop_alias$\in b_2 \Leftrightarrow$structure_root$\in b^{\wedge}$
loop_alias$\in c_2 \Leftrightarrow$structure_root$\in c$ (4) All input variables of the advance function are input or input-output to the parent.
Formally: $a_1 \subset a \cup b$ (5) All action input variables (except the loop alias) are contained in the parent's input and all input variables of the parent (possibly except the structure root) are contained in the condition variables or the input of the advance function or the loop action.
Formally: $a_2 \subset a \cup \{loop\_alias/structure\_root$ in $I-O\}^{\wedge} a \subset a_1 \cup \{structure\_root\} \cup a_2 \cup v$ (6) All action input-output variables (except the loop alias) are input-output to the parent and all input-output variables of the parent are input-output (possibly except the structure root if the alias is input-output) to the loop action.
Formally: $b_2 \subset b \cup \{loop\_alias/structure\_root$ if alias in $I-O\}^{\wedge} b \subset b_2 \cup \{structure\_root\}$ (7) All loop action output variables (except the loop alias) are contained in the parent's output and all output variables of the parent (possibly except the structure root) are contained in the output of the loop action.
Formally: $c_2 \subset c \cup \{loop\_alias\}^{\wedge} c \subset c_2 \cup \{structure\_root\}$ (8) Every variable used in the condition is either an input, input-output or output to the parent.
Formally: $\forall v \in v$: ($v \in a \cup b \cup c$)

In the current AutoBuilder implementation, the loop body in elaborated repeat loops is automatically refined into a sequence of two children. The first child advances through the repeat loop alias, and the second child performs the required action. The advance function and the loop action are collectively referred to as the "loop body". In effect, repeat loop bodies in the preferred embodiment are navigation sequences.

The "advance_fn" is exercised each time a repeat loop is entered, successively changing loop_alias from an assumed initial "nill" value to a value which will satisfy cond. Commonly, the advance function involves successive movement through a list or hierarchy. When this is the case in the current implementation, the function defining the terminating condition can be determined automatically from the advance function. For example, the advance function current_rug=next_element (carpet, current_rug)

in FIG. 2 implies that the condition "done" can be defined as:

done:=not (next_element_exists (current_rug, carpet))

In general, of course, advance and terminating conditions can take any form.

For example, a solution rule or condition may include variables that get their values from some external agent. Externally determined variables are often used in conditions in which case a loop may not terminate and/or may terminate at any time (e.g., when a human has a "continue" option).

In practice, an advance_fn may include more than one alias even though one (more abstract one) would suffice. For example, the prebuilt advance function "find_next_element" includes two aliases, one to determine the current element (variable) in a Flexform and one to specify its parent. (Note: Those elements that are clones have more than one parent.)

EXAMPLES

Consider the following example of a repeat refinement:
pickup (:carpet; garbage)
   REPEAT
      current_segment=next_element (carpet, current_segment) pickup_segment (:current_segment[1]; garbage[2])
   UNTIL same (current_segment, nill)

The above is consistent if we assume, for example, that carpet is refined as follows:
[carpet] prototype:
   [current_segment]:
The following are inconsistent repeat refinements.

(3) If current_segment is moved to the input of pickup_segment (the action rule), then carpet (the structure root) is input-output to the parent while current_segment (the loop alias) is input.

(6) If garbage[2] is moved to the input-output of pickup_segment (the action rule), then it is an input-output variable which is not input-output to the parent.
(garbage $\notin$ {carpet}$\cup$ {current_segment})

(7) If garbage[2] is omitted, then garbage is an output variable of the parent which is not contained in the output of the action.
(garbage $\notin \emptyset$)

(8) It is inconsistent to use new_var in the condition.
(new_var $\notin$ {carpet, garbage}

The above example assumes that carpet has a fixed number of segments. Normally, the number of elements that may be referenced by a loop alias will vary depending on the given input. This is the motivation for introducing prototypes in refining specification variables.

Definition

A while refinement cond, loop_body ($a_1$: $b_1$; $c_1$) of f (a: b; c) is consistent if and only if (1) cond is a variable defined as a boolean function b (v)
(2) Every variable used in the condition is either an input or input-output to the parent.
   Formally: $\forall v \in v: (v \in a \cup b)$
(3) The parent variables are a subset of variables to the loop body and condition.
   Formally: $a \cup b \cup c \subset a_1 \cup b_1 \cup c_1 \cup v$ Definition An elaborated while refinement cond, advance_fn (structure_root, $a_1$: $b_1$; $c_1$), f' ($a_2$: $b_2$; $c_2$) of f (a: b; c) is consistent if and only if (1) cond is a variable, defined as a Boolean function b (v, loop_alias)
(2) The loop alias is the only input-output of the advance function, and there is no output.
   Formally: $b_1 = \{loop\_alias\} \wedge c_1 = \emptyset$
(3) The loop alias is an element (by convention the first) of the loop action's input, output or input-output, depending on whether structure_root is an element of the parents or input, output or input-output.
   Formally: loop_alias$\in a_2 \Leftrightarrow$ structure_root$\in a \cup b \wedge$
   loop_alias$\in b_2 \Leftrightarrow$ structure_root$\in b \wedge$
   loop_alias$\in c_2 \Leftrightarrow$ structure_root$\in c$
(4) All input variables of the advance function are input or input-output to the parent.
   Formally: $a_1 \subset a \cup b$
(5) All child input variables (except the loop alias) are contained in the parent's input and all input variables of the parent (possibly except the structure root) are contained in the condition variables or the input of the advance function or the loop action.
   Formally: $a_2 \subset a \cup \{loop\_alias/structure\_root$ in I-O$\} \wedge a \subset a_1 \cup \{structure\_root\} \cup a_2 \cup v$
(6) All action input-output variables (except the loop alias) are input-output of the parent and all input-output variables of the parent are input-output (possibly except the structure root if the alias is input-output) to the loop action.
   Formally: $b_2 \subset b \cup \{loop\_alias/structure\_root$ if alias in I-O$\} \wedge b \subset b_2 \cup \{structure\_root\}$
(7) All loop action output variables (except the loop alias) are contained in the parent's output and all output variables of the parent (possibly except the structure root) are contained in the output of the loop action.
   Formally: $c_2 \subset c \cup \{loop\_alias\} \wedge c \subset c_2 \cup \{structure\_root\}$
(8) Every variable used in the condition is either input or input-output of the parent or the structure_root.
   Formally: $\forall v \in v: (v \in a \cup b) \vee (v = structure\_root)$ In the preferred implementation, advance functions in elaborated while refinements are integrated with the loop conditions. That is, termination conditions in elaborated while refinements are refined (in Flexforms). In this case, the first step is an advance function and the second is the condition (which may in turn be refined). This implementation was chosen because it avoids the necessity of having to introduce an advance function prior to (i.e., to initiate) the loop. Recall in this context that loop aliases are assumed to have "nill" as an initial value.

Definition

A design hierarchy is consistent if and only if (a) each (e.g., sequence, parallel, selection, case, until, while and terminal) refinement in the design hierarchy is consistent, (b) no use of a variable referenced in two or more subtrees of a refinement depends on a value set in any preceding subtree in the refinement (this is a direct implication of consistency) and (c) variable names used in the specifications match those used in the design.

In the preferred embodiment, only variables in the INTERMEDIATE section of a consistent design can be an alias or defined by data execution in terms of other variables. Second, the above consistency rules allow substitution of children variables for their more abstract parents only in parallel and sequence refinements. This restriction facilitates readability, simplifies checking and is without loss of generality—although, in practice, parent variables may be replaced by equivalent children variables defined in the specifications.

Third, alias variables can be operated on and changed just as any other variable. For example, they may be passed as parameters or used in defining selection conditions via data execution. New alias variables, however, can only be introduced in loop refinements or navigation sequences. In the preferred embodiment, such aliases are automatically initialized. Given these restrictions, pointer references cannot be changed as incidental side effects.

Values of intermediate variables introduced in sequence refinements also are independent of previously set values. Although refinement scoping encourages the introduction of additional local variables, data abstraction reduces the overall number of variables to be considered. Collectively, scoping and data abstraction tend to make maintenance more a local matter, and consequently easier.

In the preferred embodiment, all values between sequentially related refinements are passed as parameters. In contrast, operations in most behavioral designs (e.g., structured analysis, clean room engineering) reference common sets of intermediate (if not global) variables which are available for use in the design as a whole.

What makes the disclosed method feasible is that variables (i.e., parameters) are arranged hierarchically in a manner that parallels the hierarchical organization of processes. Arranging variables hierarchically in parallel with process refinement dramatically reduces the number of parameters that must be referenced by any given solution rule.

This type of consistency has broad implications for design maintenance. One can add, delete, replace or move any solution rule (subtree) in any consistent design hierarchy and not have to worry about side effects. The only requirement is that the modification (e.g., addition, deletion) makes semantic sense in the new context (i.e., that the result is still internally consistent).

The above consistency constraints are illustrative and may be adjusted where desired. However, they are not arbitrary. The consistency constraints chosen in any particular implementation of the present disclosure must satisfy certain constraints as regards abstract correctness (internal to the design). To see the relationship, first assume one abstract value for each parameter in the design hierarchy. Then, notice that parameters providing input to defined conditions are implicitly partitioned into abstract values. Specifically, each condition necessarily has a finite number of outputs (frequently just two). These output values implicitly impose a partition on the values of the corresponding input variables. The abstract input values (equivalence classes) correspond one-to-one with decision outputs. These abstract values may be distinguished (e.g., by name). Hence, abstract values are specified for all parameters in the design hierarchy. Abstract values of those parameters serving as inputs to a condition are determined implicitly by the outputs of the decision conditions used in the design. The other parameters remain unpartitioned and are assumed to have just one abstract value.

Assuming abstract values have been determined as above, it is reasonable to expect consistency constraints to ensure abstract correctness. In effect, a design that satisfies appropriate consistency constraints also should be abstractly correct. Assuming that all abstract values have been represented, design consistency should be equivalent to ensuring abstract correctness within a design hierarchy. As we shall see, enforcing name consistency with respect to specifications further ensures abstract correctness of the design with respect to its specification.

As described, the above ideas apply to individual designs and/or design hierarchies. We consider next how these ideas apply to larger domains as well—in particular to domains for which no single design will suffice. The question is how to identify design hierarchies associated with any given domain of problems, even ill defined domains, no matter how complex.

Structural (cognitive task) analysis (e.g., Scandura, 1982, 1984a) was designed for this purpose, and puts a premium on ill-defined problem domains and higher order knowledge. In the present context, a typical problem is to find or derive a design for implementing a given solution rule; higher order knowledge corresponds to higher order designs for use in deriving needed designs.

Definition

Higher order designs are designs in which the values of one or more output parameters are designs. Accordingly, higher order specifications are specifications for higher order designs.

At least one output (or input-output) parameter in a higher order design must have values that are themselves designs. Accordingly, abstract values of such a parameter are equivalence classes of designs. Parent-child and input-output mappings in higher order designs involve abstract designs (i.e., equivalence classes of designs). Otherwise, all of the above consistency rules apply.

Of particular interest in the current disclosure are higher order designs in which an output variable contains designs. Such higher order designs can be used to derive new designs needed to implement given solution rules. Other applications will be apparent to those skilled in the arts of automated training, learning and other intelligent systems.

A major goal of structural analysis since its inception has been to identify higher order knowledge. In the literature, elements of higher order knowledge are referred to as higher order rules. Herein, higher order knowledge elements are referred to as higher order designs or components. Identifying higher order knowledge involves the introduction of higher order problems.

Structural analysis is a systematic method for identifying sets of designs and higher order designs that are sufficient for solving wide ranges of problems in given, potentially ill-defined domains. These designs and higher order designs are used collectively i.e. by interacting in problem solving to construct new designs as needed. Especially important in the preferred embodiment are problem domains containing (potentially large) sets of implementation problems. Solving such problems requires generating designs needed to implement solution rules.

Structural analysis involves first identifying subsets of problems for which rigorous specifications and designs can be constructed using methods described in the present disclosure. Then, for each such design, a higher order specification is constructed: The output contains all specifications having the same structure as the given design; the input has the same structure as selected elements from which the design is to be constructed. Next, higher order designs, that are consistent and correct with respect to the corresponding higher order specifications, are constructed using the prescribed methods. (NOTE: Higher order input elements are not necessarily components of the design. Among other things, such elements may be analogous to all or part of the desired output designs. Indeed, no input elements may be specified at all—in which case any higher order rule that generates the required output will be acceptable.)

Application of higher order designs to other semantics-based components (including designs and affiliates—see below) makes it possible to create new designs. Redundant designs—ones that can be constructed from other (higher and lower order) designs—can be eliminated as desired. This process can be repeated as many times as desired by constructing (new) higher order specifications and designs from other specifications and designs. Each time the process is repeated, two things happen: (1) The designs collectively can be used to solve broader and broader ranges of problems in the ill-defined domain, specifically including problems not in any of the initially defined subsets. (2) Designs individually, including higher order designs, tend to become simpler.

More details are on the process are given in the concluding section on the preferred embodiment.

Object Oriented Design Definitions

So far, we have assumed that the virtual solution rules used in designs, as well as components used to implement designs, are defined on data structures composed of indivisible objects (also called variables). We also have seen how objects in such structures can be defined in terms of other objects. No behavior, however, was ascribed to the data structures themselves. The component objects (e.g., "room", "bed", "carpet") comprising these structures were assumed to be elementary with no internal structure as such.

Inheritance in the OO paradigm involves relationships between categories of objects rather than between objects and their components. Category relationships typically (but do not necessarily) involve objects having internal structures. A bedroom, for example, is a category of room. It is not a component. The internal component structure of room may or may not be made explicit (e.g., it might be defined in terms of walls, floor and ceiling). To be a bedroom in either case requires additional structure (e.g., beds and carpets). Categories of rooms, say bedrooms and kitchens, necessarily include both the components of rooms in general and the components that distinguish those categories. Thus, bedrooms typically contain beds and carpets. Similarly, kitchens contain stoves and sinks.

In traditional OO, rooms and bedrooms correspond to separate, albeit hierarchically related classes (types with associated functions defined on those types). Real world objects, however, do not correspond directly to such classes. Bedroom objects, for example, include components associated with both room and bedroom classes. As a result, OO terminology can sometimes be misleading and a source of conceptual errors in design.

Similarly, when we speak of cleaning rooms from a real-world semantic (cognitive) perspective, reference is made to all rooms. Making beds and vacuuming carpets are integral parts of the process when the room in question happens to be a bedroom. But, this level of procedural detail (in a design) is not necessary unless we are talking explicitly about beds and carpets. When we say, "clean (room)", and the input room is a bedroom, the intent is to make the bed and vacuum the carpet, as well as to clean the generic parts of the room. Real-world cognitive semantics calls for an abstract, albeit executable operation which operates on all rooms. Such a clean operation implicitly includes make and vacuum.

This raises the question of how best to implement a procedural statement like "clean (room)" when solution rule operations like make and vacuum (in subordinate classes) are affiliated with clean (an operation in the room class). In most OO languages, such affiliation is most commonly handled by introducing overloaded clean operations, frequently called methods of functions. In this case, when a room object is passed to clean, the implementation decides which clean to invoke. The choice is typically determined, either during compilation or at run-time, based on the type of the room object. In typeless OO languages, the same result can be obtained by choosing the function whose domain most fully matches the object's structure. For example, the "clean" associated with bedroom objects might be chosen when the room in "clean (room)" is a bedroom—because it offers a better fit than does the original clean (i.e., it deals with beds and carpets as well as generic room components).

One way to implement an abstract clean operation would be to introduce case alternatives (within the operation) which anticipate everything that rooms might contain. Alternatively, the case alternatives might refer to all of the kinds of clean sub-operations which need to be performed (e.g., on objects having hard impervious services, on cloth-like items to be arranged symmetrically, etc.).

The same result can be accomplished in a way that more naturally reflects real-world semantics—by introducing the notion of affiliate operations. In modeling system behavior (at a high level of abstraction), the abstract clean operation is assumed to operate on all room objects. From a real-world behavioral perspective, it is an external operation (and not just one of potentially many functions associated with room objects). The intended semantics of "clean (room)" is: Clean all of the components which define room (e.g., walls and floor) plus all of its contents (e.g., beds, carpets, sinks or whatever). In particular, clean applies to bedrooms, kitchens and any other room comprised of components under room or any of its subtypes.

Definition

An affiliate of a solution rule or of another affiliate is a design, solution rule or semantics-based component (often referred to in OO as a function or method) in a class. In the preferred embodiment, affiliates necessarily know their own domains of applicability and have a special section called AFFILIATE which contains all affiliates of the affiliate. In OO discourse, affiliates correspond to agents, operations that are applied automatically to elements in their domains of applicability.

NOTE: Defining room in this manner makes it possible to more easily define sets of subclasses. For example, the introduction of bedroom and kitchen subclasses may be interpreted as implicitly defining all possible subclasses representable in terms of components in bedrooms and kitchens. Implicit definition of subclasses in this way is directly analogous to implicitly defining values of a variable. Rather than listing all values explicitly, this is often done implicitly (e.g., by specifying ranges of values).

The abstract clean solution rule operation can be defined in terms of operations, which are directly or indirectly affiliated with it. Thus, clean in the room class might be an affiliate of the abstract clean. In turn, make and vacuum might be affiliates of clean in the room object. This affiliation concept can be implemented by associating operations in the top-level class (on which the abstract operation operates) with the abstract operation. Functions in superordinate objects, in turn, are affiliated with functions in subordinate ones. When we add an operation, like make or vacuum, to a subordinate class, we would have the option of affiliating that operation with operations associated with the superordinate class. In effect, calling clean (room) has the effect of (also) executing those of its affiliates that are associated with any given room object. If an object is outside the scope of an affiliate, that affiliate is not applied because all affiliates (like agents) check their domain of applicability.

Implementation of these ideas, of course, might retain the option of specifying functions associated with particular classes—perhaps using the common syntax: class.operation (data). For example, bedroom.clean (room) could be used to specify a particular instance of an overloaded clean operation. (NOTE: From a behavioral perspective, there is little difference between calling a function or operation in a specified object and calling one in a procedural library.)

Many OO programmers might deem the latter syntax essential. Nonetheless, I suspect, but have not attempted to prove, that this kind of flexibility is unnecessary. Anything that can be done using the extended syntax can also be done in the proposed semantically more palatable manner—much like GOTOs can be eliminated in structured programming.

In OO programming, inheritance relationships pertain to classes in one way and to objects in another. Subtypes (data structures) in subordinate classes supplement superordinate ones. Objects, on the other hand, include data structures associated with both superordinate and subordinate classes. For example, whereas a bedroom class refers only to structures unique to bedrooms, bedroom objects associated with that class include structures associated with both bedroom and (superordinate) room classes. This difference can easily lead to confusion and/or unnecessary complication in modeling real-world semantics.

Method overloading (and/or polymorphism) typically involves distinct methods having the same names in different classes. (NOTE: Method is the OO term most commonly used in referring to functions or procedures in classes.) Real-world semantics, on the other hand, typically calls for single all-encompassing abstract operations that combine the effects of all affiliates (possibly including overloaded/polymorphic methods sharing a common name). Behaviorally speaking, such all-encompassing abstract solution rules operate on objects as wholes. Putting them inside objects is counterintuitive. By differing from this simple semantics, standard OO implementations can lead at a minimum to unnecessarily complicated and hard to maintain code. Rather than simply writing one clean operation (with affiliates), which refers to all rooms (bedrooms and otherwise), for example, one would have to maintain several clean solution rules, one for each category of room.

An important difference between objects as resources and the use of objects in modeling behavior also is often neglected. Collecting operations inside objects because they share a common (input) data type is reasonable from the perspective of defining resources. In modeling behavior, however, operations become paramount. In this case, it is cognitively (i.e., semantically speaking) more palatable to view different, albeit hierarchically related, data types in class hierarchies according to the operations that use them.

Overall, semantic differences between classes used in inheritance hierarchies and objects associated with those hierarchies, and semantic differences between overloaded/polymorphic operations and cognitive intent, can both lead to unnecessary complications in modeling behavior. Reliability, availability (understandability) and maintainability (RAM) are reduced as a result. Designs and programs become unnecessarily complex; debugging and testing can be even harder. To overcome these limitations, abstract all-encompassing operations, called abstract solution rules, are introduced. Abstract solution rules act on objects as wholes, but they are implemented in terms of affiliate operations inside classes. Operations in objects may be referenced by (i.e., become affiliates of abstract solution rules but they are conceptually different. (NOTE: Keep in mind that other operations (functions) serve to define relationships between input objects via data execution. These functions are neither inside objects nor do they map inputs into outputs.)

In effect, abstract (albeit executable) solution rules are based directly on real-world semantics; they operate on classes of input objects and generate output objects. Abstract solution rules accomplish their work by referencing affiliated operations associated with classes in inheritance hierarchies (used in defining object parameters).

Although frequently hierarchical in nature, parameters in the preferred environment are typeless.

In addition to operations within objects, the present disclosure supports associating functions directly with objects. The latter serve to define given objects (dynamically) in terms of other objects, much like functions embedded in procedure calls. The only difference is that these functions are associated directly with data, rather than (necessarily) with procedural logic. We call this "data execution". Data execution simplifies procedural logic, and localizes the definition of new objects. Notice in our original clean example (FIG. 1) that room is defined directly in terms of bed and carpet. That is, the value of room is determined by the values of bed and carpet. Consider another example: Designing an algorithm for simulating the way a child performs column subtraction. In this case, data execution might be used to define, say, top-digit as the common element of top-row and current-column. Instead of having to define top-digit repeatedly in writing the algorithm, data execution makes it possible to do it just once.

Previous sections in this disclosure describe the role of designs in the construction of behavioral models. The emphasis was on the role such designs play in procedural models. Clearly, procedural designs also play a central role in OO design. The remainder of this section defines essential concepts. We first define what we mean by a class.

Definition

A class is a four-tuple consisting of a data structure (or type) in which each variable represents a component, a set of designs, a set of corresponding specifications and a list of the subordinate classes (if any) which inherit data structures, designs and specifications from the class.

In the preferred embodiment, classes are represented as Flexforms having four sections: DATA STRUCTURE, INHERIT, DESIGN (INCLUDED FILE) and SPECIFICATION. The class data:structure is included in the input specification for each design in the class (commonly referred to as a method or function). The abstract input values, however, may vary in different designs.

Definition

A class hierarchy consists of a top-level class and all recursively referenced classes that inherit from higher level classes in the hierarchy.

Class hierarchies correspond directly to what are called class inheritance hierarchies in the OO paradigm. Multiple inheritance is not allowed in the preferred embodiment because the same effect can be obtained by introducing a higher level class from which the multiple inheritance classes inherit.

As mentioned in the Specification Definitions section, there is a one-to-one relationship between class hierarchies and category hierarchies. As shown in FIG. 2D, the major difference between category hierarchies and class hierarchies is that class hierarchies include designs (and optional specifications for the designs) defined on the data structures.

Definition

Objects are instances of class hierarchies. Data structures associated with objects are constructed by combining data structures associated with classes in the class hierarchy. Specifically, each object is associated with one class in the hierarchy. The data structure associated with that class is supplemented with the data structures associated with each class (in the hierarchy) from which it inherits.

Traditional OO designs typically consist of sets of class hierarchies and messages between them. Grouping designs according to common data types is useful from the perspective of (reusable) resources. Interacting OO designs, however, are not sufficient in modeling behavior at higher levels of abstraction.

In addition to behavior associated with designs within objects, and to messages between objects, it is semantically desirable to consider behavior (abstract operations) on objects themselves. (Traditional message passing is based on operations within objects.) Abstract behavior is conceptualized in the preferred embodiment by grouping objects, irrespective of their data types, according to the (abstract) operations that use them (rather than the reverse).

NOTE: In the preferred embodiment (FIG. 2D), inheritance is specified from the top-down. That is, individual classes reference the subordinate classes, which inherit from them. This simplifies implementation of affiliate operations. In most OO implementations, however, sub-ordinate classes typically reference those classes from which one inherits. The latter is convenient where a subclass can inherit from more than one super class. Multiple inheritance in the preferred embodiment, however, is disallowed. (Multiple inheritance can always be replaced by introducing superordinate classes as needed.) This makes implementation of affiliates easier without loss of generality.

In the next section, we see how the use of affiliate functions eliminates the need for introducing overloaded (or polymorphic) operations in sub-categories.

Behavioral Designs and Design Resources

In modeling software systems, it is important to distinguish between the behavioral model (i.e., design), on the one hand, and the resources used to implement the behavioral model, on the other. To this point, the disclosed process has emphasized the former—that is the specification of desired behavior and how that behavior is to be generated. We have assumed that whatever components are needed are, in fact, available in some library or libraries.

Although any number of distinctions is possible, modern software libraries fall into two general categories: procedural libraries (see FIG. 5) and object-oriented class libraries (see FIG. 6). Components in procedural libraries and their specifications are directly reusable in designs. In a similar manner, data structures can be reused in specifying behavior.

Solution rules (at arbitrary levels) in a design (e.g., FIG. 5B) can successfully be implemented in terms of a procedural component if and only if the latter preserves the abstract behavior specified by the rule. The situation with the objects used in behavioral models is very similar (see FIG. 6). In this case, the major difference is that all implementation components in the (class) library are grouped according to the data structures they use.

Assuming that component resources are available in compiled libraries, it is sufficient to simply reference those components. Because procedural components in different objects may have the same name, calls to those components must reference the objects as well as the components themselves. As long as the designer specifies both the component and the object containing it, abstraction details, including inheritance, access rights, etc. are hidden from the design. Standard dot notation (i.e., "object/library.operation") can be used to designate designs in HLD libraries. Of course, the inclusion of entire libraries (as reusable resources) in implementing designs has the overhead of extra code for components that may not be used. This overhead is normally less pronounced in the case of objects because in common practice the associated designs tend to be smaller.

The preferred embodiment also supports separate compilation units consisting of libraries, classes and/or designs. A PROJECT, in turn, may contain any number of such units. In the preferred implementation, compilation units are represented by libraries (which may contain class hierarchies). The Flexform shown in FIG. 4 represents a sample project for cleaning houses. This Flexform references the specification clean_house_spc for the top-level design clean_ house_dsn. The INCLUDED FILE section contains references both to the design and to Flexforms representing clean_component_library and room_class resources. The tree view in FIG. 4A shows the clean_house project including relationships to referenced Flexforms. In this example, clean_house_dsn is the top-level design. It calls clean_ room_dsn, which in turn calls vacuum_dsn and make_dsn. The latter designs are contained in clean_component_ library.

The referenced Flexforms are shown in FIGS. 5 through 7. FIG. 5 represents a clean_component_library containing "vacuum" and "make" designs and their specifications. FIG. 5A represents specifications for vacuum carpeting in clean_ component_library. FIG. 5B represents the top-level of a design and external specifications for vacuum carpeting in clean_component_library. FIG. 6 represents a room class containing a data structure (set of components) which represents a room, two designs that operate on this data structure and their specifications. No sub-class inherits this room data structure.

In the preferred embodiment, all libraries are implemented as Flexforms containing a design (INCLUDED FILE) section (see FIG. 5). This section contains references to the design Flexforms (e.g., see FIG. 5B) contained in the library. Although external specifications are included in the respective designs, they also may be listed as separate Flexforms in an optional SPECIFICATION section (e.g., see FIG. 5A). Classes (e.g., see FIG. 6) contain, in addition, a DATA STRUCTURE section and an INHERIT section. The former contains the data structure common to all designs in the class (referenced in the INCLUDED FILE section). The INHERIT section represents inheritance relationships between classes. Specifically, this section contains references to classes that inherit data structures and designs from the class.

As is the norm in object-oriented inheritance, the Flexsys interpreter used in the current embodiment supports the application of overloaded designs used in class hierarchies. In this case, designs attached to superordinate classes apply equally to specialization objects associated with subordinate classes. For example, a design associated with a generic room class will apply equally to kitchen objects. In this case, of course, the design will only apply to common aspects of the data structure. In effect, actual parameters may be a superset of the formal parameters. Design overloading can be resolved via standard type matching, or even via "goodness of fit" methods.

A second issue arises with overloaded designs associated with subordinate classes. In standard implementations, such designs must explicitly call or otherwise enhance overloaded designs associated with corresponding superordinate classes.

When designs are used as resources in the preferred embodiment, these designs are grouped, as in most OO techniques, in classes by common (input) data structures. In building behavioral designs, however, not all designs (in class hierarchies) are required. Rather than using overloaded designs to accommodate different data structures, the preferred embodiment stresses operation abstraction. Semantically equivalent designs that operate on objects associated with the data structures in a class hierarchy are conceptually grouped. In the preferred embodiment, each grouping constitutes an abstract operation. Designs (solution rules) associated with cleaning (generic) rooms, bedrooms and kitchens, for example, are collectively represented as an abstract clean operation which applies to all rooms. By the same logic, clean can be further abstracted to include houses, towns, states, or (even) arbitrary entities. Grouping data structures by common abstract operations is the preferred way to represent system designs.

To make the concepts as well as the differences clear, we next consider data execution and abstract operations in more detail.

Data Execution

As noted above, data execution functions define relationships between objects (e.g., "done"). This important construct is directly supported in the preferred HLD language embodiment. In C++, for example, it is only enabled.

Thus, in HLD programming we have:

[room_status] status (bed, carpet)
  [bed]: made
  [carpet]: dirty
display (room_status)

The same thing can be done in defining data structures. In HLD we have:

[room_object] construct (bed, carpet)
  [bed]
  [carpet]
convert (room_object, bedroom_object)

where the latter statement refers to the conversion of (ordinary) rooms into bedrooms. In this case "convert" might simply add a bed and a carpet to the room (as is the norm in inheritance), or it might involve more esoteric operations.

In C++ (or as a non-preferred alternative in HLD), we have, respectively:

display (status (bed, carpet))

and convert (construct (bed, carpet), bedroom_object)

The former approach has the effect of replacing procedural complexity with structural complexity (cf. Scandura, 1981). This improves understandability in two ways: (a) it simplifies procedural statements and (b) it localizes data definitions.

Abstract HLD Solution Rules

As noted above, abstract HLD solution rules go beyond simple polymorphism. In addition to allowing parameters to vary as to data structure, abstract solution rules (in conjunction with their affiliates) perform the necessary behavior without specifying any additional procedural logic.

Consider the Class Hierarchy

[room]
  [bedroom]
    [bed]
    [carpet]
  [kitchen]

where bedroom and kitchen are categories of room, and bed and carpet are components of bedroom.

In HLD, without any additional work, we have:

clean (room)

irrespective of whether the room is a bedroom or a kitchen.

In C++, in addition to defining a room class hierarchy, we would have to write clean functions for both the bedroom and kitchen classes as well as for the room class. In the case of bedroom, for example, the clean function might call make and vacuum in the bedroom class plus clean in the room class. Another clean would be needed for the kitchen class. An alternative in C++ (or HLD) might be:

room.clean (room)
bedroom.make (bed)
bedroom.vacuum (carpet)

The disadvantage of the first (most common) approach is that: (a) we have more than one "clean" to maintain and/or resolve when debugging (in addition to at compile or run time) and (b) the approach tends to camouflage the semantic equivalence of make and vacuum with respect to clean. The latter implementation provides more flexibility but it adds unnecessary procedural complexity and can easily lead to sloppy programs that are hard to maintain.

Further simplification derives from the fact that HLD data structures (in the preferred embodiment) are typeless. All structures are explicitly represented hierarchically. This encourages the use of abstract objects (variables) in designs and programs. (The use of global variables is strongly discouraged with obvious advantages as regards system reliability, availability and maintainability.) Because parameters may be as abstract as necessary, one is never forced into using long parameter lists. Overall, HLD solution rules are designed to facilitate modeling real-world behavior. Core HLD solution rules work on arbitrary data structures. The HLD solution rule duplicate (structure_root, target_element)

for example, works irrespective of the structure involved. It operates on arbitrary node (data) structures. Basic HLD solution rules, such as "add", ":=", etc. are implemented (in C++) so they generalize across data types (e.g., int, float, char). Indeed, the types of parameters of solution rules are converted to node_ptr before being added to any HLD library. This wrapping process ensures that the solution rules are typeless, interoperable and apply only to input within their domains of applicability. Compound solution rules constructed from these solution rules also interoperate based solely on real-world semantics.

Implementing Abstract Solution Rules

In the preferred embodiment, abstract solution rules are implemented as follows. Each abstract solution rule is affiliated with one or more (implemented) affiliate operations (e.g., functions) in the top-level classes associated with its (object) parameters. Thus, the abstract "clean" in "clean (room)" might be affiliated with "implemented_clean" in the room class. This takes care of the common parts (generic data structure) of room. To "clean" the remaining components of any particular room, the notion of affiliates is extended to operations associated with particular classes. Thus "implemented_clean" might have "make", "vacuum", "wash", etc. as affiliates. In this case, the abstract clean operation would clean any room, having a structure compatible with the inheritance hierarchy associated with room; "clean (room)" would in fact clean all room components for which there is an affiliate. What makes this possible is the requirement that every design must "know" its domain of applicability (e.g., via error checking). Domain testing is integral to the idea of partitioning domains into abstract values.

By way of contrast, an overloaded or polymorphic "clean (my_room)" would work where my_room is of type (generic) room, kitchen or bedroom. Similarly, there would be no ambiguity regarding make (my_room) where my_room is a kitchen. On the other hand, consider a cheap one-room efficiency apartment, one that contains both a bed and a sink, but no carpet or stove. The introduction of affiliate functions (i.e., solution rules) makes it easy to accommodate hybrid objects like this. In addition to cleaning any kitchen or bedroom object, for example, our abstract clean solution rule would apply to any manner of implicitly defined hybrid room as well. An affiliate function like "make" for example, cares only about beds. The presence or absence of a rug would be irrelevant. Implementation of "clean" in terms of overloading and/or polymorphism is necessarily restricted to the defined subclasses (e.g., defined bedrooms and kitchens).

Concluding Comments

Although enabled in all object-oriented languages, the explicit introduction of abstract solution rules in designs makes it possible to avoid the anomaly of having to talk about passing messages or of having to create and implement overloaded designs with overlapping functionality. In the real world, we talk of cleaning rooms, not of telling rooms to clean themselves. In effect, although object-oriented languages enable operation abstraction, they do not directly support operation abstraction in the modeling context described herein.

The use of overloaded designs in independent HLD objects is not encouraged or supported in the current embodiment. No ambiguity would be involved in this case, however, even where overloaded designs are used, because every design has a well-defined data structure on which it operates.

The above discussion assumes the well-known distinction between objects and classes. In the present context, a class hierarchy is a behavioral template from which one can derive any number of specific objects sharing one of the data structures supported by the class hierarchy.

Specification—Design Relationships

In this section, we consider the design process in relation to and as it is affected by the corresponding specifications. When a specification exists, building a corresponding design normally begins by referencing only the highest level variables in the specification hierarchy.

Successive levels of design refinement similarly refer to successive levels of variables in the specification INPUT and OUTPUT hierarchies. Whether or not a given design refinement references variables in the specification, however, all INPUT and OUTPUT variables eventually must be referenced if the design is to satisfy (be consistent with) the specifications.

Variables used in a design that are not in the specification must be declared locally in the design. In the current embodiment, such variables are referred to as INTERMEDIATE variables (see FIG. 2C). With the exception of extraction refinements (which correspond to sequence refinements in designs), the more complete a specification hierarchy, the fewer INTERMEDIATE variables are needed in the corresponding design hierarchy. If needed variables are lacking in a partial specification, those variables must be introduced during design as INTERMEDIATE variables. INTERMEDIATE variables arise naturally as a result of sequence refinements.

Standard practice has been to complete a specification (hierarchy) prior to formulating a design (hierarchy). A complete specification hierarchy, however, also may be constructed in parallel with constructing the design hierarchy. In the preferred embodiment, specifications can even be "reverse engineered" from a design hierarchy. In the latter case, the specifications hierarchy is based entirely on the designer's intuition as to what the solution is to do. As noted above, a design may and normally will reference variables that are not included in its specification hierarchy.

Hierarchical arrangement of variables in a specification is not necessary to ensure adequacy of a specification. Nonetheless, there are important advantages in introducing and arranging specification variables hierarchically whenever possible, specifically where the abstract values of a parent variable may be determined by a function defined on more concrete child variables. To see why this is important, consider the traditional approach to proving correctness.

Definition

A solution rule is correct with respect to its definition if and only if for each specified set of input values, the solution rule produces the specified output.

In a design refinement one must show, for every specified set of values of the input variables, that the refinement produces the same outputs as does the parent. In the absence of hierarchical input-output specifications, behavior of the parent and behavior of the children solution rules in a design refinement are judged relative to the same input and output variables. Typically, these specification variables are associated with the predetermined standard set of resources or components (e.g., addition, subtraction) used in constructing the design. As a result, proof techniques typically must accommodate large, in principle countably infinite numbers of inputs and outputs.

The number of inputs and outputs to be checked is reduced in the current disclosure in two basic ways. First, arranging variables hierarchically reduces the numbers of variables that must be considered at higher levels of abstraction in the refinement process. Behavior associated with parents is decomposed into mappings between children and parents and between parent inputs and parent outputs.

Second, partitioning values of specification variables into abstract values dramatically reduces the number of values that must be considered at successive stages of refinement. In this context, parent variables will generally have different (abstract) values than the variables used in their respective refinements. In order to prove correctness, therefore, one must know or otherwise specify the relationship between abstract values of parent variables and their children. As we have seen, this is accomplished by introducing functional relationships between abstract values of parent variables in specifications and their children. In effect, representing specifications hierarchically with functional relationships between levels in the hierarchy dramatically reduces the number of (abstract) values that must be considered in constructing proofs.

As a result it becomes much easier to prove that a design is correct, turning what has been impossible with realistic systems into a task which is quite feasible, even with the largest systems. The reduction is so dramatic that one can routinely use simple enumeration proofs. In addition, the introduction of abstraction into specifications (as well as its traditional role in design) has the advantage of putting both specifications and designs on the same plane—mapping more directly into the way people think about the real world.

Furthermore, as noted above, design consistency is equivalent to ensuring abstract correctness within a design hierarchy. The previously disclosed consistency constraints also ensure correctness of a design hierarchy with respect to its specification when the specified abstract values are equivalent to those implicitly defined by decision conditions in the design. That is, the implicitly defined abstract values of those design parameters must represent the same equivalence classes, as do the abstract values of the corresponding specification variables.

In principle, it is possible to specify a program completely by adding enough detail to the corresponding specification (e.g., Hoare & Shepherdson, 1985). Many of the details, however, are formalistic and nonintuitive, requiring an entirely different approach to programming. In contrast, the current approach to specification has a direct "real world" interpretation.

Moreover, such specifications facilitate constructing designs. In addition to simplifying correctness proofs, the type of procedural refinement required (e.g., parallel, iteration, selection) for a specified parameter (in the parent solution rule) can often be inferred from the type of refinement associated with the specification variable corresponding to that parameter:

(a) A parallel process refinement may be used when the children in a specification refinement are components of the parent. Specifically, when a parent solution rule in the corresponding design has that parent variable as an input-output or output parameter, one can always introduce a parallel refinement in which different child solution rules reference children of that variable. The analyst (i.e., specifier), of course, need not be concerned with design issues. (Notice that component refinements correspond to the ubiquitous notion of record types in software.)

(b) An iteration refinement is indicated when the specification refinement of a variable refers to an unspecified number of essentially identical child structures (i.e., where one can conveniently introduce a prototype to represent the children). Specification prototypes correspond to INTERMEDIATE (pointer) variables of type "alias" (which are introduced in loop refinements). A single child in a specification hierarchy typically implies a prototype, irrespective of whether the refinement is marked as a prototype refinement. (Prototype refinements correspond to arrays or linked lists.)

(c) A navigation sequence refinement is indicated when the prototype in a specification refinement refers to a fixed finite number (one in the preferred embodiment) of children, rather than to an indeterminate number. Recall that the loop body in an elaborated loop is a navigation sequence.

(d) A sequence refinement is indicated in the presence of an extract refinement. In this case, the children variables provide detailed information not present in the parent variable. Extracted variables are either INTERMEDIATE variable in the design. As noted previously, the abstract values associated with children variables in extract refinements more precisely represent the abstract values associated with the parent.

In the preferred embodiment, the maximal sequence consistency constraints detailed above are used to automatically construct sequence refinements in the design process. Conversely, minimal sequence consistency constraints are used when constructing or updating parents of sequence refinements. The latter constraints allow the designer more flexibility in assembling components.

(e) A selection (i.e., case) refinement may be used where the corresponding variable in the specification: (1) is terminal and has two or more abstract values or (2) is a category refinement consisting entirely of atomic elements with two or more child categories. In both cases, each abstract value or category of the specified variable is a CASE selector. Introducing one of these kinds of specifications indicates that a procedural refinement is desired.

(f) An object-oriented design is preferred when a category refinement includes a compound data structure (in which data structures associated with sub-categories of the category refinement supplement the parent data structure). For example, the variable room might be categorized into bed_room and kitchen where the latter categories share a common core data structure supplemented with additional (specialized) structure. (The latter specialized structures share the same abstract values as room.)

Category refinements in this case correspond to parent-child data structures associated with classes in OO designs. More generally, category hierarchies in specifications correspond directly to inheritance hierarchies in the corresponding OO design. An inheritance hierarchy can always be constructed from the corresponding category hierarchy by adding the desired designs (and optionally their specifications). Class hierarchies always have a single root in the preferred embodiment because category refinements always start with a single variable.

There is a one-to-one relationship between refinement levels in category and inheritance hierarchies. Both contain the same data structures but inheritance hierarchies also contain designs. In the preferred embodiment, recall, a category is represented as a Flexform having two data sections: DATA STRUCTURE and CATEGORY. A class is represented as a Flexform having four data sections: DATA STRUCTURE, INHERIT, SPECIFICATION and DESIGN. The DATA STRUCTURE section contains exactly one data structure; the other sections include references to any number of categories, classes, specifications and design Flexforms.

The CATEGORY and INHERIT sections, respectively, contain lists of sub-categories and sub-classes that inherit from the given category or class. The listed sub-categories specialize the parent data structure. The listed subclasses similarly contain data structures and designs that supplement the parent. Each class includes designs that operate on objects having the same type as that class. Each child sub-category and subclass, in turn, can be refined in the same way. Listing sub-classes (which inherit from the given class) is opposite to the approach used in most OO implementations. Although both approaches are acceptable, the former is used in the preferred embodiment because it makes it easier to implement the previously disclosed notion of affiliates. Specifically, although both approaches were equally useful in constructing objects from class hierarchies, the proposed approach made it easier to extend design interpreter.

As noted above, class hierarchies can easily be constructed from category hierarchies by renaming corresponding suffixes and section names, and adding references to desired specification and design Flexforms (see FIGS. 1B, 1C and 2D). The major difference in a design, of course, is that the category hierarchy must be made operational by adding the desired designs. Specifications for the referenced designs are optional.

Class hierarchies themselves are not behavioral models (designs) but resources used in implementing designs. Although designs are grouped according to the data structures on which they operate when viewed as resources, behavioral models give priority to operational abstractions. In effect, whereas designs are grouped by data structures when used as object resources, data structures are grouped by abstract operations in modeling behavior. These abstractions operate on objects associated with inheritance hierarchies, and are implemented in terms of (affiliated) designs.

To see how specified data objects are used, consider the following scenario: We have a virtual solution rule which calls for cleaning a room. The specification includes a category refinement designating kitchens and bedrooms that serve as both input and output sub-categories. As before, room's input abstract values are presentable and unpresentable; the output abstract value is presentable. All rooms, kitchen and bedrooms alike, even though they have different data structures, necessarily have the same abstract values. Before refinement, the corresponding design contains a "clean" design rule that applies to all "rooms". Rather than refining clean into a case selection (the above non-preferred procedural alternative), the specification calls for introducing an OO design—in particular, a room class hierarchy which encompasses subordinate bedroom and kitchen classes.

Room itself can be a simple variable (or object). Because specified abstract values apply to generic rooms, kitchens and bedrooms alike, their input-output behavior can be ascribed to a single abstract (possibly virtual) operation defined on all rooms, kitchens and bedrooms, and any other defined category (of room).

As anyone skilled in the art knows, there are many ways in which this can be accomplished. Operation abstraction is typically implemented in object oriented design via overloaded and/or polymorphic functions, associated with the various categories (e.g., of room). Thus, we might have one clean for bedrooms and another for kitchen, in addition to a generic clean (on generic parts of generic rooms) which is called by the former. Here, the appropriate clean operation will be determined by the kind of room. As is well known in the object oriented community, the appropriate (overloaded) operation can be determined transparently either during construction or during execution based on the given input structure. In the latter case, the term polymorphism is typically used (instead of overloading).

As described above, abstract operations in the preferred embodiment are implemented via affiliates (independent but associated operations). These operations belong to those classes in the class hierarchy that are associated with the object to which the abstract operation applies. The introduction of abstract operations, of course, eliminates the need for procedural (i.e., selection) refinement.

NOTE: Although not preferred, we have seen how (especially atomic) category refinements can also be implemented via selection refinements. In this case, each category corresponds to a case alternative (in a procedural refinement) which distinguishes the specialized data structures and operations on those structures. Modern languages often provide other alternatives. Object inheritance, or at least certain aspects of it, for example, can be implemented using variant records in Pascal, or unions in C. The major difference in this case is that operations necessarily apply to one or the other of the variants. Typical implementations do not allow operations on the commonalities shared by variant records or elements in a union. Although classes, and inheritance between classes, are easily represented within the current disclosure, classes per se serve the same basic role in behavioral designs as do other libraries. Library components and functions in class libraries both are reusable resources (containing subdesigns and/or executables) used to implement designs. Neither classes nor libraries themselves are behavioral models (or executable systems).

The behavior associated with category refinements (e.g., parent rooms, and child kitchens and bedrooms) is necessarily modeled in terms of operations (solution rules) defined on the objects as wholes, including the operations defined on their data structures. Specifically, abstract operations defined on room apply equally to kitchens and bedrooms. Abstract operations are implemented via affiliated solution rules, some of which apply to generic parts of rooms (e.g., clean may involve washing walls) whereas others require solution rules (e.g., involving making beds) that are unique to specialized aspects of given objects.

To summarize, behavior associated with specified category refinements can be satisfied in designs in either of two basic ways: (a) selection refinements in procedural designs involving specialized subdesigns or solution rules that operate on the categories or (b) abstract operations (solution rules) defined on objects as wholes. These operations apply transparently to all category objects.

The standard OO approach is to implement cleaning room objects, say, by introducing distinct (overloaded or polymorphic) operations associated with different types (categories) of objects. By way of contrast, "clean" is implemented the preferred embodiment as an abstract (possibly virtual) operation which applies to all objects, irrespective of category. Except in the case where all categories in a refinement refer to elementary variables, the preferred implementation of category refinements in specifications is via objects. In either case, one starts with an abstract (virtual) "clean" solution rule in the design that operates on the parent object "room". Procedural refinement yields a case selection in which the child solution rules operate on kitchens and bedrooms. Object-oriented design, on the other hand, encourages the introduction of class hierarchies containing affiliated solution rules which operate on both common and specialized structures. Specialized affiliate solution rules are explicitly called by the abstract operation itself, or by a more generic designs (higher in the class hierarchy). Introducing new sub-category data structures during maintenance in this case has no impact on the procedural designs that use it.

Abstract operations simplify procedural logic. Rather than refining procedural logic, design complexity is put in class hierarchies (and the associated objects)—making it easier both to understand designs and to add new functionality. Suppose we have a "house" object, for example, and a design revision calls for moving houses. The ability to move an object implies the availability of information positioning objects in space as well as operations that modify this information. Such information may be represented by introducing a specialization object (including a move solution rule) which inherits structure from its parents. Once affiliated, the move solution rule adds new functionality.

Adding structure locally in this manner makes it easy to add new functionality without changing (existing) procedural logic. (NOTE: Object implementation is even easier than usual in the preferred environment, because all variables are automatically initialized. Constructors are not needed as such.) The introduction of category refinements in specifications has the further advantage of introducing explicit design discipline, thereby ensuring that the model directly reflects intended semantics—in particular, whether the analyst prefers procedural or OO logic.

Finally, it is instructive to compare inheritance with data execution, where both the values and data structures associated with given variables may be derived dynamically as arbitrary functions of other variables. The former simplifies procedural logic by enhancing input data structures. The latter simplifies procedural logic by replacing functions used in procedures with (new) intermediate variables defined in terms of those functions.

INTERMEDIATE condition variables associated with selection and loop refinements in a design can also introduce new categories. In particular, abstract values of condition variables may be defined indirectly via data execution involving existing variables. In contrast to the above, sequence refinements in a design introduce new INTERMEDIATE variables (which are not in the specifications). When an input-output variable has more than two abstract values, it also is possible to introduce sequence refinements without introducing INTERMEDIATE variables. This is illustrated in the clean room example (see FIG. 2) in the pickup_vacuum refinement. "pickup" converts a messy_dirty rug into one that is just dirty. "vacuum" makes the rug clean.

In the current implementation, the designer is free in any given design refinement to either ignore or take advantage of the above relationships between specifications and designs. In the clean room example, for instance, the operation pickup_vacuum might be refined into a sequence rather than a case selection. That is, even though the specification suggests a selection, the designer might decide to introduce a sequence. Nonetheless, there is a close relationship between abstraction levels in a specification hierarchy and in the corresponding design hierarchy. Having specified a parent parameter to refine (often there is just one), these relationships automate selection of the design refinement. Although not mandatory in the preferred embodiment, these selections could be made so without loss of generality.

Conversely, one can infer specification refinements from the corresponding design when that design is more complete (than the specification). This can be accomplished in the current embodiment by making a copy of the input and output subtrees in the DATA SPECS section. Clone variables, however, only appear once in DATA SPECS. Hence, in order to distinguish abstract input and output values, these values must be determined from the RULE SPECS.

Typically, specifications need not be as completely specified as a design must be in order to be implementable. Consequently, designs will frequently include refinements that go beyond corresponding refinements in the specification hierarchy. In particular, more than one level of design refinement may be involved in a correctness proof corresponding to any given level in the specification hierarchy. These observations are made more specific in the following.

Each solution rule in a design hierarchy has a rule specification, including INPUT, INPUT-OUTPUT and OUTPUT variables. In addition to the variables themselves, rule specifications include all possible abstract values of those variables and the input and output relationships between those variables.

In the preferred embodiment, separate sub-specifications, sub-designs and callbacks may be constructed for any solution rule in a design hierarchy, virtual or otherwise. In either case, one begins the sub-specification with input and output variables corresponding to the parameters of the to-be-extracted solution rule in the calling (or parent) design. Notice that intermediate variables in the calling design may be used in input and output specifications for sub-designs. These specifications, of course, may be refined in turn, thereby providing more explicit guidance during the sub-design process. These specification variables may include reference to parameters that are INTERMEDIATE variables in DATA SPECS of the parent design (FIG. 3B).

When the to-be-extracted solution rule is non-terminal, some additional steps are required. One can create sub-specifications from subtrees in the DATA SPECS corresponding to parameters of the sub-design. These sub-specifications comprise the original DATA SPECS for the sub-design. In the preferred embodiment, the RULE SPECS of the sub-design is constructed by copying the design rule corresponding to the sub-design itself and moving those referenced from it to the sub-design. (The original virtual rule, of course, must be made terminal in the calling design.) Finally, all of the intermediate variables referenced in the sub-design must be copied to the sub-design's RULE SPECS.

Abstract values of the input and output variables in the specification of the called (child) design also must be determined from the parent design. As noted above, abstract input and output values of clone variables cannot be distinguished in DATA SPECS. Hence, these values must be determined in the preferred embodiment from the RULE SPECS.

In the preferred embodiment, callbacks are designs that operate orthogonally to the solution rules that use them. Callbacks are represented as parameters of the solution rules that invoke them. (FIGS. 29A and 30A show GUI interfaces used in the preferred embodiment to launch the main specifications and design builder callbacks.) In general, sub-specifications, sub-designs and callbacks have the same structure and constraints as other specifications and designs. As noted above, sub-specifications, sub-designs and callbacks are listed under INCLUDED FILE (see FIG. 2C).

Clearly, all solution rules that have separate specifications must be made terminal in the original design. Other terminal solution rules are listed in the GLOBAL section (see FIG. 2C). Notice in the clean_room example that the solution rules are very basic. "assign_role" (or "=" using infix notation), for example, assigns an alias (i.e., lets the assigned variable refer to a given one). In a similar vein, "match" and "same" are functions that return T (true) or F (false). The function "next_element" returns that child element of a given parent element which follows a given child. Specifications also are included for each non-terminal virtual solution rule. In the preferred embodiment, all solution rules and their specifications are listed as children under RULE SPECS (see FIG. 2A).

Definition

A design is abstractly correct relative to a specification hierarchy if and only if, for each set of abstract input values for INPUT variables in the specification hierarchy, the design generates the specified abstract output values for corresponding variables in the OUTPUT specification hierarchy.

A design that is abstractly correct necessarily satisfies certain syntactic constraints on the parameters. The constraints imposed by the above consistency requirements are designed to: (a) facilitate automatic construction of refinements during the design process, (b) automate updating of ancestor solution rules (in design hierarchies) during maintenance and (c) eliminate sequential side effects that can arise during maintenance even when a design is otherwise correct.

Definition

A design is complete relative to a specification hierarchy if and only if each terminal INPUT variable in the specification hierarchy corresponds to a variable in the INPUT sub-section of the DATA SPECS section of that design and each terminal OUTPUT variable corresponds to a variable in the OUTPUT sub-section of the DATA SPECS.

Designs necessarily operate on concrete data. Consequently, prototype variables in specifications correspond in any given instance to a given number of variables (sharing the prototype's characteristics). The latter variables and their values (which may change during execution) are stored in PROBLEM GIVENS and GOALS. In the current embodiment, default PROBLEMS correspond to formal parameters given in DOMAINS and RANGES associated with a design. Although prototypes need not have any fixed (array) bounds, GIVENS and GOALS necessarily include a given number of variables.

Definition

A refinement of a solution rule is abstractly (or internally) correct relative to the rule's specification if and only if, for each set of abstract input values, the refinement produces the same specified abstract output values (or their equivalents) as does the (parent) solution rule.

Correctness is typically determined by starting from the abstract input values to the children operations and computing abstract values of the parent operation in two ways: One path (top path) goes from the children input to the parent input (using parent-child relationships) and then to the parent outputs (using input-output relationships). The other (bottom path) goes from the children inputs to the children outputs and then to the parent outputs. The numbers of abstract input and output values is necessarily finite and practically speaking quite small in number. Consequently, simple enumeration proofs will often be sufficient. This technique is used in the current embodiment. Those skilled in the art, however, will recognize that the same results can be achieved by any number of automated theorem proving techniques.

Refinement Induction theorem

For each design in (slice through) a design hierarchy, if the top-level solution rule in the design hierarchy is consistent relative to a complete specification hierarchy and each refinement in the design hierarchy (up to and including all solution rules in the design) is abstractly correct (relative to the parent's specification hierarchy), then the design itself is abstractly correct relative to the specification hierarchy.

Summary Proof

This observation follows because each level of refinement, including those levels explicitly in the design, produces the same behavior as its parent. For similar reasons, the design hierarchy itself is abstractly correct relative to its specification hierarchy. This relationship also holds when a specifications hierarchy is not complete (does not explicitly specify all relationships between parent and children variables) because we assume in this case that each specification variable has exactly one abstract value and that (abstract) parent values are derivable from abstract values of their children.

Resources Used in Implementing Designs

The discussion so far emphasizes the abstract behavior a system is to produce, and the design resources used in elaborating the operations and objects used in producing that behavior. Both procedural and OO designs are defined in terms of solution rules that have a direct semantic relationship to the real world. Components in designs include solution rules and conditions used in designs. Solution rule parameters may include objects consisting of data structures together with the solution rules that operate on those data structures. This section addresses the implementation of designs and objects. We begin with some definitions.

Definition

Components are semantics-based if their specifications have the same form as those of solution rules. Component internals typically are unknown or are not in a form that can readily be analyzed. Such components may be called compiled components. Components are commonly packaged in procedural libraries (e.g., C function libraries) and/or class libraries (e.g., C++ class hierarchies and/or class templates).

Definition

A semantics-based component is executable if it automatically generates a unique output for each input in its domain. To execute correctly, of course, the component must generate the specified output for each input. The component is also error-free if it recognizes inputs that are not in its domain, and provides an error message or otherwise does not execute.

Definition

An object executes correctly and is error-free with respect to an abstract solution rule which references it as a parameter if all affiliates of that abstract solution rule execute correctly and are error-free. This implies that all affiliates of affiliates execute correctly and are error-free.

Definition

A semantics-based component (in some library of available resources) matches the specifications for a solution rule if and only if all parameters of the component have the same types and roles (i.e., input, input-output, output) as the solution rule's parameters.

Definition

A component that satisfies a solution rule's specifications executes correctly in the abstract if and only if, for each set of values of its input parameters, the component generates an output response consistent with the abstract input and output values specified for the solution rule.

Equivalently, a component (which matches the specification for a solution rule) executes correctly in the abstract if and only if for all input values in every set of abstract values in solution rule's specification, the component generates outputs in the specified abstract output values. In this case, we shall also say that the solution rule executes correctly.

The data structures on which components operate must similarly be reduced to constructs (data structures, or what are commonly referred to as data types) which reflect the way memory has been organized on the implementation device.

In the preferred embodiment, all parameters of semantically wrapped components have the same abstract data type, called "node_ptr". Variables of type node-ptr may have values and/or point to (be aliased with) other variables. In the preferred embodiment they are implemented in terms of Flexform nodes which also have other properties (i.e., fields). The basic parameter types include integer, character and float. Derived types, that is record and array types, are defined in terms of hierarchies (of nodes). Aliases (i.e., pointer types) are defined in terms of pointers between nodes.

It is clear to anyone skilled in the art that matching solution rules and semantics-based components can be accomplished automatically. Comparing what are often called (syntactic) signatures is sufficient for this purpose. The situation with correct execution, however, is quite different. Semantic issues also must be addressed if one is to ensure that a component actually generates the required behavior. It is not sufficient that corresponding parameters of components and solution rules simply have the same numbers of abstract input and output values. It also is essential that the abstract values have the same meanings. The input and output parameters of components for adding and subtracting integers, for example, are in one-to-one correspondence both as to number and roles. The corresponding parameters might even have the same numbers of abstract values. To assure intended behavior, however, the semantics of these abstract values must be the same. That is, the abstract values must refer to the same equivalence classes of values. This clearly is not the case with addition and subtraction. The output is a sum in addition, and a difference in subtraction.

The above concepts apply directly to our familiar clean (room) examples. It is instructive to consider how these ideas also apply in event driven environments involving call back functions. Consider a prototypic case involving the solution rule display_poll_dialog (call_back: dialog_box, persistent_data). This solution rule displays a dialog box and reacts to external events. One input to the solution rule is the call_back function. The dialog_box and persistent_data parameters serve as both input and output. The solution rule provides an (external) environment within which the call back operates, possibly modifying the solution rule's parameters. The call back reacts to events in the environment. Abstract correctness in this case requires that the callback handle all abstract inputs correctly, including external events. This typically involves invocation of a variety of case alternatives in the callback, one for each abstract value.

We have shown previously how embedded functions can be replaced via data execution. Hence, it also is of interest to observe that embedded functions can be viewed as a special case of callbacks. The former take initial inputs and returns results to the solution rule before execution. Callbacks operate independently at any point during execution of the solution rule. The solution rule effectively creates an environment within which the call back operates. Inputs to the call back include the solution rule's parameters (e.g., persistent_data) as well as external events.

The same functionality might be obtained using objects. Thus, we might introduce the abstract solution rule abstract_display (dialog_object), where dialog_object is an object containing functions for creating a display and for reacting to events. For the abstract solution rule to operate correctly it must create (output) an appropriate dialog box display and the dialog object must react as specified to outside events. It accomplishes this by evoking a display affiliate in the dialog object and one or more callback affiliates (which react to the external events). Each call back affiliate, of course, must know its domain of applicability.

Definition

A solution rule (in a design) is directly implementable if and only if there exists at least one component which matches the solution rule, executes correctly and is error free. Similarly, a condition is directly implementable if and only if there exists at least one component (a function in the preferred embodiment) which matches the condition, executes correctly and is error-free. Finally, an abstract solution rule is directly implementable if and only if all affiliates of the class hierarchies corresponding to object parameters of the abstract solution rule execute correctly and are error-free.

Indirect Implementation

Solution rules also may be implemented in terms of executable designs with automated support, even where solution rules are not directly implementable. As noted under prior art (i.e., in describing the structural learning theory—Scandura, 1973, 1977) the goal switching control mechanism as originally formulated does not lend itself to automation in a way that is independent of the higher and lower components whose use it is to control. Indeed, it was not apparent for many years to the inventor of this concept himself how to resolve this problem. The present disclosure reveals an automated method that fully separates control from the operational components. This disclosure is universal in application; among other things it accommodates alternative methods such as production systems and means-ends analysis as special cases (e.g., Winston, 1987, pp. 129–56).

Rather than defining higher order problems in terms of designs that satisfy problems, higher order designs are defined as designs whose outputs include outputs . . . that include designs that directly match the original problem. Such designs generate designs . . . that in turn solve the original problem. Although this is the kernel of the idea, it is still not obvious how to formulate this idea as an unambiguous control mechanism that can be used with arbitrary sets of components. Such a solution is proposed in the current disclosure. This solution has direct application in implementing designs when there is a gap between the available components and to-be-implemented solution rules.

In the preferred embodiment, the inputs and outputs associated with the to-be-implemented solution rule constitute the specification for a problem to be solved. In its most demanding form, unless exactly one component matches the problem specification, the control mechanism directs the search to components whose outputs contain designs having the same structure as the to-be-implemented solution rule. (These are higher order components that can generate designs that in turn can solve the problem—directly or indirectly as above.) The process continues until a unique match is found. The matching component is then applied, thereby generating a new component. At this point, the process is reversed. Matches are sought at previous levels, specifically including newly generated designs, until the original problem can be solved. Details on the control mechanism used in the preferred embodiment are given in the following section on the preferred embodiment.

In a more relaxed form of the control mechanism, any component that matches is acceptable. The control mechanism can be specialized to make its selections on whatever basis seems desirable—the first match, most recently used, most specific, etc. Where exactly one match is required for a component to be applied, higher order components are needed to select from among the alternatives.

Structural analysis (e.g., Scandura, 1982, 1984a), particularly as regards the identification of higher order specifications and designs (see DESIGN DEFINITIONS), plays an essential role this approach. Unless the available components include the necessary higher order executable components (or designs), no basis exists for constructing the new designs that may be needed for implementation.

Direct and/or indirect implementation can take place at any level in a design hierarchy.

Definition

A design is implementable, also called a solution design, if and only if each terminal element—solution rule and condition—in the design is implementable.

Definition

A design executes correctly if and only if for all input values in the specification, the design generates outputs in the specified abstract values. In the case of affiliate designs the design must recognize inputs outside its domain and react gracefully, perhaps returning an error message.

Correctness Theorem

If a design is abstractly correct relative to a specification hierarchy and each terminal element of the design is implemented in terms of a component which executes correctly, then the design will execute correctly with respect to the specification.

Summary Proof

Assume there exists a set of actual input values associated with abstract values of variables in the specification hierarchy for which the design when executed produces an unspecified result (i.e., an actual value which is not in the specified abstract output value). This output value and each of the input values of the associated input variables belong to unique abstract values of the associated variables in the specification. However, the abstract output value associated with some valid set of inputs is different from that specified. Since the design is abstractly correct, the only way this can happen is if one of the implementation components does not execute correctly. This contradicts the assumption that each component used in the implementation executes correctly.

This theorem has considerable practical import because it dramatically reduces the number of tests required to prove correctness. Once a design has been shown to be abstractly correct, it is sufficient to apply correctness proofs successively to terminal elements in the design. Consequently, the method scales easily to arbitrarily large software systems.

Proving abstract correctness is equivalent to traditional correctness proving methods with one major exception. Instead of establishing correctness with respect to a fixed set of basic operations (e.g., addition and subtraction), proving abstract correctness is relative to whatever operations the designer is willing to assume operate as they should. In effect, the applications developer is free to determine correctness to whatever degree of certainty is desired. A designer can always implement a design in terms of components in which he has an arbitrarily high degree of confidence. In particular, implementation components can always be chosen so as to guarantee that the design will execute correctly to any desired predetermined level of certainty.

In the structural learning theory, this is equivalent to the relativistic nature of atomic knowledge (often called rules). The more capable the human, the more one can assume for diagnostic purposes, and the less detail one needs to provide in conveying information to the person (e.g., Scandura, 1971, p. 32–5; 1973, pp.183–5; 1977, pp.114–20). Metaphorically, this fact has direct relevance for designing software.

If one refines any given solution rule sufficiently, one can always reduce that solution rule to descendent components which one is willing to assume operate correctly. Our experiments also imply that eventually the descendent components may involve only a finite number of actual inputs and outputs. If this can be formally proven, one should always be able to prove actual correctness automatically, often by simple enumeration. Without rigorous proof this seems to follow from the availability of interation (loop) refinements. Each loop refinement reduces a potentially infinite number of possible inputs into a finite number. Hence, given a sufficient but still finite number of loop refinements, components having infinite numbers of input-output (I-O) pairs into can always be refined into components having only finite numbers. It is left to mathematicians to determine exact conditions and to devise formal proofs.

Irrespective of whether finite numbers of values can always be guaranteed, recent developments in automatic theorem provers make it possible to handle certain classes of components having infinite numbers of I-O pairs. The current disclosure in combination with automatic theorem provers opens up the possibility of formal correctness proofs in essentially any situation. In effect, automated theorem provers will be the key to moving from relative proofs of correctness to actual proofs. This would close the loop on a major breakthrough with very significant practical implications!

To see how the above ideas relate to traditional programming, consider the following example.

```
read(X);
read(Y);
read(M);
while (X<M & Y<M)
   X=X+3;
   Y=Y+5;
wend;
if M=<X
   return(X);
else
   return(Y);
fi;
```

An equivalent design can be constructed via abstract value analysis involving successive refinement of both data and process. Suppose the specification starts with an input variable called file having three abstract values (i.e., equivalence classes): relation, ~relation1, ~relation2. We introduce three relations because the program distinguishes three situations. In the specification, the top-level output variable is XorY, where all abstract input values map into the default abstract value (consisting of one abstract value).

More precise specification is obtained via an extraction refinement. In this case, the three abstract input values are represented in terms of a relation involving the variables X, Y and M. Whereas the parent in the refinement has three abstract values of file the children have abstract triples of values of X, Y and M. That is, the conditions in the above program are represented as equivalence classes of triples of values of the children variables. These equivalence classes (i.e., abstract relationships) correspond one-to-one with abstract values of the parent.

In effect, (X<M & Y<M), M=<X and (M>X & M=<Y) are (non-hierarchical) extraction refinements, respectively, of relation, ~relation1 and ~relation2. The only difference between the two sets of abstract (relation) values is that the former expressions are more precise. Representing the abstract values of file in more concrete terms (i.e., as relationships between the specific attributes X, Y and M) becomes meaningful, of course, only when child variables X, Y and M are specified.

The child variables referenced in the detailed abstract relations (i.e., X, Y and M) must be extracted from the parent variable file during the design process. Consequently, the specification refinement is referred to as an extract (non-hierarchical or factual) refinement. There can be any number of extract refinements: Recall that consistency of a refinement, for example, can be represented more precisely in terms of top__path and bottom__path, which in turn can be represented more precisely in terms of elements which make up the paths.

In parallel to the extract refinement, the output variable XorY may be refined into its components X and Y, each of which has one default abstract value (as does their parent XorY).

Based on this specification, the top-level of the design, say process (file:; XorY) is first refined into a sequence: read (file:; X, Y, M) followed by, say, adjust (M: X, Y;) and finally return (M, X, Y:; XorY). The read rule extracts (i.e., derives) the values of X, Y and M from file. (Although the use of sequences is preferred, as in this case, attributes and relationships also may be extracted from abstract values associated with conditions.) The read solution rule can be refined further, as a parallel sequence involving three separate reads.

The adjust rule then takes X, Y and M as inputs and outputs X and Y. The adjust rule is further refined into a loop. Here, the loop condition is defined in terms of the first abstract relation (X<M & Y<M) and its negation. (These relations are equivalent to the abstract parent values: relation and ~relation. Once X, Y and M have been extracted, however, the more detailed representations become available for use.) The body of the loop finally is refined into a sequence, the first child of which outputs X and the second Y.

return takes X and Y as inputs and outputs XorY. XorY is an abstraction. It contains both X and Y as components. The component specification calls for refining return into a selection refinement based on the condition M=<X (or ~relation1) and its negation (~relation2). The corresponding actions are as in the above code. (Note: Instead of introducing three relations in the original specification, we might have introduced only relation and ~relation. In this case, the rule specification for return would have to include a partition on ~relation, or its equivalent in terms of X, Y and M.)

Although extraction refinements add nothing with regard to abstract correctness (the number of abstract values does not change), they do make the abstract values more accessible to formal proof. Specifically, extraction analysis is crucial to reducing complexity of the required proofs. Proving actual (in addition to relative) correctness requires that abstract values associated with the components used in an implementation be defined concretely in terms of mathematical expressions, like M=<X for example. Formal proofs are not possible when the components are defined in terms of abstractions, like relation, ~relation1, ~relation2.

Contemporary theorem provers are designed to work with detailed mathematical expressions. Hence, this example illustrates how automatic theorem proving methods might be applied when implementation components and their abstract input and output values are made "simple enough". In effect, the disclosed relative correctness methods, when combined with automatic theorem proving techniques, make it possible to formally prove correctness (with respect to actual values) of programs of arbitrary size.

Observation

Any design in a design hierarchy which is abstractly correct relative to a consistent specifications hierarchy may be converted into (i.e., replaced with) another abstractly correct design which is more (or less) abstract relative to the design hierarchy.

This follows because parent rules produce the same (or equivalent) abstract values as their children. Replacing subordinate solution rules with one higher in a design (abstraction) hierarchy, for example, may reduce the overhead associated with ensuring that solution rules interoperate. Consequently, this type of conversion may (but will not necessarily) improve efficiency. In this context, notice that the more abstract a design the smaller will be the subset of INTERMEDIATE variables (introduced during refinement) that are actually used in the design. (NOTE: Adherence to previously detailed consistency rules avoids unintended sequential effects, even where the same intermediate variables are (re) introduced in different refinements. Because intermediate variables can only be introduced in sequence refinements, previous values are ignored in any given refinement. Such reuse is common in programming and can be used to safely reduce the numbers of such variables. Constraints on the introduction and use of alias variables have similar effects.)

The Preferred Embodiment

The Problem.—Imagine the following scenario. You need to get a job done and must convey your wishes to the person who is going to do the work. Moreover, assume that it is very important that your instructions be followed precisely. Verbal, even written, descriptions are often ambiguous and lead to miscommunication. The same is true, often even more so, in describing the processes (behavior) to be followed.

Now imagine multiplying these problems a thousand or more fold. This is the situation confronted in specifying and designing any non-trivial software system. Figuring out how to assemble available components to achieve desired ends requires a high degree of skill and leads to many errors.

A variety of methods have been proposed to help solve these problems but none has been completely satisfactory. All design methods, for example, provide some way to represent different levels of data, process and/or object abstraction. Common methods deal with data (information engineering), others with processes (structured analysis) and still others attempt to model the real world by describing behavior in terms of objects (i.e., data containing processes—see Booch, 1994; Scandura, 1996). All of these factors play an important role in developing software, but attempts to integrate the methods have involved idiosyncrasies, compromises, unnecessary complications and incomplete descriptions. Although some error checking is common, automated support for such methods consists primarily of help with design drawings. Although such support is better than nothing, human analysts, designers and programmers still must make all decisions.

Previous attempts to ensure the internal consistency and/or correctness of software have all failed in the "real world" in one way or another, typically because they were impractical. The approach described in Martin (1985), for example, was non-intuitive and limited to ensuring internal consistency. Proving correctness via cleanroom engineering (e.g., Linger, 1994; Linger, Mills & Witt, 1979), on the other hand, requires intensive and continuing manual effort. Formal assurances (i.e., proofs) based on cleanroom engineering are theoretically possible but infeasible in practice. The method proposed by Gaboury (U.S. Pat. No. 5,481,717) does not address development or maintenance processes at all, but rather deals only with verifying that two logic programs (after development) perform the same behavior. Although it is possible in principle to detail both specifications and designs to the same degree (so that equivalence can be verified) this is almost never done in practice. It is hard enough to develop one non-trivial software program let alone two.

The present disclosure solves these problems by extending concepts and methods commonly used in the software industry. The methods revealed herein automate many of the processes involved in developing and maintaining software while, at the same time, ensuring that the software will do what it is supposed to do. In fact, the methods used in automation and those used to ensure consistency and correctness are both based on the same core ideas.

Basis for Solution

The methods disclosed herein automate refinement and abstraction processes in ways that ensure internal consistency and correctness with respect to independently formulated specifications and reduce the difficulty of proving correctness by reducing the problem from proving correctness of entire programs to correctness of the components that make up the programs. These methods involve: (a) refining data and process simultaneously in a way that combines behavioral and object oriented methods while reducing the numbers of variables that must be considered at any given level of refinement, (b) capitalizing on semantically meaningful relationships between different kinds of specification and design refinements and (c) reducing the numbers of values that need to be considered to ensure correctness by introducing value abstractions (i.e., by partitioning of values of variables into equivalence classes, or what we have called abstract values).

The above and other close relationships between data structures, processes and values, and their roles in software specification, design, implementation, maintenance and testing have been described in considerable detail in previous sections. These previously revealed concepts and ideas are key to the present invention. Collectively, they provide a general and highly adaptable foundation for automating software development and maintenance processes while guaranteeing that the software does what it is supposed to do. Specifically, this foundation provides a sound basis for devising any number of practical and easy to use methods for automating specification, design, implementation and maintenance processes, and for ensuring internal consistency and correctness. (NOTE: The clean room examples used above to illustrate many of the above ideas have nothing directly to do with cleanroom engineering—except that the present disclosure and cleanroom engineering share some of the same goals. The clean room examples deal with real world behavior and are simple in nature. Nonetheless, the methods they illustrate are equally applicable to arbitrarily large software systems.)

Particular methods based on this foundation have been implemented as a software program, called the Automated Application Builder (AutoBuilder). AutoBuilder constitutes the preferred embodiment. Moreover, the methods disclosed herein have been used increasingly in bootstrapping AutoBuilder's own development. Using these methods, virtual and implementation components are automatically assembled, refinement by refinement, through implementation while guaranteeing internal consistency and correctness with respect to specifications. Conversely, design abstractions are automatically inferred and constructed from assembled components, though only correctly assembled components will allow consistent and correct abstractions.

The preferred AutoBuilder embodiment is comprehensive in scope, and represents a fully integrated software development and maintenance environment. Both top-down and bottom-up approaches are supported. FIG. 8A shows excerpts from the specifications builder callback, and FIG. 8B the design builder callback. Top levels of the consistency and correctness checkers are shown in FIGS. 11 and 12. As described below, automated implementation and abstraction methods also are supported. Interactions between these methods can either be controlled automatically or by the human designer. Common practice, for example, calls for solution designs to be derived from available specification hierarchies. Consequently, the AutoBuilder implementation supports the development of specifications and their use in design. It also makes it possible, however, to evoke specifications from designs and vice versa. To help organize large systems, the AutoBuilder embodiment includes support for aggregating specifications and designs in component and class libraries, compilation units and projects. As noted above, designs are included in libraries and classes, which in turn may be included in (compilation) units. Similarly, units may be included in projects. Particular attention is called to the above discussion indicating how a specification can be implemented using both procedural and object-oriented designs. All behavioral models, however, require at least one level of procedural logic at the top.

The Preferred Methods

We turn next to methods supported in the preferred implementation.

Building Specifications

Building a specification hierarchy involves: (1) specifying the output and corresponding input variables at a high level of abstraction, (2) optionally identifying abstract values (i.e., distinguishable and semantically meaningful equivalence classes of values) for each input and output variable (the default being one abstract value per variable), (3) specifying INPUT-OUTPUT RELATIONSHIPS—that is, for each abstract value of each output variable, specifying the corresponding abstract values of the input variables, (4) optionally refining the specification variables into variables which more fully characterize the desired inputs and outputs (the child variables may be components, categories or extracted facts (non-hierarchical properties and relationships which more precisely define the parent), (5) specifying PARENT-CHILD relationships (the mapping) between the abstract values of each parent variable and its children and (6) making sure that each refinement is consistent. (NOTE: When no abstract values are specified the variables themselves are equivalent to a default single abstract value.)

In step (4) of the preferred embodiment, component and extraction refinements specify procedural design logic whereas category refinements specify object-oriented logic. Steps (2) through (6) may be applied any number of times until the analyst is satisfied that the specification is sufficiently detailed to guarantee that any solution which satisfies the specification will do what is desired. Excerpts from the specification's design are shown in FIG. 8A.

Abstract input-output values are checked for consistency at each level of refinement as the specification hierarchy is being built. The input-output checker ensures that the specification accounts for all abstract values and that there are no ambiguities—that is, each output value is accounted for, and there is an unique output for each set of possible inputs. The parent-child checker similarly ensures that there is a well-defined functional mapping between abstract values of each parent variable and its children. Specification refinements also are checked for consistency. As detailed above, this means that the input-output behavior specified for the children of each output variable and its corresponding inputs must be equivalent to that specified for the corresponding parents. In the preferred embodiment, this is accomplished by starting from the children inputs and computing the parent's outputs via the top path and via the bottom path. The specifications checker notes deviations, informs the analyst and provides appropriate guidance.

In the current implementation, the analyst-designer has the option of starting with the specifications or the design, and of moving arbitrarily between them. In the preferred embodiment, when a project is started, the specifications builder asks the human analyst to assign names to the top-level abstract input and output variables, identify abstract values for each and so on as in steps (1) through (5) above. The specification builder automates the process and displays the results at each phase, requiring human input only where human intent is essential. It also checks human input at each step of the process for completeness and consistency.

The preferred method for building specifications is summarized in FIG. 15. This method applies to all specifications, including higher order specifications. In the latter case, the only difference is that the abstract values of at least one output variable refer to equivalence classes of specifications instead of equivalence classes of simple values.

Building Designs

Designs also are built with automated support. In the preferred embodiment, the design process begins at the top. When run in automatic (CONTINUE/SUGGEST NEXT) mode, the first step in the design builder is to determine the names of the input and output variables and that of the operation in the top-level of the design. Given a specification, the top-level solution rule is constructed automatically. Where possible, the names of input and output variables are determined from the specification (if any). The designer is given the option of renaming the automatically generated operation name. The input and output variables also are automatically "declared" in the DATA SPECS, RULE SPECS, DOMAIN and RANGE of the design as described above. Where specifications are available, the top-level design (i.e., solution rule) includes only the top-level INPUT and OUTPUT variables in the specification hierarchy. Subsequent refinements are based on the parameters of the solution rule being refined. Given the type of design refinement, solution rule shells for children in the refinement can be constructed automatically in a way that insures internal consistency and correctness with respect to the specification. The names associated with the child solution rules may be adjusted and other user-specified changes can be made as long as the required consistency rules are not broken. FIG. 12 summarizes the process used in checking correctness of a design with respect to its specification.

Where parameters of a to-be-refined solution rule correspond to (i.e., have the same name as) variables in the specification, it also is possible to automatically determine the appropriate type of design refinement from the specification refinement. In the preferred embodiment, the automated design builder bases its suggested refinement type on the refinement type of one of the specified variables used as the solution rule's parameters. No input from the user is required when the solution rule has only one parameter. When there is more than one such parameter, the suggested refinement will depend on the design parameter chosen as a basis for the refinement. A design refinement may correspond to refinement of specification variables associated with more than one parameter. However, such parameters can always be replaced by an abstraction. The preferred embodiment encourages refinement based on only one parameter, but the designer can always override the suggestion as long as consistency is maintained. In short, if the chosen parameter is included in the specification hierarchy, then the suggested design refinement is determined by the specification refinement. The specification refinements and corresponding design refinements used in the preferred embodiment are summarized in Table 2.

TABLE 2

Relationship between Specification and Design Refinements

| Type of Specification Refinement | Suggested Design Refinement |
|---|---|
| component | parallel |
| prototype (variable # components) | loop (elaborated repeat-until, do-while) |
| prototype (fixed # components)* | navigation sequence |
| terminal | case (based on abstract values) |
| extraction | sequence |
| category (atomic sub-categories) | selection (case/if-then, based on sub-categories) |
| category | class inheritance hierarchy |

*In the preferred implementation the number of child components in a prototype refinement is typically one. In this case, the component in a navigation sequence designates a single to-be determined component (e.g., the next to last element in a set) on which some action is to be performed.
NOTE: Recall that variables in specification refinements may themselves be dynamic specifications. Similarly, parameter variables in designs may be designs, which interact with one another.

In the preferred embodiment, the human designer may choose to override these suggestions. At each stage of refinement the design builder automatically constructs a shell for children solution rules and conditions (see FIGS. 9, 9A–G). The suggested child solution rules are consistent with both the specifications and the consistency rules detailed above in relation to the given parent solution rule. These rules ensure that all parameters are properly classified as to role (i.e., input, output or input-output).

The consistency rules described above and implemented in the preferred embodiment are designed to ensure internal consistency under default conditions—that is, where no abstract values are explicitly specified (so there is one default abstract value for each specified variable). Correctness with respect to a specification further assumes that the names of design parameters and their abstract values match the corresponding names in the specification. Where constants or call backs are used as parameters, they are viewed (for purposes of determining correctness) as variables with one abstract value, namely the constant value. It is clear to anyone skilled in the art that there is any number of variants on these consistency rules that would serve the same purpose. In particular, stronger constraints may be used in automatically constructing refinements. (As noted below, weaker constraints may be used to facilitate design abstraction with respect to legacy code.)

In auto-assembly (i.e., auto-refinement), except where parameters correspond to specified variables, the human designer has the option of accepting computer generated names for new solution rules and their parameters, or of assigning more meaningful names. Given a variable on which to base a design refinement, parallel, loop, sequence and selection design refinements are proposed automatically based on the kind of component refinement in the specifications hierarchy as detailed in Table 2 above. Parallel refinements are suggested where a specification involves an output refinement involving two or more component variables. Based on the preferred consistency constraints, a loop refinement is indicated where a specifications refinement involves a prototype corresponding to the loop alias. Sequence refinements are suggested where extraction refinements are specified. A selection refinement may be used where a terminal specification variable has two or more abstract values. Selection refinements also may be used to implement category refinements in specifications. The use of objects, however, is the preferred design implementation for non-atomic category refinements—that is, where the category variables involve non-atomic data structures. In the preferred embodiment, AutoBuilder can be configured to accept suggested refinement types automatically, although the default is to make the human designer ultimately responsible for deciding what types of refinement are to be used and when. A choice must be made, of course, where multiple parameters of the to-be-refined solution rule correspond to variables in the specification, especially where these parameters correspond to specified variables having different refinement types. In this case the choice of specification variable on which to base a design refinement necessarily depends on the semantic intent of the designer.

Regardless of what or whomever makes the decision, the AutoBuilder automatically creates a shell refinement in accordance with FIGS. 9A–G that satisfies the consistency constraints detailed above. AutoBuilder assures that the refinement is internally consistent and correct with respect to the design's specification. In this context recall that maximal sequence consistency and elaborated loop consistency both ensure refinements that are more easily understood than their more lenient counterparts (e.g., minimal sequence consistency). Specifications for individual solution rules also may be introduced during design. In this case, newly introduced INTERMEDIATE variables may be enhanced with abstract values.

The designer may assign new or revised names that have a direct semantic interpretation in the associated application domain as long as they do not conflict with the specification. Every time a new solution rule or condition parameter is introduced, the designer is given the opportunity to specify abstract values for that parameter (the default being one). The latter information is stored in RULE SPECS and is essential in proving internal consistency (and correctness).

In the preferred embodiment, design checkers automatically check the consistency and correctness of each refinement (FIGS. 11 and 12). They also provide feedback and assistance as appropriate. During construction (e.g., FIG. 9), designs can be constrained to whatever degree is desired. Nonetheless, while AutoBuilder refinements are correct by design, this will not necessarily be the case where human designers make modifications. In this case, the design consistency checker (e.g., FIG. 11) automatically checks the modifications and provides appropriate feedback. The consistency checker operates in accordance with the consistency rules described above under DESIGN DEFINITIONS. To assure consistency, of course, the names of INPUT and OUTPUT parameters must remain identical with corresponding variables in the specifications. The preferred embodiment disallows renaming variables that come from specifications.

The design correctness checker (FIG. 12) further compares the parent's input-output behavior with that of its children to make sure that the refinement produces the same (i.e., equivalent) abstract values as its parent. As in checking the consistency of a specification, the preferred method is to start with abstract input values to the children and make sure one gets the same abstract output values for the parent via both the top path and the bottom path. Pre-specified abstract values in the specifications as well as in rule specs associated with child solution rules introduced in corresponding design refinements are used for this purpose. Given the possible abstract values associated with each solution rule in a design, it is possible to unambiguously determine the (abstract) behavior associated with any given design refinement and with any given path through the design.

Designs (and programs based on such designs) may, in principle, be indefinitely large. In common practice, however, large designs are typically broken up into different subroutines, class hierarchies and/or compilation units. There are two basic ways of addressing this issue in the context of the present disclosure. One is to simply combine all designs and sub-designs, irrespective of whether they initially are in separate routines, libraries or units. In this case the disclosed methods apply directly to the composite design.

In the preferred embodiment relationships between designs and sub-designs are handled directly. Whenever a new sub-design is changed, formed or extracted from another design, the specification for that sub-design must be consistent with sub-design calls (from calling designs). Thus, when the interface (i.e., specification) to a sub-design is changed, all sub-routine calls must be adjusted to reflect this change. This is accomplished semi-automatically in the preferred embodiment via the Update Interfaces option on the Design Builder dialog (see FIGS. 30A, 30M and 30N). Impacted calling designs are identified by first inverting the relevant call hierarchy and then referencing the subtree having the changed sub-routine as its root. Whenever the specification interface to a sub-design is changed, all of the calls are changed accordingly, including adjustments to parameter structures (or equivalently adjustments to data types). Although changes to actual design logic may be made automatically, designer input is required in the current embodiment.

Conversely, in building a design the designer may choose to delay final implementation by introducing one or more sub-designs (rather than by introducing an executable component). In this case, the preferred implementation automatically constructs a specification and top-level solution design for the sub-design (hierarchy) directly from the call specification.

Additional factors come into play in constructing specification parameters when parameters of the solution rule call are non-terminal (i.e., have a structure, or equivalently a defined data type). For example, data structures to be passed as parameters may be constructed while the design is being executed. The sub-design in this case must be applicable to a wide variety of such data structures. (Notice that the parameters of abstract solution rules also accept different sub-structures as well as different values.)

It is essential in constructing a sub-design specification to identify those parts of each parameter structure that are invariant. Only invariants are to be passed to the sub-routine. For example, suppose a design constructs a variety of Flexforms, and that Flexform is a parameter of the call. Clearly, the concept of a Flexform is all encompassing. Given a particular Flexform, which parts of this Flexform (data structure) are to be passed when the call is broken out as a subroutine? The specification should contain only those parts of the structure that are common to all allowable subtypes.

Obviously, these same ideas apply to extracting virtual solution rules at higher levels in a design hierarchy (via the Create Sub-design option in FIG. 30A). In this case the above methods are used to construct sub-design specifications and top-level solution rules from the specifications of higher-level virtual solution rules. The only difference is the extra bookkeeping required to ensure that redundant (no longer used) variables are eliminated form the original design.

The above construction methods ensure that one cannot change a subroutine call if that sub-routine already exists. The available sub-routine specification imposes constraints on the call (which must remain correct with respect to its specification). The desired change is made in the preferred embodiment by first changing the sub-design, and then updating calls in the callers as above (see Update Interfaces).

The preferred method for building designs is summarized in FIG. 16. This method applies to all designs, including higher order designs in which one or more output parameters are themselves specifications or designs. In the latter case, the only difference is that the abstract values of at least one output variable refer to equivalence classes of specifications or designs instead of equivalence classes of simple values.

Design Abstraction

The AutoBuilder uses similar consistency constraints to automatically construct (or reconstruct during maintenance) abstractions from designs in implicit design hierarchies. Natural groupings or assemblies of terminal solution rules and conditions always exist, irrespective of whether a parent solution rule (or descriptive comment for that matter) has been specified for any particular assembly. These assemblies are made explicit in Flexform, control flow and other procedural representations. Complete design hierarchies (including higher level solution rules) can be constructed automatically from given designs as long as the (implicit assemblies of) terminal solution rules and conditions in the design, and higher level designs constructed therefrom, satisfy the given consistency constraints. In particular, higher level virtual solution rules (e.g., see FIG. 10) can be inferred automatically from working HLD programs. The consistency rules used in conjunction with design refinements, however, may not allow for all valid constructions. Consequently, the resulting refinements (i.e., automatically constructed parents) may not always be consistent even though the program itself is valid.

Implicit assemblies of statements (corresponding to solution rules) inherent in the legacy code also can be reverse engineered from existing code (in traditional programming languages) using well-established parsing techniques associated with language grammars (e.g., Scandura, 1992; also see FIGS. 13A, B and C). The legacy code is first reverse engineered to expose its semantics. Then essential characteristics are converted to HLD designs. The latter include both architectural characteristics such as classes and compilation units as well as procedural modules. In general, all aspects of a legacy system having counterparts in HLD programs are converted. Other characteristics are ignored. The latter typically consist of compiler meta-commands, detailed memory manipulation techniques, etc. An alternative, non-preferred, approach would be to construct consistency constraints directly tailored to particular programming languages.

Except for sequence and loop refinements (see detailed discussion in DESIGN DEFINITIONS) the same consistency constraints are used both in constructing refinements and in updating parents in the preferred embodiment. Minimal sequence constraints and non-elaborated loop constraints are used in up dating parents. It is important to recognize that the aforementioned abstraction processes pertain to individual designs. Classes and class hierarchies that may be inherent in a HLD program already represent abstractions. In this case, the abstraction processes revealed herein would apply to the detailed designs associated with those classes. The AutoBuilder implementation uses the processes outlined in FIGS. 10A–G to automatically create and/or update an internally consistent design hierarchy from any design or working program (represented in HLD or equivalent syntax) that implicitly satisfies the prescribed consistency constraints. In the preferred embodiment, an error or warning is given when it is not possible to construct an internally consistent abstraction.

Consistency constraints are used to automate a variety of development and maintenance tasks. During development, specification and design shells are automatically created for new sub-designs associated with terminal solution rules in a design. During maintenance, one can automatically extract sub-designs corresponding to non-terminal rules in a design hierarchy making it easier to simplify and/or reorganize designs.

It is obvious to anyone skilled in the art that similar constraints might be used in conjunction with any programming or scripting language. As noted above under Design Definitions, established reverse engineering technologies can be used to automatically extract implicit design hierarchies for essentially any programming language. Once an implicit design hierarchy has been reversed engineered, design abstraction might be accomplished, for example, by (e.g., automatically) converting the implicit design hierarchy containing the legacy code to HLD syntax. Well established technologies have been developed for accomplishing such conversions (e.g., Scandura, 1994). Other options would be to adjust the consistency requirements to accept the legacy code, or to use some combination of the two methods.

In the current implementation, the update option is evoked automatically when the AutoBuilder is first applied to a given legacy design (or partial design hierarchy). This ensures that the hierarchy is consistent before further elaboration. The designer also may evoke the update option manually. It is an explicit option from the DESIGN BUILDER main dialog box. The preferred update method is summarized in FIG. 17. The preferred method for converting legacy code into a form to which the update method applies is summarized in FIG. 20.

Top-down/bottom-up Designs

Designs can be built top-down and/or bottom-up. More important, one can begin at any desired level of abstraction. Given an initial design, AutoBuilder first constructs an implicit design hierarchy (e.g., see FIGS. 13B and 13C). Internal consistency is ensured in the process. Where a particular design refinement breaks the given consistency rules, the children solution rules must be modified as necessary to ensure consistency. During maintenance, the update process can be rerun as necessary to maintain consistency with lower level design changes. In turn, terminal solution rules may be refined with automated support.

In effect, parent solution rules can be constructed automatically from their children and children from their parents. In the latter case, of course, any number of refinements is possible. The consistency rules detailed above are selected in accordance with the case refinement in FIG. 11. As discussed above, maximal consistency constraints (e.g., for sequences and loops) are used when building refinements; minimal constraints are used during abstraction.

As also discussed above, weaker constraints are desirable where one wishes to allow wider variation in the way components are assembled. The latter is especially important in creating abstractions from "legacy" code (i.e., from arbitrary assemblies of components). High level designs for the various updating (i.e., abstraction) processes used in the current embodiment are summarized in FIG. 10 and elaborated in FIGS. 10A–G. The preferred integrated top-down/bottom-up process is summarized in FIG. 18.

Structural (Cognitive Task) Analysis

Appropriately combined, the methods of FIGS. 15, 16 and 17 for constructing representations of specifications, designs and abstractions, respectively, also can be applied to what are often called ill-defined domains. Ill-defined domains are problem domains that transcend any given finite set of specifications (or designs). These are domains for which no set of formalizable specifications can be found which collectively includes all problems in the domain.

Structural analysis is a systematic method for identifying sets of designs and higher order designs that are sufficient for solving wide ranges of problems in ill-defined domains. Such designs and higher order designs are used collectively to construct (new) designs for solving new problems (in the ill-defined) domain. Especially important in the preferred embodiment are problem domains involving the implementation of virtual solution rules. Implementation of a given virtual solution rule requires generation of an executable design that is (abstractly) correct with respect to the solution rule specification. Because virtual solution rules are constructed as needed during the design process, they cannot all be anticipated in advance. Invariably, some will be external to any predetermined set of specifications (which is the definition of an ill-defined domain).

Structural analysis involves first identifying a set of prototypic problems in the given domain for which formal specifications can be constructed. Consider an ill-defined domain consisting of a broad variety of "maintenance" tasks, ranging from cleaning bedrooms to getting into good physical condition and everything in between. Given a particular room, the goal of one prototypic problem might be to generate a room that is presentable. Similarly, given a prospective athlete the goal might be to mold him or her into shape. Each such problem is characteristic of a class of similar problems. These classes of problems can be represented as formal specifications as per the method disclosed in FIG. 15.

An abbreviated specification for cleaning a room, omitting parent-child and input-output relationships, is given below. NOTE: To reduce space requirements, the representations introduced in this section include only input (IN) and output (OUT) sections (under DATA SPECS in DETAILED SPECIFICATIONS). Based on the preferred embodiment detailed in previous sections, it is clear to anyone skilled in the art how these representations may be fully expanded to include these other design sections. For the most part, no distinction is made in the discussion below between designs and their IN and OUT variables, on the one hand, and the hierarchies of which they are a part, on the other. (Recall that solution designs are "slices" through design hierarchies.)

Specification hierarchy for clean_bedroom
    [IN]:
       [room]: <unpresentable, presentable>
        [bed]: <unmade, made>
        [carpet]: <messy_dirty, dirty, clean>
    [OUT]:
       [room]: <presentable>
       [bed]: <made>
       [carpet]: <clean>

Each problem associated with this specification would have exactly the same structure. In the preferred embodiment, the main differences are: IN and OUT would be replaced by GIVEN and GOAL, respectively, and room, bed and carpet would have particular input values.

Specifications for getting into good physical condition and other classes of problems in the ill-defined domain are constructed in a similar manner. Although each set of prototypic problems will have its own specification, some specifications will have structures similar to others. Consider, for example, a specification hierarchy for getting into good physical condition. In this case, one begins with a prospective athlete who may or may not be in good physical condition. More precisely, the athlete's cardiovascular system may have a high or low capacity, and his muscular system may have high or low strength. At the conclusion of training, the cardiovascular system should have a high capacity and the muscular system, high strength. These similarities play an important role in structural analysis as described below. Different specifications need not have identical structures as in this example. Nonetheless, they must share common substructures and/or elements as indicated below.

The second step in structural analysis is to construct a design that is consistent and correct with respect to each specification identified in the (potentially ill-defined) domain. The method detailed in FIG. 16 is used for this purpose. In accordance with the above analysis, a clean_bedroom design might be summarized as:

Design for clean_bedroom
    [DESIGN]:
       clean_bedroom (: room;)
        make (: bed;)
        vacuum (: carpet;)
    [In]:
       [room]: <unpresentable, presentable>
        [bed]: <unmade, made>
        [carpet]: <messy_dirty, dirty, clean>
    [OUT]
       [room]: <presentable>
       [bed]: <made>
       [carpet]: <clean>

Just as different specifications may share common structures, so can different designs. Although having nothing to do with cleaning, for example, one can easily envision a design with the same structure for getting into good physical condition in terms of weight training and aerobics, for example. Some sports, like train for wrestling, combine both in parallel. In this case, train for wrestling, weight training and aerobics, respectively, correspond to clean_bedroom, make and vacuum. Clearly, these examples may appear rather far removed from traditional software concerns (although not so far from robotics, for example). The basic ideas, however, are universally applicable. Exactly the same principles apply irrespective of the domain under consideration.

Consequently, the next step in structural analysis is to identify semantically meaningful similarities among the previously constructed solution designs and the inputs needed in their construction. This step involves identifying sub-structures for each design that define a set of "similar" designs and the set of corresponding inputs from which these designs can be derived. (In earlier, more informal cognitive research, these similarities were referred to simply as "parallel" solutions [e.g., Scandura, 1982,1984a].) The idea is to partition previously identified solution designs (including their specifications) into equivalence classes of designs, each of which the structural analyst believes can be constructed using analogous input resources in the same way (see below). A design template, representing an abstraction and/or generalization of designs, is constructed for each equivalence class. This template includes semantic and/or syntactic similarities but none of the unique design characteristics, and has some similarities with defining data definitions for a database. Given their close resemblance, a design template shared by the above two examples may be summarized as:

[parallel_design1_design2]:
   [DESIGN]:
      parallel_design1_design2 (:root;)
         design1 (: A;)
         design2 (: B;)
   [IN]:
      [root]: <absrt1, absrt2>
      [A]: <abs1, abs2>
      [B]: <abs3, abs4, abs5>
   [OUT]:
      [root]: <absrt2>
      [A]: <abs2>
      [B]: <abs5>

In this case, the two example designs (e.g., clean_room and train_for_wrestling) share exactly the same structure. Only the names of the designs and the solution rules and abstract values in those designs have been changed. In effect, specific operations (and the abstract values describing their behavior) have simply been replaced with generic "placeholders", keeping exactly the same data structures. For reference purposes, we may refer to the above design definition as a shared or template design. This example illustrates the most restrictive case—a design template that contains all designs having a structure that is identical to each of the similar designs. Other design templates will be less restrictive. As illustrated below, design templates may have different numbers abstract values, different numbers of inputs, etc.

Whereas design templates are abstractions and/or generalizations of previously derived designs, inputs to higher order specifications are abstractions and/or generalizations of specification and design resources. In particular, the resources in a shared resource or input template (i.e., higher order specification input) must be sufficient for constructing designs in the corresponding design template. In the above examples, these resources include the solution rules make, vacuum, aerobics and weight_training. The analyst, of course, must determine input resources. Having identified a set of resources, the next step is to define an abstraction and/or generalization that provides a sufficient basis for constructing the corresponding design template. The two resources required for constructing parallel_design1_design2 (above) are represented below. (These pairs of resources will be inputs in a higher order specification.)

[design1]:
   [DESIGN];
      design1 (: A;)
   [IN]:
      [A]: <abs1, abs2>
   [OUT]:
      [A]: <abs2>
[design2]:
   [DESIGN]:
      design2 (: B;)
   [IN]:
      [B]: <abs3, abs4, abs5>
   [OUT]:
      [B]: <abs5>

The next step in structural analysis is to construct a higher order specification for each pair of design (parallel_design1_design2 above) and input templates (design1 and design2 above). Notice that each design template defines a set of solutions for a higher order problem. Accordingly, each design corresponds directly to OUT in a higher order specification. Specifically, the design template represents a set of more or less similar designs that share a common template. In each case, the output of the higher order specification can be constructed automatically from the design template. The higher order specification shown below was constructed in this manner by inserting the parallel_design1_design2 design under OUT in the higher order specification below for constructing parallel designs.

Similarly, the input template (above) represents common characteristics of inputs from which the identified designs may be constructed. This input template corresponds directly to the IN in the higher order specification. In effect, given the above IN and OUT design templates, the higher order specification for constructing this type of parallel design can be constructed directly as shown in the abbreviated Flexform below.

Higher order specification for constructing parallel designs
   [IN]:
      [design1]:
      [design2]:
   [OUT]:
      [parallel_design1_design2]:
         [DESIGN]:

In this particular example, the variables root, A and B under IN and OUT under parallel_design1_design2 have exactly the same structures (i.e., data structures, roles and numbers of abstract values) as the corresponding variables under design1 and design2. That is, design1 and design2 both represent arbitrary designs, which like make and vacuum, respectively, have exactly one input-output variable. Parameter A in design1 has two abstract input values and one abstract output value; parameter B has three in and one out. Any two solution rules with this form comprise valid inputs. Correspondingly, any parallel refinement would be a valid output as long as there are two child operations, each with a single parameter and the specified number of abstract values.

Given a set of designs, of course, there are many ways to partition them into sets (or equivalence classes) of similar designs. What are appropriate commonalties in one domain may not be appropriate in others. Grouping designs necessarily depends on the intended semantics of the domain. Indeed, different domain-specific knowledge may lead analysts to different generalizations, which in their respective views, more fully or adequately reflect essential semantic relationships. Once groupings have been established, however, template commonalties, whether they be substructures and/or common elements may be identified automatically. Starting with one design in a class, for example, one can compare this design with each of the others one at a time, each time eliminating differences. In some cases it will be sufficient to introduce generic operation and/or parameter names. Nonetheless, generalization limited to operations having exactly the same form can be too limiting. It is rarely the case that different operations or designs will have exactly the same numbers of parameters, each having the same numbers of abstract values. In such cases, the numbers, or even the presence, of abstract values or parameters may be eliminated. The essential process of identifying commonalties is much like traditional concept attainment both in cognitive psychology (e.g., Bruner, Goodnow & Austin, 1956) and artificial intelligence (e.g., Winston, 1977). Given a partition on pairs of inputs and corresponding designs, the process could easily be automated using well-known techniques (e.g., neural nets).

In general, the scope of a higher order specification can be increased by simply relaxing constraints. Eliminating constraints on the numbers of abstract values, for example, would clearly accommodate larger varieties of designs. Similarly, the two parallel operations might be generalized to have any number of parameters —as long as they satisfy the disclosed constraints on parallel refinements (or their equivalent). The higher order specification might be generalized still further to include any number of parallel operations.

In the latter case, an abstraction can be introduced under IN in the above higher order specification by replacing design1 and design2 with a new variable, set_of_designs, thereby generalizing the constraints on the structure of the input designs in this set. In effect, common elements shared by the input designs are represented by a prototype design under set_of_designs. In this case, of course, it would make little sense to prescribe the numbers of abstract values, or even the numbers of parameters. The corresponding OUT design would similarly be adjusted to include a loop (corresponding to the prototype refinement in the specification) to accommodate any number of operations.

Allowance for multiple operations in an OUT design, of course, is just one way in which an analyst may introduce abstraction or generalization into a higher order specification. The refinement types revealed herein, for example, suggest other methods of generalization. For example, the input solution rules and designs (associated with similar problems) may be sub-categories on which similar or analogous actions are to be performed (to produce the corresponding OUT). In this case, the IN solution rule and OUT design templates might be made a sub-category of a super-ordinate category representing commonalties among the sub-categories. The corresponding OUT design in this case might be a selection or class hierarchy. Problem-specific input designs also may express relationships in more detail than desired. In this case, the IN abstraction might be represented in more abstract terms as the parent in an extraction refinement. The corresponding OUT design template would allow a class of sequences. In general, the possible kinds of generalization and/or abstraction is limited only the perspicuity of the analyst.

It is up to the analyst to determine what inputs are needed to derive each of the designs in a grouping, as well as to determine the shared characteristics in these groupings. Depending on the kind of generalization introduced, these shared characteristics may provide considerable detail as regards the required inputs, or they may be relatively non-specific. In either case, any higher order design that satisfies the higher order specification will be acceptable. Of course, the input resources required by a higher order design for solving a given problem may or may not be available. In practice, constructing templates is perhaps most easily accomplished by: (1) identifying the inputs needed to derive each design, (2) partitioning the input-design pairs into equivalence classes and (3) constructing input-design templates representing commonalties within the equivalence classes.

NOTE: It is possible to envision higher order specifications that call for generating arbitrarily complex designs including arbitrary sequence, selection and iteration refinements. In principle, one can envision including all possible designs in an all-encompassing generalization; as we have seen, all designs can be constructed via successive refinement. The above parallel design (from which the higher order specification is constructed) would be only one of many variations in this case. Over-generalization, however, serves little purpose in practice. Although the present disclosure details a method for constructing designs that are correct with respect to arbitrarily given specifications, the more general a specification the less guidance that specification provides in the design process. In the extreme case cited above, the specification would be vacuous. Indeed, specifications in practice rarely determine corresponding designs completely. This certainly will never be the case with ill-defined domains.

Having constructed a new set of higher order specifications (whether generalized or not), the process repeats itself. The next step in structural analysis is to construct a higher order design for each higher order specification. As before, use of the prescribed methods ensures consistency and correctness with respect to the corresponding higher order specification.

A higher order design for the above higher order specification follows:

Higher order design for construct_parallel_refinement
   [DESIGN]:
      construct_parallel_refinement (design1, design2: ;
         success) check_for_overlap (design1, design2: ;
         match) IF match
         THEN assemble_parallel_refinement ((design1,
           design2:; parallel_design1_design2)
   [IN]:
      [design1]:
      [design2]:
   [OUT]:
      [parallel_design1_design2]:

Availability of this higher order design makes it possible to create designs that may be very different from one another (e.g., training for wresting vs. cleaning rooms). Given arbitrary pairs of designs with the same structures as design1 and design2 (e.g., weight_training and aerobics, make and vacuum, etc.), application of the above higher order design results in parallel designs (e.g., train_for_wrestling, clean_bedroom, etc.) that may have very different domains of applicability. Designs like clean_bedroom and train_for_wrestling that can be constructed from other (higher and lower order) designs (i.e., construct_parallel_refinement, make, vacuum, weight_train and aerobics) are effectively redundant. Consequently, they can be eliminated as desired when deriving a rule set sufficient for solving problems in a given domain.

If the illustrative higher order specification had been generalized, of course, the corresponding higher order design also would have to be more generally applicable.

For example, if set_of_designs had been taken as input, as described above, parallel_design1_design2 might have been renamed to parallel_design, and generalized to assemble any number of solution rules. In effect, generalizing higher order specifications imposes a heavier load on the higher order designs that must satisfy them. Instead of having to construct a higher order design that constructs parallel designs consisting of exactly two operations, for example, the above higher order design would have to generate parallel refinements consisting of any number of independent solution rules.

Reducing the constraints in higher order specifications (to accommodate broader varieties of designs) increases generality—of both the OUT designs and the IN of the higher order specification. Consequently, the more abstract or general a higher order specification, the less guidance the higher order specification provides in creating a higher order design that satisfies that higher order specification. This places more responsibility on the designer. Hence, constructing a consistent design that satisfies a given higher order specification does not guarantee that each OUT design will satisfy its own specification (or the initially specified behavior). For example, inputs matching the higher order specification IN may not uniquely determine an OUT design.

Put differently, a higher order design (satisfying the higher order specification) may or may not generate the design which motivated creation of the higher order specification in the first place. Assume constraints on the abstract values and/or numbers of parameters are removed as per the above discussion (of the parallel example). Removal of these constraints makes it possible (for the higher order design) to generate designs that do not match the original specification—even though the design satisfies the higher order specification. In effect, there is a trade-off between generalizing higher order specifications and ensuring that OUT designs satisfy initially given specifications. A higher order design may work in some cases, but fail in others. In the problem solving literature, such higher order designs are referred to as heuristics (e.g., see Polya in Scandura, 1977, Chapter 3).

In principle, the process of constructing higher order specifications from given designs (and still higher order specifications from higher order designs) can be repeated as many times as desired. The above higher order design construct_parallel_refinement, for example, can be converted into the OUT of a still higher order specification. That is, a new specification is constructed whose OUT section contains construct_parallel_refinement, the previously constructed higher order design (or some generalization thereof). In this case, OUT in the higher order specification might include all internally consistent designs which, like construct_parallel_refinement, might be constructed from given conditions and pairs of designs. The IN may consist of any set of basic inputs (theoretically nill) from which the specified higher order designs can be derived. In the most restricted case, these inputs might include components having exactly the same structures as match, check_domain and assemble_parallel_refinement.

In turn, still higher order designs can be constructed from the newly created higher order specifications. One such design for the above (higher order) specification, call it construct_selection_sequence, might construct a selection refinement from the given condition and the first design, and then a sequence consisting of the selection followed by the second design. This higher order design, for example, might take match, check_domain (design1, design2:; match) and assemble_parallel_refinement (design1, design2:; parallel_design1_design2) as IN and produce the above (higher order) construct_parallel_refinement design as OUT. The same higher order design, obviously, can be used in constructing analogous designs composed of conditions and components having the same structures (although different content). As revealed above, of course, the new higher order specifications (and in turn designs) can be generalized by relaxing some of these constraints.

This process of moving to higher and higher levels results in increasingly complex specifications, with designs (which may already include embedded OUTs) embedded in a new OUT. Correspondingly complex data structures are needed for designs which satisfy these specifications.

Many of the steps described above can easily be automated. Other steps, however, require a deep understanding of the domain. As revealed above, steps involving the identification of problem classes characteristic of a domain, and of grouping previously identified problem classes and/or designs, require detailed knowledge of domain semantics. For example, given a set of designs which (the designer believes) may be derived in the same way, it is a relatively simple matter to construct a structure sharing common characteristics. It is more difficult to identify the groupings of designs that define that design template structure in the first place, or the inputs needed to derive the designs in the groupings. Although a variety of classification techniques (e.g., neural nets) can be used for this purpose, generic methods of this sort either fail to capture the semantics of given domains or are restricted in applicability (to specific domains). As noted above, actually constructing a higher order specification, given the shared OUT and IN template structures, can be accomplished by simply duplicating a structure.

Overall, it would be extremely difficult to automate all steps in the process of structural analysis in a way that accurately captures the "real world" semantics of arbitrarily given domains. Nonetheless, structural analysis does lend itself to significant automation where prescribed kinds of generalization (if any) are introduced in converting designs to higher order specifications. As noted above, a variety of artificial intelligence techniques might be used for this purpose, particularly in prescribed domains.

There can be no guarantee that a design will always work (i.e., satisfy its own specification), even where the design satisfies a given higher order specification. For example, the design template under OUT in a higher order specification may be incomplete relative to the originally identified design—exactly because the original design has been generalized in constructing the design template. In this case, the higher order specification will be only partially specified relative the specification for the original design. Hence, the higher order design may generate designs that do not necessarily meet all of the conditions in the original specification. (As noted above, such higher order designs correspond to heuristics in the prior art—see Polya in Scandura, 1977, Chapter 3).

Structural analysis is particularly useful in analyzing large, potentially ill-defined domains. In general, it is impossible to identify a priori all of the components that might be needed in constructing designs in any given non-trivial domain. In that context, the above process can be repeated as many times as desired by constructing (new) higher order specifications from newly generated designs and, in turn, higher order designs which satisfy those higher order specifications. Redundancies may, but need not, be eliminated in the process. Each time the process is repeated, two things tend to happen: (1) The designs collectively can be used to solve broader and broader ranges of problems in the ill-defined domain, specifically including problems not in any of the initially defined specifications. (2) The procedural portions of designs individually, including higher order designs, tend to become simpler. At the same time, rule specifications (data structures) associated with those designs become more complex. These two observations play an important role in implementing virtual solution rules as disclosed in the following section on the control mechanism.

To actually generate new solution designs, of course, relevant components must be available for higher order designs to operate on. In general, structural analysis may begin either with or without a set of available component and/or design resources. Resources can be introduced gradually as inputs are needed (to generate given designs), and/or the process of structural analysis may begin with a potentially large set of available resources. These resources may include specifications as well as executable components or designs. The former are used in constructing solution plans containing sub-specifications. Many resources will be domain specific, and applicable only in highly restricted contexts (e.g., certain sort or print routines). Others may apply broadly to all inputs satisfying rather general input constraints. The disclosed refinement methods fall in this general category, as do logical rules of inference. Still other resources will apply to a variety of different domains but not be universal in applicability. The various heuristics identified in cognitive research fall in this intermediate category.

As revealed below, structural Analysis plays an essential role in implementing (virtual) solution rules in designs. In particular, structural analysis can be used to identify the higher and lower order components (and/or designs and affiliates) needed to implement the wide varieties of virtual solution rules that naturally arise in creating designs, especially designs associated with large, potentially ill-defined domains. The preferred method for structural analysis is summarized in FIG. 27.

Implementation Resources

It should be clear that each and every solution rule in a design provides a convenient and well-defined interface against which available components (including designs, affiliates and abstract solution rules) can be compared. Accordingly, in the preferred embodiment all components must be semantically wrapped before they can be used: The parameters, types (including data structures which explicitly represent the equivalent of defined types) and input and output roles must be represented in HLD format. Semantically wrapped components, including their specifications and classes containing them, are placed in a resource library where the components may be accessed at any stage of the design process. In effect, given any (virtual) solution rule in a design, it is possible to determine the availability of an implementation component via a simple matching process.

In the current disclosure, it is generally assumed that the components used for implementation purposes not only execute but execute correctly with respect to their specifications. Correct execution in this context refers to actual input and output values not to abstract values. The rule specs for to-be-implemented virtual solution rules (and sub-designs used in their implementation) are assumed to have abstract values (even if only the default of one). However, abstract values are not sufficient in the case of general-purpose components used to implement arbitrary virtual solution rules. In general, the partitions (i.e., abstract values) called for in different applications may vary. Consequently, to assure correct execution of a design, implementation resources (components) must guarantee correctness with respect to all input and output values. This will ensure abstract correctness of any virtual solution rule implemented using the component, irrespective of the virtual solution rule's abstract input and output values.

In the current (semantics-based) implementation, basic types (e.g., int, char, float) may be ignored. All such types are abstracted to node_ptr. Variables of type node_ptr can have values and they can alias (point to) other node_ptr variables. Each operation "knows" which of its parameters represent numbers and which represent strings. Effectively, only one basic type is required. Record and array types are defined in terms of hierarchies of variables having the type node_ptr. To anyone skilled in the art, however, it should be apparent that both basic and defined types could easily be distinguished via enhanced matching processes (in the implementation machinery).

It is immaterial in implementing behavioral designs how the components and design resources are packaged as long as these resources have a semantically compatible interface. Procedural and class libraries are the most common form of packaging; these libraries come available as source code and/or in compiled form. Semantically compatible components in classes can be used in implementing behavioral designs as can any other component or design. Overloading and polymorphism only make a difference to the extent that the object or class must be referenced along with the component.

The preferred embodiment makes special provision for abstract solution rules that operate on objects as a whole (and which consequently are outside of objects). Conceptually, formal parameters in abstract solution rules can accept variables with different subtypes as well as different values. The abstract solution rule, clean (: room;), for example, operates on all subtypes (categories) of rooms. Abstract solution rules are simply solution rules that have at least one non-atomic object (containing at least one operation) as a parameter.

Abstract virtual solution rules can be implemented in two basic ways. First, virtual solution rules may be implemented by directly referencing (one or more) affiliate components (or executable designs) in object parameters. Implementation of an abstract solution rule in this case involves selecting one or more affiliate operations in classes (e.g., in class hierarchies) associated with the rule's object parameters. Second, the set of available resources may specifically include executable components that can be referenced in implementing abstract solution rules. In this case, the components have a standard HLD interface (corresponding to abstract solution rules), together with class hierarchies in which all of the needed affiliates are executable. In this case, abstract solution rules are subject to the same matching requirements as other component resources.

All other things being equal it is preferable to introduce (executable) components at as high a level of abstraction as possible. High levels of implementation are especially important where the components are written entirely in a lower level language because this invariably improves execution speed. Once a consistent and correct design has been developed, reusing intermediate variables can further reduce memory requirements. Minimizing memory requirements, however, has become less important given the larger amounts of memory available on modern computers. The preferred method for improving an existing design, library, class or project is summarized in FIG. 21.

Implementation

In the current embodiment, implementation machinery assists manual identification of semantically compatible components which satisfy both the signatures (i.e., the parameters and their type structures) and the behavioral semantics (via abstract values) associated with terminal solution rules in the design. Such identification can be accomplished automatically in the preferred embodiment when an available component directly matches the virtual solution rule. In this case matching is simply a matter of determining whether the structures (types) and input and output roles of parameters of executable implementation components are in one-to-one correspondence with those of the to-be-implemented solution rule. The corresponding parameter names as well as operation names may differ of course. As noted above, however, the actual behavior of implementation components must be consistent with the abstract values associated with the corresponding virtual solution rules. Otherwise, one could never be sure that the behavior of an implementation component will actually do what the designer intends.

Indirect Implementation

Components are often used to implement a virtual solution rule in a design, even where no available component directly matches the given element. Commonly, for example, a component matches the parameters of a to-be-implemented (virtual) solution rule (i.e., its rule specs) but includes extra parameters (or global variables) as well. In this case, constant values of the unused parameters (and global variables) may be assigned. Such assignment has the effect of specializing the component so it satisfies the solution rule's specifications. There are many other situations where modification and/or combination of one or more components makes them suitable for use in implementation. In this context, executable combinations of executable components are referred to herein as executable designs. Except where context requires differentiation, the terms component, rule, design, affiliate (as well as semantics-based, virtual and executable versions thereof) are used more or less interchangeably.

In the preferred embodiment, a (virtual) solution rule may be implemented in terms of an executable design with automated support, even where the rule is not directly implementable using a single component. Given a sufficient set of higher and lower order (executable) components, an executable design that matches any given to-be-implemented solution rule can be derived automatically via the universal goal switching control mechanism (detailed below). Recall that higher order components are defined as components whose specified outputs include elements whose outputs . . . (eventually) include designs (modifications and/or combinations of components) that match the original problem. Such higher order components generate executable designs that, in turn, generate executable designs that . . . (eventually) may solve the original problem.

It is easy to envision higher order components for general-purpose operations, such as constructing sequences of two of more components, assigning given constant values to unused parameters, or replacing one set of parameters with another. The control mechanism is more general, however, and supports the generation of executable designs (composed of executable components) using arbitrary higher order components. The preferred implementation process is summarized in FIG. 19.

The method detailed in FIG. 19 makes direct use of the control mechanism introduced above. Given its central importance, this mechanism is described in more detail below.

Goal Switching Control Mechanism

As described above, new executable designs may be derived via the previously mentioned goal switching mechanism. Although other applications of the control mechanism will be apparent to those skilled in the art, the main class of problems in the preferred embodiment involves the automatic construction of solution designs that implement given virtual solution rules (in designs). The control mechanism in this context operates in conjunction with a specification for a virtual solution rule. Specifically, the GIVEN in an implementation problem consists of a to-be-implemented (virtual) solution rule, including its associated inputs and outputs (rule specs), and a set of higher and lower order semantics-based components. The problem GOAL is to find or derive an executable design whose INPUT-OUTPUT specification matches the rule specs of the given (virtual) solution rule. The abbreviated contents of a Flexform representing a typical problem of this kind has the form:

Problem of implementing the virtual solution rule clean_bedroom (: room,)
[GIVEN]: {Set of available components plus rule spec for clean solution rule.}
  [components]: {Set of available components.}
    [make]:
      [IN]:
        [bed]: <unmade, made>
      [OUT]:
        [bed]: <made>
    [vacuum]:
      [IN]:
        [carpet]: <messy_dirty, dirty, clean>
      [OUT]:
        [carpet]: <clean>
  [clean]: {The clean specification constitutes the given of the implementation problem.}
    [IN]:
      [room]: <unpresentable, presentable>
      [bed]: <unmade, made>
      [carpet]: <messy_dirty, dirty, clean>
    [OUT]:
      [room]: <presentable>
      [bed]: <made>
      [carpet]: <clean>
[GOAL]: {Find or derive an executable design for implementing clean room.}
  [clean]:
    [DESIGN]: {An executable design for clean bedroom that satisfies the clean specification.}
    [IN]:
      [room]: . . .
    [OUT]: . . .

As in the section on structural analysis, parent-child relationships and input output behavior have again been omitted in the above for purposes of brevity. Notice that the GIVEN of the clean bedroom problem includes available components from which the implementation design is to be derived. Nonetheless, it is convenient in the following discussion (and in FIG. 26) to distinguish the available components and that part of the clean bedroom problem consisting of the to-be-implemented solution rule.

The control mechanism searches first for available components whose specifications directly match the specification for the to-be-implemented solution rule (e.g., the clean bedroom specification). If a component is available that matches that specification, then the implementation problem is solved. The previously detailed clean_bedroom (: room;) component serves this purpose.

Unless an available component matches the problem specification, the control mechanism searches for higher order components whose OUT contains an executable design that matches the problem specification. The above higher order design, construct_parallel_refinement, satisfies this requirement. That is, the OUT section of construct_parallel_refinement contains a design whose IN and OUT match the given implementation problem. In particular, the specification for parallel_design1_design2 (under OUT) matches the given clean_bedroom specification.

As detailed in the section on structural analysis, higher order components generate components that, in turn, may solve given problems. Thus, given a pair of components satisfying the specified IN constraints, the above higher order design, construct_parallel_refinement, constructs a parallel refinement in which the two given components can be executed in parallel. No component can be applied, of course, unless the required inputs are available. In this case, the IN section of the specification for construct_parallel_refinement includes design1 and design2. The specifications for these designs match those of make and vacuum, respectively. Hence, given the to-be-implemented virtual clean bedroom solution rule, the IN of construct_parallel_refinement matches the executable components make and vacuum. When applied to this input, it outputs a parallel refinement consisting of the two executable child components (i.e., make and vacuum). The resulting design is executable and, hence, implements the virtual solution rule.

When no matching design is found, the search moves to a still deeper level. At the next level, for example, the search would look for designs whose OUT section contains an OUT section that contains a design that matches the given clean bedroom specification. The previously described construct_selection_sequence design provides an example. As in structural analysis this process may be continued indefinitely, or as in the preferred embodiment, until a predetermined level is reached. (The latter prevents the possibility of non-terminating recursion, or the equivalent in looping.)

In the present context, it is easy to envision other higher order components that can implement virtual solution rules in terms of other refinements. For example, create_loop_refinement takes matching conditions, advance operations and actions as input and generates loop designs. Indeed, given the previously disclosed analysis, it is easy to envision a general-purpose higher order design that automatically constructs designs that are refinements of given virtual rule specifications. This assumes, of course, the availability of executable components that match the required inputs. For example, suppose we are given one executable component for converting from, say, A to B and another, from B to C. In this case, a higher order sequence (or composition) rule would automatically construct an executable design for converting A to C. One can also envision other universally applicable higher order components corresponding to logical equivalencies, such as modus ponens.

The above higher order components are just a small sample of those that may be useful in deriving new designs. It is easy to construct higher order components, for example, that operate on general-purpose designs and construct more specialized designs for solving restricted kinds of problems (e.g., see Scandura, 1982, 1984a). Many useful higher order components (or designs), often called heuristics, also apply broadly but cannot be guaranteed to work. The pattern of higher order "two-loci" provides one example (e.g., see Scandura, 1973, pp. 109–10, 1977, Chapter 3). Higher order "analogy" rules that replace input and output parameters in a specification with other (e.g., more general) parameters illustrate another class of such rules (Scandura, 1977, Chapter 4).

As noted earlier, structural analysis (e.g., Scandura, 1982, 1984a), particularly as regards the identification of higher order specifications and designs is an important prerequisite for effective use of the control mechanism. Without the necessary lower and higher order executable components (or designs), no basis exists for constructing new designs needed for implementation.

To summarize, the inputs and outputs associated with a to-be-implemented (virtual) solution rule constitute the specification for a problem to be solved. The control mechanism searches the set of available components (including designs and affiliates in classes). Depending on the type of implementation desired, available resources also may include abstract solution rules, together with the class hierarchies containing the (executable) affiliates referenced (directly or indirectly) by those abstract solution rules. In the preferred embodiment, unless exactly one component matches the problem specification, the control mechanism directs the search to components whose outputs contain components whose specifications have the same structure as the to-be-implemented solution rule. (These are higher order components that can generate designs that, in turn, can solve the problem.) The search process continues at deeper and deeper levels of OUT specifications of available components until a unique match is found. That is, the control mechanism searches for (higher order) executable components that output executable designs that, in turn, may solve the problem. If construct_parallel_refinement had not been directly available, for example, the next level of search would have been for a higher order design whose OUT contains an OUT that contains a design whose specification matches the given specification (for the to-be-implemented solution rule).

The construct_selection_sequence refinement in the section on structural analysis provides an example. Once a matching component has been found, an appropriate input is sought among the available components (including specifications (used in constructing solution plans) as well as executable components and designs). This input effectively initializes the matching design. Then, the matching (higher order) component is applied, thereby generating a new component, and the new component is added to the set of available components.

At this point, the process is reversed: Matches are sought at previous levels (e.g., by "unwinding" a recursion or an equivalent loop), input resources are identified and newly generated designs are added to the available set. Matches at previous levels specifically include newly generated components in the search. The process continues until the original problem is solved, or the last derived design fails.

All is not lost, however, even when the control mechanism fails due to an insufficient set of available input designs. Specifications necessarily exist and may be assumed available for all needed input components. Thus, if a needed component is not available, the component's specification is used in its place. Consequently, higher order designs can often reduce the complexity of given to-be-implemented solution rules by generating what might be called solution "plans". In addition to executable designs, solution plans may include (sub) specifications for solution rules. If a solution (plan) includes a specification, one of two things can be done. First, the designer can implement the specification manually prior to derivation. Second, the control mechanism can be invoked automatically on the specification (presumably using finer-grained components). In either case, the implementation problem is reduced in complexity.

Two obvious variants on the control mechanism are possible. As in most production systems, a component may be applied whenever the search returns at least one component. In this case, the control mechanism uses some "hard wired" criterion (e.g., first found, most specific) to select from among the alternatives. The preferred embodiment is based on a second more exacting alternative: A unique match is required before any component is applied. The latter variant avoids the problem of having the control mechanism resolve ambiguities. Instead, selections from among matching components are made by higher order selection rules (i.e., components or executable designs). As with other components, (higher order) selection components may be introduced and/or modified at will without affecting the control mechanism. (NOTE: In the preferred embodiment, it is assumed that each design "knows" its domain of applicability. Where this is not the case, the control mechanism may fail. In this case, a recovery procedure may be introduced, for example, whereby defective components are eliminated from the search before goal switching is repeated.)

Details on the control mechanism used in the preferred embodiment are summarized in FIG. 26.

The AutoBuilder Embodiment

It is clear to anyone skilled in the art that the present disclosure can be implemented using any number of interfaces (e.g., pull down menus, dialog boxes, icons, etc.) and representation methods for specifications and designs. For the most part, pull down menus and dialog boxes, together with Flexforms and standard tree view representations are used in the current AutoBuilder implementation. Numerous examples of Flexforms have been introduced in the above disclosure.

Sample pull-down menus used in the current AutoBuilder are shown in FIGS. 28A–D. The top-level Design Builder modeless dialog along with supporting Design Builder dialogs is shown in FIGS. 30A–J and O. Depending on the users wishes, changes to a design can be made directly in the Flexform or locally in dialog boxes representing single refinements (in Flexform). The top-level Spec Builder modeless dialog along with supporting dialogs is shown in FIGS. 29A–E. Depending on the user's wishes, changes to a design can be made directly in the Flexform or locally in dialog boxes representing single refinements (in Flexform). Changes to specifications, libraries, classes and projects also can be made using standard GUI tree-views (e.g., see FIG. 29F where a tree view is shown as part of the main pull down).

FIG. 30K shows a flexform class hierarchy containing two subclasses, treeview_representation and flexform_representation. The flexform, treeview_representation and flexform_representation classes each contain two designs, one for creating objects and the other for redrawing representations. New designs can be added at will. FIG. 30L shows a design containing the abstract solution rule, redraw (: current_flexform;)

This abstract solution rule has as an affiliate redraw in the flexform class. In turn, redraw has two affiliates, in redraw_treeview in treeview_representation and redraw_flexform in flexform_representation. When the abstract rule redraw is invoked, it calls its affiliate redraw in the flexform class. The latter then calls its two affiliates. Once the classes have been constructed, the designer need not even be aware of the design hierarchy itself. Furthermore, the definition of the classes can be made locally without effecting procedural logic.

The AutoBuilder is used to create and modify Flexform modules (i.e., specifications and designs) automatically based on minimal user input. Relationships between Flexforms (e.g., call and object hierarchies) and, indeed, relationships between the relationships (e.g., unit hierarchies) also are constructed automatically and represented as Flexforms. As illustrated above, Flexform repositories are fully modular (object oriented), and directly and fully represent underlying system semantics. In general, Flexform repositories include specific modules (i.e., specifications, designs), libraries and class hierarchies containing modules and projects containing all of the above, as well as relationships between modules (e.g., structure charts) and between compilation units (files)—at all abstraction levels. The preferred method for building maintaining and implementing behavioral models is summarized in FIG. 23.

Although Flexforms can be created automatically in the current AutoBuilder environment, the visual Flexform design environment also makes it possible to create and modify Flexforms manually. In this context, procedural Flexforms may be expanded directly in context, as well as in separate windows (see U.S. Pat. No. 5,262,761 where the original term "FLOWform" was used). High-level system overviews and individual modules may be linked, viewed and edited in a highly interactive, uniform visual environment. Switching between high level overviews and individual modules is instantaneous. Basic syntactic constraints can be checked even in manual mode. Although refinements need not be consistent, for example, it is impossible to create Flexforms with invalid structures. Language specific checking includes syntax and consistency of declarations with respect to processes. Similar assurances are available in some programming and software development (e.g., CASE) tools. The current disclosure goes much further, however.

Flexform designs written in the HLD language can be guaranteed to be internally consistent and (abstractly) correct with respect to given specifications. As long as a design conforms to a given set of consistency rules, higher levels in the implicit design hierarchy can be constructed automatically. More generally, manual additions and/or changes can be made to a design in the design environment and not just to the AutoBuilder itself. In either case, the design will be subjected to checks and corrective actions just as if the design had been built by the AutoBuilder.

Although Flexforms provide a convenient mechanism for representing both specifications and designs, including objects, there are any number of equivalent representation methods used both in academic research and in contemporary design tools. Scandura (1992), for example, shows how data flow, control flow, entity-relationship and context diagrams may be represented in terms of FLOWforms (Flexforms), and vice versa. Indeed, anyone skilled in the art could devise alternative methods for representing the information required to implement the disclosed processes. Indeed, specification hierarchies are represented in standard tree view representations as well as in Flexforms. The way in which information is displayed is immaterial with respect to the present disclosure.

In addition to AutoBuilder itself and the Flexform design environment, the current implementation includes a Simulator and an automated Semantic Wrapper.

Simulating Designs

In the current AutoBuilder implementation, solution designs (and implementations of those designs) operate during execution on what are called PROBLEMs. PROBLEMs correspond to instances of the specified inputs, having actual values, with to-be-determined outputs. PROBLEMs have GIVEN and GOALS sections which contain, respectively, the same variables and have a hierarchical structure which matches that in the specified INPUT and OUTPUT. Rather than prototype variables (each of which represent any number of loop variables) or all possible abstract values of other variables, however, the GIVENS section of a PROBLEM contains a specific number of (non-prototype) variables and actual input values. Initially (i.e., before a PROBLEM is solved), GOAL variables can have any value, normally the default value "nill" for aliases and "" (empty) for non-aliases. After solution, each GOAL variable must contain an actual value consistent with the specified abstract input-output values.

The DOMAIN and RANGE sections of a Flexform are similar in form to the GIVENS and GOALS, respectively. DOMAIN and RANGE elements (variables, their types and values) serve as formal parameter declarations for the corresponding designs. Availability of a PROBLEM corresponds directly to independently available data on which a program may operate. (In the current implementation, DOMAIN and RANGE variables are sometimes used for testing purposes to define default PROBLEMs. In this case, prototypes in the specifications must be defined as intermediate [local] variables. Category variables correspond to objects in the current implementation. Initial values may be inserted in the value fields of the formal input parameters [in the DOMAIN and RANGE] of a design. These initial values are used to construct a default PROBLEM [i.e., GIVENS and GOALS data on which designs and/or solution designs operate] where no PROBLEM is independently available.)

The Simulator has supported dynamic simulation of simple English (or other natural language) statements as well as of high level designs from its early inceptions in PRODOC (Scandura, 1992, pp. 106–8). This makes it possible to simulate and update the values of relevant variables in the conditions and solution rules in any design step by step. The Simulator has recently been enhanced to support aliases, components in separate dynamically linked libraries and object oriented designs. Simulation-related facilities also include test coverage and various debugging modes. Real world modeling is directly supported via a set of general-purpose, semantics-based high level design (HLD) "glue" components. Collectively, these components make it possible to model essentially any system in an intuitively appealing manner. These core components may be supplemented as desired with arbitrary sets of other semantically compatible HLD software components. High level designs can be executed interpretively where referenced components have been semantically wrapped and integrated into the AutoBuilder system (see below). Executable solution rules automatically interoperate with virtual rules that must be simulated manually. Rules in one design module can call other modules, with explicit support for recursion. Although some of the core Simulator machinery has been in place for several years, many subtle (and not so subtle) enhancements have been necessary to support the current disclosure.

Designs can be simulated at any desired level of abstraction (see FIG. 25). This is true whether a design has been elaborated and displayed as in FIG. 2, or whether lower level refinements are either hidden or do not exist. For example, the top-level of the clean_room design in FIG. 2 can be run in the Simulator (when the lower levels are not displayed). At the beginning of execution, the value of room is unpresentable as shown. Execution of this high level model involves only the operation clean. During execution, the current operation is highlighted, the current value of room is displayed (i.e., unpresentable) and the user is asked to perform (simulate) the clean operation and update the value of room. In this case we might enter "clean". FIG. 2 shows the top-level Flexform model refined into a pair of parallel operations: make the bed and vacuum the carpet. At this level of execution, initially, the bed can be unmade or made and carpet can be dirty or clean. After execution, bed should be made and carpet, clean.

In the loop refinement of vacuum (: carpet;), the loop body corresponds to advance_and_vacuum the current_ rug. current_rug initially has no value. Since it is an alias, however, the Simulator knows it must refer to some element and sets the initial value to nill. When asked, the user might supply rug1. Once the meaning of current_rug is known, the user is shown the current value of rug1 and is asked to update its value (after vacuuming). In short, the statement advance_and_vacuum (: current_rug;)

involves first determining what is being aliased, and then updating the value of the referenced element (e.g., rug1).

The loop condition is simply a matter of evaluating done—that is, executing same (current_rug, rug3) to determine whether current_rug is an alias for rug3. Clearly, one must execute the loop body three times before the condition is true. Incidentally, same in this example is one of the core semantic components built into the Simulator. (Collectively, the core routines provide a full set of semantic model building facilities.) Execution in this case is automatic. Insofar as the Simulator is concerned, however, it is immaterial whether a human performs the operation or the execution is performed automatically.

FIG. 2 includes additional refinement of the clean room design. In this case the loop body has been refined first into a navigation sequence with an advance solution rule followed by the required action. Next, the action solution rule is refined into a case selection and finally the THEN alternative into a sequence. The first statement in the body current_rug=next_element (carpet, current_rug)

involves next_element, another core semantic function, along with=or what we have called assign_role or assign_ alias. Each time through the loop, this statement automatically assigns the next segment to current_rug until done, which is defined as done :=not (next_element_exists (current_rug, carpet)). (This refinement is "hidden" under the condition and not displayed in FIG. 2.) In FIG. 2, the case selector checks to see if current_rug is an alias for a rug that is messy_dirty. (In the PROBLEM in FIG. 3 we see that rug2 is the only rug with this value.) In effect, the case refinement partitions the rugs into three equivalence classes, those that are messy_dirty, those that are just dirty and those that are already clean. (The latter case is omitted in the design of FIG. 2 because it is redundant.) When the messy_ dirty alternative is executed, the pick_up operation changes the value of current_rug to just dirty—that is, it gets rid of the messy part. The operation vacuum does the rest (i.e., it cleans rug2). The clean room design can be implemented as any other design. In this case, the implementation might be in terms of animation components that display processes for making beds, picking up messes and vacuuming rugs.

This illustration shows how representing data (objects) and process (operations) at the same compatible level of abstraction has important implications for "design debugging." Abstract objects are operated on by correspondingly abstract operations. We can therefore execute such models at arbitrary levels of abstraction. As shown elsewhere (Scandura, 1990, 1992), the ability to debug designs from the highest levels of abstraction dramatically reduces the number of empirical tests required to "prove" a system. In particular, it is possible to simulate the execution of steps at higher levels in a design hierarchy even when some or all of those steps are virtual (non-executable) solution rules. Having tested one level in a design hierarchy, it is sufficient to test only individual refinements at the next level. (Indeed, ensuring the consistency of individual refinements is key to the AutoBuilder embodiment.) When testing is delayed until after a system has been implemented, the number of paths to be tested goes up exponentially with complexity. This number only goes up additively when testing is done at successive levels. The preferred method for interpreting designs at arbitrarily given level of abstraction is summarized in FIG. 25. What is considered a terminal refinement in FIG. 25 changes according to the given abstraction level.

What the current invention reveals in addition is how to build specifications and designs and how to guarantee that those designs are both consistent and correct with respect to the specifications. This is accomplished by obtaining, storing and checking behavior associated with individual solution rules (as well as designs as a whole). FIG. 2A provides a "snap shot" of the consistency and correctness information stored for each solution rule during the construction process. The preferred method for creating and executing test cases is summarized in FIG. 24.

Automated Semantic Wrapper

The current AutoBuilder also includes machinery for wrapping independently derived components in a semantically compatible interface (i.e., in parameters with the type node_ptr). It takes current interface information and automatically creates a wrapper with the required interface. The current implementation handles common C functions, including those in classes. The basic approach can be extended to arbitrary interfaces (e.g., ActiveX, OpenDoc) and languages (e.g., Java).

This wrapping machinery also supports the packaging of semantically wrapped components as dynamically linked libraries (DLLs). AutoBuilder implementation and simulation machinery automatically accesses newly added DLLs, making it easy to extend AutoBuilder's domain of applicability.

Role of the Disclosure in Contemporary Software Architectures

To emphasize the importance of the present disclosure, we briefly consider how the disclosed methods relate to contemporary software architectures. Consider event-driven architectures. In particular, consider a GUI system that detects events and triggers callbacks (sometimes called mini-uses, Sigfried, 1996, p. 370). Here, the top-level solution rule takes, or simply assumes, a screen as input and opens a window (as output) with which the user must interact. The callback itself (another input to the top-level solution rule) might react to a set of input events and include corresponding actions invoked by these events.

As illustrated above, both the GUI system itself and the callback can be represented by designs as described herein. These designs do not call one another directly however. Rather, they operate orthogonally to and effectively independently of one another. Callback designs, for example, are typically parameters of the GUI (or other) design that launches them. Similar orthogonality obtains between designs which coordinate interacting parallel processes (e.g., as in multithreading and Ada tasking).

It is immaterial whether interacting designs are to be implemented on a single computer or on a network of such computers. One design may serve as a GUI client, another as a (e.g., database) server, and still others as application logic.

It also is important to consider how the disclosed methods apply where there is more than one possibly interacting object. Behavioral analysis, even in this case, requires a top-level solution rule to initiate the process. In general, the top-level output might range from simply starting a program (having its own input-output behavior) or invoking a callback to controlling interactions between different objects.

First consider an abstract solution rule having two or more different objects as parameters. Such a solution rule can be implemented in terms of affiliate operations in one or more of the object parameters. For example, suppose bed and carpet are (non-atomic) object parameters of the abstract solution rule, clean (bed, carpet). Here, clean might have one or more affiliates in bed that make beds, and affiliates in carpet that vacuum carpets. When clean is invoked, all of its affiliates will automatically be executed. (In effect, invoking clean is not the same as invoking a simple procedure call.) Each affiliate in the preferred embodiment is constructed so it "knows" its domain of applicability. Hence, only those affiliates that apply in a given situation will actually be executed. For example, a make affiliate in the bed object would be executed in the presence of beds, but not carpets.

Suppose, however, that clean_carpet (a specialization of clean) has two interacting object parameters, carpet and rug_cleaner. The nature of this interaction must be specified: For example, if rug_cleaner is a vacuum cleaner, then clean_carpet (carpet, rug_cleaner) might vacuum the carpet. However, if rug_cleaner is a broom, then clean_carpet (carpet, rug_cleaner) might sweep the carpet. Controlling interactions between the carpet and rug_cleaner objects requires procedural logic. The use of independent affiliates is not sufficient for this purpose. The required functionality, of course, can easily be obtained by refining clean_carpet procedurally into a case selection involving vacuum (carpet) and sweep (carpet) where carpet is the only parameter.

The following further clarifies the limits and role of affiliates in implementing solution rules with two or more "active" objects as parameters: Assume an instructional system including the solution rule test (:teacher, learner;) which coordinates interactions between (active) teacher and learner objects. At first thought, it might appear that test could be implemented in terms of affiliates in teacher that construct and present test problems to learner, and an affiliate in learner that attempts to solve problems. Although such affiliates might seem independent of one another (as with making beds and vacuuming carpets in the example above), this is not the case. Further consideration makes it clear that learner cannot attempt to solve a problem that teacher has not yet presented. Consequently, implementation requires that the solution rule test first be refined procedurally (into a sequence of solution rules, each of which can be implemented in terms of affiliates). One such rule might be construct_problem (:teacher, learner; problem) where only the teacher is active. Although the preferred embodiment employs the notion of abstract operations (on objects), that are implemented in terms of affiliates, it is clear to anyone skilled in the art that the same functionality can be obtained using standard object-oriented methods.

Event-driven programming can be viewed as a special case of sequential programming in which the operating system serves to coordinate interactions between interacting objects. In this context, the role of the operating system is frequently ignored. In effect, the objects interact directly or indirectly via cyclical calling relationships between the objects. For instance, after construct_problem the teacher might direct the learner to solve the problem—quiz (problem, teacher_status: teacher, learner:). The quiz solution rule would help the active learner object solve the problem. If the learner has a question (and the teacher_status indicates whether the teacher is willing to entertain questions), then the learner is allowed to create a question and invoke answer_question (question: teacher, learner; answer) in the teacher object.

Instead of having the teacher and learner objects interacting directly in a cyclically calling relationship, they can made to interact indirectly. This can be accomplished by introducing globally available information whose use is coordinated by the operating system. For example, before starting a quiz the teacher could register (i.e., make globally available) that he is ready to answer questions (e.g., register_abilities ('question', answer_question: teacher;) where answer_question is a callback in the teacher class). When the learner has a question he might invoke ask_question (question: leaner; answer). The rule ask_question in the learner object, then, would indirectly invoke answer_question in the teacher object. When done in this way, it is possible to easily change the model for the teacher without having to change the model for the learner.

To summarize, internally consistent (and correct) designs may be called from and used in essentially any architecture, including procedural architectures (in which case the designs correspond to programs), event-driven applications (including application frameworks, GUI development environments, etc.) and client-server environments. This is true whether procedural or object-oriented methods are used. The interpreter, debugger and code generator in the preferred embodiment support all of these architectures and methods. The preferred method for incorporating designs into various architectures is summarized in FIG. 22.

While the invention has been described in terms of a preferred embodiment using a specific methodology in a specific system environment, those skilled in the art recognize that the invention can be practiced, with modification, using other methodologies and in other and different hardware and software environments within the spirit and scope of the appended claims.

Having thus described our invention, what we claim as new, and desire to secure by Letters Patent is:

1. A computer implemented method for specifying, designing, testing, implementing and maintaining at least one of a plurality of systems that can be guaranteed to be internally consistent and abstractly correct with respect to their specifications via successive refinement, said method comprising the steps of:

a) building and maintaining a specification hierarchy representing a behavioral system in which input and output variables have been hierarchically structured so that abstract behavior of said behavioral system at successive levels of refinement in said specification hierarchy is equivalent in response to a request to specify the behavior of said system;

b) in response to a request building and maintaining a design hierarchy corresponding to the behavioral system in which each refinement in said design hierarchy conforms to consistency constraints, which guarantee that the children in each said refinement produce behavior that is abstractly equivalent to that of the parent, wherein each design in said design hierarchy produces abstract behavior equivalent to a corresponding specification hierarchy hierarchy when said specification hierachy of step a) exists;

c) analyzing at least one of said specification hierarchy and said design hierarchy in response to a request to extract information inherent in at least one of said specification hierarchy and said design hierarchy;

d) modifying said specification hierarchy in response to a request to modify the abstract behavior of said specification hierarchy;

e) modifying said design hierarchy in response to a request to modify the abstract behavior of said design hierarchy;

f) testing at least one design in response to a request subsequent to at least one of the steps of dynamically modeling the behavior of said design and creating test cases for said design and proving conclusively that a component in at least one said design executes according to its specification;

g) in response to a request implementing at least one component by converting said components in said design into executables; and h) in response to a request performing at least one of the steps of executing said design, calling said design from an existing application and executing a component or a design corresponding to at least one component in said design.

2. A method in accordance with claim 1, further comprises the steps of:

a1) specifying at least one output variable, and for each said output variable in said specification hierarchy, specifying zero or one input variable and at least one input variable to said specification hierarchy which maps into said output variable;

b1) partitioning the values of each said input and output variable of said specification hierarchy into equivalence classes, said partition consisting of a finite number of abstract values, one abstract value being the default number;

c1) specifying a mapping of said abstract input values of step b1, into said abstract output values;

d1) given one of an input variable and an output variable in said specification hierarchy, refining said variable into one of no child variables, said variable then being terminal in said specification hierarchy, and one of component child variables and category child variables and relationships between child variables and operations, specifying mappings between input and output child variables, said components, categories, relationships and operations more fully characterizing said input and output variables;

e1) specifying a mapping between the abstract values of each said parent variable of step d1) and the abstract values of said children variables of said parent variable;

f1) for each said child output variable of step d1), specifying a mapping from said abstract values of said input children variables of step d1 ) into said abstract values of each said child output variable; and g1) ensuring that said input and output mappings of step c1) are consistent with said child mappings of step a1), in which case the mapping of step e1) followed by the mapping of step c1) generates the same abstract values for each said output variable of step c1) as does the mapping of step f1) followed by the mapping of step e1).

3. A method in accordance with claim 2, wherein said step d1) of refining each said input and output variable into child variables further comprises:

a2) when said refinement is a component refinement, distinguishing between prototype component refinements in which one child component represents a finite set of child components, each of which has exactly the same structure and the same abstract values, and those said component refinements which are not said prototype refinements; and b2) when said refinement is a category refinement, distinguishing between category refinements in which all child variables are atomic, without any internal component structure, and those said category refinements In which at least one said child variable has component variables.

4. A method in accordance with claim 2 for constructing a higher order specification hierarchy when the values of at least one said variable of claim 2 are specifications.

5. A method in accordance with claim 2 for constructing specifications for real time systems wherein the values of at least one variable of said specification are themselves one of time and timed events.

6. A method in accordance with claim 1 wherein said step b) of building a design hierarchy by successive refinement of design components in which each refinement in said hierarchy conforms to consistency constraints, which guarantee that the children In each refinement produce behavior that is abstractly equivalent to that of the parent, wherein each design component in said hierarchy produces abstract behavior equivalent to said specification when said specification hierarchy of step a) of claim 1 exists, further comprises the steps of:

a1) constructing and choosing a name for a top-level design component in said design hierarchy, in which the parameters of said top-level design component include all of the input and output variables at the top-level of said specification hierarchy of claim 1, and when said specification hierarchy of claim 1 hierarchy exists, said design component also including as parameters one of no external events and input events and their abstract values from outside said design hierarchy;

b1) refining each design component of said design hierarchy into one of a sequence, parallel, selection, iteration, affiliate, relation and operation refinement in accordance with specified consistency constraints, wherein said consistency constraints ensure that the abstract behavior of each said design component is equivalent to the abstract behavior of the child design components in said refinement;

c1) for each parameter of each said child design component of step b) which is not identical to a variable in said specification hierarchy of claim 1 or a parameter of the parent design component of said refinement of step b), partitioning the values of said parameter into abstract values, one said abstract value being the default, and specifying the abstract input-output behavior for each said design component in said each refinement, the full set of input and output parameters of each child design component in said each refinement comprising the specifications for said child design component; d1) verifying that the abstract behavior specified by each parent design component in each said refinement is consistent with the abstract behavior specified by the children design components in each said refinement; and e1) when said specification hierarchy of step a) of claim 1 exists, repeating steps b1) through d1) until all variables in said specification hierarchy of step a) of claim 1 have been referenced in said design hierarchy.

7. A method in accordance with claim 6 wherein said step b1) of refining said design component into one of a sequence, parallel, selection, iteration, affiliates, relation and operation, in accordance with specified constraints on design refinements, wherein said specified constraints on design refinements ensure consistency of said refinement, further comprises the steps of, a1) when at least one parameter of said design component corresponds to a variable in said specification hierarchy of claim 6, herein called a specification parameter (I) selecting one said specification parameter of said design component, (ii) determining the specification refinement type of said specification parameter, and (iii) suggesting the type of refinement of said design component as follows;

when the type of said specification parameter is a component refinement, then suggesting a parallel refinement for said design component, when the type of said specification parameter is a prototype refinement representing a variable number of components, then suggesting a loop refinement for said design component, when the type of said specification parameter is a prototype refinement representing a fixed number of components, then suggesting a navigation sequence refinement for said design component, when the type of said specification parameter is a terminal refinement with at least two abstract values, then suggesting a case refinement for said design component, otherwise make no said suggestion, when the type of said specification parameter is a category refinement with atomic sub-categories, then suggesting one of a selection and case refinement for said design component, when the type of said specification parameter is a category refinement with non-atomic sub-categories, otherwise known as a class inheritance hierarchy, then suggesting an affiliate refinement for said design component when the type of said specification parameter is an relational refinement, otherwise known as a extraction refinement, then suggesting a sequence refinement for said design component, when the type of said specification parameter is a dynamic refinement, then suggesting an interactional refinement for said design component;

(iv) choosing a refinement type for said design component, (v) verifying that said refinement type is consistent with said specification hierarchy, wherein said consistency means:

when the refinement type of said design component is a parallel refinement, then at least one of said specification parameter of said design component must be one of a terminal refinement and a component refinement, when the refinement type of said design component is a loop refinement, then at least one specification parameter of said design component must be one of a terminal refinement and a prototype refinement representing a variable number of components, when the refinement type of said design component is a navigation sequence refinement, then at least one specification parameter of said design component must be one of a terminal refinement and a prototype refinement representing a fixed number of components, when the refinement type of said design component is one of a case refinement and a selection refinement, then at least one specification parameter of said design component must be one of a terminal refinement and a category refinement with atomic sub-categories, when the refinement type of said design component is a case refinement, then at least one specification parameter of said design component must be one of a terminal refinement and an atomic category refinement, when the refinement type of said design component is an affiliate refinement, in which at least one parameter of said design component is an object, wherein said design component is an abstract design component, then at least one specification parameter of said design component must be one of a terminal refinement and a non-atomic category refinement, when the refinement type of said design component is a sequence refinement, then at least one specification parameter of said design component must be one of a terminal refinement and a relational refinement, when the refinement type of said design component is an interactional refinement, then at least one specification parameter of said design component must be one of a terminal refinement and a dynamic refinement, and b2) for said refinement of step a2), checking to ensure that consistency constraints for the refinement type of said refinement are satisfied, and ensuring that the abstract behavior of said design component is equivalent to the abstract behavior of the child design components in said refinement.

8. A method in accordance with claim 6 for constructing a higher order design hierarchy when the values of at least one parameter of said design component of claim 6 are design components.

9. A method in accordance with claim 6 for constructing designs for real time system wherein the values of at least one variable of a design are themselves one of time and timed events.

10. A method in accordance with claim 1 wherein said step of maintaining said specification hierarchy of step a) of claim 1 in which input and output variables have been hierarchically structured so that abstract behavior at successive levels of refinement is equivalent, further comprises the steps of, a1) modifying the abstract input-output behavior of at least one variable in said specification hierarchy;

b1) updating the abstract input-output behavior of the parent and the children of said variable of step a) to maintain abstract consistency;

c1) updating refinements in which said parent is a child and in which those said children which are changed are parents; and d1) repeating step c1) until there are no more parent variables and no more children which are changed.

11. A method in accordance with claim 1 wherein said step of modifying a design hierarchy in which the behavior of the parent and children In each said refinement is equivalent, further comprises the steps of:

a1) modifying the abstract behavior of a design component in said design hierarchy;

b1) updating the parent of said design component in accordance with the consistency constraints of the refinement containing said parent and ensuring that the abstract behavior of the parent and children in said refinement is equivalent and updating the children of said design component in accordance with the consistency constraints of the refinement containing said design component and ensuring that the abstract behavior of said design component and its children is equivalent;

c1) updating the parent in those refinements in which said parent is a child when said parent has been changed;

d1) updating the children in those refinements in which said child is a parent when said child has been changed; and e1) repeating step c1) and d1) until there are no more parent and child design components.

12. A method in accordance with claim 11 wherein said step c1) of updating the parent of said design component in said design hierarchy further comprises the steps of:

a2) identifying the parent of said design component in said design hierarchy, b2) identifying the type of refinement associated with said parent; and c2) constructing a parent design component for said refinement of step b2) from the children of said refinement using consistency constraints specified for said type of refinement of step b2).

13. A method in accordance with claim 12 wherein the step of constructing a parent design component from children design components further comprises:

a) for each sequence refinement In said program, using consistency constraints for sequences to construct the patent design component in said sequence refinement;

b2) for each selection refinement in said program, using consistency constraints for selections to construct the parent design component in said selection refinement;

c3) for each loop refinement in said program, using consistency constraints for loops to construct the parent design component in said loop refinement; and d3) when said refinement is a loop refinement, said loop refinement contains one of an unelaborated loop body and a condition and an advance operation, an action operation and a condition.

14. A method in accordance with claim 13 wherein said step of constructing a parent design component from said children design components in said sequence refinement further comprises:

a4) identifying those subsequences of said refinement that are navigation sequences and those subsequences of said sequence refinement that are parallel refinements;

b4) inserting into Said design hierarchy of claim 13 a parent for each said subsequence, said subsequence parent replacing its children in said sequence and updating the contents of each said subsequence parent; and c4)c) updating said sequence refinement.

15. A method in accordance with claim 14 wherein said step of identifying those subsequences of said sequence that are navigation sequences and those subsequences of said sequence that are parallel refinements further comprises:

a5) one of not partitioning the design components in said sequence refinement and partitioning Said sequence into navigation sub-sequences which introduce alias variables and non-navigation sequences, which do not introduce said aliases, and using consistency constraints to convert navigation sub-sequences into navigation sequence refinements;

b5) for each non-navigation sequence and each navigation sequence refinement in said program, one of not partitioning said sequences and partitioning said sequences into sub-sequences of steps which must be carried out sequentially and those sub-sequences which may be carried out in parallel, and c5) when a said subsequence may be carried out in parallel, using consistency constraints to construct a parent design component for said parallel refinement, wherein new higher level parameters, composed of component variables in child design components, may be introduced in said parent design component.

16. A method in accordance with the method of claim 11, which creates an internally consistent design hierarchy from a design that has been constructed using traditional methods of assembling design components, wherein said design is constructed from design components in a canonical form, including refinement types and wherein goto's have been eliminated, wherein said design defines an implicit design hierarchy whose higher level elements include the successively embedded refinement types in said design and wherein higher level design components in said implicit design hierarchy are constructed from said design, said method comprising the steps of, a2) embedding said design in an implicit design hierarchy; and
 b2) applying the method claim 11 to each refinement in said implicit design hierarchy, wherein each child of each said refinement is a design component in one of said design and said implicit design hierarchy, to construct a parent design component in said refinement.

17. A method for converting the steps in a plurality of programs into components represented in said canonical form of claim 16, wherein said programs are written in a structured programming language in which goto's have been eliminated, wherein said programs may be one of program, subroutine, function, affiliate operation or method associated with an object, callback and remote procedure call, and wherein said canonical form means that each design component is an operation or function, whose input and output parameters are typeless and which does not reference any global variables, said method comprising the steps of;

a) receiving said program;
 be) converting global variables used in said program to parameters and insuring that said program consists entirely of modules;
 c3) converting each statement in each module in said program into a design component represented in said canonical form wherein the type of each parameter of each said canonical design component is represented as a data structure of typeless data elements and the input, output and Input-output role of each said parameter is represented in said canonical form, and
 d3) reverse engineering, said program to extract the implicit design hierarchy of refinement types defined by said program.

18. A method in accordance with claim 1 wherein the step of testing at least one design by one of dynamically modeling the behavior of said design, creating test cases for said design and proving that a design component executes correctly, wherein said design may be at any level of abstraction in said design hierarchy, wherein parameters of said design components may have multiple data types in which case said design components are called abstract design components, further comprises:

a1) selecting a design
 b1) the dynamically modeling the behavior of said design comprising,
  (I) when said design element is an abstract design component, then determining which affiliates to invoke at run-time based on the structure of the parameters and replacing said design component with a sequence whose elements are affiliate design components,
  (ii) when said design component is not executable, then presenting an external agent with the input values of the parameters of said design component, and obtaining the corresponding output values and data structures of said parameters from said external agent,
  (iii) when said design component is executable, then executing said design component,
  (iv) repeating steps (i) through (iii) until there are no more design components to interpret;
 c1) in response to a request to create test cases for said design wherein said test cases can be used to ensure that said design produces behavior consistent with said specification of claim 1,
  (i) selecting at least one set of actual values for each combination of abstract values of input variables in said specification of claim 1 associated with said selected design, wherein each said set contains one actual value for each said abstract value of input variables;
  (ii) for each combination of said abstract values of input variables of said step (i), determining the corresponding set of abstract output values of output variables in said specification of claim 1, each said combination of actual input values of step (i) and said corresponding abstract output values constituting a test case; and
  (iii) applying said test cases of step c1 (ii) to said design of step a1) and determining whether each actual output value belongs to said corresponding abstract value of output variables of step c1) (ii) for said corresponding test case; and
 d1) in response to a request to prove conclusively that a given design component executes according to its specification,
  (i) selecting a verification method including at least one of formal proofs, automated theorem proving techniques and other verification methods;
  (ii) when at least one of formal proofs and automated theorem proving techniques is selected in said step d1) (i) and the specification of said design component is not sufficiently precise to allow use of at least one of said formal proofs and automated theorem proving techniques, then
   identifying variables in said specification of said design component whose abstract values are too abstract to allow proof and
   introducing a relational refinement, also called an extract refinement, wherein the specification of the children in said relational refinement is represented as a relationship between two or more variables, wherein said relationship is sufficiently precise, wherein said relationship is expressed in some suitable logic, for use in at least one of said formal proofs and automated theorem proving techniques.

19. A method in accordance with claim 1, wherein step g) of implementing at least one component in a design in a manner which guarantees abstract correctness, said method comprising the steps of:

a) in response to a request, one of receiving and identifying and constructing a finite set of design components sufficient for implementing all contemplated design components in a given set of designs;
 b) in response to a request, receiving an unimplemented design component and converting said design component into a problem whose input consists of the specification for said design component and whose goal is satisfied by designs consistent with asid specification;

c) in response to a request, deriving a design component from said finite set of components consistent with said specification of said design component of step b); and d) in response to a request, when absolute correctness must be guaranteed, verifying that said derived design component executes correctly; and e) in response to a request, repeating steps b) through d) until all design components in said design of step b) have been implemented.

20. Given a design in a design hierarchy Implemented in accordance with the method of claim 19, a method for implementing an equivalent design in said design hierarchy, in which said equivalent design is at least one of faster in execution and more compact in size; said method compricing the steps of:

a2) when the designer seeks to speed execution,
  (I) identifying a portion of said design, commonly known as a section of code, which Is operating slower than desired,
  (ii) identifying that design component, which is at a higher level of abstraction In said design hierarchy and which is the parent of a sub-hierarchy in said design hierarchy which includes said identified section of code,
  (iii) implementing said higher level design component in a lower level language and
  (iv) when the designer seeks to eliminate redundancy, at least one of deleting unused local variables in said design and replacing a local variable used in one subtree of said design hierarchy with a reusable local variable used in a preceding subtree of said design hierarchy;

b2) when the designer seeks to make said design more general,
  (I) identifying a component in said design, wherein at least one original parameter of said given component may be replaced by another parameter, said another parameter having the same commonly understood "real world" meaning and representing a set of data structures, which includes the data structure of said original parameter,
  (ii) replacing said original parameter with said another parameter and converting said design component into an abstract design component and constructing a class hierarchy, including affiliates that support all data structures associated with said another parameter.

21. A method in accordance with claim 19, wherein said step of constructing a finite set of design components sufficient for implementing all contemplated designs, wherein said finite set of design components consists of lower and higher order design components, and wherein said lower and higher design components collectively provide a sufficient basis for constructing designs that satisfy an arbitrarily diverse set of specifications in some implicitly, but ill-defined domain of problems, further comprises
  a2) constructing a finite sample of specifications in said ill-defined domain;
  b2) constructing a design component for each specification in said finite sample of step a);
  c2) for each said design component, one of converting and not converting said design into a higher order specification;
  d2) constructing a higher order design component for each said higher order specification;
  e2) one of repeating steps c) and d) and not repeating said steps.

22. A method in accordance with claim 21, wherein said step c) of converting said design into a higher order specification further comprises:
  a) for each said design of step b) of claim 21, identifying corresponding Input designs from which said design can be constructed;
  be) for each said design of step a), constructing a pair consisting of the specification for said design and the set of input designs of step a) that map into said design;
  c3) partitioning said pairs of step b) into equivalence classes using at least one of artificial intelligence, another automated technique and designer judgment; and
  d3) converting each said equivalence class of step c) into a higher order specification, wherein the inputs and output in said higher order specification are at least one of an abstraction and a generalization of a corresponding pair.

23. Given a problem, wherein the input to said problem is the specification for a to-be-implemented design component, together with a finite set of available components, and the goal in said problem Is a design that satisfies said specification, a method in accordance with claim 19 wherein the step of deriving said design from said finite set of available components further comprises the steps of:
  a2) finding a component in said finite set of available components, which matches said problem, wherein the output of said component contains the specification of said problem at a specified level of outputs in said specification said initial level being one;
  b2) when said component is found, then applying said component to said Input to said problem and said set of available components and adding the design generated by said component to the set of available components and decrementing the level of outputs in said specification which said finding of step a) searches;
  c2) when said component of step a) is not found, then incrementing the level of outputs at which said finding searches; and
  d2) repeating said steps a2)a) through c2) until one of said component of Step a) is found and said level of outputs reaches some prescribed number.

24. A method in accordance with claim 23, wherein said problem may be any of a plurality of problems, wherein the input to said problem may be any given, the set of available components may be any set of problems, the goal in said problem may be any goal and a solution to said problem is a design that operates on said given and generates an output that satisfies said goal of said problem.

25. A method in accordance with claims 23, wherein said step of finding a component whose specification matches said solution, further comprises:
  a) a) when a component has the desired behavior but the interface is not in a prescribed canonical form, then semantically wrapping said component to conform to said canonical form.

26. A method in accordance with claim 1, wherein a specification hierarchy is constructed from a design hierarchy constructed in accordance with step b), wherein each kind of design refinement corresponds one-to-one with a unique specification refinement, said method comprising the steps of:
  a1) when said design hierarchy has no explicit specification, select the top level input and output variables in said design hierarchy as said specification;

b1) for each refinement in said design hierarchy of each said variable, identifying the refinement type, the children variables of said refinement, and the abstract values of said children variables in said design refinement:

c1) converting the type of said design refinement into the corresponding specification refinement type and adding said converted refinement type, including its children variables and abstract values, to said specification hierarchy; and d1) repeating steps b1) and c1) until one of all said children variables have been identified and converted and said specification has otherwise been deemed by some human or intelligent agent to be sufficiently detailed.

27. A method by which designs constructed in accordance with step h) of claim 25, wherein said design can be utilized within or in conjunction with one of a plurality of existing designs, components, applications and operating systems, said method comprising at least one of the steps of:

a) executing said design;

b) when one of said application and said operating system calls a component corresponding to said design, then converting calls from one of said application and said operating system into calls on said design; and c) when said design calls a design component, which can be implemented using at least one of the steps of calling an existing design, calling an executable component, calling an application and calling an operating system, then replacing said design component in said design with one of said existing design, component, application and operating system.

* * * * *